(12) United States Patent
Misra et al.

(10) Patent No.: US 12,301,803 B2
(45) Date of Patent: May 13, 2025

(54) SYSTEMS AND METHODS FOR REDUCING A RECONSTRUCTION ERROR IN VIDEO CODING BASED ON A CROSS-COMPONENT CORRELATION

(71) Applicant: Sharp Kabushiki Kaisha, Sakai (JP)

(72) Inventors: Kiran Mukesh Misra, Vancouver, WA (US); Frank Bossen, Vancouver, WA (US); Christopher Andrew Segall, Vancouver, WA (US); Sachin G. Deshpande, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/617,986

(22) Filed: Mar. 27, 2024

(65) Prior Publication Data

US 2024/0275961 A1 Aug. 15, 2024

Related U.S. Application Data

(63) Continuation of application No. 17/766,322, filed as application No. PCT/JP2020/024648 on Jun. 23, 2020, now Pat. No. 11,979,566.

(60) Provisional application No. 62/950,000, filed on Dec. 18, 2019, provisional application No. 62/913,065, filed on Oct. 9, 2019.

(51) Int. Cl.
| | |
|---|---|
| *H04N 19/86* | (2014.01) |
| *H04N 19/117* | (2014.01) |
| *H04N 19/186* | (2014.01) |
| *H04N 19/46* | (2014.01) |
| *H04N 19/70* | (2014.01) |
| *H04N 19/82* | (2014.01) |

(52) U.S. Cl.
CPC ......... *H04N 19/117* (2014.11); *H04N 19/186* (2014.11); *H04N 19/46* (2014.11); *H04N 19/70* (2014.11); *H04N 19/82* (2014.11)

(58) Field of Classification Search
CPC .... H04N 19/117; H04N 19/186; H04N 19/46; H04N 19/70; H04N 19/82
See application file for complete search history.

(56) References Cited

U.S. PATENT DOCUMENTS

2022/0182641 A1* 6/2022 Nam ................. H04N 19/176

OTHER PUBLICATIONS

Misra et al., "Systems and Methods for Reducing a Reconstruction Error in Video Coding Based on a Cross-Component Correlation", U.S. Appl. No. 17/766,322, filed Apr. 4, 2022.

* cited by examiner

*Primary Examiner* — Patrick E Demosky
(74) *Attorney, Agent, or Firm* — Keating & Bennett, LLP

(57) ABSTRACT

A method of filtering reconstructed video data is disclosed. The method comprising: parsing a first syntax element used for setting cross-component filter coefficients; inputting a reconstructed luma picture sample array; deriving luma locations by using location corresponding to a current chroma sample; deriving a filter coefficient array by using the cross-component filter coefficients; deriving a variable by using the filter coefficient array and the reconstructed luma picture sample array defined by the luma locations; and deriving a scaled variable by using the variable, wherein the variable is modified by a sum of a sample of a current chroma block, which is defined by a predetermined location, and the scaled variable.

3 Claims, 32 Drawing Sheets

FIG. 8

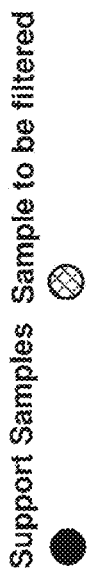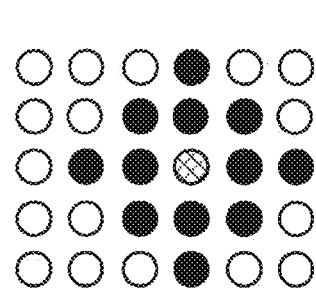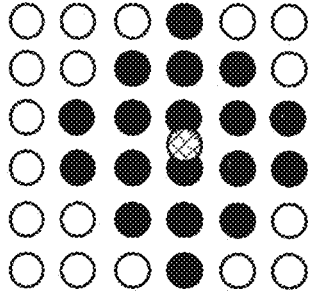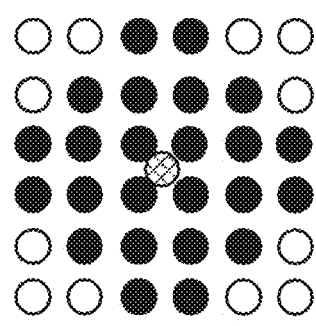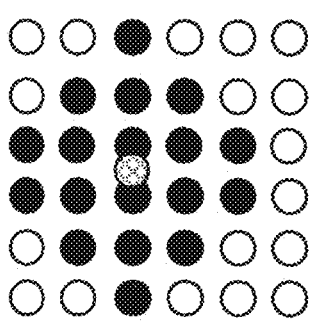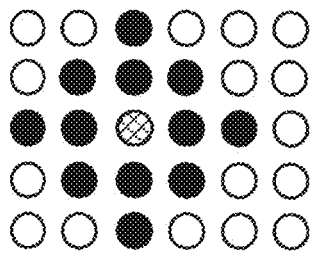
FIG. 9A FIG. 9B FIG. 9C FIG. 9D FIG. 9E FIG. 9F

Pre-determined
sample above line
boundary

Pre-determined
sample below line
boundary

Pre-determined
sample to the left of
line boundary

Pre-determined
sample to the right of
line boundary

Support Samples, Coefficient Signaled ●

Support Samples, Coefficient Derived ●

Sample to be filtered ⊗

SYSTEMS AND METHODS FOR REDUCING A RECONSTRUCTION ERROR IN VIDEO CODING BASED ON A CROSS-COMPONENT CORRELATION

CROSS REFERENCE

This Nonprovisional application claims priority under 35 U.S.C. § 119 on provisional Application No. 62/913,065 on Oct. 9, 2019, No. 62/950,000 on December 18, the entire contents of which are hereby incorporated by reference.

TECHNICAL FIELD

This disclosure relates to video coding and more particularly to techniques for reducing a reconstruction error.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is a data structure that may be received and decoded by a video decoding device to generate reconstructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardized video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that were under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the $10^{th}$ Meeting of ISO/IEC JTC1/SC29/WG11 16-20 Apr. 2018, San Diego, CA. From the multiple descriptions of video coding tools, a resulting initial draft text of a video coding specification is described in "Versatile Video Coding (Draft 1)," $10^{th}$ Meeting of ISO/IEC JTC1/SC29/WG11 16-20 Apr. 2018, San Diego, CA, document JVET-J1001-v2, which is incorporated by reference herein, and referred to as JVET-J1001. The current development of a next generation video coding standard by the VCEG and MPEG is referred to as the Versatile Video Coding (VVC) project. "Versatile Video Coding (Draft 5)," 14th Meeting of ISO/IEC JTC1/SC29/WG11 19-27 Mar. 2019, Geneva, CH, document JVET-N1001-v8, which is incorporated by reference herein, and referred to as JVET-N1001, represents an iteration of the draft text of a video coding specification corresponding to the VVC project. "Versatile Video Coding (Draft 6)," 15th Meeting of ISO/IEC JTC1/SC29/WG11 3-12 Jul. 2019, Gothenburg, SE, document JVET-O2001-vE, which is incorporated by reference herein, and referred to as JVET-O2001, an iteration of the draft text of a video coding specification corresponding to the VVC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream.

SUMMARY OF INVENTION

In one example, a method of filtering reconstructed video data, the method comprising: parsing a first syntax element used for setting cross-component filter coefficients; inputting a reconstructed luma picture sample array; deriving luma locations by using location corresponding to a current chroma sample; deriving an filter coefficient array by using the cross-component filter coefficients; deriving a variable by using the filter coefficient array and the reconstructed luma picture sample array defined by the luma locations; and deriving a scaled variable by using the variable, wherein the variable is modified by a sum of a sample of a current chroma block, which is defined by a predetermined location, and the scaled variable.

In one example, a device for coding video data, the device comprising one or more processors configured to: code a first syntax element used for setting cross-component filter coefficients; input a reconstructed luma picture sample array; derive luma locations by using a location corresponding to a current chroma sample; derive an filter coefficient array by using the cross-component filter coefficients; derive a variable by using the filter coefficient array and the reconstructed luma picture sample array defined by the luma locations; and derive a scaled variable by using the variable, wherein the variable is modified by a sum of a sample of a current chroma block, which is defined by a predetermined location, and the scaled variable.

In one example, a device for decoding video data, the device comprising one or more processors configured to: decode a first syntax element used for setting cross-component filter coefficients; input a reconstructed luma picture sample array; derive luma locations by using a location corresponding to a current chroma sample; derive an filter coefficient array by using the cross-component filter coefficients; derive a variable by using the filter coefficient array and the reconstructed luma picture sample array defined by the luma locations; and derive a scaled variable by using the variable, wherein the variable is modified by a sum of a sample of a current chroma block, which is defined by a predetermined location, and the scaled variable.

BRIEF DESCRIPTION OF DRAWINGS

FIG. 8 is a conceptual diagram illustrating examples of reconstruction errors for multiple components of video data in accordance with one or more techniques of this disclosure.

FIG. 9A is a conceptual diagram illustrating example of support samples which may be used for cross component filtering in accordance with one or more techniques of this disclosure.

FIG. 9B is a conceptual diagram illustrating example of support samples which may be used for cross component filtering in accordance with one or more techniques of this disclosure.

FIG. 9C is a conceptual diagram illustrating example of support samples which may be used for cross component filtering in accordance with one or more techniques of this disclosure.

FIG. 9D is a conceptual diagram illustrating example of support samples which may be used for cross component filtering in accordance with one or more techniques of this disclosure.

FIG. 9E is a conceptual diagram illustrating example of support samples which may be used for cross component filtering in accordance with one or more techniques of this disclosure.

FIG. 9F is a conceptual diagram illustrating example of support samples which may be used for cross component filtering in accordance with one or more techniques of this disclosure.

FIG. 10 is conceptual diagram illustrating an example of reducing a reconstruction error using cross component filtering accordance with one or more techniques of this disclosure.

FIG. 14A is a conceptual diagram illustrating example of filter coefficient locations which may be used for cross component filtering in accordance with one or more techniques of this disclosure.

FIG. 14B is a conceptual diagram illustrating example of filter coefficient locations which may be used for cross component filtering in accordance with one or more techniques of this disclosure.

FIG. 14C is a conceptual diagram illustrating example of filter coefficient locations which may be used for cross component filtering in accordance with one or more techniques of this disclosure.

FIG. 14D is a conceptual diagram illustrating example of filter coefficient locations which may be used for cross component filtering in accordance with one or more techniques of this disclosure.

FIG. 14E is a conceptual diagram illustrating example of filter coefficient locations which may be used for cross component filtering in accordance with one or more techniques of this disclosure.

FIG. 14F is a conceptual diagram illustrating example of filter coefficient locations which may be used for cross component filtering in accordance with one or more techniques of this disclosure.

FIG. 15A is a conceptual diagram illustrating example of filter coefficient locations which may be used for cross component filtering in accordance with one or more techniques of this disclosure.

FIG. 15B is a conceptual diagram illustrating example of filter coefficient locations which may be used for cross component filtering in accordance with one or more techniques of this disclosure.

FIG. 15C is a conceptual diagram illustrating example of filter coefficient locations which may be used for cross component filtering in accordance with one or more techniques of this disclosure.

FIG. 15D is a conceptual diagram illustrating example of filter coefficient locations which may be used for cross component filtering in accordance with one or more techniques of this disclosure.

DESCRIPTION OF EMBODIMENTS

Figure 1:
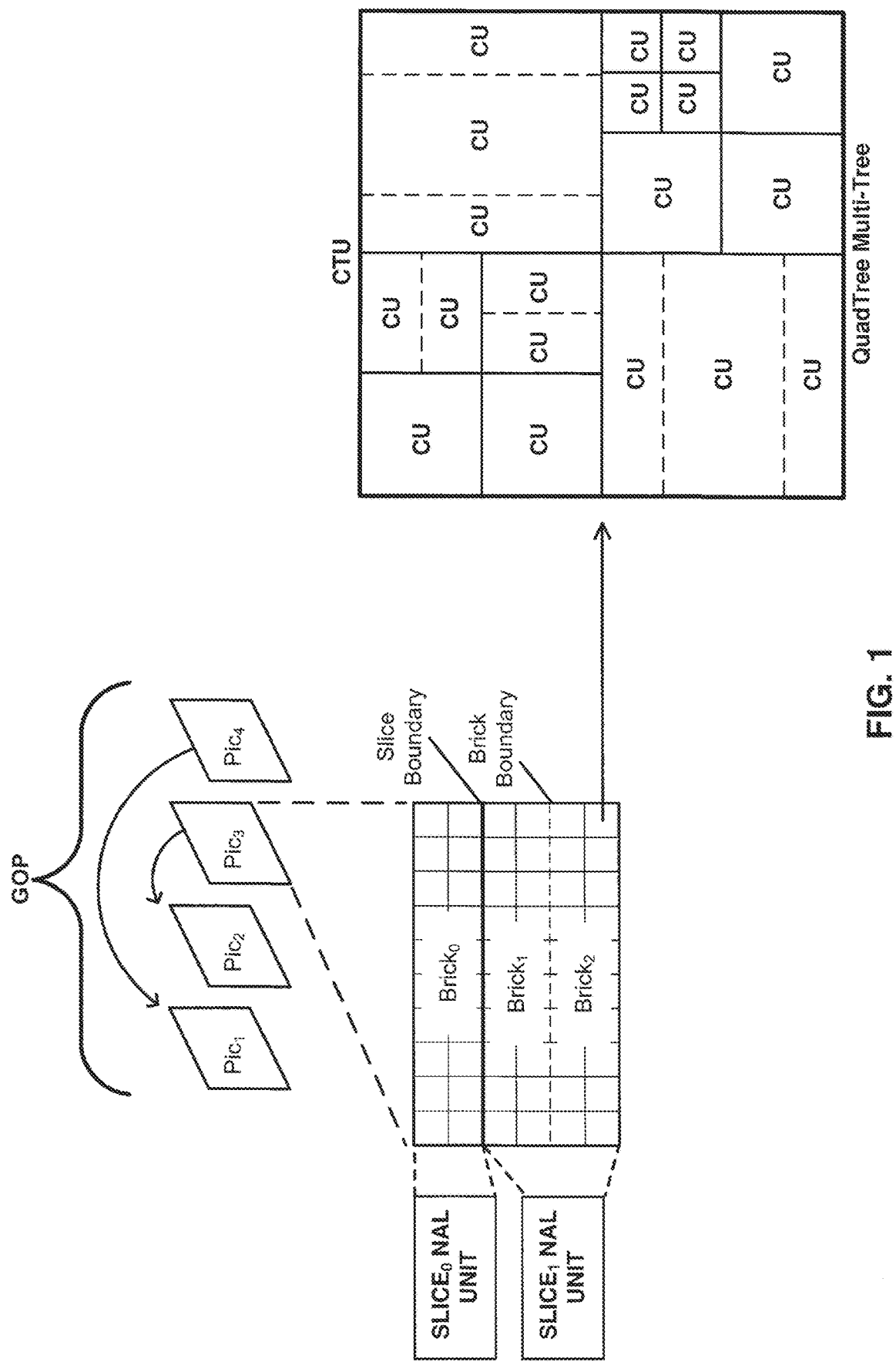
FIG. 1 is a conceptual diagram illustrating an example of a group of pictures coded according to a quad tree multi-tree partitioning in accordance with one or more techniques of this disclosure.

This application is related to U.S. Provisional Application No. 62/865,933, filed on Jun. 24, 2019; U.S. Provisional Application No. 62/870,752, filed on Jul. 4, 2019; U.S. Provisional Application No. 62/886,891, filed on Aug. 14, 2019; U.S. Provisional Application No. 62/899,053, filed on Sep. 11, 2019; U.S. Provisional Application No. 62/901,679, filed on Sep. 17, 2019; U.S. Provisional Application No. 62/904,399, filed on Sep. 23, 2019; U.S. Provisional Application No. 62/905,312, filed on Sep. 24, 2019; U.S. Provisional Application No. 62/910,317, filed on Oct. 3, 2019; and U.S. Provisional Application No. 62/913,065, filed on Oct. 9, 2019, each of which are incorporated by reference in their entirety.

In general, this disclosure describes various techniques for coding video data. In particular, this disclosure describes techniques for reducing a reconstruction error. It should be noted that although techniques of this disclosure are described with respect to ITU-T H.264, ITU-T H.265, JEM, JVET-N1001, and JVET-02001 the techniques of this disclosure are generally applicable to video coding. For example, the coding techniques described herein may be incorporated into video coding systems, (including video coding systems based on future video coding standards) including video block structures, intra prediction techniques, inter prediction techniques, transform techniques, filtering techniques, and/or entropy coding techniques other than those included in ITU-T H.265, JEM, JVET-N1001, and JVET-02001. Thus, reference to ITU-T H.264, ITU-T H.265, JEM, JVET-N1001, and/or JVET-02001 is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method comprises receiving reconstructed sample data for a current component of video data, receiving reconstructed sample data for one or more additional components of video data, deriving a cross component filter based on data associated with one or more additional components of video data, and applying a filter to the reconstructed sample data for a current component of video data based on the derived cross component filter and the reconstructed sample data for one or more additional components of video data.

In one example, a device comprises one or more processors configured to receive reconstructed sample data for a current component of video data, receiving reconstructed sample data for one or more additional components of video data, derive a cross component filter based on data associated with one or more additional components of video data, and apply a filter to the reconstructed sample data for a current component of video data based on the derived cross component filter and the reconstructed sample data for one or more additional components of video data.

In one example, a non-transitory computer-readable storage medium comprises instructions stored thereon that, when executed, cause one or more processors of a device to receive reconstructed sample data for a current component of video data, receiving reconstructed sample data for one or more additional components of video data, derive a cross component filter based on data associated with one or more additional components of video data, and apply a filter to the reconstructed sample data for a current component of video data based on the derived cross component filter and the reconstructed sample data for one or more additional components of video data.

In one example, an apparatus comprises means for receiving reconstructed sample data for one or more additional components of video data, means for deriving a cross component filter based on data associated with one or more additional components of video data, and means for applying a filter to the reconstructed sample data for a current component of video data based on the derived cross component filter and the reconstructed sample data for one or more additional components of video data.

The details of one or more examples are set forth in the accompanying drawings and the description below. Other features, objects, and advantages will be apparent from the description and drawings, and from the claims.

Video content includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region. For example, a rule defining a region may be that a region must be an integer number of video blocks arranged in a rectangle. Further, video blocks in a region may be ordered according to a scan pattern (e.g., a raster scan). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions.

A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr)). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may by halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-N1001 and JVET-02001, CTUs are partitioned according a quadtree plus multi-type tree (QTMT or QT+MTT) structure. The QTMT in JVET-N1001 and JVET-02001 is similar to the QTBT in JEM. However, in JVET-N1001 and JVET-02001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge. Referring again to FIG. 1, FIG. 1 illustrates an example of a CTU being partitioned into quadtree leaf nodes and quadtree leaf nodes being further partitioned according to a BT split or a TT split. That is, in FIG. 1 dashed lines indicate additional binary and ternary splits in a quadtree.

As described above, each video frame or picture may divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any). A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice.

With respect to JVET-N1001 and JVET-O2001, slices are required to consist of an integer number of bricks instead of only being required to consist of an integer number of CTUs. In JVET-N1001 and JVET-O2001, a brick is a rectangular region of CTU rows within a particular tile in a picture. Further, in JVET-N1001 and JVET-O2001, a tile may be partitioned into multiple bricks, each of which consisting of one or more CTU rows within the tile. A tile that is not partitioned into multiple bricks is also referred to as a brick. However, a brick that is a true subset of a tile is not referred to as a tile. As such, a slice including a set of CTUs which do not form a rectangular region of a picture may or may not be supported in some video coding techniques. Further, it should be noted that in some cases, a slice may be required to consist of an integer number of complete tiles and in this case is referred to as a tile group. The techniques described herein may applicable to bricks, slices, tiles, and/or tile groups. FIG. 1 is a conceptual diagram illustrating an example of a group of pictures including slices. In the example illustrated in FIG. 1, $Pic_3$ is illustrated as including two slices (i.e., $Slice_0$ and $Slice_1$). In the example illustrated in FIG. 1, $Slice_0$ includes one brick, i.e., $Brick_0$ and $Slice_1$ includes two bricks, i.e., $Brick_1$ and $Brick_2$. It should be noted that in some cases, $Slice_0$ and $Slice_1$ may meet the requirements of and be classified as tiles and/or tile groups.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B slice), bi-prediction, uni-prediction, and intra prediction modes may be utilized, for regions having a P type (e.g., a P slice), uni-prediction, and intra prediction modes may be utilized, and for regions having an I type (e.g., an I slice), only intra prediction modes may be utilized. As described above, reference pictures are identified through reference indices. For example, for a P slice, there may be a single reference picture list, RefPicList0 and for a B slice, there may be a second independent reference picture list, RefPicList1, in addition to RefPicList0. It should be noted that for uni-prediction in a B slice, one of RefPicList0 or RefPicList1 may be used to generate a prediction. Further, it should be noted that during the decoding process, at the onset of decoding a picture, reference picture list(s) are generated from previously decoded pictures stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding.

As described above, for inter prediction coding, reference samples in a previously coded picture are used for coding video blocks in a current picture. Previously coded pictures which are available for use as reference when coding a current picture are referred as reference pictures. It should be noted that the decoding order does not necessary correspond with the picture output order, i.e., the temporal order of pictures in a video sequence. In ITU-T H.265, when a picture is decoded it is stored to a decoded picture buffer (DPB) (which may be referred to as frame buffer, a reference buffer, a reference picture buffer, or the like). In ITU-T H.265, pictures stored to the DPB are removed from the DPB when they been output and are no longer needed for coding subsequent pictures. In ITU-T H.265, a determination of whether pictures should be removed from the DPB is invoked once per picture, after decoding a slice header, i.e., at the onset of decoding a picture. For example, referring to FIG. 1, $Pic_3$ is illustrated as referencing $Pic_2$. Similarly, $Pic_4$ is illustrated as referencing $Pic_1$. With respect to FIG. 1, assuming the picture number corresponds to the decoding order, the DPB would be populated as follows: after decoding $Pic_1$, the DPB would include $\{Pic_1\}$; at the onset of decoding $Pic_2$, the DPB would include $\{Pic_1\}$; after decoding $Pic_2$, the DPB would include $\{Pic_1, Pic_2\}$; at the onset of decoding $Pic_3$, the DPB would include $\{Pic_1, Pic_2\}$. $Pic_3$ would then be decoded with reference to $Pic_2$ and after decoding $Pic_3$, the DPB would include $\{Pic_1, Pic_2, Pic_3\}$. At the onset of decoding $Pic_4$, pictures $Pic_2$ and $Pic_3$ would be marked for removal from the DPB, as they are not needed for decoding $Pic_4$ (or any subsequent pictures, not shown) and assuming $Pic_2$ and $Pic_3$ have been output, the DPB would be updated to include $\{Pic_1\}$. $Pic_4$ would then be decoded with referencing $Pic_1$. The process of marking pictures for removal from a DPB may be referred to as reference picture set (RPS) management.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-N1001 and JVET-O2001, a CU is associated with a transform unit (TU) structure having its root at the CU level. That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed.

A quantization process may be performed on transform coefficients or residual sample values directly (e.g., in the case of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein, each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and/or previously coded syntax elements. For example, values of syntax elements associated with neighboring video blocks may be used to determine a context for a current bin.

Figure 2A:
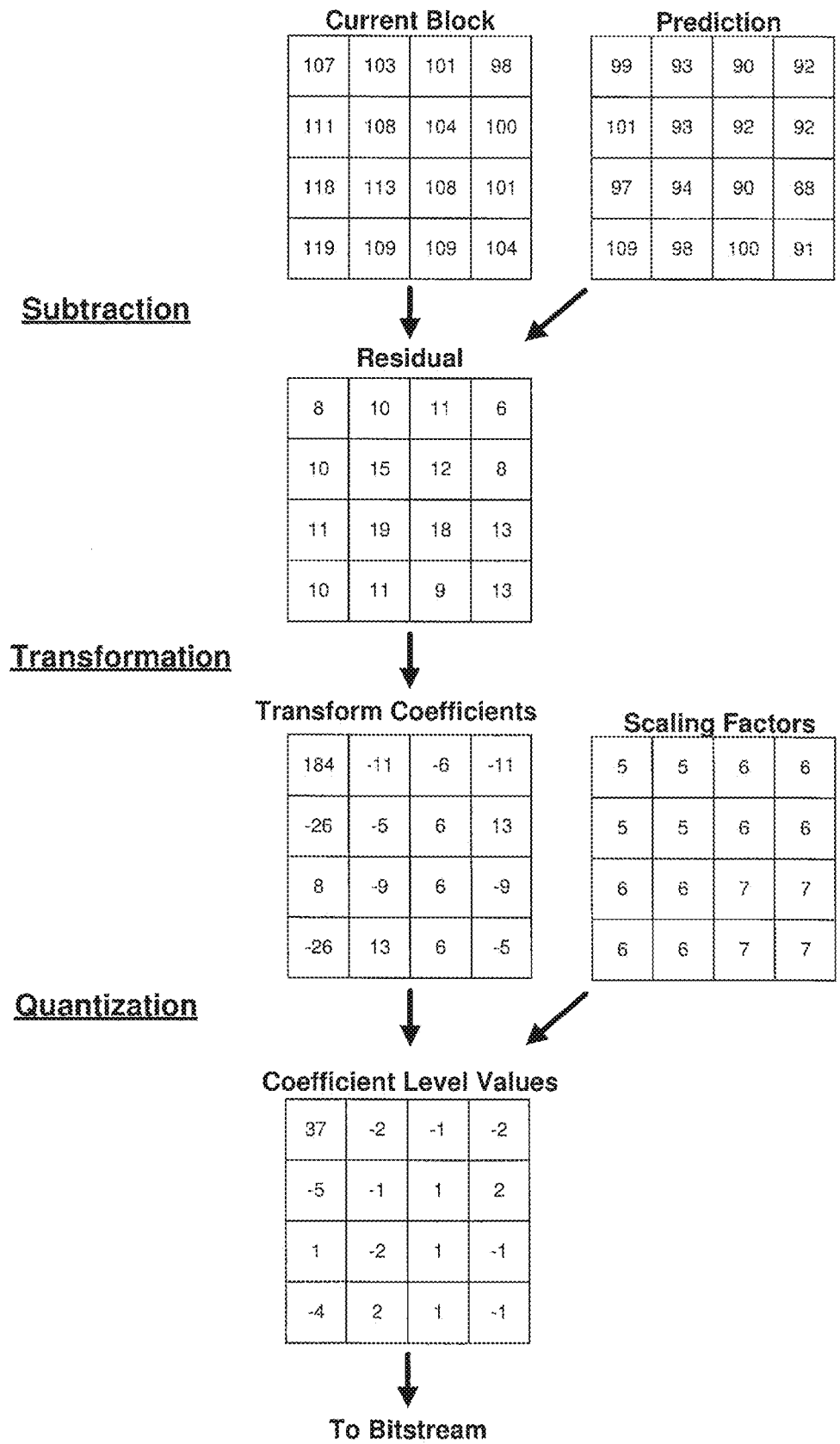
FIG. 2A is a conceptual diagram illustrating example of coding a block of video data in accordance with one or more techniques of this disclosure.
Figure 2B:
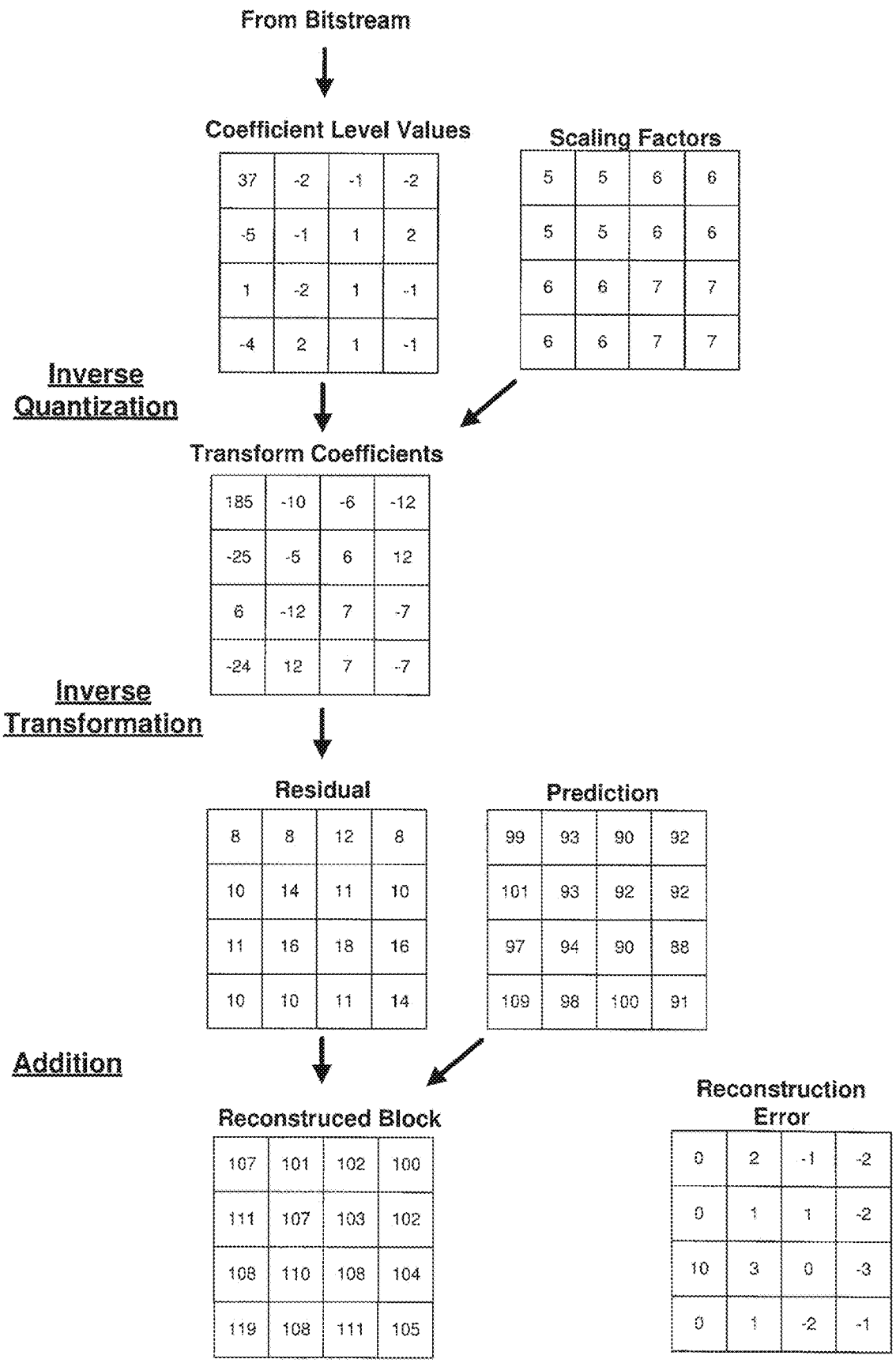
FIG. 2B is a conceptual diagram illustrating example of coding a block of video data in accordance with one or more techniques of this disclosure.

FIGS. 2A-2B are conceptual diagrams illustrating examples of coding a block of video data. As illustrated in FIG. 2A, a current block of video data (e.g., a CB corresponding to a video component) is encoded by generating a residual by subtracting a set of prediction values from the current block of video data, performing a transformation on the residual, and quantizing the transform coefficients to generate level values. As illustrated in FIG. 2B, the current block of video data is decoded by performing inverse quantization on level values, performing an inverse transform, and adding a set of prediction values to the resulting residual. It should be noted that in the examples in FIGS. 2A-2B, the sample values of the reconstructed block differs from the sample values of the current video block that is encoded. In particular, FIG. 2B illustrates a Reconstruction Error which is the difference between Current Block and Reconstructed Block. In this manner, coding may be said to be lossy. However, the difference in sample values may be considered acceptable or imperceptible to a viewer of the reconstructed video.

Further, as illustrated in FIGS. 2A-2B, coefficient level values are generated using an array of scaling factors. In ITU-T H.265, an array of scaling factors is generated by selecting a scaling matrix and multiplying each entry in the scaling matrix by a quantization scaling factor. In ITU-T H.265, a scaling matrix is selected based in part on a prediction mode and a color component, where scaling matrices of the following sizes are defined: 4×4, 8×8, 16×16, and 32×32. It should be noted that in some examples, a scaling matrix may provide the same value for each entry (i.e., all coefficients are scaled according to a single value). In ITU-T H.265, the value of a quantization scaling factor, may be determined by a quantization parameter, QP. In ITU-T H.265, for a bitdepth of 8-bits, the QP can take 52 values from 0 to 51 and a change of 1 for QP generally corresponds to a change in the value of the quantization scaling factor by approximately 12%. Further, in ITU-T H.265, a QP value for a set of transform coefficients may be derived using a predictive quantization parameter value (which may be referred to as a predictive QP value or a QP predictive value) and an optionally signaled quantization parameter delta value (which may be referred to as a QP delta value or a delta QP value). In ITU-T H.265, a quantization parameter may be updated for each CU and a respective quantization parameter may be derived for each of the luma and chroma channels.

As described above, with respect to the examples illustrated in FIGS. 2A-2B, the sample values of a reconstructed block may differ from the sample values of the current video block that is encoded. Further, it should be noted that in some cases, coding video data on a block-by-block basis may result in artifacts (e.g., so-called blocking artifacts, banding artifacts, etc.) For example, blocking artifacts may cause coding block boundaries of reconstructed video data to be visually perceptible to a user. In this manner, reconstructed sample values may be modified to minimize the difference between the sample values of the current video block that is encoded and the reconstructed block and/or minimize artifacts introduced by the video coding process. Such modifications may general be referred to as filtering. It should be noted that filtering may occur as part of an in-loop filtering process or a post-loop filtering process. For an in-loop filtering process, the resulting sample values of a filtering process may be used for predictive video blocks (e.g., stored to a reference frame buffer for subsequent encoding at video encoder and subsequent decoding at a video decoder). For a post-loop filtering process the resulting sample values of a filtering process are merely output as part of the decoding process (e.g., not used for subsequent coding). For example, in the case of a video decoder, for an in-loop filtering process, the sample values resulting from filtering the reconstructed block would be used for subsequent decoding (e.g., stored to a reference buffer) and would be output (e.g., to a display). For a post-loop filtering process, the reconstructed block would be used for subsequent decoding and the sample values resulting from filtering the reconstructed block would be output.

Deblocking (or de-blocking), deblock filtering, or applying a deblocking filter refers to the process of smoothing the boundaries of neighboring reconstructed video blocks (i.e., making boundaries less perceptible to a viewer). Smoothing the boundaries of neighboring reconstructed video blocks may include modifying sample values included in rows or columns adjacent to a boundary. ITU-T H.265 provides where a deblocking filter is applied to reconstructed sample values as part of an in-loop filtering process. ITU-T H.265 includes two types deblocking filters that may be used for modifying luma samples: a Strong Filter which modifies sample values in the three adjacent rows or columns to a boundary and a Weak Filter which modifies sample values in the immediately adjacent row or column to a boundary and conditionally modifies sample values in the second row or column from the boundary. Further, ITU-T H.265 includes one type of filter that may be used for modifying chroma samples: Normal Filter.

In addition to applying a deblocking filter as part of an in-loop filtering process, ITU-T H.265 provides where Sample Adaptive Offset (SAO) filtering may be applied in the in-loop filtering process. In ITU-T H.265, SAO is a process that modifies the deblocked sample values in a region by conditionally adding an offset value. ITU-T H.265 provides two types of SAO filters that may be applied to a CTB: band offset or edge offset. For each of band offset and edge offset, four offset values are included in a bitstream. For band offset, the offset which is applied depends on the amplitude of a sample value (e.g., amplitudes are mapped to bands which are mapped to the four signaled offsets). For edge offset, the offset which is applied depends on a CTB having one of a horizontal, vertical, first diagonal, or second diagonal edge classification (e.g., classifications are mapped to the four signaled offsets).

Another type of filtering process includes the so-called adaptive loop filter (ALF). An ALF with block-based adaption is specified in JEM. In JEM, the ALF is applied after the SAO filter. It should be noted that an ALF may be applied to reconstructed samples independently of other filtering techniques. The process for applying the ALF specified in JEM at a video encoder may be summarized as follows: (1) each 2×2 block of the luma component for a reconstructed picture is classified according to a classification index; (2) sets of filter coefficients are derived for each classification index; (3) filtering decisions are determined for the luma component; (4) a filtering decision is determined for the chroma components; and (5) filter parameters (e.g., coefficients and decisions) are signaled.

According to the ALF specified in JEM, each 2×2 block is categorized according to a classification index C, where C is an integer in the inclusive range of 0 to 24. C is derived based on its directionality D and a quantized value of activity Â, according to the following equation:

$$C = 5D + \hat{A}$$

where D and Â, gradients of the horizontal, vertical and two diagonal direction are calculated using a 1-D Laplacian as follows:

$$g_v = \sum_{k=i-2}^{i+3}\sum_{l=j-2}^{j+3} V_{k,l}, V_{k,l} = |2R(k, l) - R(k, l-1) - R(k, l+1)|,$$

$$g_h = \sum_{k=i-2}^{i+3}\sum_{l=j-2}^{j+3} H_{k,l}, H_{k,l} = |2R(k, l) - R(k-1, l) - R(k+1, l)|,$$

$$g_{d1} = \sum_{k=i-2}^{i+3}\sum_{l=j-3}^{j+3} D1_{k,l}, D1_{k,l} = |2R(k, l) - R(k-1, l-1) - R(k+1, l+1)|$$

$$g_{d2} = \sum_{k=i-2}^{i+3}\sum_{j=j-2}^{j+3} D2_{k,l}, D2_{k,l} = |2R(k, l) - R(k-1, l+1) - R(k+1, l-1)|$$

where, indices i and j refer to the coordinates of the upper left sample in the 2×2 block and R(i,j) indicates a reconstructed sample at coordinate (i,j).

Maximum and minimum values of the gradients of horizontal and vertical directions may be set as:

$$g_{h,v}^{max} = \max(g_h, g_v);$$

$$g_{h,v}^{min} = \min(g_h, g_v).$$

and the maximum and minimum values of the gradient of two diagonal directions may be set as:

$$g_{d0,d1}^{max} = \max(g_{d0}, g_{d1});$$

$$g_{d0,d1}^{min} = \min(g_{d0}, g_{d1}).$$

In JEM, to derive the value of the directionality D, the maximum and minimum values are compared against each other and with two thresholds $t_1$ and $t_2$:

Step 1. If both $g_{h,v}^{max} \leq t_1 g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

In JEM, the activity value A is calculated as:

$$A = \sum_{k=i-2}^{i+3}\sum_{l=j-2}^{j+3}(V_{k,l} + H_{k,l}).$$

where, A is further quantized to the range of 0 to 4, inclusively, and the quantized value is denoted as Â.

As described above, applying the ALF specified in JEM at a video encoder includes deriving sets of filter coefficients for each classification index and determining filtering decisions. It should be noted that the derivation of sets of filter coefficients and determination of filtering decisions may be an iterative process. That is, sets of filter coefficients may be updated based on filtering decisions and filtering decisions may be updated based on updated sets of filter coefficients and this may be repeated multiple times. Further, a video encoder may implement various proprietary algorithms to determine sets of filter coefficients and/or to determine filtering decisions. The techniques described herein are generally applicable regardless of how sets of filter coefficients are derived for each classification index and how filtering decisions are determined.

According to one example, sets of filter coefficients are derived by initially deriving a set of optimal filter coefficients for each classification index. Optimal filter coefficients are derived by comparing desired sample values (i.e., sample values in the source video) to reconstructed sample values subsequent to applying the filtering and by minimizing the sum of squared errors (SSE) between the desired sample values and the reconstructed sample values subsequent to performing the filtering. The derived optimal coefficients for each group may then be used to perform a basis filtering over the reconstructed samples in order to analyze the effectiveness of the ALF. That is, desired sample values, reconstructed sample values prior to applying the ALF, and reconstructed sample values subsequent to performing the ALF can be compared to determine the effectiveness of applying the ALF using the optimal coefficients.

According to the specified ALF in JEM, each reconstructed sample R(i,j) is filtered by determining the resulting in sample value R'(i,j) according to the following equation, wherein in the following equation below, L denotes filter length, and f(k,l) denotes the decoded filter coefficients.

$$R'(i, j) = \sum_{k=-L/2}^{L/2}\sum_{l=-L/2}^{L/2} f(k, l) \times R(i+k, j+l)$$

It should be noted that JEM defines three filter shapes (a 5×5 diamond, a 7×7 diamond, and a 9×9 diamond). It should be noted that in JEM, geometric transformations are applied to filter coefficients f(k,l) depending on gradient values: $g_v$, $g_h$, $g_{d1}$, $g_{d2}$, as provided in Table 1.

TABLE 1

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation | where the Diagonal, Vertical flip, and Rotation are defined as follows:

$$\text{Diagonal: } f_D(k, l) = f(l, k),$$

$$\text{Vertical flip: } f_V(k, l) = f(k, K - l - 1)$$

$$\text{Rotation: } f_R(k, l) = f(K - l - 1, k)$$

where K is the size of the filter and $0 \leq k$, $1 \leq K-1$ are coefficients coordinates, such that location (0,0) is at the upper left corner and location (K−1,K−1) is at the lower right corner.

JEM provides where up to 25 sets of luma filter coefficients can be signaled (i.e., one for each possible classification index). Thus, the optimal coefficients could be signaled for each classification index occurring in a corresponding picture region. However, in order to optimize the amount of data required to signal sets of luma filter coefficients versus the effectiveness of the filter, rate distortion (RD) optimizations may be performed. For example, JEM provides where sets of filter coefficients of neighboring classification groups may be merged and signaled using an array mapping a set of filter coefficients to each classification index. Further, JEM provides where temporal coefficient prediction may be used to signal coefficients. That is, JEM provides where sets of filter coefficients for a current picture may be predicted based on sets of filter coefficients of a reference picture by inheriting the set of filter coefficients used for a reference picture. JEM further provides where for intra prediction pictures, a set of 16 fixed filters may be available for predicting sets of filter coefficients. As described above, the derivation of sets of filter coefficients and determination of filtering decisions may be an iterative process. That is, for example, the shape of the ALF may be determined based on how many sets of filter coefficients are signaled and similarly, whether the ALF is applied to a region of a picture may be based on the sets of filter coefficients that are signaled and/or the shape of the filter. It should be noted that for the ALF filter each component uses a set of sample values from the respective component as input and derives output sample values. That is, an ALF filter is applied to each component independent of data in another component. Further, it should be noted that JVET-N1001 and JVET-O2001 specify deblocking, SAO, and ALF filters which can be described as being generally based on the deblocking, SAO, and ALF filters provided in ITU-T H.265 and JEM.

Figure 3:
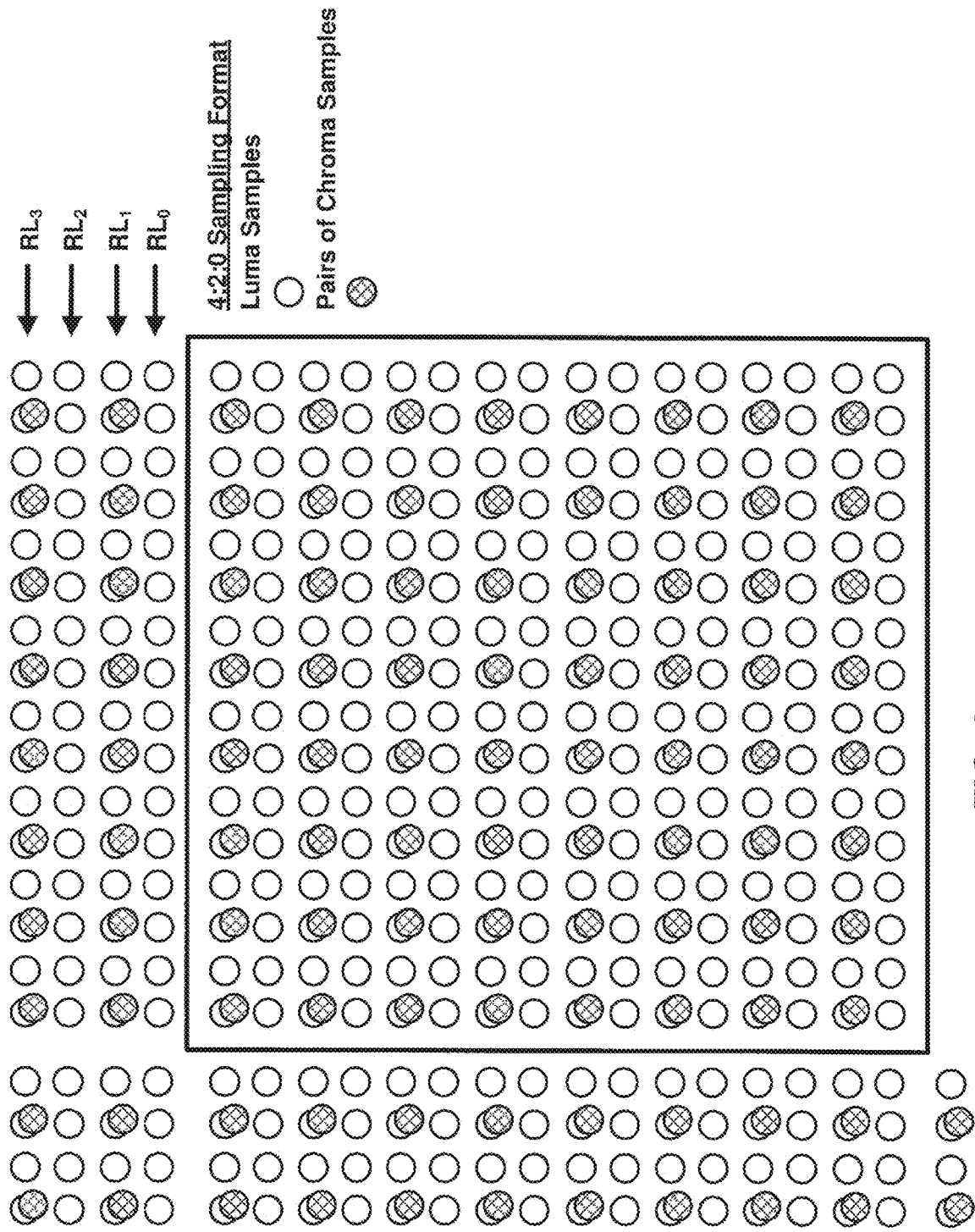
FIG. 3 is a conceptual diagram illustrating an example of a video component sampling format that may be utilized in accordance with one or more techniques of this disclosure.
Figure 4C:
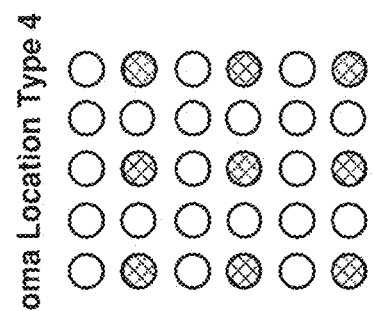
FIG. 4C is a conceptual diagram illustrating example of location types for a video component sampling format that may be utilized in accordance with one or more techniques of this disclosure.
Figure 4F:
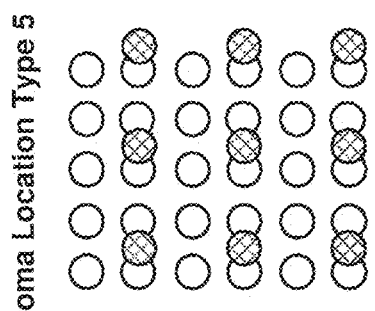
FIG. 4F is conceptual diagram illustrating example of location types for a video component sampling format that may be utilized in accordance with one or more techniques of this disclosure.
Figure 4B:
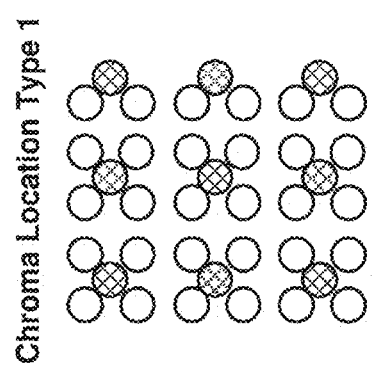
FIG. 4B is a conceptual diagram illustrating example of location types for a video component sampling format that may be utilized in accordance with one or more techniques of this disclosure.
Figure 4E:
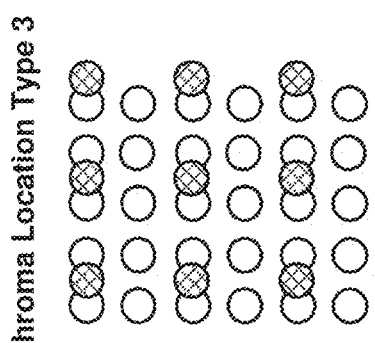
FIG. 4E is a conceptual diagram illustrating example of location types for a video component sampling format that may be utilized in accordance with one or more techniques of this disclosure.
Figure 4A:
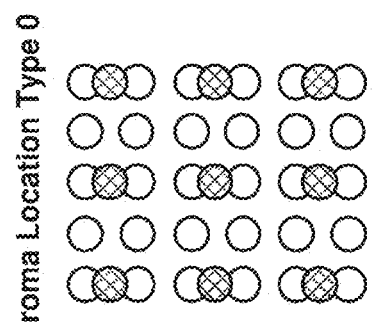
FIG. 4A is a conceptual diagram illustrating example of location types for a video component sampling format that may be utilized in accordance with one or more techniques of this disclosure.
Figure 4D:
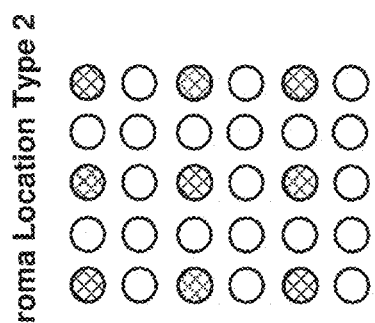
FIG. 4D is a conceptual diagram illustrating example of location types for a video component sampling format that may be utilized in accordance with one or more techniques of this disclosure.

A video sampling format, which may also be referred to as a chroma format, may define the number of chroma samples included in a CU with respect to the number of luma samples included in a CU. For example, for the 4:2:0 sampling format, the sampling rate for the luma component is twice that of the chroma components for both the horizontal and vertical directions. As a result, for a CU formatted according to the 4:2:0 format, the width and height of an array of samples for the luma component are twice that of each array of samples for the chroma components. FIG. 3 is a conceptual diagram illustrating an example of a coding unit formatted according to a 4:2:0 sample format. FIG. 3 illustrates the relative position of chroma samples with respect to luma samples within a CU. As described above, a CU is typically defined according to the number of horizontal and vertical luma samples. Thus, as illustrated in FIG. 3, a 16×16 CU formatted according to the 4:2:0 sample format includes 16×16 samples of luma components and 8×8 samples for each chroma component. Further, in the example illustrated in FIG. 3, the relative position of chroma samples with respect to luma samples for video blocks neighboring the 16×16 CU are illustrated. For a CU formatted according to the 4:2:2 format, the width of an array of samples for the luma component is twice that of the width of an array of samples for each chroma component, but the height of the array of samples for the luma component is equal to the height of an array of samples for each chroma component. Further, for a CU formatted according to the 4:4:4 format, an array of samples for the luma component has the same width and height as an array of samples for each chroma component. Referring to FIG. 3, for luma samples, the line of samples immediately adjacent above the video block may be referred to as reference line 0 ($RL_0$) and the subsequent above lines of samples may to respectively referred to as reference line 1 ($RL_1$), reference line 2 ($RL_2$), and reference line 3 ($RL_3$). Similarly, columns of samples left of the current video block may be classified as references lines in a similar manner (i.e., the line of samples immediately adjacent left the video block may be referred to as reference line 0 ($RL_0$)).

It should be noted that for a sampling format, e.g., a 4:2:0 sample format, a chroma location type may be specified. That is, for example for the 4:2:0 sample format, horizontal and vertical offset values which indicate relative spatial positioning may be specified for chroma samples with respect to luma samples. Table 2 provides a definition of HorizontalOffsetC and VerticalOffsetC for the 5 chroma location types provided in JVET-N1001 and JVET-O2001. Further, FIGS. 4A-4F illustrate the chroma location types specified in JVET-N1001 and JVET-O2001 for the 4:2:0 sample format.

TABLE 2

| ChromaLocType | HorizontalOffsetC | VerticalOffsetC |
|---|---|---|
| 0 | 0 | 0.5 |
| 1 | 0.5 | 0.5 |
| 2 | 0 | 0 |
| 3 | 0.5 | 0 |
| 4 | 0 | 1 |
| 5 | 0.5 | 1 |

With respect to the equations used herein, the following arithmetic operators may be used:

+ Addition
− Subtraction
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to −1.
÷ Used to denote division in mathematical equations where no truncation or rounding is intended.
x/y Used to denote division in mathematical equations where no truncation or rounding is intended.
x % y Modulus. Remainder of x divided by y, defined only for integers x and y with x>=0 and y>0.

Further, the following logical operators may be used:
x && y Boolean logical "and" of x and y
x||y Boolean logical "or" of x and y
! Boolean logical "not"
x?y:z If x is TRUE or not equal to 0, evaluates to the value of y; otherwise, evaluates to the value of z.

Further, the following relational operators may be used:
> Greater than
>= Greater than or equal to
< Less than
<= Less than or equal to
== Equal to
!= Not equal to Further, the following bit-wise operators may be used:
& Bit-wise "and". When operating on integer arguments, operates on a two's complement representation of the integer value. When operating on a binary argument that contains fewer bits than another argument, the shorter argument is extended by adding more significant bits equal to 0.

| Bit-wise "or". When operating on integer arguments, operates on a two's complement representation of the integer value. When operating on a binary argument that contains fewer bits than another argument, the shorter argument is extended by adding more significant bits equal to 0.

^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

x<<y Arithmetic left shift of a two's complement integer representation of x by y binary digits. This function is defined only for non-negative integer values of y. Bits shifted into the least significant bits (LSBs) as a result of the left shift have a value equal to 0.

Further, the following assignment operators may be used:

= Assignment operator

++ Increment, i.e., x++ is equivalent to x=x+1; when used in an array index, evaluates to the value of the variable prior to the increment operation.

—— Decrement, i.e., x—— is equivalent to x=x−1; when used in an array index, evaluates to the value of the variable prior to the decrement operation.

+= Increment by amount specified, i.e., x+=3 is equivalent to x=x+3, and x+=(−3) is equivalent to x=x+(−3).

−= Decrement by amount specified, i.e., x−=3 is equivalent to x=x−3, and x−=(−3) is equivalent to x=x−(−3).

Further, the following defined mathematical functions may be used:

$$Abs(x) = \begin{cases} x; & x >= 0 \\ -x; & x < 0 \end{cases}$$

Floor(x) the largest integer less than or equal to x.

Log 2(x) the base-2 logarithm of x.

$$Min(x, y) = \begin{cases} x; & x <= y \\ y; & x > y \end{cases}$$

$$Max(x, y) = \begin{cases} x; & x >= y \\ y; & x < y \end{cases}$$

$$Clip3(x, y, z) = \begin{cases} x; & z < x \\ y; & z > y \\ z; & \text{otherwise} \end{cases}$$

Figure 5:
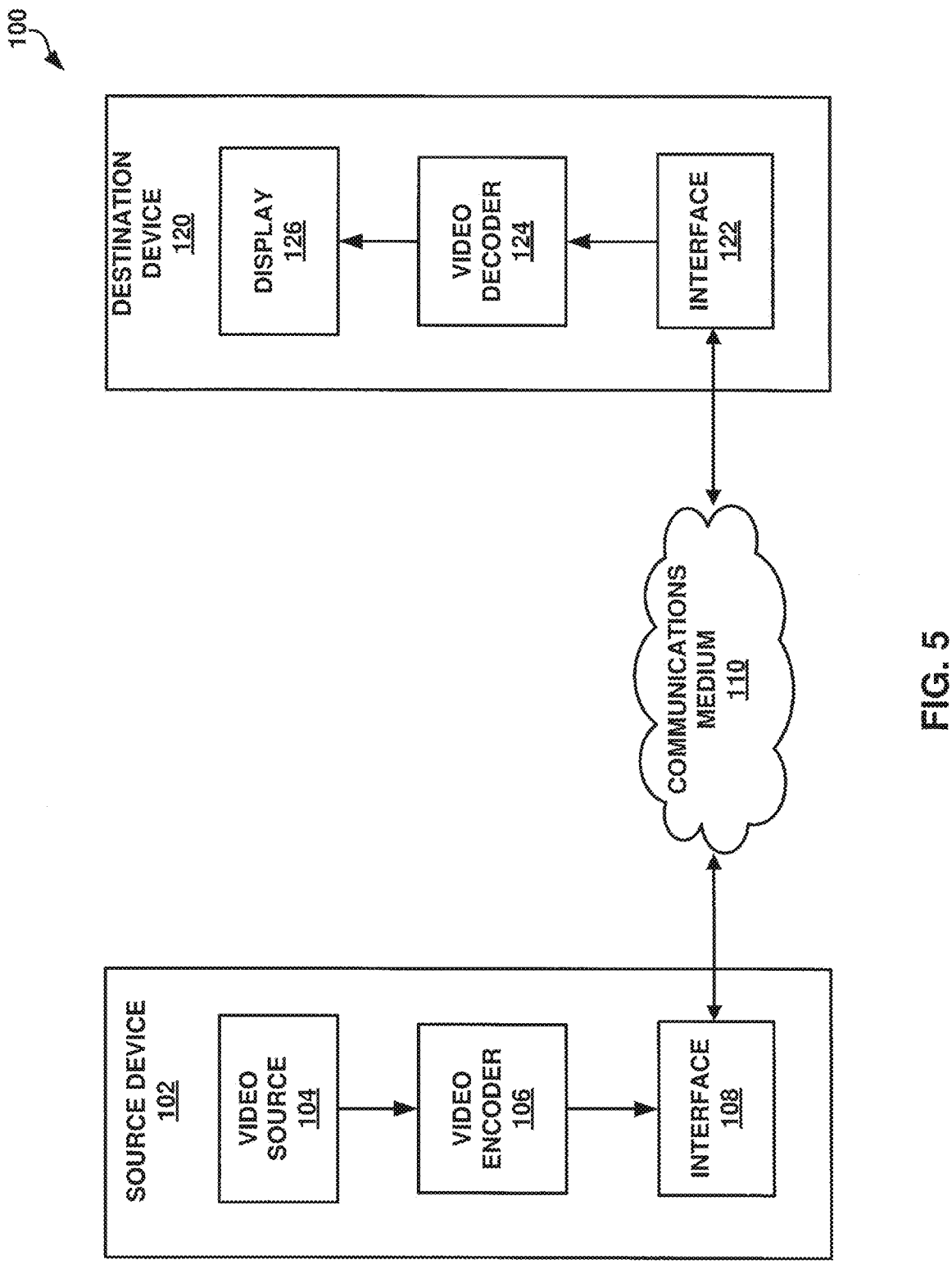
FIG. 5 is a block diagram illustrating an example of a system that may be configured to encode and decode video data according to one or more techniques of this disclosure.

FIG. 5 is a block diagram illustrating an example of a system that may be configured to code (i.e., encode and/or decode) video data according to one or more techniques of this disclosure. System 100 represents an example of a system that may perform video coding using partitioning techniques described according to one or more techniques of this disclosure. As illustrated in FIG. 5, system 100 includes source device 102, communications medium 110, and destination device 120. In the example illustrated in FIG. 5, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 5, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, PC, or any other logical and physical structure that may be used to interconnect peer devices.

Referring again to FIG. 5, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, PC, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 5, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
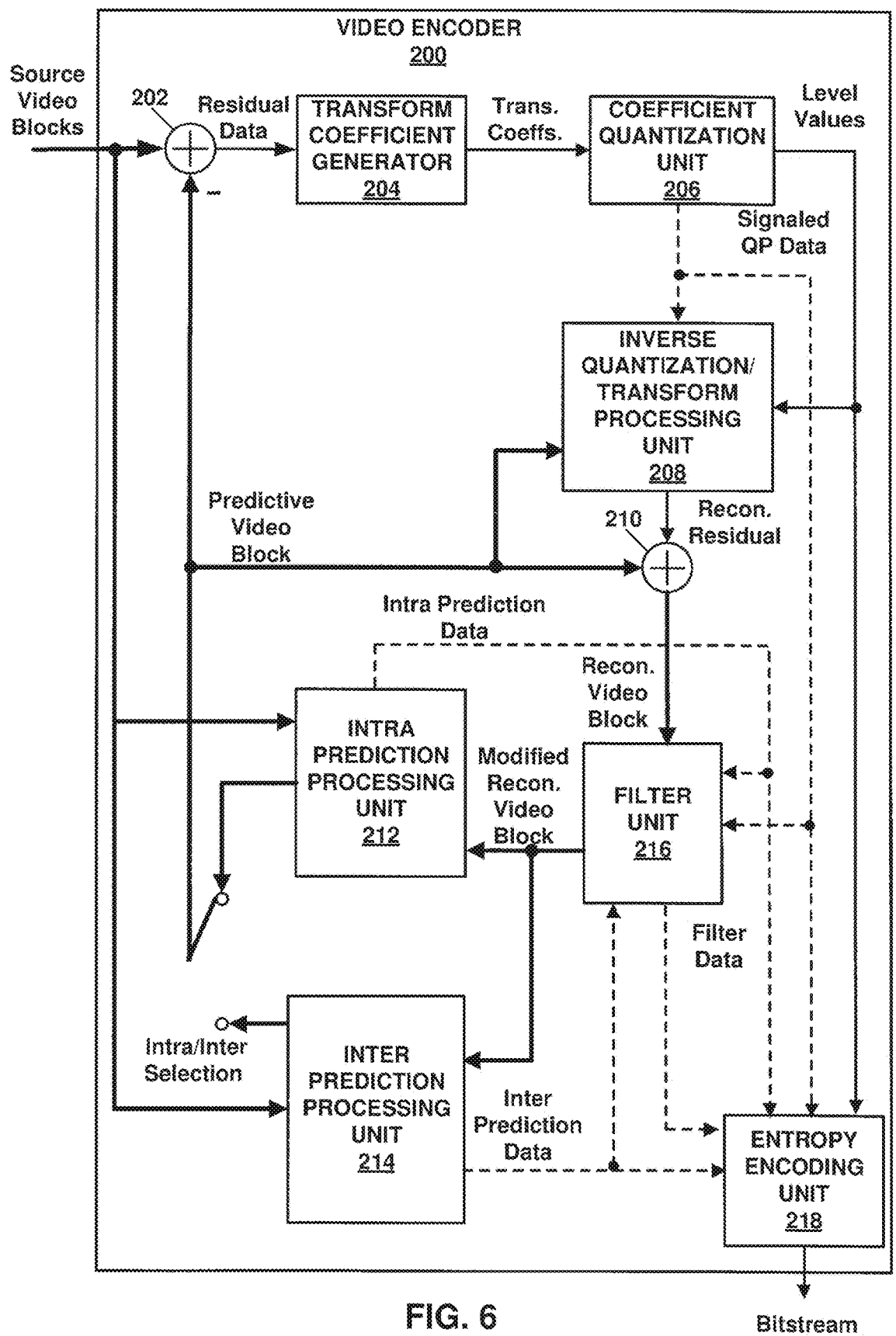
FIG. 6 is a block diagram illustrating an example of a video encoder that may be configured to encode video data according to one or more techniques of this disclosure.

FIG. 6 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 6, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 200 may be configured to perform additional subdivisions of source video blocks. It should be noted that some techniques described herein may be generally applicable to video coding, regardless of how source video data is partitioned prior to and/or during encoding. In the example illustrated in FIG. 6, video encoder 200 includes summer 202, transform coefficient generator 204, coefficient quantization unit 206, inverse quantization/transform processing unit 208, summer 210, intra prediction processing unit 212, inter prediction processing unit 214, filter unit 216, and entropy encoding unit 218.

As illustrated in FIG. 6, video encoder 200 receives source video blocks and outputs a bitstream. Video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. As described above, in ITU-T H.265, TBs are restricted to the following sizes 4×4, 8×8, 16×16, and 32×32. In one example, transform coefficient generator 204 may be configured to perform transformations according to arrays having sizes of 4×4, 8×8, 16×16, and 32×32. In one example, transform coefficient generator 204 may be further configured to perform transformations according to arrays having other dimensions. In particular, in some cases, it may be useful to perform transformations on rectangular arrays of difference values. In one example, transform coefficient generator 204 may be configured to perform transformations according to the following sizes of arrays: 2×2, 2×4N, 4M×2, and/or 4M×4N. In one example, a 2-dimensional (2D) M×N inverse transform may be implemented as 1-dimensional (1D) M-point inverse transform followed by a 1D N-point inverse transform. In one example, a 2D inverse transform may be implemented as a 1D N-point vertical transform followed by a 1D N-point horizontal transform. In one example, a 2D inverse transform may be implemented as a 1D N-point horizontal transform followed by a 1D N-point vertical transform. Transform coefficient generator 204 may output transform coefficients to coefficient quantization unit 206.

Coefficient quantization unit 206 may be configured to perform quantization of the transform coefficients. As described above, the degree of quantization may be modified by adjusting a quantization parameter. Coefficient quantization unit 206 may be further configured to determine quantization parameters and output QP data (e.g., data used to determine a quantization group size and/or delta QP values) that may be used by a video decoder to reconstruct a quantization parameter to perform inverse quantization during video decoding. It should be noted that in other examples, one or more additional or alternative parameters may be used to determine a level of quantization (e.g., scaling factors). The techniques described herein may be generally applicable to determining a level of quantization for transform coefficients corresponding to a component of video data based on a level of quantization for transform coefficients corresponding another component of video data.

Referring again to FIG. 6, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 6, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction. Intra prediction processing unit 212 may be configured to select an intra prediction mode for a video block to be coded. Intra prediction processing unit 212 may be configured to evaluate a frame and/or an area thereof and determine an intra prediction mode to use to encode a current block. As illustrated in FIG. 6, intra prediction processing unit 212 outputs intra prediction data (e.g., syntax elements) to entropy encoding unit 218 and transform coefficient generator 204. As described above, a transform performed on residual data may be mode dependent. As described above, possible intra prediction modes may include planar prediction modes, DC prediction modes, and angular prediction modes. Further, in some examples, a prediction for a chroma component may be inferred from an intra prediction for a luma prediction mode. Inter prediction processing unit 214 may be configured to perform inter prediction coding for a current video block. Inter prediction processing unit 214 may be configured to receive source video blocks and calculate a motion vector for PUs of a video block. A motion vector may indicate the displacement of a PU (or similar coding structure) of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. As described above, a motion vector may be determined and specified according to motion vector prediction. Inter prediction processing unit 214 may be configured to perform motion vector prediction, as described above. Inter prediction processing unit 214 may be configured to generate a predictive block using the motion prediction data. For example, inter prediction processing unit 214 may locate a predictive video block within a frame buffer (not shown in FIG. 6). It should be noted that inter prediction processing unit 214 may further be configured to apply one or more interpolation filters to a reconstructed residual block to calculate sub-integer pixel values for use in motion estimation. Inter prediction processing unit 214 may output motion prediction data for a calculated motion vector to entropy encoding unit 218. As illustrated in FIG. 6, inter prediction processing unit 214 may receive reconstructed video block via filter unit 216. Entropy encoding unit 218 receives quantized transform coefficients and predictive syntax data (i.e., intra prediction data, motion prediction data, QP data, etc.). It should be noted that in some examples, coefficient quantization unit 206 may perform a scan of a matrix including quantized transform coefficients before the coefficients are output to entropy encoding unit 218. In other examples, entropy encoding unit 218 may perform a scan. Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom.

Figure 8:
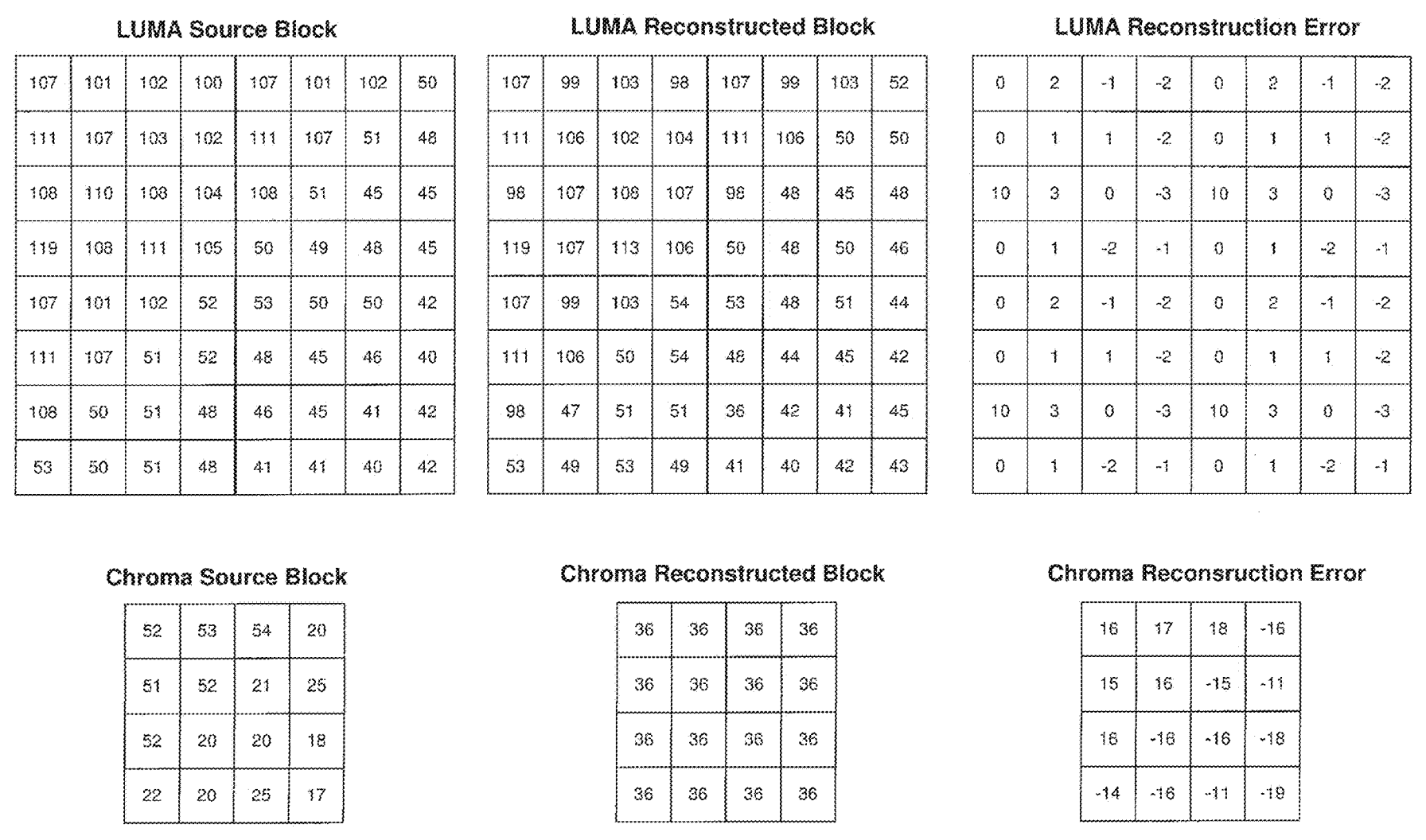

Referring again to FIG. 6, filter unit 216 may be configured to perform deblocking, Sample Adaptive Offset (SAO) filtering and/or ALF filtering as described above. Further, filter unit 216 may be configured to perform one or more the techniques described herein for reducing a reconstruction error according to cross-component correlation. As described above, for the ALF filter in JEM, each component uses a set of sample values from the respective component as input and derives output sample values in a manner that is independent of the other components. Filtering independently on a component-by-component basis may be less than ideal, as there may be correlations between components and/or channels of video data that may be useful for minimizing a reconstruction error. For example, referring to FIG. 8, FIG. 8 illustrates an example of an 8×8 luma source block and a corresponding 4×4 chroma source block (i.e., according to a 4:2:0 sampling format) and corresponding reconstructed blocks and reconstruction errors. As illustrated in FIG. 8, both of the source blocks include an edge about the diagonal, which would be typical in a case of a texture, a shape edge, or the like. However, for the reconstructed chroma component the fidelity is lost (e.g., due to a high level of quantization, etc.) compared to the luma component and the edge is not recovered.

Figure 7:
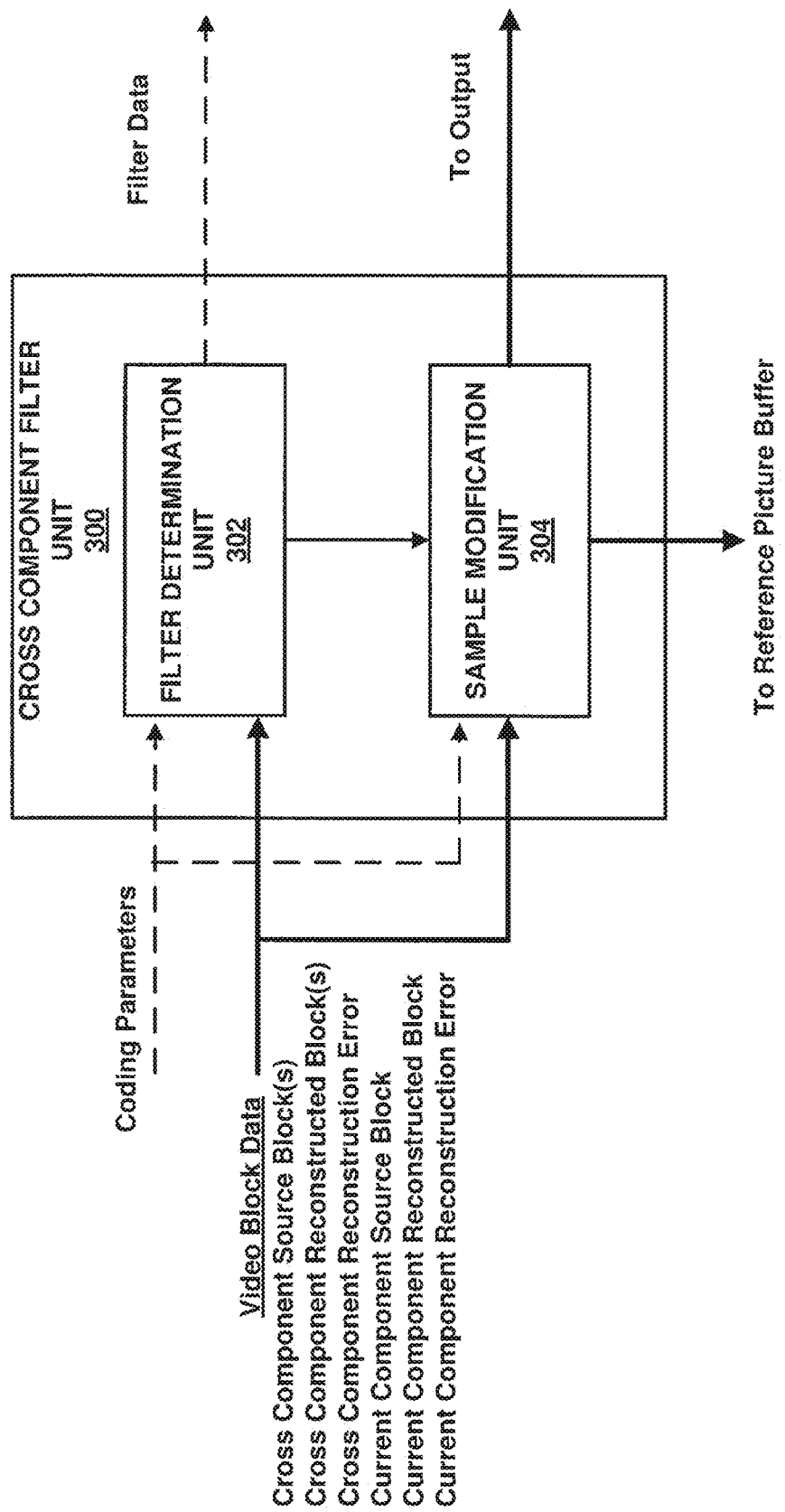
FIG. 7 is a block diagram illustrating an example of cross component filter unit that may be configured to encode video data according to one or more techniques of this disclosure.
Figure 11A:
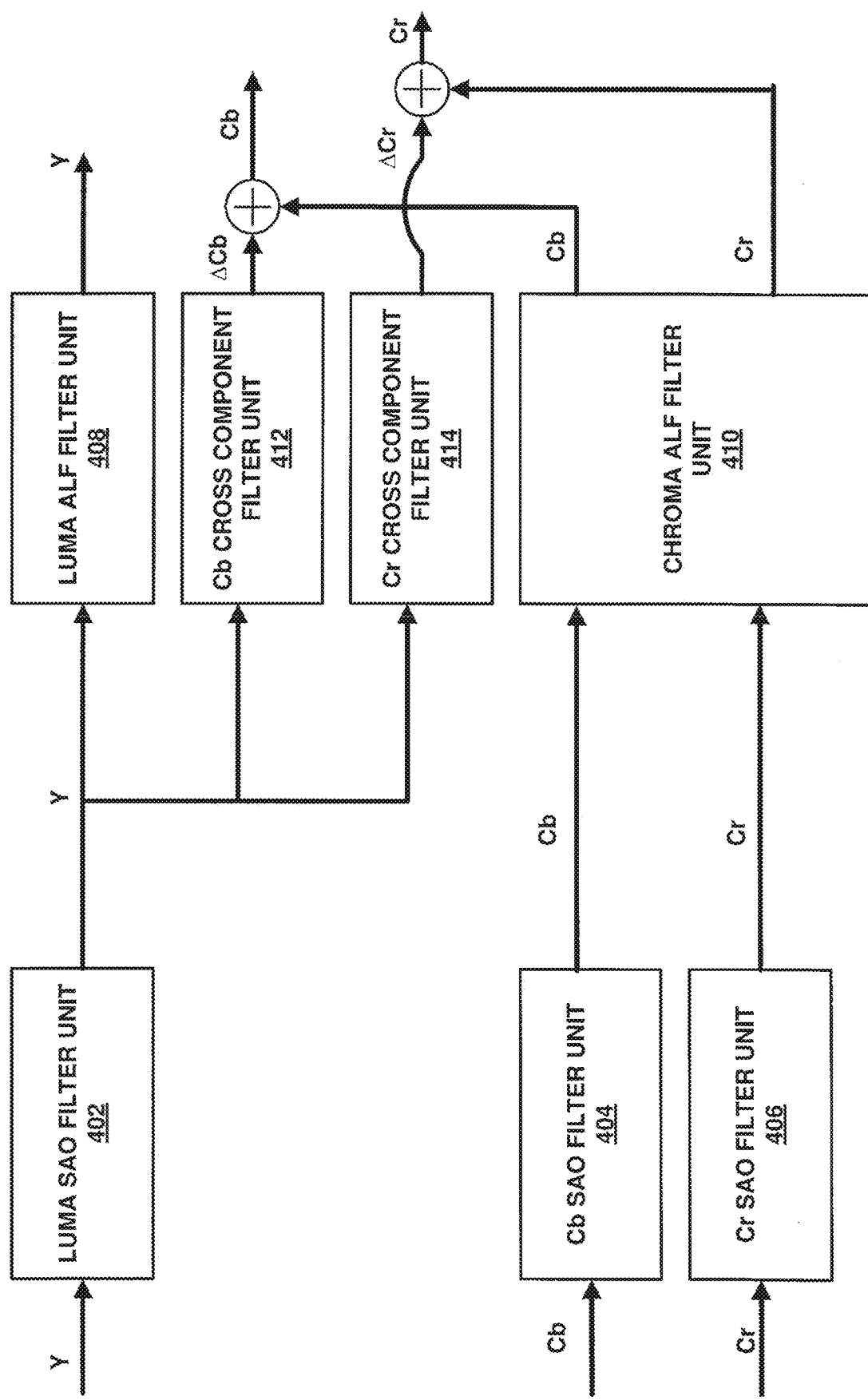
FIG. 11A is a block diagram illustrating example of cross component filter units that may be configured to reduce a reconstruction error according to one or more techniques of this disclosure.
Figure 11B:
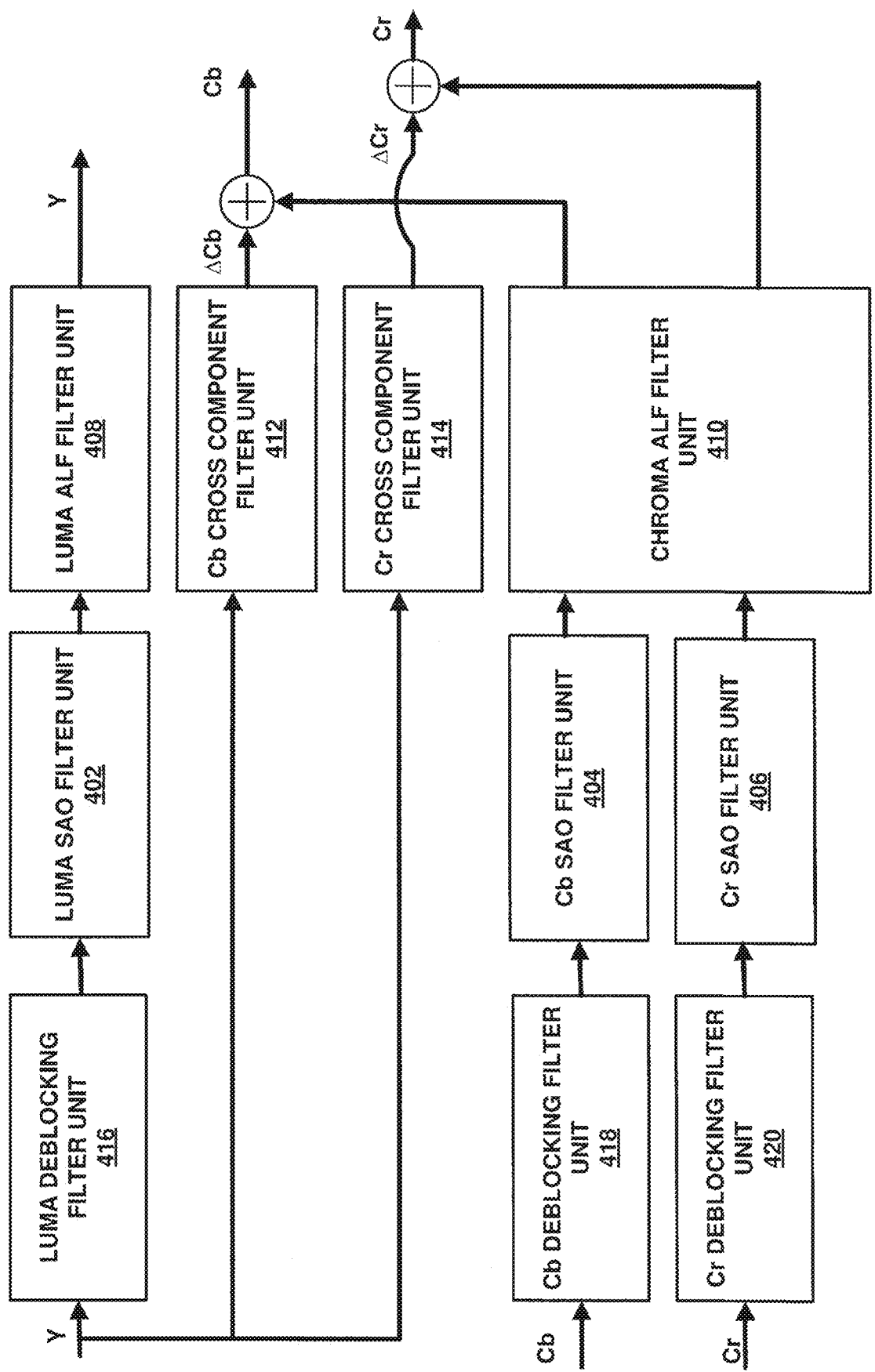
FIG. 11B is a block diagram illustrating example of cross component filter units that may be configured to reduce a reconstruction error according to one or more techniques of this disclosure.
Figure 11C:
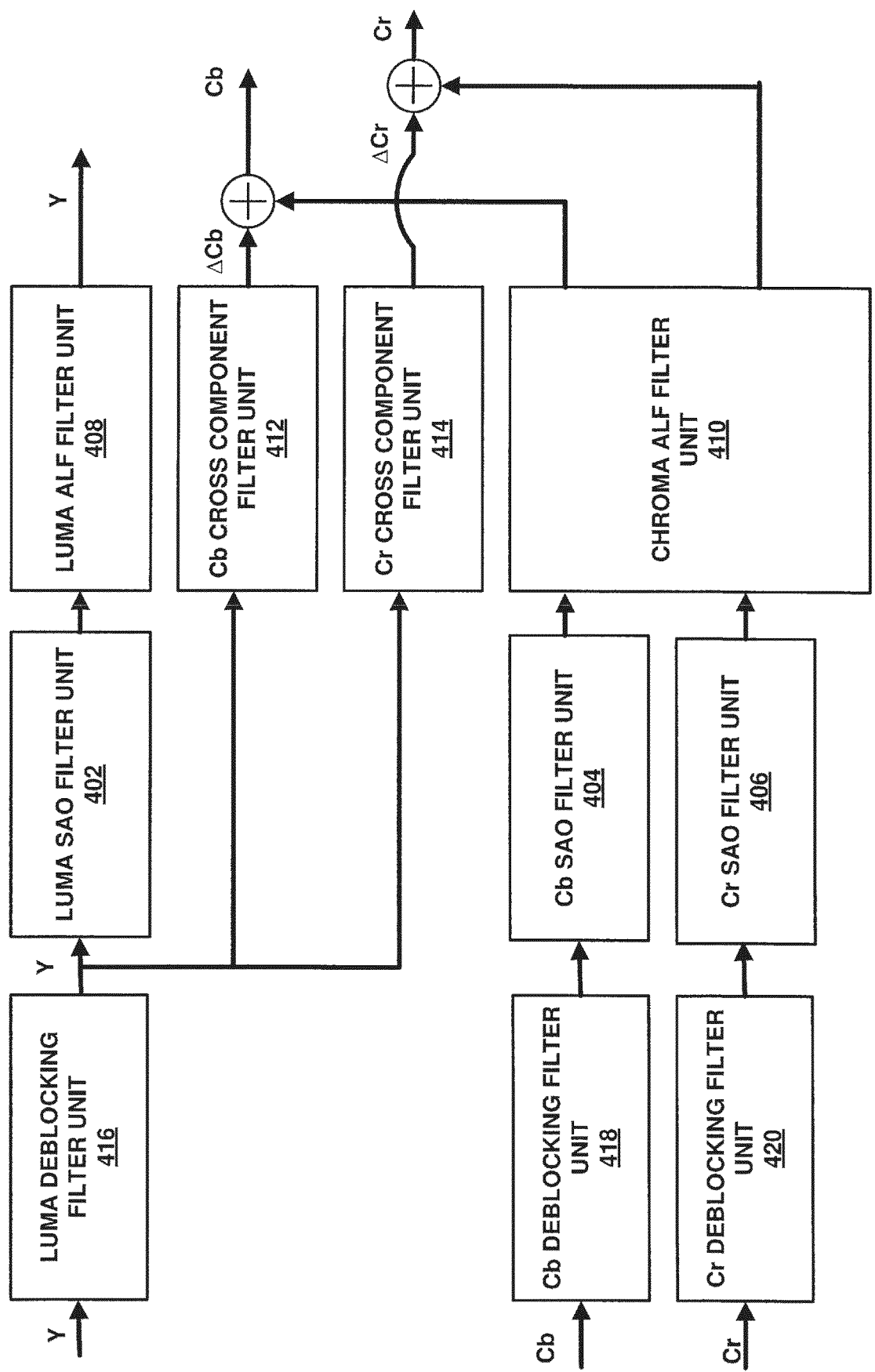
FIG. 11C is a block diagram illustrating example of cross component filter units that may be configured to reduce a reconstruction error according to one or more techniques of this disclosure.
Figure 11D:
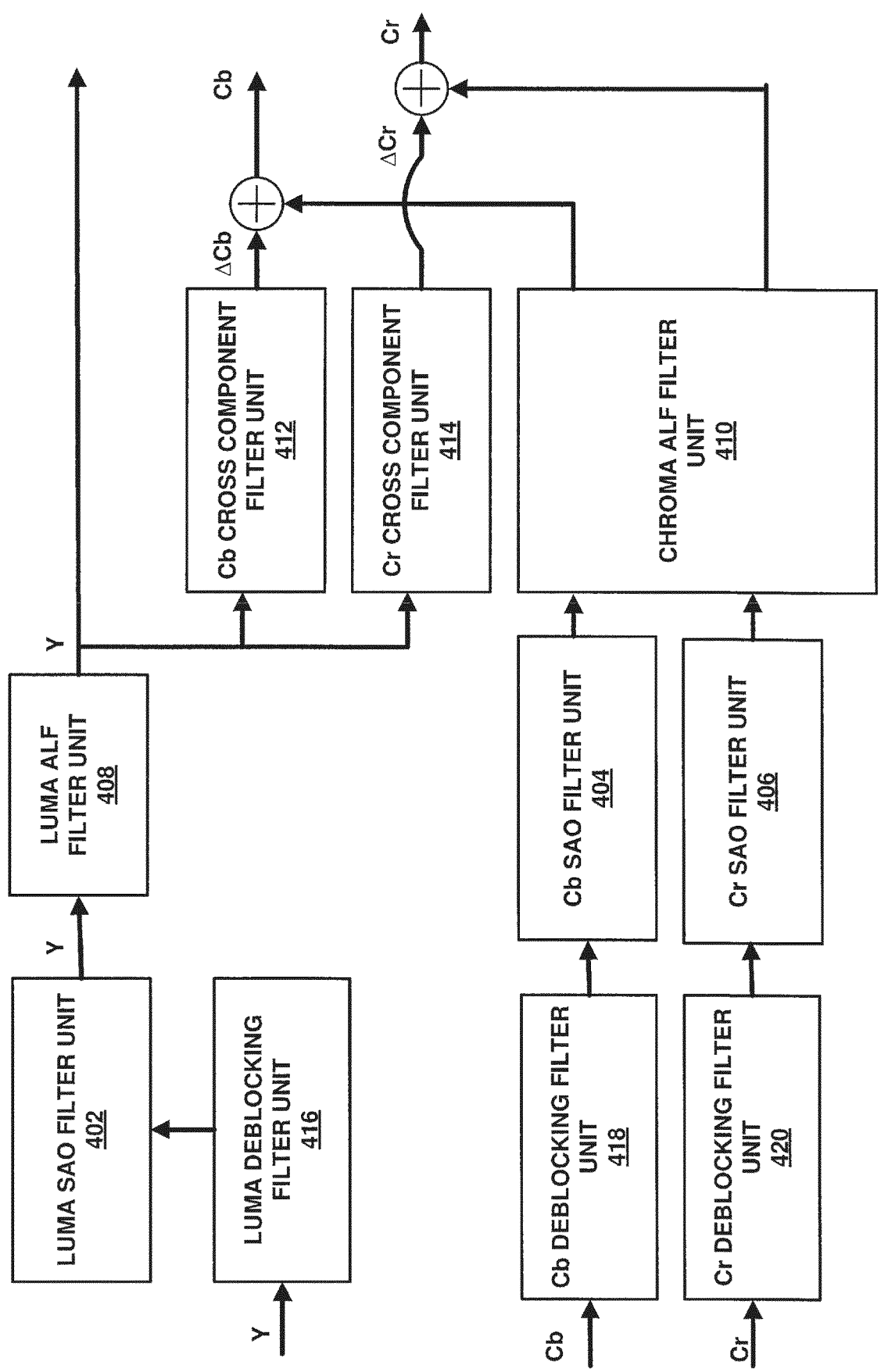
FIG. 11D is a block diagram illustrating example of cross component filter units that may be configured to reduce a reconstruction error according to one or more techniques of this disclosure.

According to the techniques herein, a filter unit may be configured to predict and/or refine information in a first color channel and/or component from information in a second color channel and/or component, which may provide improved coding efficiency of the first color channel and/or component, as the fidelity of the color channel and/or component is increased with a small number of bits. FIG. 7 illustrates an example of a cross component filter unit that may be configured to encode video data according to one or more techniques of this disclosure. As illustrated in FIG. 7, cross component filter unit 300 includes filter determination unit 302 and sample modification unit 304. It should be noted that cross component filter unit 300 illustrates an example of a cross component filter unit that may be present in a video encoder. Examples of corresponding cross component filter units that may be present in a video decoder are described in further detail below. As illustrated in FIG. 7, filter determination unit 302 and sample modification unit 304 may receive coding parameter information (e.g., an intra prediction mode) available at the time a current block is encoded/decoded and video block data which, as illustrated in FIG. 7, at a video encoder, may include: Cross Component Source Block(s); Cross Component Reconstructed Block(s); Cross Component Reconstruction Error; Current Component Source Block; and Current Component Reconstruction Error. That is, referring to the example illustrated in FIG. 8, when the chroma reconstructed block is to be filtered, all of the information in FIG. 8 may be available at cross component filter unit 300. As such, filter determination unit 302 may derive a filter to be used on the chroma reconstructed block based on the video data and sample modification unit 304 may perform filtering according to the derived filter. As illustrated in FIG. 7, sample modification unit 304 may output the modified reconstructed block to the reference picture buffer (i.e., as an in-loop filter) and output the modified reconstructed block to an output (e.g., a display). Further, as illustrated in FIG. 7, filter determination unit 302 may output filter data. That is, filter data specifying a derived filter may be signaled to a video decoder. Examples of such signaling are described in further detail below. It should be noted that with respect to FIG. 8, that there may be several ways of reducing a reconstruction error at a video encoder, e.g., reducing quantization and/or performing an improved prediction technique. Further, in some cases, it may be possible for a video encoder to signal the reconstruction error directly. However, cross component filtering according to the techniques herein provides a way to reduce a reconstruction error while signaling a relatively small amount of information. That is, for example, the cross component filtering techniques described herein may provide a way to reduce a reconstruction error at a video decoder while being more efficient that other techniques for reducing a reconstruction error. For example, it may take fewer bits to signal filter data than to signal higher fidelity residual information for a component.

Thus, cross component filter unit 300 may operate by taking a first color component and one or more second color components as input and provide an enhanced, first color component as output. It should be noted that although the examples herein are described with respect to luma, Cb and Cr components, the techniques described herein are generally applicable to other video formats (e.g., RGB) and other types of video information such as infra-red, depth, disparity or other characteristics.

The following equation provides an example of model of a filter that takes as input sample values from multiple components and outputs a filtered sample value $f_i(x,y)$ and thus, in one example, cross component filter unit 300 may implement a filter process based on the equation.

$$f_i(x, y) = \sum_{(x_0,y_0) \in S_{i,0}} I_0(g(x, y, i, 0) + x_0, h(x, y, i, 0) + y_0)c_0(x_0, y_0) +$$
$$\sum_{(x_1,y_1) \in S_{i,1}} I_1(g(x, y, i, 1) + x_1, h(x, y, i, 1) + y_1)c_1(x_1, y_1) +$$
$$\sum_{(x_2,y_2) \in S_{i,2}} I_2(g(x, y, i, 2) + x_2, h(x, y, i, 2) + y_2)c_2(x_2, y_2) + I_i(x, y)$$

Where,
$f_i(x,y)$:
is an output of component i at sample location (x,y);
$S_{i,0}$; $S_{i,1}$; and $S_{i,2}$: Defines a set of sample value locations relative to an origin in the respective components 0, 1, 2;
$g(x,y,i,0)$ and $h(x,y,i,0)$, $g(x,y,i,1)$ and $h(x,y,i,1)$, and $g(x,y,i,2)$ and $h(x,y,i,2)$: Determine the origin of support based on x, y, i and input component. The function g( ), h( ) may further depend on chroma format, chroma location type, color gamut, filter shape;
$c_0(x_0,y_0)$, $c_1(x_0,y_0)$, and $c_2(x_0,y_0)$: Are filter coefficient values for support region for each component;
$I_0$, $I_1$, and $I_2$: Are Input sample values from each component; and $I_i(x,y)$: is a Sample value of component i at sample location (x,y) prior to filtering.

Thus, according to the techniques herein, cross component filter unit 300 may be configured to reduce a reconstruction error of a current component by adding a refinement to a reconstructed sample value of the current component based on a derived filtering function having reconstructed sample values of other components as input. In one example, the reconstructed sample values of other components used as input may be referred to as filter support. FIGS. 9A-9F are conceptual diagrams illustrating examples of support samples that may be used for cross component filtering in accordance with one or more techniques of this disclosure. In the example illustrated in FIGS. 9A-9F, for each of the 4:2:0 sample format chroma location types provided in JVET-N1001 and JVET-O2001, luma support samples are illustrated for a chroma sample to be filtered. That is, 5×5, 5×6, 6×5, and/or 6×6 support samples may be used. It should be noted, in the examples in FIGS. 9A-9F, the luma support is defined to be symmetric around a chroma sample value. It should be noted that in other examples, luma support may undergo a phase shift depending on a chroma location type before being input to a filtering stage that does not depend on chroma location type. As described in further detail below, for each support sample, a filter coefficient may be determined and signaled. In one example, according to the techniques herein, for chroma samples included in a video block, the relative position of the support for each sample may be based on the sample format. For example, in one example, according to the techniques herein, for the 4:2:0 sample format, when a chroma sample in a video block at chroma location $(x_C, y_C)$ corresponds to support with an origin at luma location $(x_L, y_L)$, the origin of the support for a chroma sample in the video block at chroma location $(x_C+m, y_C+n)$ may be at luma location $(x_C+2m, y_C+2n)$; for the 4:2:2 sample format, when a chroma sample in a video block at chroma location $(x_C, y_C)$ corresponds to support with an origin at luma location $(x_L, y_L)$, the origin of the support for a chroma sample in the video block at chroma location $(x_C+m, y_C+n)$ may be at luma location $(x_C+2m, y_C+n)$; and for the 4:4:4 sample format, when a chroma sample in a video block at chroma location $(x_C, y_C)$ corresponds to support with an origin at luma location $(x_L, y_L)$, the origin of the support for a chroma sample in the video block at chroma location $(x_C+m, y_C+n)$ may be at luma location $(x_C+m, y_C+n)$. It should be noted that in this example, a shift of a chroma sample location corresponds to a shift in luma location of the origin of the support, where the ratio between the two shifts is based on chroma format.

In one example, according to the techniques herein, the application of cross component filtering may be based on the properties of samples included in a filter support region. For example, in one example, the luma sample values in a support region may be analyzed and whether cross component filtering is applied may be based on the analysis. For example, in one example, variance and/or deviation of samples in a support region may be computed and if the variance and/or deviation has certain characteristics, e.g., the region is smooth (i.e., the variance is less than a threshold), then no cross component filtering may be applied for the region. In one example, the cross component filter selection (including whether a filter is applied and when a filter is applied, which filter is applied) may be based on a luma classification filter index of a luma sample corresponding to the chroma sample being evaluated. In one example, the classification filter index for a luma sample may be derived as described in JVET-O2001. In one example, no cross component filtering may be applied for when a luma classification filter index is determined to be in a subset of luma classification filer indices. As described in further detail below, values of local region control flags and/or syntax elements may be used to indicate/determine whether cross-component filtering is applied for a region and if cross-component filtering is applied for a region, which cross-component filter is applied. In one example, the application of cross component filtering may be based on properties of samples included in a filter support region and/or values of local region control flags and/or syntax elements. That is, for example, how luma support samples are analyzed may be based on a local region control flag and/or syntax elements (e.g., if flag=0, compute/evaluate variance, otherwise, compute/evaluate luma classification filter index). Further, in one example, filter selection be based on values of syntax elements and properties of luma support samples. For example, a value of 0 for a syntax element may indicate cross component filtering is not applied for a region, a value of 1 for the syntax element and the variance of luma support being greater than a threshold may indicate a filter having a first filter coefficient set is applied, a value of 1 for the syntax element and the variance of luma support not being greater than a threshold may indicate a filter having a second filter coefficient set is applied, a value of 2 for the syntax element and the variance of luma support being greater than a threshold may indicate a filter having a third filter coefficient set is applied, a value of 2 for the syntax element and the variance of luma support not being greater than a threshold may indicate a filter having a fourth filter coefficient set is applied, etc.

The Appendix of commonly-assigned U.S. Provisional Patent Application No. 62/865,933, filed Jun. 24, 2019, which is incorporated by reference herein, provides an example of data sets corresponding to an implementation of cross component filter described herein. That is, in the Appendix, data set orgBlock represents sample values of an original 32×32 U component block; data set preFiltering-Block represents sample values of the reconstructed 32×32 U component block; data set orgError represents the reconstruction error between the original 32×32 U component block and the reconstructed 32×32 U component block; data set bestSupportY represents sample values of a 67×68 Y component block which provides filter support for filtering the reconstructed 32×32 U component block; data set bestSupportU represents sample values of a 36×36 U component block which provides support for filtering the reconstructed 32×32 U component block; data set bestSupportV represents sample values of a 36×36 V component block which provides support for filtering the reconstructed 32×32 U component block; data set coeffY represents filter coefficients in a 5×6 filter for sample values of the 67×68 Y component support block; data set coeffU represents filter coefficients in a 5×5 filter for sample values of the 36×36 U component support block; data set coeffV represents filter coefficients in a 5×5 filter for sample values of the 36×36 V component support block; data set bestOutput represents the samples values of the filtered reconstructed 32×32 U component block; data set bestError represents the represents the error between the original 32×32 U component block and the filtered reconstructed 32×32 U component block; data set signedimprovement is equal to is Abs(orgError)−Abs(bestError) and represents the change in the reconstruction error resulting from the filtering; and data set positive improve represents reconstructed sample values where the reconstruction error was reduce as a result of the filtering. Thus, according to the techniques herein, a reconstruction error may be reduced for one or more or a majority of samples by applying a cross component filter. It should be noted for particular types of video content, the amount a reconstruction error is improved according to a mathematical relationship may have varying results on how the perceived visual quality of video is improved. That is, for example, relatively small values of signedimprovement may result in relatively significant improvements is visual quality.

Figure 10:
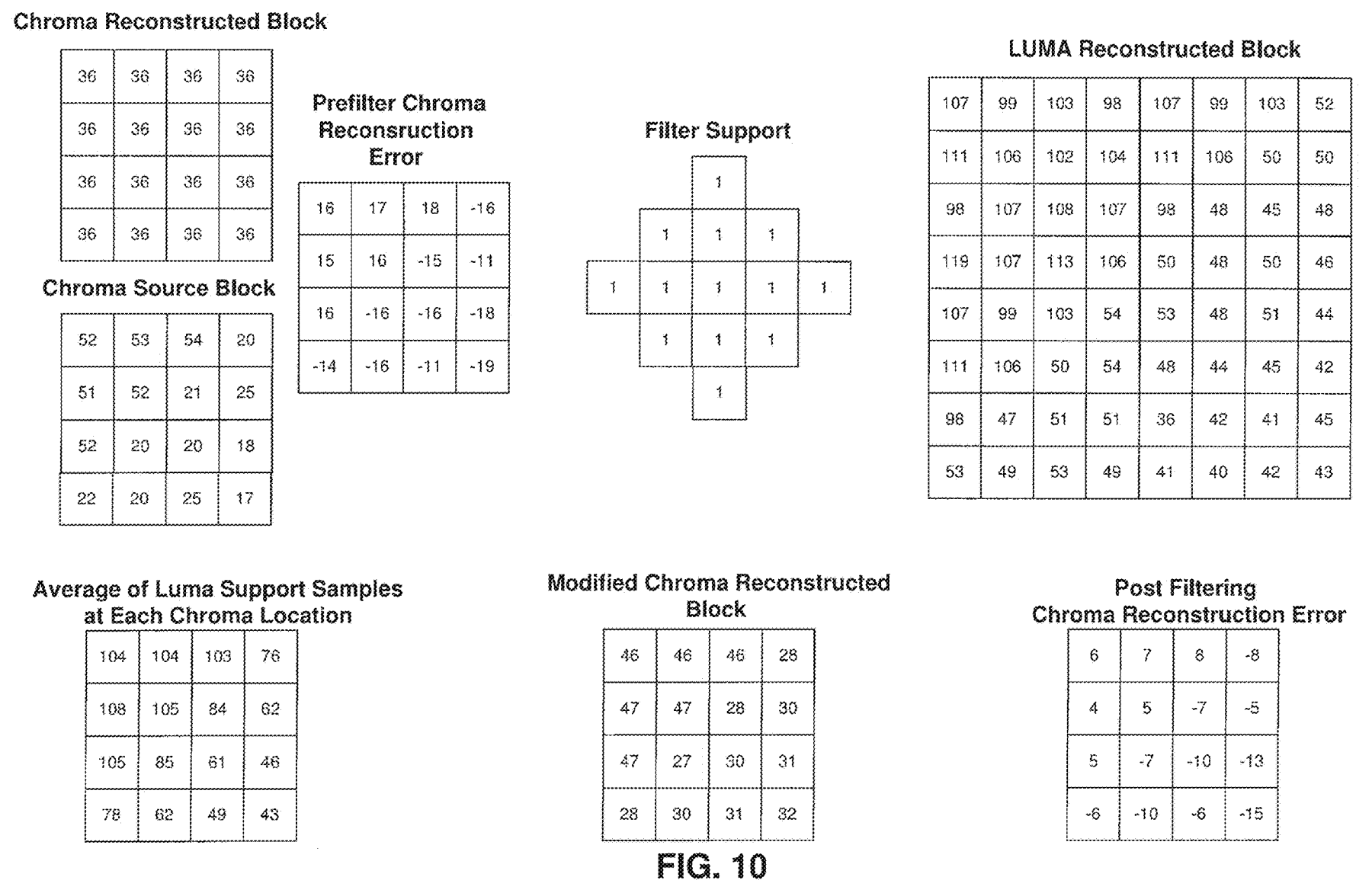

As described above, cross component filter unit 300 may generally operate by taking a first and one or more second color components as input and provide an enhanced first color component as output. That is, a filtering process performed by cross component filter unit 300 may take as input luma sample values which may be used to predict the difference between original respective chroma sample value and output refined chroma sample values based on the prediction. Referring again to the example illustrated in FIG. 8, FIG. 10 is conceptual diagram illustrating an example of reducing a reconstruction error using cross component filtering accordance with one or more techniques of this disclosure. FIG. 10 provides an example where a reconstruction error is reduced by taking the average of support samples and if the average is greater than 90, the average divided by 10 is added to the reconstructed sample; and if the average is not greater than 90, the average divided by 10 is subtracted from the reconstructed sample. That is, in the example, the prediction filter is generally described as: if support average is greater than threshold1, add weight1 multiplied by support average; else add weight2 multiplied by support average. As illustrated in the example illustrated in FIG. 10, the post filtering chroma reconstruction error provides reconstruction error reduction. Thus, according to the techniques herein, cross component filtering may reduce a reconstruction error according to a cross component filter defined according to logical functions, thresholds, weights, and the like.

As described above, JVET-N1001 and JVET-O2001 include deblocking, SAO, and ALF filters, cross component filter techniques described herein may be performed as various point in a filter chain. That is, for example, at various stages of in-loop filtering. FIGS. 11A-11D are block diagrams illustrating examples of cross component filter units that may be configured to reduce a reconstruction error according to one or more techniques of this disclosure. In FIGS. 11A-11D, luma SAO filter unit 402 represent a filtering unit configured to perform SAO filtering on luma sample values, Y, for example, SAO filtering as provided in JVET-N1001 or JVET-O2001; Cb SAO filter unit 404 represent a filtering unit configured to perform SAO filtering on chroma Cb sample values, for example, SAO filtering as provided in JVET-N1001 or JVET-O2001; Cb SAO filter unit 406 represent a filtering unit configured to perform SAO filtering on Cb sample values, for example, SAO filtering as provided in JVET-N1001 or JVET-O2001; luma ALF filter unit 408 represent a filtering unit configured to perform ALF filtering on luma sample values, Y, for example, ALF filtering as provided in JVET-N1001 or JVET-O2001; chroma ALF filter unit 410 represent a filtering unit configured to perform ALF filtering on chroma sample values, for example, ALF filtering as provided in JVET-N1001 or JVET-O2001; luma deblocking filter unit 416 represents a filtering unit configured to perform deblocking filtering on luma sample values, Y, for example, deblocking filtering as provided in JVET-N1001 or JVET-O2001; Cb deblocking filter unit 418 represents a filtering unit configured to perform deblocking filtering on Cb sample values, for example, deblocking filtering as provided in JVET-N1001 or JVET-O2001; and Cr deblocking filter unit 420 is represents a filtering unit configured to perform deblocking filtering on Cr sample values, for example, deblocking filtering as provided in JVET-N1001 or JVET-O2001. Further, in FIGS. 11A-11D, Cb cross component filter unit 412 represents an example of a cross component filter configured to generate a Cb refinement, ΔCb, according to one or more of the techniques described herein; and Cr cross component filter unit 414 represents an example of a cross component filter configured to generate a Cr refinement, ΔCr, according to one or more of the techniques described herein. Thus, as illustrated FIGS. 11A-11D cross component filtering according to the techniques herein may be applied as various points in a filtering chain. That is, cross component filtering input may be received at various points in a filtering chain and cross component filtering refinements may be output at various points in a filtering chain. It should be noted that in the example illustrated in FIG. 11B, the input of luma deblocking is used as input to filtering which may have the advantage of reducing line buffer requirements. It should be noted that in the example illustrated in FIG. 11C, the output of luma deblocking is used as input to filtering which may have the advantage of reducing line buffer requirements with slightly improved coding efficiency. It should be noted that in the example illustrated in FIG. 11D, the output of ALF luma is used as input to filtering which may have the advantage of improved coding efficiency.

Figure 12A:
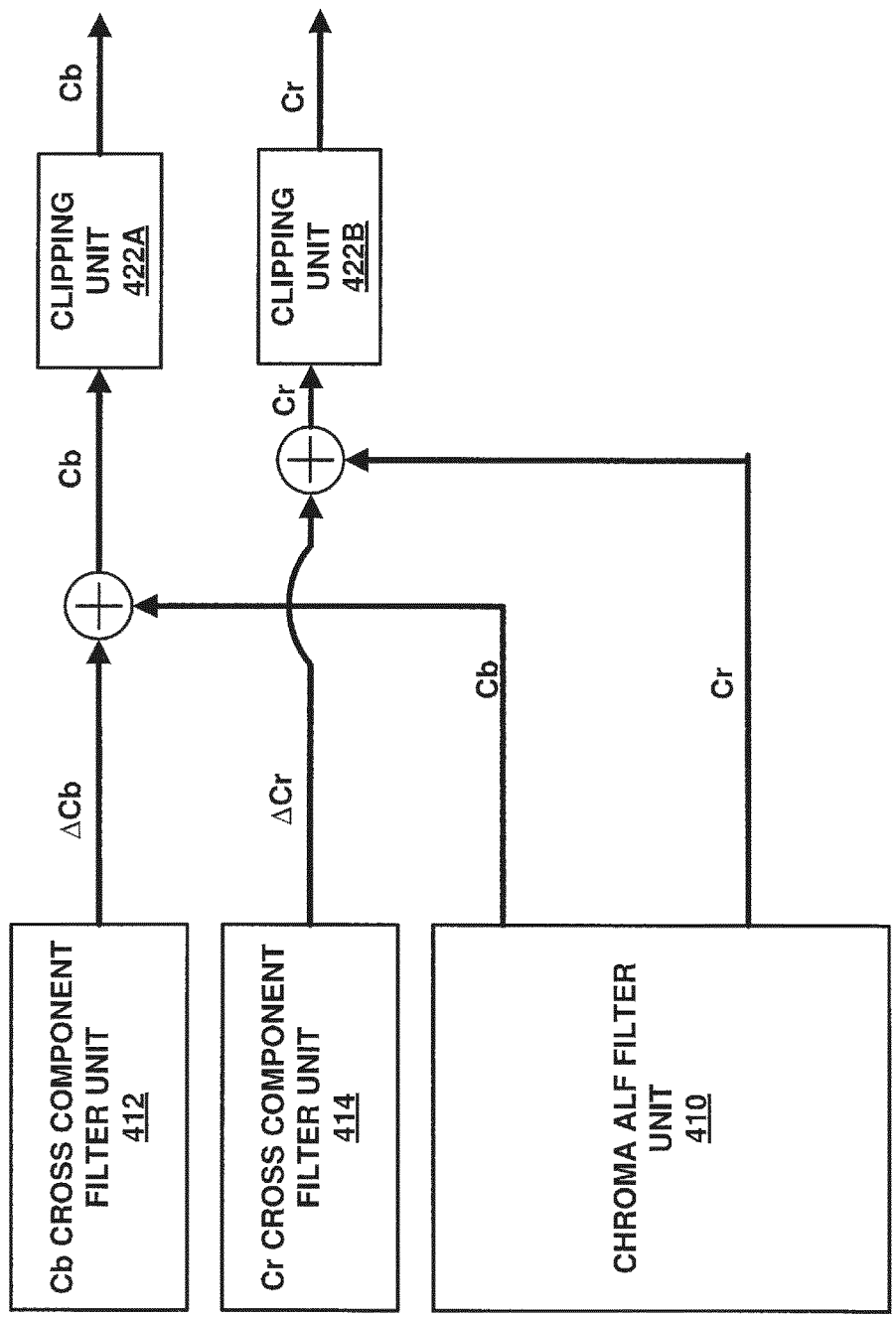
FIG. 12A is a block diagram illustrating example of cross component filter units that may be configured to reduce a reconstruction error according to one or more techniques of this disclosure.
Figure 12B:
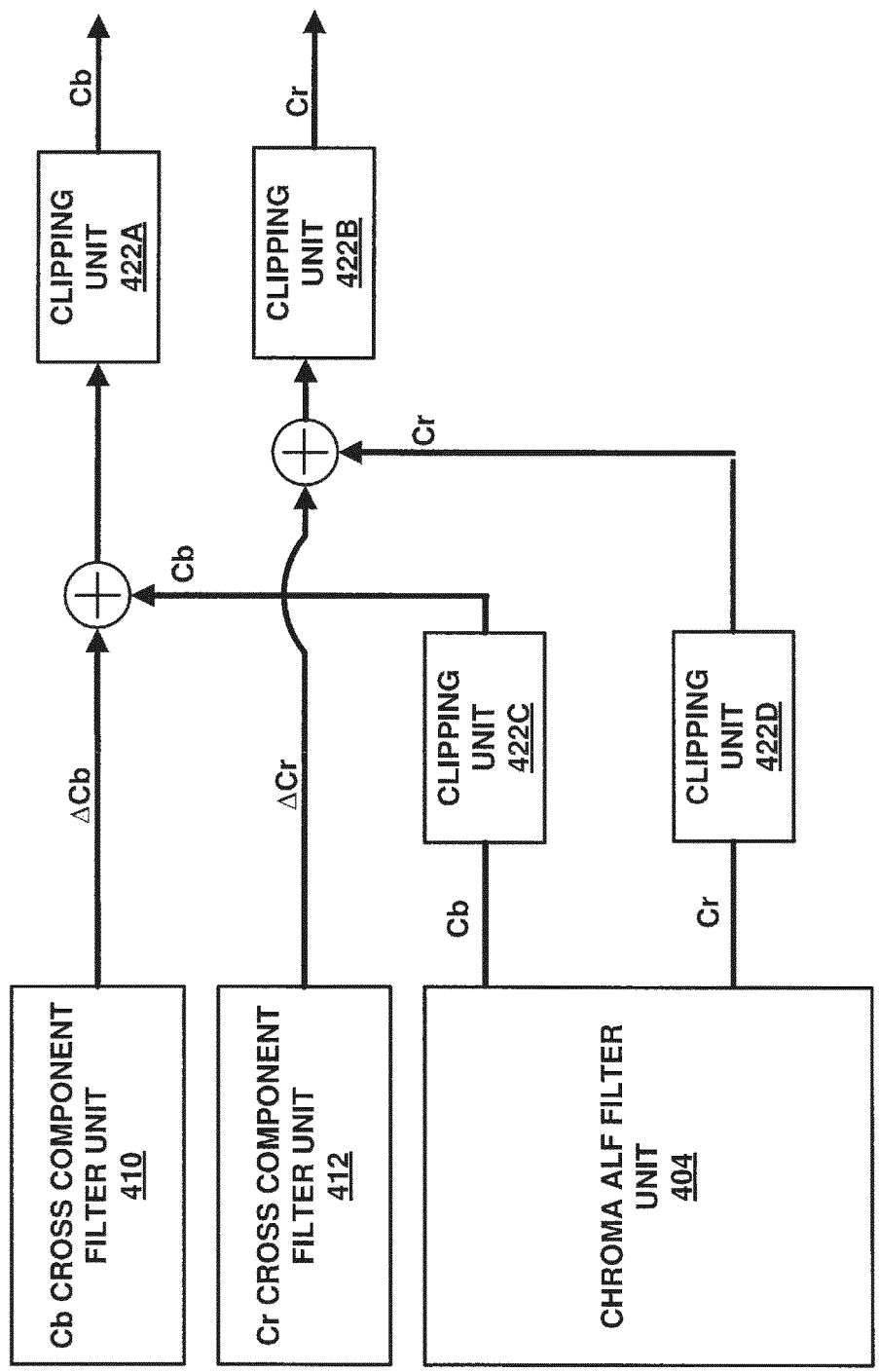
FIG. 12B is a block diagram illustrating example of cross component filter units that may be configured to reduce a reconstruction error according to one or more techniques of this disclosure.

Further, cross component filter techniques described herein may further include performing clipping operations at various points in a filter chain. That is, for example, at various stages of in-loop filter. FIGS. 12A-12B are block diagrams illustrating examples of cross component filter units that may be configured to reduce a reconstruction error according to one or more techniques of this disclosure. In FIGS. 12A-12B, commonly numbered elements are described above with respect to FIGS. 11A-11D and clipping units 422A-422D may be configured to perform a clipping function based on an output bit depth of respective component e.g., Clip3(0, $2^{BitDepthC}-1$, *). It should be noted that clipping units 422A-422D may be selectively enabled based on whether particular types of filtering are performed.

Figure 13A:
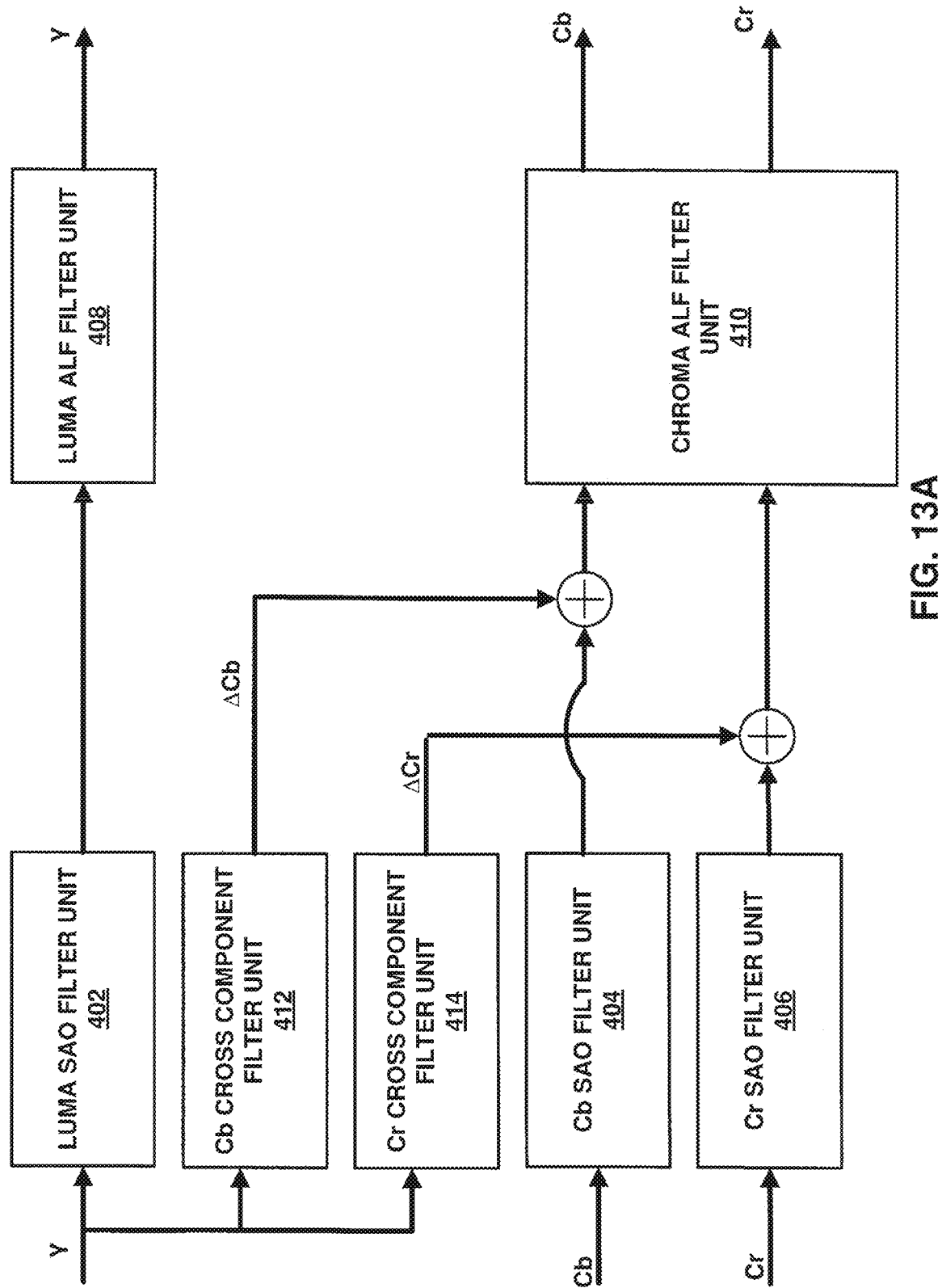
FIG. 13A is a block diagram illustrating example of cross component filter units that may be configured to reduce a reconstruction error according to one or more techniques of this disclosure.
Figure 13B:
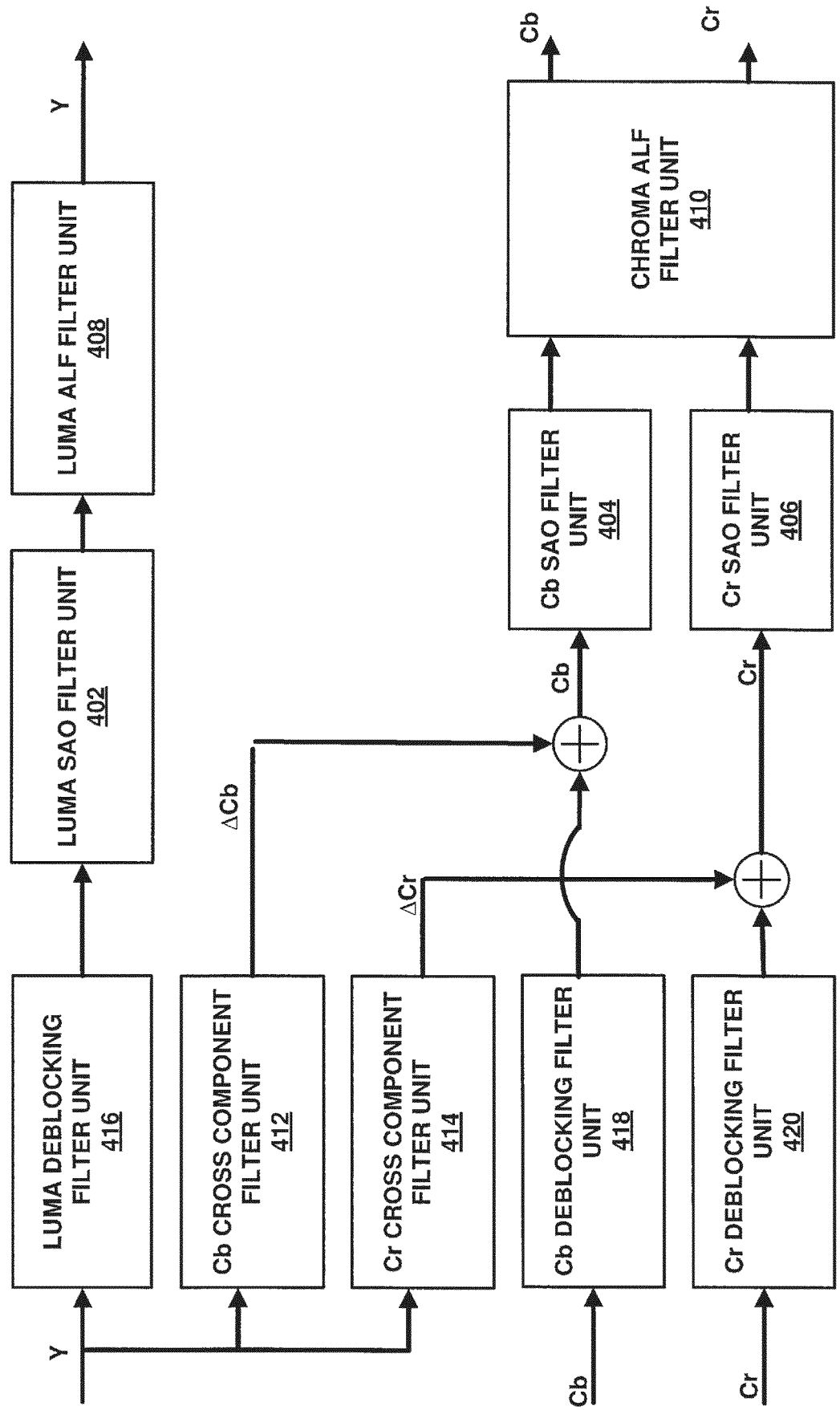
FIG. 13B is a block diagram illustrating example of cross component filter units that may be configured to reduce a reconstruction error according to one or more techniques of this disclosure.
Figure 13C:
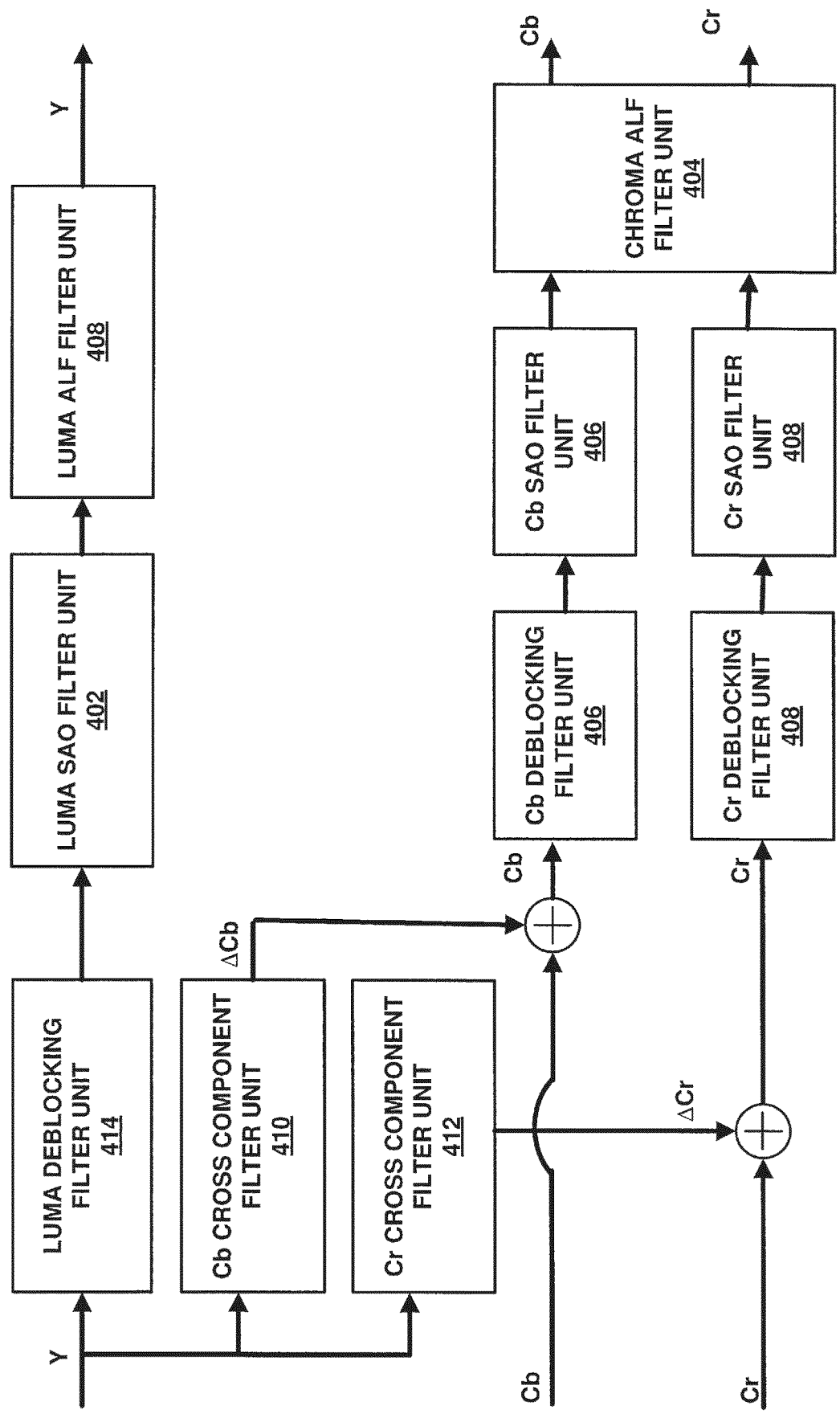
FIG. 13C is a block diagram illustrating example of cross component filter units that may be configured to reduce a reconstruction error according to one or more techniques of this disclosure.

FIGS. 13A-13B are block diagrams illustrating examples of cross component filter units that may be configured to reduce a reconstruction error according to one or more techniques of this disclosure. FIGS. 13A-13B further illustrate that cross component filtering according to the techniques herein may be applied as various points in a filtering chain. In FIGS. 13A-13C, commonly numbered elements are described above.

Further, it should be noted that in some cases, there may be more that 3 components of video data, e.g., YUV+depth. Cross component filtering techniques described herein may be generally applicable to these cases. In some cases, pre-processing of the input sample values from each component may be performed prior to the filtering operation. For example, the input sample values may be clipped. Further, in one example, the clipping range may vary for each coefficient and may be signaled in the bitstream. It should be noted that in some examples, the following equation provides an option for pre-processing of the input sample values:

$$I_j(g(x, y, i, j) + x_j, h(x, y, i, j) + y_j) =$$
$$\min(a, \max(b, I'_j(g(x, y, i, j) + x_j, h(x, y, i, j) + y_j) - derivedValue))$$

Further, another option for pre-processing of the input sample values may be as follows:

$$I_j(g(x, y, i, j) + x_j, h(x, y, i, j) + y_j) = derivedValue +$$
$$\min(a, \max(b, I'_j(g(x, y, i, j) + x_j, h(x, y, i, j) + y_j) - derivedValue))$$

Where, $I'_j(u,v)$: sample value at location (u,v) prior to processing derivedValue: is a value derived from a subset of values in $I'_j(*,*)$, e.g. (a) $I_j(g(x,y,i,j)+0, h(x,y,i,j)+0)$, at origin (b)

$$\frac{(I_j(g(x, y, i, j) + 0, h(x, y, i, j) + 0) + I_j(g(x, y, i, j) + 1, h(x, y, i, j) + 1))}{2},$$

around origin a: is a value that be received in bitstream/inferred from data received in bitstream/derived from a subset of values in $I'_j(*,*)$; and b: is a value that be received in bitstream/inferred from data received in bitstream/derived from a subset of values in $I'_j(*,*)$ In an example, b may be derived from a (e.g., b=−a), to reduce the amount of signaling needed.

Further, in one example, a generalization of input used in a cross component filter operation may be as follows:

$$f_i(x, y) =$$
$$\sum_{\substack{(x_0,y_0) \in S_{i,0,0} \\ (x_1,y_1) \in S_{i,1,0} \\ (x_2,y_2) \in S_{i,2,0} \\ (x_{c0},y_{c0}) \in S_{c0}}} G_0(I_0(g(x, y, i, 0) + x_0, h(x, y, i, 0) + y_0), I_1(g(x, y, i, 1) +$$

$$x_1, h(x, y, i, 1) + y_1), I_2(g(x, y, i, 2) + x_2, h(x, y, i, 1) + y_2))c_0(x_{c0}, y_{c0}) +$$

$$\sum_{\substack{(x_0,y_0) \in S_{i,0,1} \\ (x_1,y_1) \in S_{i,1,1} \\ (x_2,y_2) \in S_{i,2,1} \\ (x_{c1},y_{c1}) \in S_{c1}}} G_1(I_0(g(x, y, i, 0) + x_0, h(x, y, i, 0) + y_0), I_1(g(x, y, i, 1) +$$

$$x_1, h(x, y, i, 1) + y_1), I_2(g(x, y, i, 2) +$$
$$x_2, h(x, y, i, 1) + y_2))c_1(x_{c1}, y_{c1}) \ldots +$$

$$\sum_{\substack{(x_0,y_0) \in S_{i,0,n} \\ (x_1,y_1) \in S_{i,1,n} \\ (x_2,y_2) \in S_{i,2,n} \\ (x_{cn},y_{cn}) \in S_{cn}}} G_n(I_0(g(x, y, i, 0) + x_0, h(x, y, i, 0) + y_0), I_1(g(x, y, i, 1) +$$

$$x_1, h(x, y, i, 1) + y_1), I_2(g(x, y, i, 2) +$$
$$x_2, h(x, y, i, 1) + y_2))c_n(x_{cn}, y_{cn}) + I_i(x, y)$$

Where, $G_{r_i}(\ )$ is a function used to combine the sample values from components and obtain a derived value corresponding to each coefficient value with index $(x_{c_j}, y_{c_j})$. The function $G_i(\ )$ may depend on chroma format, chroma location type, color gamut, filter shape In one example, cross component filtering may be performed according to the following: Define a support region for luma; For 4:2:0, Upsample by 2× chroma component to be used as input; Subtract a derived value (e.g. 512 for 10-bit chroma, or local average) from the support used for the corresponding chroma component; Then take sample-wise product of luma sample value and chroma sample value corresponding to the defined support region; and Use the product as one of the inputs to the filtering operation.

Further, it should be noted that in some examples, the cross component filtering techniques described herein may be performed on a prediction or a residual. In one example, if field coding is used instead of progressive, then for luma support samples: in one example, sample values from one of the corresponding luma fields may be used and in another example, the sample values from both the luma fields may be used.

Figures 14A, 14B, 14C, 14D, 14E, 14F:
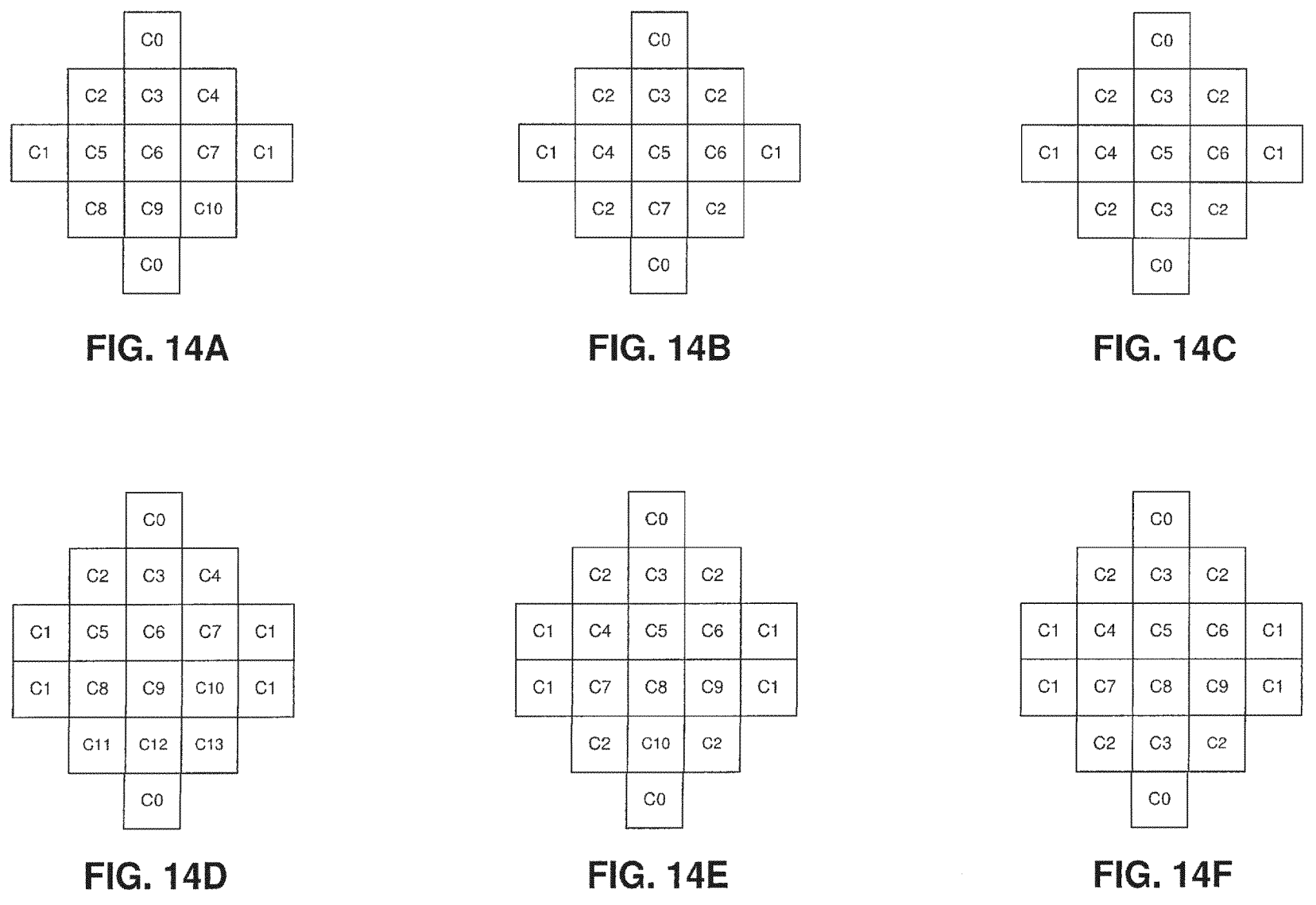
Figures 15A, 15B, 15C, 15D:
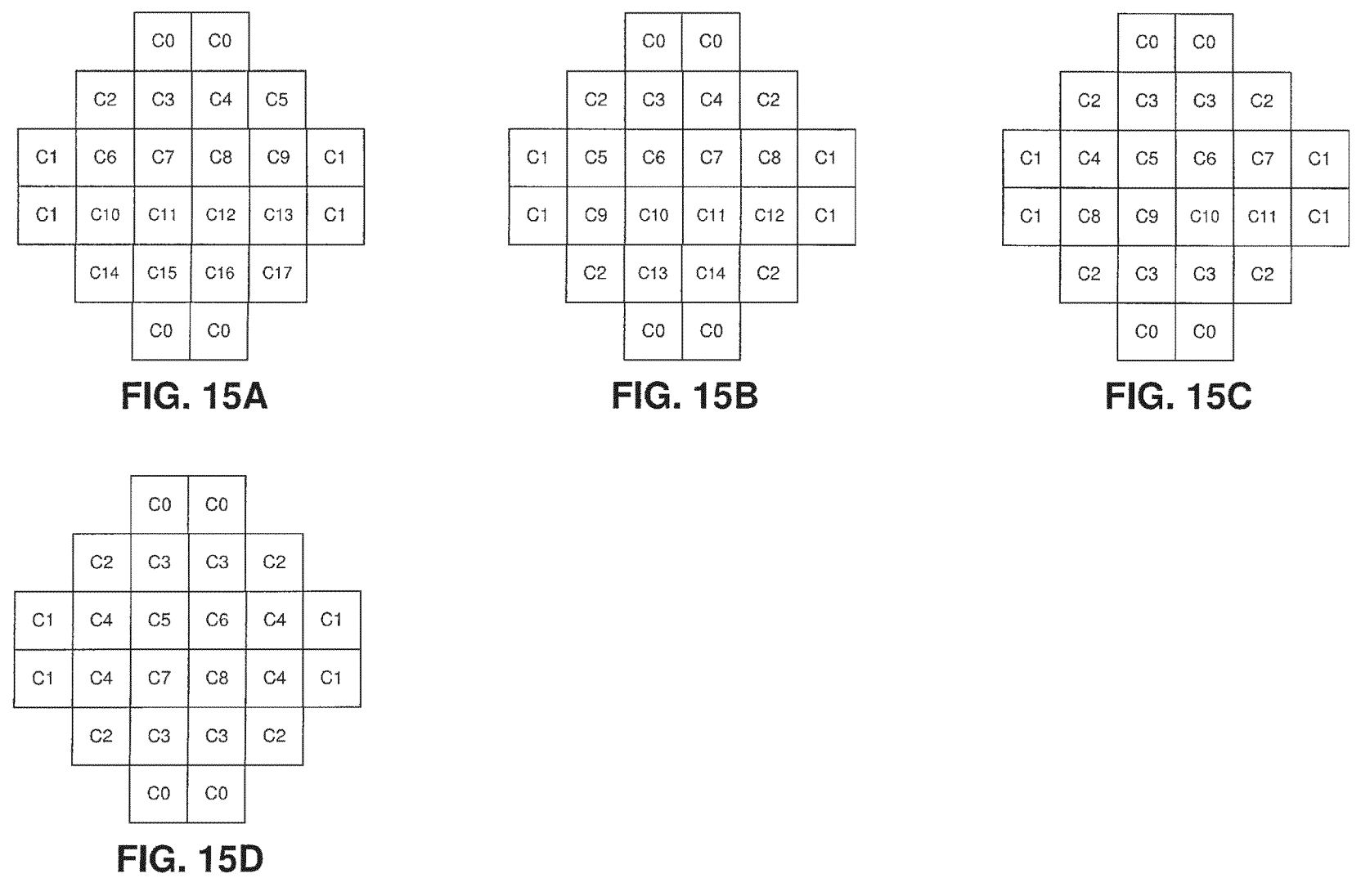

As described above, for each support sample a filter coefficient may be determined and signaled. That is, for example, for 5×5, 5×6, 6×6, and/or 6×6 filter coefficients may be signaled. FIGS. 14A-14C illustrate examples of signaling filter coefficients for 5×5 filters. FIGS. 14D-14F illustrate examples of signaling filter coefficients for 5×6 (and similarly, 6×5) filters. FIGS. 15A-15D illustrate examples of signaling filter coefficients for 6×6. In each of FIGS. 14A-15D, respective filter coefficients for a filter are indicated by CN. Thus, in cases, where the same $C_N$ value is provided multiple locations of the same filter, the filter coefficients are that same, i.e., shared. In this manner, the number of filter coefficients that is signaled for a filter is reduced. For example, in FIG. 14D, 14 filter coefficients are signaled for the 18 support locations.

Figure 16A:
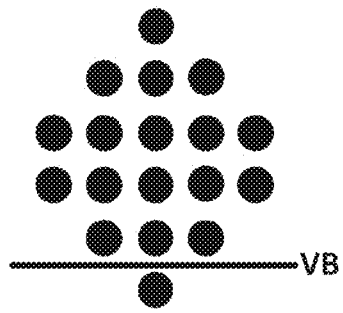
FIG. 16A is a conceptual diagram illustrating example of virtual line buffers which may be used for cross component filtering in accordance with one or more techniques of this disclosure.
Figure 16A:
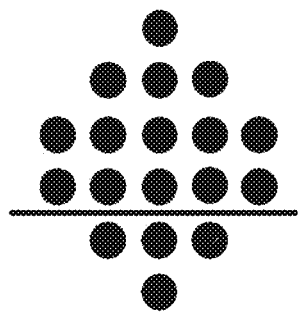
Figure 16A:
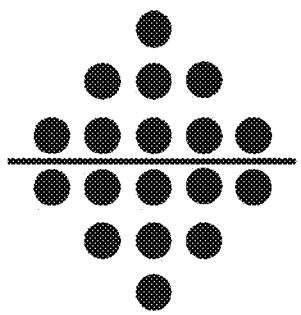
Figure 16B:
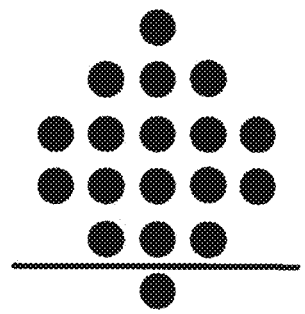
FIG. 16B is a conceptual diagram illustrating example of virtual line buffers which may be used for cross component filtering in accordance with one or more techniques of this disclosure.
Figure 16B:
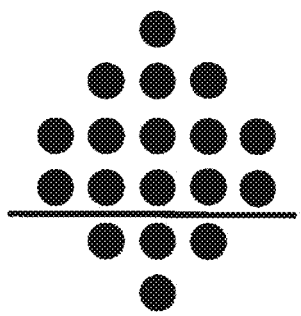
Figure 16B:
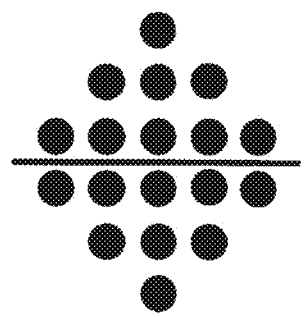
Figure 16C:
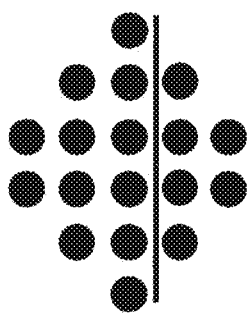
FIG. 16C is a conceptual diagram illustrating example of virtual line buffers which may be used for cross component filtering in accordance with one or more techniques of this disclosure.
Figure 16C:
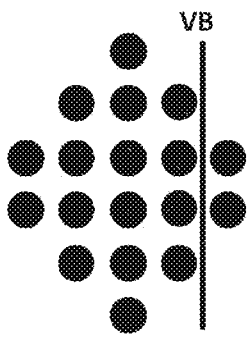
Figure 16D:
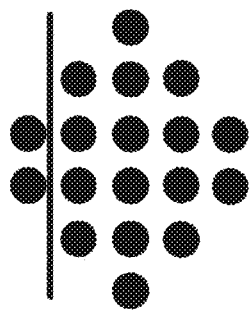
FIG. 16D is a conceptual diagram illustrating example of virtual line buffers which may be used for cross component filtering in accordance with one or more techniques of this disclosure.
Figure 16D:
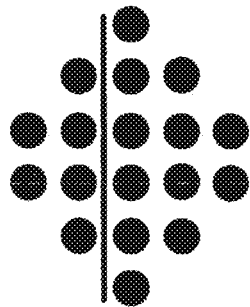

In one example, it may be desirable to limit the number of line buffers within an architecture where samples are processed CTU-by-CTU. That is, for example, a virtual line boundary provides where for each CTU, samples above the horizontal VB can be processed before the lower CTU comes, but samples below the horizontal VB cannot process until the lower CTU becomes available. JVET-N1001 and JVET-O2001 define a horizontal virtual line boundary (VB) for luma ALF and luma SAO. According to the techniques herein this VB may be reused for the luma-input-chroma-output filter defined herein. Further, a vertical VB may be reused for the luma-input-chroma-output filter defined herein, and/or subsets of VBs may be reused for luma-input-chroma-output filter defined herein. Further, there are two cases defined, for which the support samples in the luma component may be derived/modified: when a pre-determined luma sample (corresponding to chroma sample being decoded for e.g. based on chroma location type) is above the VB and the support spans across the VB; and when a pre-determined luma sample (corresponding to chroma sample being decoded e.g., based on chroma location type) is below the VB and the support spans across the VB. In an example, the pre-determined sample is the sample at the position corresponding to coefficient C6 for 5×6 luma support illustrated in FIG. 14D. FIGS. 16A-16D are conceptual diagrams illustrating examples of virtual line buffers which may be used for cross component filtering in accordance with one or more techniques of this disclosure. In FIG. 16A, samples below a horizontal VB are obtained by copying samples above and closest to virtual line boundary and in same column. In FIG. 16B, samples below a horizontal VB are obtained by copying samples below and closest to virtual line boundary and in same column. In one example, a luma VB is four samples from the horizontal CTU boundary. In one example, each CTU, SAO and ALF can process samples to left of the vertical VB before the right CTU comes, but cannot process samples to right of the vertical VB until the right CTU becomes available. Example modifications when support spans across vertical virtual boundary (VB) is shown in FIGS. 16C-16D. In FIG. 16C, samples to right of vertical VB are obtained by copying samples to left and closest to virtual line boundary and in same row. In FIG. 16D, samples to left of vertical VB are obtained by copying samples right and closest to virtual line boundary and in same row. In an example, a luma VB is four samples from the vertical CTU boundary. In one example, according to the techniques herein, with respect to a generating sample for a horizontal VB, one may consider a vertical and a horizontal axis passing through the center of the support region. The samples being copied may be obtained by copying samples in a column that are at the same distance from the vertical axis, but on the opposite side of the vertical axis. In one example, the sample being copied may be copied from a row that is at the same distance from the horizontal axis but on the opposite side. In one example, according to the techniques herein, with respect to a generating sample for a vertical VB, one may consider a vertical and a horizontal axis passing through the center of the support region. The samples being copied may be obtained by copying samples in a row that are at the same distance from the vertical axis, but on the opposite side of the horizontal axis. In one example, the sample being copied may be copied from a column that is at the same distance from the vertical axis, but on the opposite side. In one example, according to the techniques herein, with respect to generating samples for a VB, samples may be obtained by symmetric padding. That is, with respect to a horizontal VB samples may be copied from the same column and at the same sample distance from the VB and with respect to a vertical VB, samples may be copied from the same row and at the same sample distance from the VB. That is, sample values are mirrored about the VB. It should be noted that section 8.8.5.2 Coding tree block filtering process for luma samples of JVET-O2001 provides a padding scheme for luma samples across a virtual boundary for use with respect to an ALF process. In one example, according to the techniques herein, for cross-component filtering, a similar padding scheme may be used. In one example, according to the techniques herein, when one or more support samples are unavailable, e.g., due to a VB, cross-component filtering may be disabled.

In one example, according to the techniques herein, cross component filtering includes scaling of output of cross-component filtering prior to adding the output to corresponding chroma ALF output. That is, a scaling operation may be used to convert filter coefficients to an integer number, for example as follows:

```
for( int i = 0; i < numCoeff; i++ )
{
    int sign = filterCoeff[i] > 0 ? 1 : -1;
    filterCoeffQuant[i] = int( filterCoeff[i] * sign * factor + 0.5 ) * sign;
}
``` where, in one example, factor=$2^{BitDepthC}$, in another example factor=$2^{(BitDepthC-1)}$), in another example factor=$2^{(8-1)}$ In one example, the scaling factor may be used to adjust the output of the cross-component filtering as follows:

$$f'_i(x, y) = \sum_{(x_0, y_0) \in S_{i,0}} I_0(g(x, y, i, 0) + x_0, h(x, y, i, 0) + y_0)$$
$$filterCoeffQuant[MapToI(x_0, y_0)]f_i[x, y]$$
$$= f'_i(x, y) \div \text{factor} + I_i(x, y)$$

It should be noted that, if factor=$2^x$, this corresponds to a right shift integer rounding $$\left(f_i(x, y) + 2^{(x-1)}\right) \gg x$$

As described above, filter data specifying a derived filter may be signaled to a video decoder. In one example, there may be three main aspects of signaling filter data: turning the filter on/off; local control of the tool e.g., enabling the tool in some spatial regions but not others; and signaling of specific filters. In one example, a parameter set, for example, a Sequence Parameter Set may conditionally include a flag that enables/disables the filter. In one example, the flag may indicate whether one of more filters are enabled e.g., ALF and cross component filters. In one example, slice level signaling of filter coefficients may be used. In another example, pointer(s) to an APS containing the corresponding filter coefficients data may be sent in slice header. Tables 3-4 illustrate an example of syntax than may be included in a slice header for signaling of filter coefficients according to this example.

TABLE 3

| | Descriptor |
|---|---|
| slice_header( ) { | |
| ... | |
|   if( sps_cross_component_alf_enabled_flag ) { | |
|     slice_cross_component_alf_cb_enabled_flag | u(1) |
|     if( slice_cross_component_alf_cb_enabled_flag ) { | |
|       slice_cross_component_alf_cb_aps_id | u(5) |
|   slice_cross_component_alf_cb_log2_control_size_minus4 | ue(v) |
|     } | |
|     slice_cross_component_alf_cr_enabled_flag | u(1) |
|     if( slice_cross_component_alf_cr_enabled_flag ) { | |
|       slice_cross_component_alf_cr_aps_id | u(5) |
|       slice_cross_component_alf_cr_log2_control_size_minus4 | ue(v) |
|     } | |
|   } | |
| ... | |
| } | |

TABLE 4

| | Descriptor |
|---|---|
| alf_data( adaptation_parameter_set_id ) { | |
|   if (sps_alf_enabled_flag) { | |
|     alf_luma_filter_signal_flag | u(1) |
|     if ( chroma_format_idc != 0 ) // monochrome | |
|       alf_chroma_filter_signal_flag | u(1) |
|   } | |
|   if (sps_cross_component_alf_enabled_flag) { | |
|     alf_cross_component_cb_filter_signal_flag | u(1) |
|     alf_cross_component_cr_filter_signal_flag | u(1) |
|   } | |
|   if( alf_luma_filter_signal_flag ) { | |
|     ... | |
|   } | |
|   if( alf_chroma_filter_signal_flag ) { | |
|     ... | |
|   } | |
|   if( alf_cross_component_cb_filter_signal_flag ) { | |
|     alf_cross_component_cb_min_eg_order_minus1 | ue(v) |
|     for( i = 0; i < 3; i++ ) | |
|       alf_cross_component_cb_eg_order_increase_flag[ i ] | u(1) |
|     for ( j = 0; j < 14; j++ ) { | |
|       alf_cross_component_cb_coeff_delta_abs[ j ] | uek(v) |
|       if( alf_cross_component_cb_coeff_delta_abs[ j ] ) | |
|         alf_cross_component_cb_coeff_delta_sign[ j ] | u(1) |
|     } | |
|   } | |
|   if( alf_cross_component_cr_filter_signal_flag ) { | |
|     alf_cross_component_cr_min_eg_order_minus1 | ue(v) |

TABLE 4-continued

| | Descriptor |
|---|---|
| `    for( i = 0; i < 3; i++ )` | |
| `        alf_cross_component_cr_eg_order_increase_flag[ i ]` | u(1) |
| `    for ( j = 0; j < 14; j++ ) {` | |
| `        alf_cross_component_cr_coeff_delta_abs[ j ]` | uek(v) |
| `        if( alf_cross_component_cr_coeff_delta_abs[ j ] )` | |
| `            alf_cross_component_cr_coeff_delta_sign[ j ]` | u(1) |
| `    }` | |
| `  }` | |
| `}` | |

With respect to Tables 3-4, in one example, the semantics may be based on the following:

slice_cross_component_alf_cb_enabled_flag equal to 0 specifies that the cross-component Cb filter is not applied to Cb colour component. slice_cross_component_alf_cb_enabled_flag equal to 1 indicates that the cross-component adaptive loop filter is applied to the Cb colour component.

slice_cross_component_alf_cr_enabled_flag equal to 0 specifies that the cross-component Cr filter is not applied to Cr colour component, slice_cross_component_alf_cb_enabled_flag equal to 1 indicates that the cross-component adaptive loop filter is applied to the Cr colour component.

slice_cross_component_alf_cb_aps_id specifies the adaptation_parameter_set_id that the Cb colour component of the slice refers to. When slice_cross_component_alf_cb_aps_id is not present, it is inferred to be equal to slice_alf_aps_id_luma[0]. The TemporalId of the ALF APS NAL unit having adaptation_parameter_set_id equal to slice_cross_component_alf_cbaps_id shall be less than or equal to the TemporalId of the coded slice NAL unit.

slice_cross_component_alf_cr_aps_id specifies the adaptation_parameter_set_id that the Cr colour component of the slice refers to. When slice_cross_component_alf_cr_aps_id is not present, it is inferred to be equal to slice_alf_aps_id_luma[0]. The TemporalId of the ALF APS NAL unit having adaptation_parameter_set_id equal to slice_cross_component_alf_cr_aps_id shall be less than or equal to the TemporalId of the coded slice NAL unit.

slice_cross_component_alf_cb_log2_control_size_minus4 specifies the value of the square block sizes in number of samples as follows:

AlfCCSamplesCbW=AlfCCSamplesCbH= $2^{(slice\_cross\_component\_alf\_cb\_log2\_control\_size\_minus4+4)}$ slice_cross_component_alf_cb_log2_control_size_minus4 shall be in the range 0 to 3, inclusive.

slice_cross_component_alf_cr_log2_control_size_minus4 specifies the value of the square block sizes in number of samples as follows:

AlfCCSamplesCrW=AlfCCSamplesCrH= $2^{(slice\_cross\_component\_alf\_cr\_log2\_control\_size\_ins4+4)}$ slice_cross_component_alf_cr_log2_control_size_minus4 shall be in the range 0 to 3, inclusive.

alf_luma_filter_signal_flag equal to 1 specifies that a luma filter set is signaled. alf_luma_filter_signal_flag equal to 0 specifies that a luma filter set is not signaled. When alf_luma_filter_signal_flag is not present, it is inferred to be equal 0.

alf_chroma_filter_signal_flag equal to 1 specifies that a chroma filter is signaled. alf_chroma_filter_signal_flag equal to 0 specifies that a chroma filter is not signaled. When alf_chroma_filter_signal_flag is not present, it is inferred to be equal 0.

alf_cross_component_eb_filter_signal_flag equal to 1 specifies that a cross-component cross-component Cb filter set is signaled. alf_cross_component_cb_filter_signal_flag equal to 0 specifies that a cross-component Cb filter set is not signaled. When alf_cross_component_cb_filter_signal_flag is not present, it is inferred to be equal 0.

alf_cross_component_cr_filter_signal_flag equal to 1 specifies that a cross-component cross-component Cr filter set is signaled. alf_cross_component_cb_filter_signal_flag equal to 0 specifies that a cross-component Cr filter set is not signaled. When alf_cross_component_cr_filter_signal_flag is not present, it is inferred to be equal 0.

alf_cross_component_eb_min_eg_order_minus1 plus 1 specifies the minimum order of the exp-Golomb code for cross-component Cb filter coefficient signaling. The value of alf_cross_component_eb_min_eg_order_minus1 shall be in the range of 0 to 9, inclusive. It should be noted, that in some examples, this range may be changed.

alf_cross_component_cr_min_eg_order_minus1 plus 1 specifies the minimum order of the exp-Golomb code for cross-component Cr filter coefficient signaling. The value of alf_cross_component_cb_min_eg_order_minus1 shall be in the range of 0 to 9, inclusive. It should be noted, that in some examples, this range may be changed.

alf_cross_component_cb_eg_order_increase_flag[i] equal to 1 specifies that the minimum order of the exp-Golomb code for cross-component Cb filter coefficient signaling is incremented by 1. alf_cross_component_cb_eg_order_increase_flag[i] equal to 0 specifies that the minimum order of the exp-Golomb code for cross-component Cb filter coefficient signaling is not incremented by 1.

The order expGoOrderCb[i] of the exp-Golomb code used to decode the values of alf_cross_component_cb_coeff_delta_abs[j] is derived as follows:

expGoOrderCb[$i$]=
($i$==0?alf_cross_component_cb_min_eg_order_minus1+
1:expGoOrderCb[$i$−1])+alf_cross_component_cb_eg_order_increase_flag[$i$]

alf_cross_component_cr_eg_order_increase_flag[i] equal to 1 specifies that the minimum order of the exp-Golomb code for cross-component Cr filter coefficient signaling is incremented by 1. alf_cross_component_cr_eg_order_increase_flag[i] equal to 0 specifies that the minimum order of the exp-Golomb code for cross-component Cr filter coefficient signaling is not incremented by 1.

The order expGoOrderCr[i] of the exp-Golomb code used to decode the values of alf_cross_component_cb_coeff_delta_abs[j] is derived as follows:

expGoOrderCr[$i$]=
($i$==0?alf_cross_component_cr_min_eg_order_minus1+
1:expGoOrderCr[$i$−1])+alf_cross_componen-t_er_eg_order_increase_flag[$i$]

alf_cross_component_cb_coeff_delta_abs[j] specifies the absolute value of the j-th coefficient delta of the signaled cross-component Cb filter. When alf_luma_cross_component_eb_coeff_delta_abs[j] is not present, it is inferred to be equal 0.

The order k of the exp-Golomb binarization uek(v) is derived as follows:

golombOrderIdxCb[ ]={0,2,2,2,1,2,2,2,2,2,2,1,2,1}
[these may be Categorize coefficient into 3 categories, each category uses the same order $k$ exp-Golomb code]

$k$=expGoOrderCb[golombOrderIdxCb[$j$]]

alf_cross_component_cr_coeff_delta_abs[j] specifies the absolute value of the j-th coefficient delta of the signaled cross-component Cr filter. When alf_luma_cross_component_cr_coeff_delta_abs[j] is not present, it is inferred to be equal 0.

The order k of the exp-Golomb binarization uek(v) is derived as follows:

golombOrderIdxCr[ ]={0,1,2,1,0,1,2,2,2,2,2,1,2,1}
[these may be Categorize coefficient into 3 categories, each category uses the same order $k$ exp-Golomb code]

$k$=expGoOrderCr[golombOrderIdxCr[$j$]]

alf_cross_component_cb_coeff_sign[j] specifies the sign of the j-th cross-component Cb filter coefficient as follows:
If alf_cross_component_cb_coeff_sign[j] is equal to 0, the corresponding cross-component Cb filter coefficient has a positive value.
Otherwise (alf_cross_component_cb_coeff_sign[j] is equal to 1), the corresponding cross-component Cb filter coefficient has a negative value.

When alf_cross_component_eb_coeff_sign[j] is not present, it is inferred to be equal to 0.

The cross-component Cb filter coefficients AlfCCCoeff$_{Cb}$[adaptation_parameter_set_id] with elements AlfCCCoeff$_{Cb}$[adaptation_parameter_set_id][j], with j=0 . . . 13 are derived as follows:

AlfCCCoeff$_{Cb}$[adaptation_parameter_set_id][$j$]=
alf_cross_component_cb_coeff_abs[$j$]*(1–
2*alf_cross_component_cb_coeff_sign[$j$])

It is a requirement of bitstream conformance that the values of AlfCCCoeff$_{Cb}$[adaptation_parameter_set_id][j] with j=0 . . . 13 shall be in the range of $-2^{10}-1$ to $2^{10}-1$, inclusive.

alf_cross_component_cr_coeff_sign[j] specifies the sign of the j-th cross-component Cr filter coefficient as follows:
If alf_cross_component_cr_coeff_sign[j] is equal to 0, the corresponding cross-component Cr filter coefficient has a positive value.
Otherwise (alf_cross_component_cr_coeff_sign[j] is equal to 1), the corresponding cross-component Cr filter coefficient has a negative value.

When alf_cross_component_cr_coeff_sign[j] is not present, it is inferred to be equal to 0.

The cross-component Cr filter coefficients AlfCCCoeff$_{Cr}$[adaptation_parameter_set_id] with elements AlfCCCoeff$_{Cr}$[adaptation_parameter_set_id][j], with j=0 . . . 13 are derived as follows:

AlfCCCoeff$_{Cr}$[adaptation_parameter_set_id][$j$]=
alf_cross_component_cr_coeff_abs[$j$]*(1–
2*alf_cross_component_cr_coeff_sign[$j$])

It is a requirement of bitstream conformance that the values of AlfCCCoeff$_{Cr}$[adaptation_parameter_set_id][j] with j=0 . . . 13 shall be in the range of $-2^{10}-1$ to $2^{10}-1$, inclusive.

It should be noted that the range of $-2^{10}-1$ to $2^{10}-1$ may change. It should be noted, that in some examples, this range may depend on bit depth of luma/chroma or subset thereof.

With respect to Table 4, in one example, the alf_data( ) syntax structure provided in Table 5A may be used.

TABLE 5A

| | Descriptor |
|---|---|
| alf_data( adaptation_parameter_set_id ) { | |
| ... | |
|   if (sps_cross_component_alf_enabled_flag) { | |
|     alf_cross_component_cb_filter_signal_flag | u(1) |
|     alf_cross_component_cr_filter_signal_flag | u(1) |
|   } | |
|   if( alf_luma_filter_signal_flag ) { | |
|     ... | |
|   } | |
|   if( alf_chroma_filter_signal_flag ) { | |
|     ... | |
|   } | |
|   if( alf_cross_component_cb_filter_signal_flag ) { | |
|     alf_cross_component_cb_min_eg_order_minus1 | ue(v) |
|     for( i = 0; i < 3; i++ ) | |
|       alf_cross_component_cb_eg_order_increase_flag[ i ] | u(1) |
|     for ( j = 0; j < 14; j++ ) { | |
|       alf_cross_component_cb_coeff_abs[ j ] | uek(v) |
|       if( alf_cross_component_cb_coeff_abs[ j ] ) | |
|         alf_cross_component_cb_coeff_sign[ j ] | u(1) |
|     } | |
|   } | |
|   if( alf_cross_component_cr_filter_signal_flag ) { | |
|     alf_cross_component_cr_min_eg_order_minus1 | ue(v) |
|     for( i = 0; i < 3; i++ ) | |
|       alf_cross_component_cr_eg_order_increase_flag[ i ] | u(1) |
|     for ( j = 0; j < 14; j++ ) { | |
|       alf_cross_component_cr_coeff_abs[ j ] | uek(v) |
|       if( alf_cross_component_cr_coeff_abs[ j ] ) | |
|         alf_cross_component_cr_coeff_sign[ j ] | u(1) |

TABLE 5A-continued

| | Descriptor |
|---|---|
| ``` 
    }
   }
 }
``` | |

With respect to Table 5A, in one example, the semantics may be based on the following:

alf_luma_filter_signal_flag equal to 1 specifies that a luma filter set is signaled. alf_luma_filter_signal_flag equal to 0 specifies that a luma filter set is not signaled. When alf_luma_filter_signal_flag is not present, it is inferred to be equal 0.

alf_chroma_filter_signal_flag equal to 1 specifies that a chroma filter is signaled. alf_chroma_filter_signal_flag equal to 0 specifies that a chroma filter is not signaled. When alf_chroma_filter_signal_flag is not present, it is inferred to be equal 0.

alf_cross_component_cb_filter_signal_flag equal to 1 specifies that a cross-component Cb filter set is signaled. alf_cross_component_cb_filter_signal_flag equal to 0 specifies that a cross-component Cb filter set is not signaled. When alf_cross_component_eb_filter_signal_flag is not present, it is inferred to be equal 0.

alf_cross_component_cr_filter_signal_flag equal to 1 specifies that a cross-component Cr filter set is signaled. alf_cross_component_cb_filter_signal_flag equal to 0 specifies that a cross-component Cr filter set is not signaled. When alf_cross_component_cr_filter_signal_flag is not present, it is inferred to be equal 0.

alf_cross_component_cb_min_eg_order_minus1 plus 1 specifies the minimum order of the exp-Golomb code for cross-component Cb filter coefficient signaling. The value of alf_cross_component_cb_min_eg_order_minus1 shall be in the range of 0 to 9, inclusive. It should be noted, that in some examples, this range may be changed.

alf_cross_component_cr_min_eg_order_minus1 plus 1 specifies the minimum order of the exp-Golomb code for cross-component Cr filter coefficient signaling. The value of alf_cross_component_cb_min_eg_order_minus1 shall be in the range of 0 to 9, inclusive. It should be noted, that in some examples, this range may be changed.

alf_cross_component_cb_eg_order_increase_flag[i] equal to 1 specifies that the minimum order of the exp-Golomb code for cross-component Cb filter coefficient signaling is incremented by 1. alf_cross_component_cb_eg_order_increase_flag[i] equal to 0 specifies that the minimum order of the exp-Golomb code for cross-component Cb filter coefficient signaling is not incremented by 1.

The order expGoOrderCb[i] of the exp-Golomb code used to decode the values of alf_cross_component_cb_coeff_abs [j] is derived as follows:

expGoOrderCb[i]=
(i==0?alf_cross_component_cb_min_eg_order_minus1+
1:expGoOrderCb[i−1])+alf_cross_component_cb_eg_order_increase_flag[i]

In an example, a pre-determined value corresponding to the minimum order of the exp-Golomb code for cross-component Cb filter coefficient signaling may be used.

In an example, a single value corresponding to the minimum order of the exp-Golomb code for cross-component used for all Cb filter coefficient may be signaled in the bitstream.

alf_cross_component_cr_eg_order_increase_flag[i] equal to 1 specifies that the minimum order of the exp-Golomb code for cross-component Cr filter coefficient signaling is incremented by 1. alf_cross_component_cr_eg_order_increase_flag[i] equal to 0 specifies that the minimum order of the exp-Golomb code for cross-component Cr filter coefficient signaling is not incremented by 1.

The order expGoOrderCr[i] of the exp-Golomb code used to decode the values of alf_cross_component_cb_coeff_abs [j] is derived as follows:

expGoOrderCr[i]=
(i==0?alf_cross_component_cr_min_eg_order_minus1+
1:expGoOrderCr[i−1])+alf_cross_component_cr_eg_order_increase_flag[i]

In an example, a pre-determined value corresponding to the minimum order of the exp-Golomb code for cross-component Cr filter coefficient signaling is used.

In an example, a single value corresponding to the minimum order of the exp-Golomb code for cross-component used for all Cr filter coefficient is signaled in the bitstream.

alf_cross_component_cb_coeff_abs[j] specifies the absolute value of the j-th coefficient of the signaled cross-component Cb filter. When alf_cross_component_cb_coeff_abs[j] is not present, it is inferred to be equal 0.

The order k of the exp-Golomb binarization uek(v) is derived as follows:

golombOrderIdxCb[ ]={0,2,2,2,1,2,2,2,2,2,2,1,2,1}
[these may be Categorize coefficient into 3 categories, each category uses the same order k exp-Golomb code]

k=expGoOrderCb[golombOrderIdxCb[j]]

In an example ue(v) coding may be used for signaling the value of syntax element alf_cross_component_cb_coeff_abs [j]

alf_cross_component_cr_coeff_abs[j] specifies the absolute value of the j-th coefficient of the signaled cross-component Cr filter. When alf_cross_component_cr_coeff_abs[j] is not present, it is inferred to be equal 0.

The order k of the exp-Golomb binarization uek(v) is derived as follows:

golombOrderIdxCr[ ]={0,1,2,1,0,1,2,2,2,2,2,1,2,1}
[these may be Categorize coefficient into 3 categories, each category uses the same order k exp-Golomb code]

k=expGoOrderCr[golombOrderIdxCr[j]]

In an example, ue(v) coding is used for signaling the value of syntax element alf_cross_component_cr_coeff_abs[j]

alf_cross_component_cb_coeff_sign[j] specifies the sign of the j-th cross-component Cb filter coefficient as follows:
If alf_cross_component_cb_coeff_sign[j] is equal to 0, the corresponding cross-component Cb filter coefficient has a positive value.
Otherwise (alf_cross_component_cb_coeff_sign[j] is equal to 1), the corresponding cross-component Cb filter coefficient has a negative value.

When alf_cross_component_cb_coeff_sign[j] is not present, it is inferred to be equal to 0. The cross-component Cb filter coefficients AlfCCCoeff$_{Cb}$[adaptation_parameter_set_id] with elements AlfCCCoeff$_{Cb}$[adaptation_parameter_set_id][j], with j=0 . . . 13 are derived as follows:

AlfCCCoeff$_{Cb}$[adaptation_parameter_set_id][j]
=alf_cross_component_cb_coeff_abs[j]*(1−
2*alf_cross_component_cb_coeff_sign[j])

It is a requirement of bitstream conformance that the values of AlfCCCoeff$_{Cb}$[adaptation_parameter_set_id][j] with j=0 . . . 13 shall be in the range of $-2^{10}-1$ to $2^{10}-1$, inclusive.

alf_cross_component_cr_coeff_sign[j] specifies the sign of the j-th cross-component Cr filter coefficient as follows:
If alf_cross_component_cr_coeff_sign[j] is equal to 0, the corresponding cross-component Cr filter coefficient has a positive value.
Otherwise (alf_cross_component_cr_coeff_sign[j] is equal to 1), the corresponding cross-component Cr filter coefficient has a negative value.

When alf_cross_component_cr_coeff_sign[j] is not present, it is inferred to be equal to 0.

The cross-component Cr filter coefficients AlfCCCoeff$_{Cr}$[adaptation_parameter_set_id] with elements AlfCCCoeff$_{Cr}$[adaptation_parameter_set_id][j], with j=0 . . . 13 are derived as follows:

AlfCCCoeff$_{Cr}$[adaptation_parameter_set_id][j]=
alf_cross_component_cr_coeff_abs[j]*(1−
2*alf_cross_component_cr_coeff_sign[j])

It is a requirement of bitstream conformance that the values of AlfCCCoeff$_{Cr}$[adaptation_parameter_set_id][j] with j=0 . . . 13 shall be in the range of $-2^{10}-1$ to $2^{10}-1$, inclusive.

In one example, the alf_data( ) syntax structure provided in Table 5B may be used. It should be noted that in Table 5B, when coefficients are signaled in an APS, the number of filters is signaled using minus one coding.

TABLE 5B

|  | Descriptor |
|---|---|
| alf_data( adaptation_parameter_set_id ) { | |
|    ... | |
|    if (sps_cross_component_alf_enabled_flag) { | |
|       alf_cross_component_cb_filter_signal_flag | u(1) |
|       alf_cross_component_cr_filter_signal_flag | u(1) |
|    } | |
|    if( alf_luma_filter_signal_flag ) { | |
|       ... | |
|    } | |
|    if( alf_chroma_filter_signal_flag ) { | |
|       ... | |
|    } | |
|    if( alf_cross_component_cb_filter_signal_flag ) { | |
|       alf_cross_component_cb_filters_signalled_minus1 | ue(v) |
|       for( k = 0; k < (alf_cross_component_cb_filters_signalled_minus1+1); k++ ) { | |
|          alf_cross_component_cb_min_eg_order_minus1 | ue(v) |
|          for( i = 0; i < 3; i++ ) | |
|             alf_cross_component_cb_eg_order_increase_flag[ k ][ i ] | u(1) |
|          for ( j = 0; j < 14; j++ ) { | |
|             alf_cross_component_cb_coeff_abs[ k ][ j ] | uek(v) |
|             if( alf_cross_component_cb_coeff_abs[ k ][ j ] ) | |
|                alf_cross_component_cb_coeff_sign[ k ][ j ] | u(1) |
|          } | |
|       } | |
|    } | |
|    if( alf_cross_component_cr_filter_signal_flag ) { | |
|       alf_cross_component_cr_filters_signalled_minus1 | ue(v) |
|       for( k = 0; k < (alf_cross_component_cr_filters_signalled_minus1+1); k++ ) { | |
|          alf_cross_component_cr_min_eg_order_minus1 | ue(v) |
|          for( i = 0; i < 3; i++ ) | |
|             alf_cross_component_cr_eg_order_increase_flag[ k ][ i ] | u(1) |
|          for ( j = 0; j < 14; j++ ) { | |
|             alf_cross_component_cr_coeff_abs [ k ][ j ] | uek(v) |
|             if( alf_cross_component_cr_coeff_abs[ k ][ j ] ) | |
|                alf_cross_component_cr_coeff_sign[ k ][ j ] | u(1) |
|          } | |
|       } | |
|    } | |
| } | |

With respect to Table 5B, in one example, the semantics may be based on the following:

alf_cross_component_cb_filter_signal_flag equal to 1 specifies that a cross-component Cb filter set is signaled. alf_cross_component_cb_filter_signal_flag equal to 0 specifies that a cross-component Cb filter set is not signaled. When alf_cross_component_cb_filter_signal_flag is not present, it is inferred to be equal 0.

alf_cross_component_cr_filter_signal_flag equal to 1 specifies that a cross-component Cr filter set is signaled. alf_cross_component_cb_filter_signal_flag equal to 0 specifies that a cross-component Cr filter set is not signaled. When alf_cross_component_cr_filter_signal_flag is not present, it is inferred to be equal 0.

alf_cross_component_cb_filters_signaled_minus1 plus 1 specifies the number of cross-component Cb filter sets for which coefficients are signaled. The value of alf_cross_component_cb_filters_signaled_minus1 shall be in the range of 0 to NumCcAlfCbFilters−1, inclusive.

NumCcAlfCbFilters represents the maximum number of cross-component Cb filter set allowed in a video sequence. In one example, NumCcAlfCbFilters may be set to a predetermined non-negative integer value. In one example, NumCcAlfCbFilters is signaled in a parameter set for e.g. SPS, PPS.

alf_cross_component_cb_min_eg_order_minus1[k] plus 1 specifies the minimum order of the exp-Golomb code for the k-th cross-component Cb filter coefficient set signaling. The value of alf_cross_component_cb_min_eg_order_minus1 [k] shall be in the range of 0 to 9, inclusive.

alf_cross_component_cb_eg_order_increase_flag[k][i] equal to 1 specifies that the minimum order of the exp-Golomb code for the k-th cross-component Cb filter coefficient set signaling is incremented by 1. alf_cross_component_cb_eg_order_increase_flag[k][i] equal to 0 specifies that the minimum order of the exp-Golomb code for the k-th cross-component Cb filter coefficient set signaling is not incremented by 1.

The order expGoOrderCb[k][i] of the exp-Golomb code used to decode the values of alf_cross_component_cb_coeff_abs[k][j] is derived as follows:

expGoOrderCb[k][i]=
(i==0?alf_cross_component_cb_min_eg_order_minus1
[k]+1 expGoOrderCb[k][i−1])+alf_cross_component_cb_eg_order_increase_flag[k][i]

alf_cross_component_cb_coeff_abs[k][j] specifies the absolute value of the j-th coefficient of the signaled k-th cross-component Cb filter set. When alf_cross_component_cb_coeff_abs[k][j] is not present, it is inferred to be equal 0.

The order k of the exp-Golomb binarization uek(v) is derived as follows:

golombOrderIdxCb[ ]={0,2,2,2,1,2,2,2,2,2,2,1,2,1}
[Note, these may categorize coefficient into 3 categories, each category uses the same order *l* exp-Golomb code]

k=expGoOrderCb[golombOrderIdxCb[j]]

alf_cross_component_cb_coeff_sign[k][j] specifies the sign of the j-th coefficient of k-th cross-component Cb filter coefficient set as follows:
  If alf_cross_component_eb_coeff_sign[k][j] is equal to 0, the corresponding cross-component Cb filter coefficient has a positive value.
  Otherwise (alf_cross_component_cb_coeff_sign[k][j] is equal to 1), the corresponding cross-component Cb filter coefficient has a negative value.

When alf_cross_component_cb_coeff_sign[k][j] is not present, it is inferred to be equal to 0.

The cross-component Cb filter coefficients AlfCCCoeff$_{Cb}$[adaptation_parameter_set_id][k] with elements AlfCCCoeff$_{Cb}$[adaptation_parameter_set_id][k][j], with j=0 . . . 13 are derived as follows:

AlfCCCoeff$_{Cb}$[adaptation_parameter_set_id][k][j]=
alf_cross_component_eb_coeff_abs[k][j]*(1−
2*alf_cross_component_eb_coeff_sign[k][j])

It is a requirement of bitstream conformance that the values of AlfCCCoeff$_{Cb}$[adaptation_parameter_set_id][k][j] with j=0 . . . 13 shall be in the range of $-2^7$ to $2^7-1$, inclusive.

alf_cross_component_cr_filters_signaled_minus1 plus 1 specifies the number of cross-component Cr filter sets for which coefficients are signaled. The value of alf_cross_component_cr_filters_signaled_minus1 shall be in the range of 0 to NumCcAlfCrFilters−1, inclusive.

NumCcAlfCrFilters represents the maximum number of cross-component Cr filter set allowed in a video sequence. In one example, NumCcAlfCrFilters may be set to a predetermined non-negative integer value. In one example, NumCcAlfCrFilters is signaled in a parameter set for e.g. SPS, PPS.

alf_cross_component_cr_min_eg_order_minus1 [k] plus 1 specifies the minimum order of the exp-Golomb code for the k-th cross-component Cr filter coefficient set signaling. The value of alf_cross_component_cb_min_eg_order_minus1[k] shall be in the range of 0 to 9, inclusive.

alf_cross_component_cr_eg_order_increase_flag[k][i] equal to 1 specifies that the minimum order of the exp-Golomb code for the k-th cross-component Cr filter coefficient set signaling is incremented by 1. alf_cross_component_cr_eg_order_increase_flag[k][i] equal to 0 specifies that the minimum order of the exp-Golomb code for the k-th cross-component Cr filter coefficient set signaling is not incremented by 1.

The order expGoOrderCr[k][i] of the exp-Golomb code used to decode the values of alf_cross_component_cb_coeff_abs[k][j] is derived as follows:

expGoOrderCr[k][i]=
(i==0?alf_cross_component_cr_min_eg_order_minus1
[k]+1:expGoOrderCr[k][i−1])+alf_cross_component_er_eg_order_increase_flag[k][i]

alf_cross_component_cr_coeff_abs[k][j] specifies the absolute value of the j-th coefficient of the signaled k-th cross-component Cr filter set. When alf_cross_component_cr_coeff_abs[k][j] is not present, it is inferred to be equal 0.

The order k of the exp-Golomb binarization uek(v) is derived as follows:

golombOrderIdxCr[ ]={0,1,2,1,0,1,2,2,2,2,1,2,1}
[Note, these may categorize coefficient into 3 categories, each category uses the same order *k* exp-Golomb code]

k=expGoOrderCr[golombOrderIdxCr[j]]

alf_cross_component_cr_coeff_sign[k][i] specifies the sign of the j-th coefficient of k-th cross-component Cr filter coefficient set as follows:
  If alf_cross_component_cr_coeff_sign[k][j] is equal to 0, the corresponding cross-component Cr filter coefficient has a positive value.
  Otherwise (alf_cross_component_cr_coeff_sign[k][j] is equal to 1), the corresponding cross-component Cr filter coefficient has a negative value.

When alf_cross_component_cr_coeff_sign[k][j] is not present, it is inferred to be equal to 0.

The cross-component Cr filter coefficients AlfCCCoeff$_{Cr}$[adaptation_parameter_set_id][k] with elements AlfCCCoeff$_{Cr}$[adaptation_parameter_set_id][k][j], with j=0 . . . 13 are derived as follows:

AlfCCCoeff$_{Cr}$[adaptation_parameter_set_id][*k*][*j*]= alf_cross_component_cr_coeff_abs[*k*][*j*]*(1− 2*alf_cross_component_cr_coeff_sign[*k*][*j*])

It is a requirement of bitstream conformance that the values of AlfCCCoeff$_{Cr}$[adaptation_parameter_set_id][k][j] with j=0.13 shall be in the range of $-2^7$ to $2^7-1$, inclusive.

With respect to Table 5B, in one example, for syntax elements alf_cross_component_cb_coeff_abs[k][i] and alf_cross_component_cr_coeff_abs[k][i], k of uek(v) that represents k-th order exponential golomb coding, may correspond to a pre-determined value. As a result, "k" does not have to be signaled in the bitstream. In one example, in this case, the alf_data( ) syntax structure provided in Table 5C may be used.

The order k of the exp-Golomb binarization uek(v) is set equal to 3.

alf_cross_component_cr_coeff_abs[k][j] specifies the absolute value of the j-th coefficient of the signaled k-th cross-component Cr filter set. When alf_cross_component_cr_coeff_abs[k][j] is not present, it is inferred to be equal 0.

The order k of the exp-Golomb binarization uek(v) is set equal to 3.

It should be noted that in the examples above, a coefficient value is indicated using a syntax element indicating the sign (e.g., alf_cross_component_cr_coeff_sign) of a coefficient and a syntax element indicating an absolute value (e.g., alf_cross_component_cr_coeff_abs) of the coefficient. In one example, according to the techniques herein, the absolute value of a coefficient may be indicated using one or more flags indicating whether the absolute value of the coefficient is greater than a particular value (e.g., a greater than 1, a great than 2 flag, etc.) and a syntax element that indicates the absolute value of the coefficient based on the

TABLE 5C

| | Descriptor |
|---|---|
| alf_data( adaptation_parameter_set_id ) { | |
|    ... | |
|    if (sps_cross_component_alf_enabled_flag) { | |
|       alf_cross_component_cb_filter_signal_flag | u(1) |
|       alf_cross_component_cr_filter_signal_flag | u(1) |
|    } | |
|    if( alf_luma_filter_signal_flag ) { | |
|       ... | |
|    } | |
|    if( alf_chroma_filter_signal_flag ) { | |
|       ... | |
|    } | |
|    if( alf_cross_component_cb_filter_signal_flag ) { | |
|       alf_cross_component_cb_filters_signalled_minus1 | ue(v) |
|       for( k = 0; k < (alf_cross_component_cb_filters_signalled_minus1+1); k++ ) | |
|       { | |
|          for ( j = 0; j < 14; j++ ) { | |
|             alf_cross_component_cb_coeff_abs[ k ][ j ] | uek(v) |
|             if( alf_cross_component_cb_coeff_abs[ k ][ j ]) | |
|                alf_cross_component_cb_coeff_sign[ k ][ j ] | u(1) |
|          } | |
|       } | |
|    } | |
|    if( alf_cross_component_cr_filter_signal_flag ) { | |
|       alf_cross_component_cr_filters_signalled_minus1 | ue(v) |
|       for( k = 0; k < (alf_cross_component_cr_filters_signalled_minus1+1); k++) | |
|       { | |
|          for ( j = 0; j < 14; j++ ) { | |
|             alf_cross_component_cr_coeff_abs[ k ][ j ] | uek(v) |
|             if( alf_cross_component_cr_coeff_abs[ k ][ j ] ) | |
|                alf_cross_component_cr_coeff_sign[ k ][ j ] | u(1) |
|          } | |
|       } | |
|    } | |
| } | |

With respect to Table 5C, in one example, the semantics may be based on the semantics provided above with respect to Table 5B. For syntax elements for syntax elements alf_cross_component_cb_coeff_abs[k][i] and alf_cross_component_cr_coeff_abs[k][i], in one example, the semantics may be based on the following:

alf_cross_component_cb_coeff_abs[k][j] specifies the absolute value of the j-th coefficient of the signaled k-th cross-component Cb filter set. When alf_cross_component_cb_coeff_abs[k][j] is not present, it is inferred to be equal 0.

value of the one or more flags. For example, in one example, the coding of a particular coefficient value may be based on the following semantics:

alf_cross_component_coeff_abs_greater_than_N_flag[k][j] specifies whether the absolute value of the j-th coefficient of the signaled k-th cross-component filter set is greater than N. In one example, a coefficient shall be in the range of $-2^7$ to $2^{7-1}$, inclusive and N may be 64.

alf_cross_component_coeff_abs[k][j] specifies the absolute value of the j-th coefficient of the signaled k-th cross-component filter set. When alf_cross_component_coeff_abs[k][j] is not present, it is inferred to be equal 0.

alf_cross_component_coeff_sign[k][i] specifies the sign of the j-th coefficient of k-th cross-component filter coefficient set as follows:
- If alf_cross_component_coeff_sign[k][j] is equal to 0, the corresponding cross-component filter coefficient has a positive value.
- Otherwise (alf_cross_component_coeff_sign[k][j] is equal to 1), the corresponding cross-component filter coefficient has a negative value.

When alf_cross_component_coeff_sign[k][j] is not present, it is inferred to be equal to 0.

The cross-component filter coefficients AlfCCCoeff [adaptation_parameter_set_id][k] with elements AlfCCCoeff [adaptation_parameter_set_id][k][j], are derived as follows:

$$\text{AlfCCCoeff}[\text{adaptation\_parameter\_set\_id}][k][j]=$$
$$(N*\text{alf\_cross\_component\_coeff\_abs\_greater\_than\_N\_flag}[k][j]+\text{alf\_cross\_component\_coeff\_abs}[k][j])*(1-2*\text{alf\_cross\_component\_coeff\_sign}[k][j])$$

In an example, a set of cross-component filter coefficients may be signaled for a cross-component color (Cb and/or Cr) filter. Each set of cross-component filter coefficients may be assigned a cross-component filter index. In an example, the set of cross-component filter coefficients may be signaled in an APS. In an example, sample values may be partitioned (e.g. determined using techniques similar to partitioning used by control flag signaling or any suitable alternative). A filter index may be signaled for each partition of sample values, where the filter index identifies the cross-component filter to be applied to the samples in the partition. The partitioning may be communicated by use of a parameter such as block size (which may be same as the control block size parameter, or may be independent). The partition region may be derived using the parameter value, picture/slice/tile group/MCTS dimensions. In an example, the set of only one cross-component filter coefficients may be signaled in an APS for each color component. An APS identifier may be signaled for each partition of sample values that identifies the cross-component filter to be applied to the samples in the partition.

In an example the buffers for a subset or all of temporal layers may be reset e.g., for a set of NALU types (e.g., corresponding to a random access point such as an IRAP), for set of slice type (say I-slice). In an example, a reset may imply an emptying operation.

In an example, reset may imply setting buffer to a pre-determined set of value (e.g. 0, fixed set of values for each TemporalID). The buffer reset operation may imply values stored in the buffer preceding an access unit (satisfying a pre-determined set of conditions e.g. NALU type indicates IRAP, slice type equal to I slice) may not be available for that access unit and subsequently coded access units. In an example, when the buffers do not contain any coefficients then the syntax elements indicating whether filter coefficients from the buffer are to be used may not be signaled and its value inferred. In an example, when the buffers do not contain any coefficients, then the syntax elements indicating whether filter coefficients from the buffer are to be used may be signaled restricted to a pre-determined value.

Further, in one example, filters that are signaled for leading pictures should not be used by trailing pictures of the associated IRAP picture. This is because during random access operation of the bitstream leading pictures may be discarded from the bitstream. As described above, according to the techniques herein, cross component filters may be signaled using: reuse of filter(s) in corresponding temporal sublayer buffer and/or filters in APS(s). It should be noted that in some cases, an APS may be signaled out of band, so in some cases, all that may be required for bitstream conformance is that an APS which is referenced should be available.

As described above, with respect to FIGS. 9A-9F, filter shapes may be determined based on chroma location type. It should be noted that, filters shapes may include filter shapes for various type of filters. Further, filter shapes can generally be described as representing support and an origin relative to a sample being filtered. In one example, a filter shape may be signaled for each cross-component filter in parameter set: e.g. SPS, PPS, VUI. In one example, the filter shape may also be signaled in APS or slice header for e.g., when the filter shape affects the number of filter coefficients that are coded. In one example, the filter shape may be used to determine number of filter coefficients. In one example, filter coefficients may be reused. That is, in one example, a First In First Out (FIFO) buffer may be maintained for each component Cb/Cr, for each temporal layer. In one example, the size of the FIFO buffer is 1 for each component, each temporal layer. In such an example, a flag may be signaled to indicate if the filter coefficients in the corresponding (temporal layer) FIFO buffer is to be used or a new set of coefficients is to be received. When new set of filter coefficients are received they replace the contents of the corresponding (temporal layer) FIFO buffer. In one example, the size of the FIFO buffer is 1 for each component, each temporal layer. In such an example, filter coefficients in FIFO buffers that belong to same temporal layer or lower temporal layers may be reused. A syntax element (e.g. flag) is received to indicate if the filter coefficient in one of the FIFO buffers is reused, and if it is reused (e.g. the flag value is 1), then an index to the FIFO buffer whose coefficients are to be reused is received. The range of valid values for the index is determined based on the current temporal layer ID (e.g. 0 to Current Temporal Layer ID). A ue(v) coding may be used to signal a value such as −(Temporal Layer of FIFO buffer−Current Temporal Layer). In another example, truncated unary (with maximum value of TU based on Current Temporal Layer ID) may be used.

In one example signaling of local control of a cross component filter may include sending all the cross-component Cb and Cr block-level control flags for the slice in the first CTU of slice. In one example, when a control block size is larger than the CTU size then the control flags may be sent in the first coded CTU of the control block. The remaining CTUs in the control block may infer the same value as in the first coded CTU of the control block. When the first coded CTU in control block does receive a control flag, then the value of the control flag may be inferred to be 0. In one example, a control flag is sent for each CTU. In one example, control flags may be signaled in the first CTU of a slice/tile group. Further, in one example, four control flags may be signaled for each CTU of a tile group/slice. In one example, when four control blocks exist within the CTU, there may be a different number of control block flags for partial CTUs (e.g. at boundaries) compared to complete CTUs. In one example, one control flag may be signaled for each CTU of a tile group/slice. In one example, a control flag may be signaled for a first CTU of a group of CTUs, and for the remaining CTUs in the group the same value of the flag may be inferred.

In one example, cross-component filter coefficients for cross-component filters is carried its own independent parameter set e.g., APS. In one example cross-component filter coefficients is carried in a parameter set e.g. APS, that is different from the non-cross-component filters (e.g. ALF in JVET-N1001-v8). In one example, instead of the 5×6 filter, an embodiment may use the 7×7 ALF filtering process described in JVET-N1001-v8 clause on "Coding tree block filtering process for luma samples." This would further reduce the number of coefficients that need to be signaled. In the above description, a filtering operation is applied to refine the samples in a color component and/or channel and signaling that could enable/disable the operation on a frame-by-frame and location-by-location basis is provided. In one example, the filtering operation may also be implemented so that at each frame and/or location, multiple filtering operations are available and, the described signaling may be used to transmit the multiple filters and select among the available filters. In one example, an embodiment may use a 3×4 diamond shaped filter. It should be noted that in other examples other filters sizes and shapes may be used (e.g., 3×3, 4×3, 4×4, etc.). In one example, when a 3×4 diamond shaped filter is used, eight unique coefficients may be used. It should be noted that, in other examples, for each filter size and shape described herein, the number of unique coefficients that are used and/or signaled may vary in order to optimize signaling overhead. In one example, when a 3×4 diamond shaped filter is used, up to four unique filters per component may be specified (e.g., on a sequence, picture, tile, or slice level) and when filtering is applied one of the four may be selected. In one example, according to the techniques herein, local region control flags may be shared between different chroma channels.

As described above, the application of cross component filtering may be based on the properties of samples included in a filter support region (e.g., variance and/or deviation). In one example, a shared control flag, and the properties of samples included in a filter support region may be used to determine if cross component filtering is applied for one or both of the chroma channels. For example, in one example, for Cb, the value of a shared control flag may determine whether cross component filtering is applied and for Cr, the value of a shared control flag and additionally, the variance of the support, may determine whether cross component filtering is applied. As described above, in one example, when one or more support samples are unavailable, e.g., due to a VB, cross-component filtering may be disabled. Thus, a property of samples included in a filter support region for determining whether cross-component filtering is applied may include availability. In one example, according to the techniques herein, whether cross-component filtering is applied may be based on whether a threshold number of support samples are available (e.g., whether 50% or more support samples are available). Similarly, when one or more support samples are unavailable whether cross-component filtering is applied may be based on whether a defined padding process can generate a value for each of the unavailable support sample. That is, in the case where a defined padding process does not provide a mechanism for generating a value for an unavailable sample, cross-component filtering may be disabled. Further, cross-component filtering may be disabled if the position of a filter support region, according to a specified support sample (e.g., the center sample of a diamond shaped support) is within a specified range of a VB. For example, in one example, if the center sample of a diamond shaped filter support region is below and within 2 samples of a horizontal VB, cross component filtering may be disabled.

As described above, in JVET-N1001 and JVET-O2001, CTUs are partitioned according a quadtree plus multi-type tree (QTMT or QT+MTT) structure. In JVETN-1001 and JVET-O2001, for I slices, each CTU may be split into coding units with 64×64 luma samples using an implicit quadtree split and that these coding units may be the root of two separate coding tree syntax structures, i.e., one for the luma channel and one for the chroma channel. In either case, local region control flag values may be signaled/determined within the syntax of partitioning tree signaling. That is, for example, the syntax and semantics used to partition chroma channels into CUs (i.e., a chroma coding tree) may include signaling (implicit and/or explicit) which indicates local region control flag values. For example, JVET-N1001 and JVET-O2001, define a variable cbSubdiv=2*cqtDepth, cqtDepth is the current coding quadtree depth and the depth at the CTU is 0. In one example, according to the techniques herein, a smallest tree node with cbSubdiv lower than or equal to the given threshold may represent parent node control flag signaling group, where all blocks resulting from further splits belong to the same control flag signaling group. That is, a local region control flag at a parent CU may be used to infer the value of a local region control flags at any resulting children CUs. Table 6 and Table 7 illustrate an example of syntax and variable assignment for determining local region control flag values. That is, in Table 6, a smallest tree node with cbSubdiv lower than or equal to the given threshold may represent parent node control flag signaling group. Table 7 provides the corresponding coding unit syntax.

TABLE 6

```
//At Chroma Coding Tree
    if( CC ALF enabled for slice && cbSubdiv <= CC ALF
control signaling depth for slice ) {
        Cu CC Alf Control Flag Val is set to 0
        IsCuCcAlfControlFlagCoded = 0
        CuCcAlfTopLeftX = x0
        CuCcAlfTopLeftY = y0
    }
```

TABLE 7

| | Descriptor |
|---|---|
| coding_unit( x0, y0, cbWidth, cbHeight, treeType ) { <br> ... <br> if(CC ALF enabled for slice && !IsCuCcAlfControlFlagCoded ) { <br>     cross_component_chroma_alf_control_flag (shared or independent) <br> } <br> ... | <br><br><br>ae(v) |

In the example illustrated in Table 6, CC ALF control signaling depth for slice represents the threshold. In one example, this threshold may be signaled for a slice, sequence, or picture. The luma location (xCtrlBlk, yCtrlBlk), specifies the top-left luma sample of the current chroma control block relative to the top left luma sample of the current picture. The horizontal and vertical positions xCtrlBlk and yCtrlBlk are set equal to CuCcAlfTopLeftX and CuCcAlfTopLeftY, respectively. Further, the current chroma control block is a rectangular region inside a coding tree block that shares the same CC Alf Control Flag Value (shared or independent for chroma components). Its width and height are equal to the width and height of the coding tree node of which the top-left luma sample position is assigned to the variables CuCcAlfTopLeftX and CuAlfCcTopLeftY. It should be noted that in one example, there may be an independent set of variables for each chroma component.

With respect to Table 7, in one example, when cross_component_chroma_alf_control_flag (shared or independent) is not present, it is inferred to be equal to 0 and when cross_component_chroma_alf_control_flag (shared or independent) is present, the variables IsCuCcAlfControlFlagCoded is set to 1. Further, Cu CC Alf Control Flag Val is set to cross_component_chroma_alf_control_flag. As such, in this example, as long as the condition to start a new control flag signaling group is true (that is, CC ALF is enabled for the slice and cuSubdiv is not higher than the limit), an internal flag "IsCuCcAlfControlFlagCoded" is set to 0 and the current tree node origin is saved as control flag signaling group origin in CuCcAlfTopLeftX, CuCcAlfTopLeftY variables. Later, in coding unit syntax, if "IsCuCcAlfControlFlagCoded" is zero, the control signaling group flag is coded and the "IsCuCcAlfControlFlagCoded" flag is set to 1, preventing other control block flags from being coded until a new control flag signaling group is found. Coding units may inherit their control flag value from the last coded tree node origin until a new control flag signaling group is found. In an example, when the local control region syntax element is present in a coding unit then IsCuCcAlfControlFlagCoded is set equal to 1. It should be noted that JVET-N1001 and JVET-02001 provide quantization parameter groups which indicate the lowest depth at which a QP value is signaled. In one example, CC ALF control signaling may be aligned quantization parameter groups. That is, children nodes within a quantization parameter group share a QP value and a CC ALF control value. Further, in one case, the value of a CC ALF control value may be based on or derived entirely from a QP value (e.g., if a QP value less than a threshold, CC ALF control flag is not signaled for group and inferred to be 0).

As described above, signaling of cross component filtering may include signaling of a particular filter (e.g., a filter shape and/or filter coefficients). In one example, according to the techniques herein, the value of a syntax element may indicate whether cross component filtering is applied for a region and when cross component filtering is applied for a region, a particular filter for the region. For example, a value of 0 may indicate cross component filtering is not applied for a region, a value of 1 may indicate a filter having a first filter coefficient set is applied, a value of 2 may indicate a filter having a second filter coefficient set is applied, etc. In one example, the region may be a CTU. Table 8 illustrates an example of syntax included in a coding_tree_unit( ) syntax structure according to the techniques herein. That is, in the example illustrated in Table 8, syntax elements alf_cross_component_cb_idc and alf_cross_component_cr_idc indicate whether cross component filtering is applied and when cross component filtering is applied indicate a filter.

TABLE 8

| | Descriptor |
|---|---|
| coding_tree_unit( ) { | |
|   xCtb = ( CtbAddrInRs % PicWidthInCtbsY ) << CtbLog2SizeY | |
|   yCtb = ( CtbAddrInRs / PicWidthInCtbsY ) << CtbLog2SizeY | |
|   xCtbC = xCtb / SubWidthC | |
|   yCtbC = yCtb / SubHeightC | |
|   ... | |
|   if(slice_cross_component_alf_cb_enabled_flag ){ | |
|     xStartC = ( xCtbC >> AlfCCSamplesCbLog2W ) << AlfCCSamplesCbLog2W | |
|     yStartC = ( yCtbC >> AlfCCSamplesCbLog2H ) << AlfCCSamplesCbLog2H | |
|     if (xCtbC == xStartC && yCtbC == yStartC) { // at least one indicator is to be coded in CTU and when local control regions do not span across CTUs then this check may be omitted | |
|       xEndC = xStartC + (1 << CtbLog2SizeY ) / SubWidthC | |
|       xEndC = ( xEndC >= PicWidthInChromaSamples ) ? PicWidthInChromaSamples : xEndC // do not exceed picture width | |
|       yEndC = yStartC + (1 << CtbLog2SizeY ) / SubHeightC | |
|       yEndC = ( yEndC >= PicHeightInChromaSamples ) ? PicHeightInChromaSamples : yEndC // do not exceed picture height | |
|       for ( yC = yStartC; yC < yEndC; yC += AlfCCSamplesCbLog2H) { | |
|         for ( xC = xStartC; xC < xEndC; xC += AlfCCSamplesCbLog2W ) { | |
|           alf_cross_component_cb_idc[ xC >> AlfCCSamplesCbLog2W ][ yC >> AlfCCSamplesCbLog2H ] | ae(v) |
|         } | |
|       } | |
|     } else if ( UnavailableCb(xStartC, yStartC) ){ // example out of slice, out of tile | |
|       alf_cross_component_cb_idc[ xC >> AlfCCSamplesCbLog2W ][ yC >> AlfCCSamplesCbLog2H ] | ae(v) |
|     } // When local control regions do not span across CTUs and slice/tiles/bricks boundaries are aligned with CTU boundaries then this "else if" branch may be omitted | |
|   } | |
|   if(slice_cross_component_alf_cr_enabled_flag ){ | |
|     xStartC = ( xCtbC >> AlfCCSamplesCrLog2W ) << AlfCCSamplesCrLog2W | |
|     yStartC = ( yCtbC >> AlfCCSamplesCrLog2H ) << AlfCCSamplesCrLog2H | |
|     if (xCtbC == xStartC && yCtbC == yStartC) { // at least one indicator is to be coded in CTU and When local control regions do not span across CTUs then this check may be omitted | |
|       xEndC = xStartC + (1 << CtbLog2SizeY) / SubWidthC | |
|       xEndC = ( xEndC >= PicWidthInChromaSamples ) ? PicWidthIn ChromaSamples : xEndC // do not exceed picture width | |
|       yEndC = yStartC + (1 << CtbLog2SizeY ) / SubHeightC | |
|       yEndC = ( yEndC >= PicHeightInChromaSamples ) ? PicHeightInChromaSamples : yEndC // do not exceed picture height | |
|       for ( yC = yStartC; yC < yEndC; yC += AlfCCSamplesCrLog2H) { | |
|         for ( xC = xStartC; xC < xEndC; xC += AlfCCSamplesCrLog2W ) { | |
|           alf_cross_component_cr_idc[ xC >> AlfCCSamplesCrLog2W ][ yC >> AlfCCSamplesCrLog2H ] | ae(v) |
|         } | |
|       } | |
|     } else if ( UnavailableCr(xStartC, yStartC) ){ // example out of slice, out of tile | |

TABLE 8-continued

| | Descriptor |
|---|---|
|     alf_cross_component_cr_idc[ xC >> AlfCCSamplesCrLog2W ][ yC >> AlfCCSamplesCrLog2H ]<br>   } // When local control regions do not span across CTUs and slice/tiles/bricks<br>boundaries are aligned with CTU boundaries then this "else if" branch may be omitted<br>  }<br>...<br>  if( slice_type = = I && qtbtt_dual_tree_intra_flag )<br>    dual_tree_implicit_qt_split ( xCtb, yCtb, CtbSizeY, 0 )<br>  else<br>    coding_tree( xCtb, yCtb, CtbSizeY, CtbSizeY, 1, 1, 0, 0, 0, 0, 0,<br>        SINGLE_TREE, MODE_TYPE_ALL )<br>} | ae(v) |

With respect to Table 8, in one example, the semantics may be based on the following:

PicWidthInChromaSamples=pic_width_in_luma_samples/ SubWidthC

PicHeightInChromaSamples=pic_height_in_luma_samples/ SubHeightC

AlfCCSamplesCbLog2W=AlfCCSamplesCbLog2H=slice_cross_ component_alf_cb_log2_control_size_minus4+4

AlfCCSamplesCrLog2W=AlfCCSamplesCrLog2H=slice_cross_ component_alf_cr_log2_control_size_minus4+4

Further, it should be noted:
In an example, xStartC corresponds to top edge of CTU.
In an example, yStartC corresponds to left edge of CTU.
When local control regions do not span across CTUs, the check (xCtbC=xStartC && yCtbC==yStartC) may be omitted.
In one example, (xEndC>=PicWidthInChromaSamples) and (yEndC>=PicHeightInChromaSamples) the upper bounds provided by PicWidthInChromaSamples and PicHeightInChromaSample may instead respectively correspond to right and bottom slice/tile/brick/CTU boundary.
    alf_cross_component_cb_idc
[xC>>AlfCCSamplesCbLog2W]
[yC>>AlfCCSamplesCbLog2H] equal to 0 indicates that the cross-component Cb filter is not applied to block of Cb chroma samples with left top chroma position (xC, yC).
alf_cross_component_cb_idc
[xC>>AlfCCSamplesCbLog2W]
[yC>>AlfCCSamplesCbLog2H] equal to m, where m is greater than 0 indicates that the k=(m−1) th cross-component Cb filter set is applied to the block of Cb chroma samples with left top chroma position (xC, yC)
    alf_cross_component_cr_idc
[xC>>AlfCCSamplesCrLog2W]
[yC>>AlfCCSamplesCrLog2H] equal to 0 indicates that the cross-component Cr filter is not applied to block of Cr chroma samples with left top chroma position (xC, yC).
alf_cross_component_cr_idc
[xC>>AlfCCSamplesCrLog2W]
[yC>>AlfCCSamplesCrLog2H] equal to m, where m is greater than 0 indicates that the k=(m−1) th cross-component Cr filter set is applied to the block of Cr chroma samples with left top chroma position (xC, yC)
    Function UnavailableCb(xC,yC) returns TRUE when alf_cross_component_cb_idc
[xC>>AlfCCSamplesCbLog2W]
[yC>>AlfCCSamplesCbLog2H] corresponding to chroma sample location (xC,yC) is not available e.g. when (xC,yC) is in a different slice/tile compared to current CTU, Otherwise it returns FALSE
    Function UnavailableCr(xC,yC) returns TRUE when alf_cross_component_cr_idc
[xC>>AlfCCSamplesCrLog2W]
[yC>>AlfCCSamplesCrLog2H] corresponding to chroma sample location (xC,yC) is not available e.g. when (xC,yC) is in a different slice/tile compared to current CTU, Otherwise it returns FALSE.

In one example, according to the techniques herein the binarization of alf_cross_component_cb_idc and/or alf_cross_component_cr_idc may be a Truncated Rice, TR, binarization with a maximum value, cMax, depending on number of filter coefficient sets signaled, and cRiceParam is equal to 0. Table 9 illustrates an example of a Truncated Rice binarization for alf_cross_component_cb_idc and/or alf_cross_component_cr_idc.

TABLE 9

| Indication Value | TR Binarization (cRiceParam is equal to 0) |
|---|---|
| 0 | 0 |
| 1 | 10 |
| 2 | 110 |
| 3 | 1110 |
| ... | ... |
| cMax − 1 | 1 ... 10 contains (cMax − 1) 1's |
| cMax | 1 ... 11 contains cMax 1's |

Where,
For CC ALF Cb cMax is set to corresponding (alf_cross_component_cb_filters_signaled_minus1 plus 1)
For CC ALF Cr cMax is set to corresponding (alf_cross_component_cr_filters_signaled_minus1 plus 1)
In one example, for alf_cross_component_cb_idc and/or alf_cross_component_cr_idc only the first bin may be context coded (i.e., the other bins may be bypass coded). In one example, the derivation of the context for the first bin may be as follows:
Input to this process is the luma location (x0, y0) specifying the top-left luma sample of the current luma block relative to the top-left sample of the current picture, the colour component cIdx, the current coding quadtree depth cqtDepth, the dual tree channel type chType, the width and the height of the current coding block in luma samples cbWidth and cbHeight, and the variables allowSplitBtVer, allowSplitBtHor, allowSplitTtVer, allowSplitTtHor, and allowSplitQt as derived in the coding tree semantics.
Output of this process is ctxInc.
The location (xNbL, yNbL) is set equal to (x0−1, y0) and the derivation process for neighbouring block availability as specified is invoked with the location (xCurr, yCurr) set equal to (x0, y0), the neighbouring location (xNbY, yNbY) set equal to (xNbL, yNbL), checkPredModeY set equal to FALSE, and cIdx as inputs, and the output is assigned to availableL.
The location (xNbA, yNbA) is set equal to (x0, y0−1) and the derivation process for neighbouring block availability as specified is invoked with the location (xCurr, yCurr) set equal to (x0, y0), the neighbouring location (xNbY, yNbY) set equal to (xNbA, yNbA), checkPredModeY set equal to FALSE, and cIdx as inputs, and the output is assigned to availableA.

The assignment of ctxInc is specified as follows with condL and condA specified in Table 10:

For the syntax elements alf_cross_component_cb_idc[x0][y0] and alf_cross_component_cr_idc[$x_0$][y0]:

ctxInc=(condL && availableL)+(condA && availableA)+ctxSetIdx*3

TABLE 10

| Syntax element | condL | condA | ctxSetIdx |
|---|---|---|---|
| alf_cross_component_cb_idc [ x0 ][ y0 ] | alf_cross_component_cb_idc [ xNbL ][ yNbL ] == 0 | alf_cross_component_cb_idc [ xNbA ][ yNbA ] == 0 | 0 |
| alf_cross_component_cr_idc [ x0 ][ y0 ] | alf_cross_component_cr_idc [ xNbL ][ yNbL ] == 0 | alf_cross_component_cr_idc [ xNbA ][ yNbA ] == 0 | 0 |

With respect to Table 10, in one example, each of the "==0" tests may be replaced with "!=0."

In one example, for alf_cross_component_cb_idc and/or alf_cross_component_cr_idc all bins may be context coded and each bin may use a separate context set as indicated in Table 11.

TABLE 11

| | binIdx | | | | | |
|---|---|---|---|---|---|---|
| Syntax element | 0 | 1 | 2 | 3 | 4 | >=5 |
| alf_cross_component_cb_idc[ ][ ] | 0...2 | 3...5 | 6...8 | 9...12 | 13...15 | 3*binIdx...(4*binIdx−1) |
| alf_cross_component_cr_idc[ ][ ] | 0...2 | 3...5 | 6...8 | 9...12 | 13...15 | 3*binIdx...(4*binIdx−1) |

With respect to Table 11, in one example, the derivation of a context may be as follows:

Input to this process is the luma location (x0, y0) specifying the top-left luma sample of the current luma block relative to the top-left sample of the current picture, the colour component cIdx, the current coding quadtree depth cqtDepth, the dual tree channel type chType, the width and the height of the current coding block in luma samples cbWidth and cbHeight, and the variables allowSplitBtVer, allowSplitBtHor, allowSplitTtVer, allowSplitTtHor, and allowSplitQt as derived in the coding tree semantics.

Output of this process is ctxInc.

The location (xNbL, yNbL) is set equal to (x0−1, y0) and the derivation process for neighbouring block availability as specified is invoked with the location (xCurr, yCurr) set equal to (x0, y0), the neighbouring location (xNbY, yNbY) set equal to (xNbL, yNbL), checkPredModeY set equal to FALSE, and cIdx as inputs, and the output is assigned to availableL.

The location (xNbA, yNbA) is set equal to (x0, y0−1) and the derivation process for neighbouring block availability as specified is invoked with the location (xCurr, yCurr) set equal to (x0, y0), the neighbouring location (xNbY, yNbY) set equal to (xNbA, yNbA), checkPredModeY set equal to FALSE, and cIdx as inputs, and the output is assigned to availableA.

The assignment of ctxInc is specified as follows with condL and condA specified in Table 12:

For the syntax elements alf_cross_component_cb_idc[x0][y0] and alf_cross_component_cr_idc[x0][y0]:

ctxInc=(condL && availableL)+(condA && availableA)+ctxSetIdx*3

TABLE 12

| Syntax element | condL | condA | ctxSetIdx |
|---|---|---|---|
| alf_cross_component_cb_idc [ x0 ][ y0 ] bin index binIdx | (alf_cross_component_cb_idc [ xNbL ][ yNbL ] & (1 << binIdx) ) == 0 | (alf_cross_component_cb_idc [ xNbA ][ yNbA ] & (1 << binIdx) ) == 0 | binIdx |
| alf_cross_component_cr_idc [ x0 ][ y0 ] bin index binIdx | (alf_cross_component_cr_idc [ xNbL ][ yNbL ] == & (1 << binIdx) ) == 0 | (alf_cross_component_cr_idc [ xNbA ][ yNbA ] & (1 << binIdx) ) == 0 | binIdx |

In one example, for alf_cross_component_cb_idc and/or alf_cross_component_cr_idc all bins may be context coded and all bins use same context, i.e., the same context for each binIdx. In some cases a subset of binIdx is not applicable e.g. NumCcAlfCbFilters is 3, binIdx>3 is not applicable for alf_cross_component_cb_idc[ ][ ], NumCcAlfCrFilters is 3, binIdx>3 is not applicable for alf_cross_component_cr_idc[ ][ ].

In one example, for alf_cross_component_cb_idc and/or alf_cross_component_cr_idc all bins may be context coded and each bin may use the same context set as indicated in Table 13. With respect to Table 13, it should be noted that in some cases a subset of binIdx is not applicable e.g., NumCcAlfCbFilters is 3, binIdx>3 is not applicable for alf_cross_component_cb_idc[ ][ ], NumCcAlfCrFilters is 3, binIdx>3 is not applicable for alf_cross_component_cr_idc[ ][ ].

TABLE 13

| Syntax element | binIdx | | | | | |
|---|---|---|---|---|---|---|
| | 0 | 1 | 2 | 3 | 4 | >=5 |
| alf_cross_component_cb_idc[ ][ ] | 0...2 | 0...2 | 0...2 | 0...2 | 0...2 | 0...2 |
| alf_cross_component_cr_idc[ ][ ] | 0...2 | 0...2 | 0...2 | 0...2 | 0...2 | 0...2 |

With respect to Table 13, in one example, the derivation of a context may be as follows:

Input to this process is the luma location (x0, y0) specifying the top-left luma sample of the current luma block relative to the top-left sample of the current picture, the colour component cIdx, the current coding quadtree depth cqtDepth, the dual tree channel type chType, the width and the height of the current coding block in luma samples cbWidth and cbHeight, and the variables allowSplitBtVer, allowSplitBtHor, allowSplitTtVer, allowSplitTtHor, and allowSplitQt as derived in the coding tree semantics.

Output of this process is ctxInc.

The location (xNbL, yNbL) is set equal to (x0−1, y0) and the derivation process for neighbouring block availability as specified is invoked with the location (xCurr, yCurr) set equal to (x0, y0), the neighbouring location (xNbY, yNbY) set equal to (xNbL, yNbL), checkPredModeY set equal to FALSE, and cIdx as inputs, and the output is assigned to availableL.

The location (xNbA, yNbA) is set equal to (x0, y0−1) and the derivation process for neighbouring block availability as specified is invoked with the location (xCurr, yCurr) set equal to (x0, y0), the neighbouring location (xNbY, yNbY) set equal to (xNbA, yNbA), checkPredModeY set equal to FALSE, and cIdx as inputs, and the output is assigned to availableA.

The assignment of ctxInc is specified as follows with condL and condA specified in Table 14:

For the syntax elements alf_cross_component_cb_idc[x0][y0] and alf_cross_component_cr_idc[x0][y0]:

ctxInc=(condL && availableL)+(condA && availableA)+ctxSetIdx*3

TABLE 14

| Syntax element | condL | condA | ctxSetIdx |
|---|---|---|---|
| alf_cross_component_cb_idc [ x0 ][ y0 ] bin index binIdx | (alf_cross_component_cb_idc [ xNbL ][ yNbL ] & (1 << binIdx) ) == 0 | (alf_cross_component_cb_idc [ xNbA ][ yNbA ] & (1 << binIdx) ) == 0 | 0 |
| alf_cross_component_cr_idc [ x0 ][ y0 ] bin index binIdx | (alf_cross_component_cr_idc [ xNbL ][ yNbL ] == & (1 << binIdx) ) == 0 | (alf_cross_component_cr_idc [ xNbA ][ yNbA ] & (1 << binIdx) ) == 0 | 0 |

As provided above, with respect to the example corresponding to Table 8 and Table 9, the syntax elements alf_cross_component_cb_idc[ ][ ] and alf_cross_component_cr_idc[ ][ ] are signaled in coding_tree_unit( ) and the binarization of alf_cross_component_cb_idc[ ][ ] and alf_cross_component_cr_idc[ ][ ] depends on the respective values of syntax elements alf_cross_component_cb_filters_signaled_minus1 and alf_cross_component_cr_filters_signaled_minus1. If alf_cross_component_cb_filters_signaled_minus1 and alf_cross_component_cr_filters_signaled_minus1 are included in an APS, loss of the APS containing corresponding alf_cross_component_cb_filters_signaled_minus1 and alf_cross_component_cr_filters_signaled_minus1 would mean syntax elements alf_cross_component_cb_idc[ ][ ] and alf_cross_component_cr_idc[ ][ ] cannot be parsed. In one example, in order to mitigate/prevent potential unparsable syntax element, syntax elements specifying the number of cross-component Cb/Cr filter sets for which coefficients and/or which provide the binarizations for alf_cross_component_cb_idc[ ][ ] and alf_cross_component_cr_idc[ ][ ] may be signaled in another syntax structure. For example, in one example, syntax elements slice_alf_cross_component_cb_filters_signaled_minus1 and slice_alf_cross_component_cr_filters_signaled_minus1 based on the following semantics may be signaled in the slice header and their value may be used for the binarization of alf_cross_component_cb_idc[ ][ ] and alf_cross_component_cr_idc[ ][ ]. That is, in a TR binarization, for alf_cross_component_cb_idc[ ][ ], cMax is equal to slice_alf_cross_component_cb_filters_signaled_minus1+1 and for alf_cross_component_cr_idc[ ][ ], cMax is equal to slice_alf_cross_component_cr_filters_signaled_minus1+l.

It should be noted that in one example, slice_alf_cross_component_cb_filters_signaled_minus1 may be included in a slice header syntax structure immediately following slice_cross_component_alf_cb_log2_control_size_minus4, and slice_alf_cross_component_cr_filters_signaled_minus1 may be included in a slice header syntax structure immediately following slice_cross_component_alf_cr_log2_control_size_minus4.

slice_cross_component_alf_cb_signaled_minus1 plus 1 specifies the maximum value for syntax element alf_cross_component_cb_idc[ ][ ].

slice_cross_component_alf_cr_signaled_minus1 plus 1 specifies the maximum value for syntax element alf_cross_component_cr_idc[ ][ ].

It should be noted that although signaling the number of filters in the slice header removes a parsing dependency, it may be beneficial to place limitation on the number of filter syntax element that are included in the slice header. In one example, it may be a requirement that the number of filters syntax element in the slice header is the same as the number of filters signaled in the APS. Further, in one example, there may be no requirement that the number of filters syntax element in the slice header is the same as the number of filters in the APS.

When there is no requirement that the number of filters syntax element in the slice header is the same as the number of filters in the APS there is (1) a case where the number of filters signaled in the slice header is less than or equal to the number of filters signaled in the APS and (2) a case where the number of filters signaled in the slice header is greater than the number of filters signaled in the APS. When the number of filters signaled in the slice header is greater than the number of filters signaled in the APS, filters must be defined for filter indices that exceed the number of filters in the APS. For example, if there are two filtered signaled in the APS, but the signaling in the slice headers indicates that four filters are available, a video decoder must have a defined action if it receives filter indices 3 or 4. In one example, the decoder may disable CC-ALF processing in regions with a filter indices 3 or 4 (which may include using a filter with all zero tap values). In another example, a video decoder may use a filter already present in the APS. For example, the filter with index 2 could be used, if filter index 3 or 4 is received. In another example, the filter with index 1 could be used if filter index 3 is received, and the filter with index 2 could be used if filter index 4 is received. In another example, fixed filters known at the encoder and decoder could be used when filter index 3 and filter index 4 are received. In the case, where the number of filters signaled in the slice header is less than or equal to the number of filters signaled in the APS, no additional video decoder actions must be defined.

However, it is asserted that allowing this condition can have a coding efficiency benefit. For example, a first slice could reference a first APS and use all M filters from the APS and a second slice could also reference the first APS but only use the first N filters in the APS. This improves coding efficiency, as (i) it is not necessary to send a second APS for the second slice and (ii) the bits required to signal the filter indices is smaller in the second slice due to the smaller number of filters.

In one example, according to the techniques herein, an implementation of cross component filtering may be based on the following syntax and semantics. With respect to the following syntax and semantics, in Table 15, syntax elements alf_cross_component_cb_filter_signal_flag, alf_cross_component_cr_filter_signal_flag, alf_cross_component_cb_coeff_abs, alf_cross_component_cb_coeff_sign, alf_cross_component_cr_coeff_abs, and alf_cross_component_cr_coeff_sign, are added to the alf_data( ) syntax structure provided in JVET-O2001. It should be noted that the alf_data( ) syntax structure provided in JVET-O2001 is provided in the adaptation parameter set syntax structure. In Table 16, syntax elements slice_cross_component_alf_cb_enabled_flag, slice_cross_component_alf_cb_reuse_temporal_layer_filter_flag, slice_cross_component_alf_cb_aps_id, slice_cross_component_alf_cb_log2_control_size_minus4, slice_cross_component_alf_cr_enabled_flag, slice_cross_component_alf_cr_reuse_temporal_layer_filter_flag, slice_cross_component_alf_cr_aps_id, and slice_cross_component_alf_cb_log2_control_size_minus4 are added to the slice_header( ) syntax structure provided in JVET-O2001. In Table 17, syntax elements alf_cross_component_cb_flag and alf_cross_component_cr_flag are added to the coding_tree_unit( ) syntax structure provided in JVET-O2001.

TABLE 15

| | Descriptor |
|---|---|
| alf_data( ) { | |
|   alf_luma_filter_signal_flag | u(1) |
|   alf_chroma_filter_signal_flag | u(1) |
|   alf_cross_component_cb_filter_signal_flag | u(1) |
|   alf_cross_component_cr_filter_signal_flag | u(1) |
|   if( alf_luma_filter_signal_flag ) { | |
|     alf_luma_clip_flag | u(1) |
|     alf_luma_num_filters_signalled_minus1 | ue(v) |
|     if( alf_luma_num_filters_signalled_minus1 > 0 ) { | |
|       for( filtIdx = 0; filtIdx < NumAlfFilters; filtIdx++ ) | |
|         alf_luma_coeff_delta_idx[ filtIdx ] | u(v) |
|     } | |
|     alf_luma_coeff_signalled_flag | u(1) |
|     if( alf_luma_coeff_signalled_flag ) { | |
|       for( sfIdx = 0; sfIdx <= alf_luma_num_filters_signalled_minus1; sfIdx++ ) | |
|         alf_luma_coeff_flag[ sfIdx ] | u(1) |
|     } | |
|     for( sfIdx = 0; sfIdx <= alf_luma_num_filters_signalled_minus1; sfIdx++ ) { | |
|       if( alf_luma_coeff_flag[ sfIdx ] ) { | |
|         for ( j = 0; j < 12; j++ ) { | |
|           alf_luma_coeff_abs[ sfIdx ][ j ] | uek(v) |
|           if( alf_luma_coeff_abs[ sfIdx ][ j ] ) | |
|             alf_luma_coeff_sign[ sfIdx ][ j ] | u(1) |
|         } | |
|       } | |
|     } | |
|     if( alf_luma_clip_flag ) { | |
|       for( sfIdx = 0; sfIdx <= alf_luma_num_filters_signalled_minus1; sfIdx++ ) { | |
|         if( alf luma_coeff_flag[ sfIdx ] ) { | |
|           for ( j = 0; j < 12; j++ ) | |
|             alf_luma_clip_idx[ sfIdx ][ j ] | u(2) |
|         } | |
|       } | |
|     } | |
|   } | |

TABLE 15-continued

| | Descriptor |
|---|---|
| } | |
| if( alf_chroma_filter_signal_flag ) { | |
|   alf_chroma_num_alt_filters_minus1 | ue(v) |
|   for( altIdx = 0; altIdx <= alf_chroma_num_alt_filters_minus1; altIdx++ ) { | |
|     alf_chroma_clip_flag[ altIdx ] | u(1) |
|     for( j = 0; j < 6; j++ ) { | |
|       alf_chroma_coeff_abs[ altIdx ][ j ] | uek(v) |
|       if( alf_chroma_coeff_abs[ altIdx ][ j ] > 0 ) | |
|         alf_chroma_coeff_sign[ altIdx ][ j ] | u(1) |
|     } | |
|     if( alf_chroma_clip_flag[ altIdx ] ) { | |
|       for( j = 0; j < 6; j++ ) | |
|         alf_chroma_clip_idx[ altIdx ][ j ] | u(2) |
|     } | |
|   } | |
| } | |
| if ( alf_cross_component_cb_filter_signal_flag ) | |
|   for ( j = 0; j < 14; j++ ) | |
|     alf_cross_component_cb_coeff_abs[ j ] | uek(v) |
|     if( alf_cross_component_cb_coeff_abs[ j ] ) | |
|       alf_cross_component_cb_coeff_sign[ j ] | u(1) |
| if ( alf_cross_component_cr_filter_signal_flag ) | |
|   for ( j = 0; j < 14; j++ ) | |
|     alf_cross_component_cr_coeff_abs[ j ] | uek(v) |
|     if( alf_cross_component_cr_coeff_abs[ j ] ) | |
|       alf_cross_component_cr_coeff_sign[ j ] | u(1) |
| } | |

TABLE 16

| | Descriptor |
|---|---|
| slice_header( ) { | |
|   slice_pic_parameter_set_id | ue(v) |
| ... | |
| if ( slice_type != I ) { | |
| ... | |
|   if( cabac_init_present_flag ) | |
|     cabac_init_flag | u(1) |
| ... | |
| } | |
| ... | |
|   slice_qp_delta | se(v) |
| ... | |
|   if( sps_sao_enabled_flag ) { | |
|     slice_sao_luma_flag | u(1) |
|     if( ChromaArrayType != 0 ) | |
|       slice_sao_chroma_flag | u(1) |
|   } | |
|   if( sps_alf_enabled_flag ) { | |
|     slice_alf_enabled_flag | u(1) |
|     if( slice_alf_enabled_flag ) { | |
|       slice_num_alf_aps_ids_luma | u(3) |
|       for( i = 0; i < slice_num_alf_aps_ids_luma; i++ ) | |
|         slice_alf_aps_id_luma[ i ] | u(3) |
|       if( ChromaArrayType != 0 ) | |
|         slice_alf_chroma_idc | u(2) |
|       if( slice_alf_chroma_idc ) | |
|         slice_alf_aps_id_chroma | u(3) |
|     } | |
|     if( ChromaArrayType != 0 ) | |
|       slice_cross_component_alf_cb_enabled_flag | u(1) |
|     if( slice_cross_component_alf_cb_enabled_flag ) { | |
|       slice_cross_component_alf_cb_reuse_temporal_layer_filter_flag | u(1) |
|       if (!slice_cross_component_alf_cb_reuse_temporal_layer_filter_flag) | |
|         slice_cross_component_alf_cb_aps_id | u(3) |
|       slice_cross_component_alf_cb_log2_control_size_minus4 | ue(v) |
|     } | |
|     if( ChromaArrayType != 0 ) | |
|       slice_cross_component_alf_cr_enabled_flag | u(1) |
|     if( slice_cross_component_alf_cr_enabled_flag ) { | |
|       slice_cross_component_alf_cr_reuse_temporal_layer_filter_flag | u(1) |
|       if (!slice_cross_component_alf_cr_reuse_temporal_layer_filter_flag) | |
|         slice_cross_component_alf_cr_aps_id | u(3) |
|       slice_cross_component_alf_cr_log2_control_size_minus4 | ue(v) |
|     } | |
|   } | |
| ... | |
| if( deblocking_filter_override_enabled_flag ) | |
|   deblocking_filter_override_flag | u(1) |
| if( deblocking_filter_override_flag ) { | |
|   slice_deblocking_filter_disabled_flag | u(1) |
|   if( !slice_deblocking_filter_disabled_flag ) { | |
|     slice_beta_offset_div2 | se(v) |
|     slice_tc_offset_div2 | se(v) |
|   } | |
| } | |
| if( sps_lmcs_enabled_flag ) { | |
|   slice_lmcs_enabled_flag | u(1) |
|   if( slice_lmcs_enabled_flag ) { | |
|     slice_lmcs_aps_id | u(2) |
|     if( ChromaArrayType != 0 ) | |
|       slice_chroma_residual_scale_flag | u(1) |
|   } | |
| } | |
| ... | |
| byte_alignment( ) | |
| } | |

TABLE 17

| | Descriptor |
|---|---|
| coding_tree_unit( ) { | |
|   xCtb = ( CtbAddrInRs % PicWidthInCtbsY ) << CtbLog2SizeY | |
|   yCtb = ( CtbAddrInRs / Pic WidthInCtbsY ) << CtbLog2SizeY | |
|   if( slice_sao_luma_flag \|\| slice_sao_chroma_flag ) | |
|     sao( xCtb >> CtbLog2SizeY, yCtb >> CtbLog2SizeY ) | |
|   if( slice_alf_enabled_flag ){ | |
|     alf_ctb_flag[ 0 ][ xCtb >> CtbLog2SizeY ][ yCtb >> CtbLog2SizeY ] | ae(v) |
|     if( alf_ctb_flag[ 0 ][ xCtb >> CtbLog2SizeY ][ yCtb >> CtbLog2SizeY ] ) { | |
|       if( slice_num_alf_aps_ids_luma > 0 ) | |
|         alf_ctb_use_first_aps_flag | ae(v) |
|       if( !alf_ctb_use_first_aps_flag ) { | |
|         if( slice_num_alf_aps_ids_luma > 1 ) | |
|           alf_use_aps_flag | ae(v) |
|         if( alf_use_aps_flag ) { | |
|           if( slice_num_alf_aps_ids_luma > 2 ) | |
|             alf_luma_prev_filter_idx_minus1 | ae(v) |
|         } else | |
|           alf_luma_fixed_filter_idx | ae(v) |
|       } | |
|     } | |
|     if( slice_alf_chroma_idc = = 1 \|\| slice_alf_chroma_idc = = 3 ) { | |
|       alf_ctb_flag[ 1 ][ xCtb >> CtbLog2SizeY ][ yCtb >> CtbLog2SizeY ] | ae(v) |
|       if( alf_ctb_flag[ 1 ][ xCtb >> CtbLog2SizeY ][ yCtb >> CtbLog2Size Y ] | |
|         && aps_alf_chroma_num_alt_filters_minus1 > 0 ) | |
|         alf_ctb_filter_alt_idx[ 0 ][ xCtb >> CtbLog2SizeY ][ yCtb >> CtbLog2SizeY ] | ae(v) |
|     } | |
|     if( slice_alf_chroma_idc = = 2 \|\| slice_alf_chroma_idc = = 3 ) { | |
|       alf_ctb_flag[ 2 ][ xCtb >> CtbLog2SizeY ][ yCtb >> CtbLog2SizeY ] | ae(v) |
|       if( alf_ctb_flag[ 2 ][ xCtb >> CtbLog2SizeY ][ yCtb >> CtbLog2SizeY ] | |
|         && aps_alf_chroma_num_alt_filters_minus1 > 0 ) | |
|         alf_ctb_filter_alt_idx[ 1 ][ xCtb >> CtbLog2SizeY ][ yCtb >> CtbLog2SizeY ] | ae(v) |
|     } | |
|   } | |
|   xEnd = xCtb + (1 << CtbLog2SizeY ) | |
|   xEnd = ( xEnd >= pic_width_in_luma_samples ) ? pic_width_in_luma_samples : xEnd | |
|   yEnd = yCtb + (1 << CtbLog2SizeY ) | |
|   yEnd = ( yEnd >= pic_height_in_luma_samples ) ? pic_height_in_luma_samples : yEnd | |
|   if ( slice_cross_component_alf_cb_enabled_flag ) | |
|     for ( yL = yCtb; yL < yEnd; yL += CcAlfHeightCbL ) | |
|       for ( xL = xCtb; xL < xEnd; xL += CcAlfWidthCbL ) | |
|         alf_cross_component_cb_flag[ xL / CcAlfWidthCbL ][ yL / CcAlfHeightCbL ] | ae(v) |
|   if ( slice_cross_component_alf_cr_enabled_flag ) | |
|     for ( yL = yCtb; yL < yEnd; yL += CcAlfHeightCrL ) | |
|       for ( xL = xStartC; xL < xEndC; xL += CcAlfWidthCrL ) | |
|         alf_cross_component_cr_flag[ xL / CcAlfWidthCrL ][ yL / CcAlfHeightCrL ] | ae(v) |
|   if( slice_type = = I && qtbtt_dual_tree_intra_flag ) | |
|     dual_tree_implicit_qt_split ( xCtb, yCtb, CtbSizeY, 0 ) | |
|   else | |
|     coding_tree( xCtb, yCtb, CtbSizeY, CtbSizeY, 1, 1, 0, 0, 0, 0, | |
|               SINGLE_TREE, MODE_TYPE_ALL ) | |
| } | |

With respect to Table 15, in one example, the semantics may be based on the following:

alf_luma_filter_signal_flag equal to 1 specifies that a luma filter set is signaled. alf_luma_filter_signal_flag equal to 0 specifies that a luma filter set is not signaled.

alf_chroma_filter_signal_flag equal to 1 specifies that a chroma filter is signaled. alf_chroma_filter_signal_flag equal to 0 specifies that a chroma filter is not signaled. When ChromaArrayType is equal to 0, alf_chroma_filter_signal_flag shall be equal to 0.

The variable NumAlfFilters specifying the number of different adaptive loop filters is set equal to 25.

alf_cross_component_cb_filter_signal_flag equal to 1 specifies that a cross component Cb filter is signaled. alf_cross_component_cb_filter_signal_flag equal to 0 specifies that a cross component Cb filter is not signaled. When ChromaArrayType is equal to 0, alf_cross_component_cb_filter_signal_flag shall be equal to 0.

alf_cross_component_cr_filter_signal_flag equal to 1 specifies that a cross component Cr filter is signaled.

alf_cross_component_cr_filter_signal_flag equal to 0 specifies that a cross component Cr filter is not signaled. When ChromaArrayType is equal to 0, alf_cross_component_cr_filter_signal_flag shall be equal to 0.

alf_luma_clip_flag equal to 0 specifies that linear adaptive loop filtering is applied on luma component. alf_luma_clip_flag equal to 1 specifies that non-linear adaptive loop filtering may be applied on luma component.

alf_luma_num_filters_signaled_minus1 plus 1 specifies the number of adaptive loop filter classes for which luma coefficients can be signaled. The value of alf_luma_num_filters_signaled_minus1 shall be in the range of 0 to NumAlfFilters−1, inclusive.

alf_luma_coeff_delta_idx[filtIdx] specifies the indices of the signaled adaptive loop filter luma coefficient deltas for the filter class indicated by filtIdx ranging from 0 to NumAlfFilters−1. When alf_luma_coeff_delta_idx[filtIdx] is not present, it is inferred to be equal to 0. The length of alf_luma_coeff_delta_idx[filtIdx] is Ceil(Log2(alf_luma_num_filters_signaled_minus1+1)) bits.

alf_luma_coeff_signaled_flag equal to 1 indicates that alf_luma_coeff_flag[sfIdx] is signaled. alf_luma_coeff_signaled_flag equal to 0 indicates that alf_luma_coeff_flag[sfIdx] is not signaled.

alf_luma_coeff_flag[sfIdx] equal 1 specifies that the coefficients of the luma filter indicated by sfIdx are signaled. alf_luma_coeff_flag[sfIdx] equal to 0 specifies that all filter coefficients of the luma filter indicated by sfIdx are set equal to 0. When not present, alf_luma_coeff_flag[sfIdx] is set equal to 1.

alf_luma_coeff_abs[sfIdx][j] specifies the absolute value of the j-th coefficient of the signaled luma filter indicated by sfIdx. When alf_luma_coeff_abs[sfIdx][j] is not present, it is inferred to be equal 0.

The order k of the exp-Golomb binarization uek(v) is set equal to 3.

alf_luma_coeff_sign[sfIdx][j] specifies the sign of the j-th luma coefficient of the filter indicated by sfIdx as follows:

If alf_luma_coeff_sign[sfIdx][j] is equal to 0, the corresponding luma filter coefficient has a positive value.

Otherwise (alf_luma_coeff_sign[sfIdx][j] is equal to 1), the corresponding luma filter coefficient has a negative value.

When alf_luma_coeff_sign[sfIdx][j] is not present, it is inferred to be equal to 0.

The variable filtCoeff[sfIdx][j] with sfIdx=0 . . . alf_luma_num_filters_signaled_minus1, j=0 . . . 11 is initialized as follows:

filtCoeff[sfIdx][j]=alf_luma_coeff_abs[sfIdx][j]*(1−2*alf_luma_coeff_sign[sfIdx][j])

The luma filter coefficients AlfCoeff$_L$[adaptation_parameter_set_id] with elements AlfCoeff$_L$[adaptation_parameter_set_id][filtIdx][j], with filtIdx=0 . . . NumAlfFilters−1 and j=0 . . . 11 are derived as follows:

AlfCoeffL[adaptation_parameter_set_id][filtIdx][j]
=filtCoeff[alf_luma_coeff_delta_idx[filtIdx]][j]

The fixed filter coefficients AlfFixFiltCoeff[i][j] with i=0 . . . 64, j=0 . . . 11 and the class to filter mapping AlfClassToFiltMap[m][n] with m=0 . . . 15 and n=0 . . . 24 are derived as follows:

```
AlfFixFiltCoeff =
{
  {0, 0, 2, −3, 1, −4, 1, 7, −1, 1, −1, 5}
  {0, 0, 0, 0, 0, −1, 0, 1, 0, 0, −1, 2}
  {0, 0, 0, 0, 0, 0, 0, 1, 0, 0, 0, 0}
  {0, 0, 0, 0, 0, 0, 0, 0, 0, 0, −1, 1}
  {2, 2, −7, −3, 0, −5, 13, 22, 12, −3, −3, 17}
  {−1, 0, 6, −8, 1, −5, 1, 23, 0, 2, −5, 10}
  {0, 0, −1, −1, 0, −1, 2, 1, 0, 0, −1, 4}
  {0, 0, 3, −11, 1, 0, −1, 35, 5, 2, −9, 9}
  {0, 0, 8, −8, −2, −7, 4, 4, 2, 1, −1, 25}
  {0, 0, 1, −1, 0, −3, 1, 3, −1, 1, −1, 3}
  {0, 0, 3, −3, 0, −6, 5, −1, 2, 1, −4, 21}
  {−7, 1, 5, 4, −3, 5, 11, 13, 12, −8, 11, 12}
  {−5, −3, 6, −2, −3, 8, 14, 15, 2, −7, 11, 16}
  {2, −1, −6, −5, −2, −2, 20, 14, −4, 0, −3, 25}
  {3, 1, −8, −4, 0, −8, 22, 5, −3, 2, −10, 29}
  {2, 1, 7, −1, 2, −11, 23, −5, 0, 2, −10, 29}
  {−6, −3, 8, 9, −4, 8, 9, 7, 14, −2, 8, 9}
  {2, 1, −4, −7, 0, −8, 17, 22, 1, −1, −4, 23}
  {3, 0, −5, −7, 0, −7, 15, 18, −5, 0, −5, 27}
  {2, 0, 0, −7, 1, −10, 13, 13, −4, 2, −7, 24}
  {3, 3, −13, 4, −2, −5, 9, 21, 25, −2, −3, 12}
  {−5, −2, 7, −3, −7, 9, 8, 9, 16, −2, 15, 12}
  {0, −1, 0, −7, −5, 4, 11, 11, 8, −6, 12, 21}
  {3, −2, −3, −8, −4, −1, 16, 15, −2, −3, 3, 26}
  {2, 1, −5, −4, −1, −8, 16, 4, −2, 1, −7, 33}
  {2, 1, −4, −2, 1, −10, 17, −2, 0, 2, −11, 33}
  {1, −2, 7, −15, −16, 10, 8, 8, 20, 11, 14, 11}
  {2, 2, 3, −13, −13, 4, 8, 12, 2, −3, 16, 24}
  {1, 4, 0, −7, −8, −4, 9, 9, −2, −2, 8, 29}
  {1, 1, 2, −4, −1, −6, 6, 3, −1, −1, −3, 30}
  {−7, 3, 2, 10, −2, 3, 7, 11, 19, −7, 8, 10}
  {0, −2, −5, −3, −2, 4, 20, 15, −1, −3, −1, 22}
  {3, −1, −8, −4, −1, −4, 22, 8, −4, 2, −8, 28}
  {0, 3, −14, 3, 0, 1, 19, 17, 8, −3, −7, 20}
  {0, 2, −1, −8, 3, −6, 5, 21, 1, 1, −9, 13}
  {−4, −2, 8, 20, −2, 2, 3, 5, 21, 4, 6, 1}
  {2, −2, −3, −9, −4, 2, 14, 16, 3, −6, 8, 24}
  {2, 1, 5, −16, −7, 2, 3, 11, 15, −3, 11, 22}
  {1, 2, 3, −11, −2, −5, 4, 8, 9, −3, −2, 26}
  {0, −1, 10, −9, −1, −8, 2, 3, 4, 0, 0, 29}
  {1, 2, 0, −5, 1, −9, 9, 3, 0, 1, −7, 20}
  {−2, 8, −6, −4, 3, −9, −8, 45, 14, 2, −13, 7}
  {1, −1, 16, −19, −8, −4, −3, 2, 19, 0, 4, 30}
  {1, 1, −3, 0, 2, −11, 15, −5, 1, 2, −9, 24}
  {0, 1, −2, 0, 1, −4, 4, 0, 0, 1, −4, 7}
  {0, 1, 2, −5, 1, −6, 4, 10, −2, 1, −4, 10}
  {3, 0, −3, −6, −2, −6, 14, 8, −1, −1, −3, 31}
  {0, 1, 0, −2, 1, −6, 5, 1, 0, 1, −5, 13}
  {3, 1, 9, −19, −21, 9, 7, 6, 13, 5, 15, 21}
  {2, 4, 3, −12, −13, 1, 7, 8, 3, 0, 12, 26}
  {3, 1, −8, −2, 0, −6, 18, 2, −2, 3, −10, 23}
```

```
        {1, 1, -4, -1, 1, -5, 8, 1, -1, 2, -5, 10}
        {0, 1, -1, 0, 0, -2, 2, 0, 0, 1, -2, 3}
        {1, 1, -2, -7, 1, -7, 14, 18, 0, 0, -7, 21}
        {0, 1, 0, -2, 0, -7, 8, 1, -2, 0, -3, 24}
        {0, 1, 1, -2, 2, -10, 10, 0, -2, 1, -7, 23}
        {0, 2, 2, -11, 2, -4, -3, 39, 7, 1, -10, 9}
        {1, 0, 13, -16, -5, -6, -1, 8, 6, 0, 6, 29}
        {1, 3, 1, -6, -4, -7, 9, 6, -3, -2, 3, 33}
        {4, 0, -17, -1, -1, 5, 26, 8, -2, 3, -15, 30}
        {0, 1, -2, 0, 2, -8, 12, -6, 1, 1, -6, 16}
        {0, 0, 0, -1, 1, -4, 4, 0, 0, 0, -3, 11}
        {0, 1, 2, -8, 2, -6, 5, 15, 0, 2, -7, 9}
        {1, -1, 12, -15, -7, -2, 3, 6, 6, -1, 7, 30}
    },
AlfClassToFiltMap =
    {
        {8, 2, 2, 2, 3, 4, 53, 9, 9, 52, 4, 4, 5, 9, 2, 8, 10, 9, 1, 3, 39, 39, 10, 9, 52}
        {11, 12, 13, 14, 15, 30, 11, 17, 18, 19, 16, 20, 20, 4, 53, 21, 22, 23, 14, 25, 26, 26, 27, 28, 10}
        {16, 12, 31, 32, 14, 16, 30, 33, 53, 34, 35, 16, 20, 4, 7, 16, 21, 36, 18, 19, 21, 26, 37, 38, 39}
        {35, 11, 13, 14, 43, 35, 16, 4, 34, 62, 35, 35, 30, 56, 7, 35, 21, 38, 24, 40, 16, 21, 48, 57, 39}
        {11, 31, 32, 43, 44, 16, 4, 17, 34, 45, 30, 20, 20, 7, 5, 21, 22, 46, 40, 47, 26, 48, 63, 58, 10}
        {12, 13, 50, 51, 52, 11, 17, 53, 45, 9, 30, 4, 53, 19, 0, 22, 23, 25, 43, 44, 37, 27, 28, 10, 55}
        {30, 33, 62, 51, 44, 20, 41, 56, 34, 45, 20, 41, 41, 56, 5, 30, 56, 38, 40, 47, 11, 37, 42, 57, 8}
        {35, 11, 23, 32, 14, 35, 20, 4, 17, 18, 21, 20, 20, 20, 4, 16, 21, 36, 46, 25, 41, 26, 48, 49, 58}
        {12, 31, 59, 3, 33, 33, 59, 59, 52, 4, 33, 17, 59, 55, 22, 36, 59, 59, 60, 22, 36, 59, 25, 55}
        {31, 25, 15, 60, 60, 22, 17, 19, 55, 55, 20, 20, 53, 19, 55, 22, 46, 25, 43, 60, 37, 28, 10, 55, 52}
        {12, 31, 32, 50, 51, 11, 33, 53, 19, 45, 16, 4, 4, 53, 5, 22, 36, 18, 25, 43, 26, 27, 27, 28, 10}
        {5, 2, 44, 52, 3, 4, 53, 45, 9, 3, 4, 56, 5, 0, 2, 5, 10, 47, 52, 3, 63, 39, 10, 9, 52}
        {12, 34, 44, 44, 3, 56, 56, 62, 45, 9, 56, 56, 7, 5, 0, 22, 38, 40, 47, 52, 48, 57, 39, 10, 9}
        {35, 11, 23, 14, 51, 35, 20, 41, 56, 62, 16, 20, 41, 56, 7, 16, 21, 38, 24, 40, 26, 26, 42, 57, 39}
        {33, 34, 51, 51, 52, 41, 41, 34, 62, 0, 41, 41, 56, 7, 5, 56, 38, 38, 40, 44, 37, 42, 57, 39, 10}
        {16, 31, 32, 15, 60, 30, 4, 17, 19, 25, 22, 20, 4, 53, 19, 21, 22, 46, 25, 55, 26, 48, 63, 58, 55}
    },
```

It is a requirement of bitstream conformance that the values of $AlfCoeff_L$[adaptation_parameter_set_id][filtIdx][j] with filtIdx=0 ... NumAlfFilters−1, j=0 ... 11 shall be in the range of $-2^7$ to $2^7-1$, inclusive.

alf_luma_clip_idx[sfIdx][j] specifies the clipping index of the clipping value to use before multiplying by the j-th coefficient of the signaled luma filter indicated by sfIdx. It is a requirement of bitstream conformance that the values of alf_luma_clip_idx[sfIdx][j] with sfIdx=0 ... alf_luma_num_filters_signaled_minus1 and j=0 ... 11 shall be in the range of 0 to 3, inclusive.

The luma filter clipping values $AlfClip_L$[adaptation_parameter_set_id] with elements $AlfClip_L$[adaptation_parameter_set_id][filtIdx][j], with filtIdx=0 ... NumAlfFilters−1 and j=0 ... 11 are derived as specified in Table 18 depending on bitDepth set equal to $BitDepth_Y$ and clipIdx set equal to alf_luma_clip_idx[alf_luma_coeff_delta_idx[filtIdx]][j].

alf_chroma_num_alt_filters_minus1 plus 1 specifies the number of alternative filters for chroma components.

alf_chroma_clip_flag[altIdx] equal to 0 specifies that linear adaptive loop filtering is applied on chroma components when using the chroma filter with index altIdx; alf_chroma_clip_flag[altIdx] equal to 1 specifies that non-linear adaptive loop filtering is applied on chroma components when using the chroma filter with index altIdx. When not present, alf_chroma_clip_flag[altIdx] is inferred to be equal to 0.

alf_chroma_coeff_abs[altIdx][j] specifies the absolute value of the j-th chroma filter coefficient for the alternative chroma filter with index altIdx. When alf_chroma_coeff_abs[altIdx][j] is not present, it is inferred to be equal 0. It is a requirement of bitstream conformance that the values of alf_chroma_coeff_abs[altIdx][j] shall be in the range of 0 to $2^7-1$, inclusive.

The order k of the exp-Golomb binarization uek(v) is set equal to 3.

alf_chroma_coeff_sign[altIdx][j] specifies the sign of the j-th chroma filter coefficient for the alternative chroma filter with index altIdx as follows:

If alf_chroma_coeff_sign[altIdx][j] is equal to 0, the corresponding chroma filter coefficient has a positive value.

Otherwise (alf_chroma_coeff_sign[altIdx][j] is equal to 1), the corresponding chroma filter coefficient has a negative value.

When alf_chroma_coeff_sign[altIdx][j] is not present, it is inferred to be equal to 0.

The chroma filter coefficients $AlfCoeff_C$[adaptation_parameter_set_id][altIdx] with elements $AlfCoeff_C$[adaptation_parameter_set_id][altIdx][j], with altIdx=0 ... alf_chroma_num_alt_filters_minus1, j=0 ... 5 are derived as follows:

$$AlfCoeff_C[\text{adaptation\_parameter\_set\_id}][altIdx][j]=\\ \text{alf\_chroma\_coeff\_abs}[altIdx][j]*(1-2*\text{alf\_chroma\_coeff\_sign}[altIdx][j])$$

It is a requirement of bitstream conformance that the values of $AlfCoeff_C$[adaptation_parameter_set_id][altIdx][j] with altIdx=0 ... alf_chroma_num_alt_filters_minus1, j=0 ... 5 shall be in the range of $-2^7-1$ to $2^7-1$, inclusive.

alf_cross_component_cb_coeff_abs[j] specifies the absolute value of the j-th cross component Cb filter coefficient. When alf_cross_component_cb_coeff_abs[j] is not present, it is inferred to be equal to 0.

The order k of the exp-Golomb binarization uek(v) is set equal to 3.

alf_cross_component_cb_coeff_sign[j] specifies the sign of the j-th cross component Cb filter coefficient as follows:

If alf_cross_component_cb_coeff_sign[j] is equal to 0, the corresponding cross component Cb filter coefficient has a positive value.

Otherwise (alf_cross_component_cb_sign[j] is equal to 1), the corresponding cross component Cb filter coefficient has a negative value.

When alf_cross_component_cb_coeff_sign[j] is not present, it is inferred to be equal to 0.

The cross component Cb filter coefficients CcAlfApsCoeff$_{Cb}$[adaptation_parameter_set_id] with elements CcAlfApsCoeff$_{Cb}$[adaptation_parameter_set_id][j], with j=0 . . . 13 are derived as follows:

CcAlfApsCoeff$_{Cb}$[adaptation_parameter_set_id][j]=
alf_cross_component_cb_coeff_abs[j]*(1−
2*alf_cross-component_cb_coeff_sign[j])

It is a requirement of bitstream conformance that the values of CcAlfApsCoeff$_{Cb}$[adaptation_parameter_set_id][j] with j=0 . . . 13 shall be in the range of −2$^7$ to 2$^7$−1, inclusive.

alf_cross_component_cr_coeff_abs[j] specifies the absolute value of the j-th cross component Cr filter coefficient. When alf_cross_component_cr_coeff_abs[j] is not present, it is inferred to be equal to 0.

The order k of the exp-Golomb binarization uek(v) is set equal to 3.

alf_cross_component_cr_coeff_sign[j] specifies the sign of the j-th cross component Cr filter coefficient as follows:
  If alf_cross_component_cr_coeff_sign[j] is equal to 0, the corresponding cross component Cr filter coefficient has a positive value.
  Otherwise (alf_cross_component_cr_sign[j] is equal to 1), the corresponding cross component Cr filter coefficient has a negative value.

When alf_cross_component_cr_coeff_sign[j] is not present, it is inferred to be equal to 0.

The cross component Cr filter coefficients CcAlfApsCoeff$_{Cr}$[adaptation_parameter_set_id] with elements CcAlfApsCoeff$_{Cr}$[adaptation_parameter_set_id][j], with j=0 . . . 13 are derived as follows:

CcAlfApsCoeff$_{Cr}$[adaptation_parameter_set_id][j]=
alf_cross_component_cr_coeff_abs[j]*(1−
2*alf_cross_component_cr_coeff_sign[j])

It is a requirement of bitstream conformance that the values of CcAlfApsCoeff$_{Cr}$[adaptation_parameter_set_id][j] with j=0 . . . 13 shall be in the range of −2$^7$ to 2$^7$−1, inclusive.

alf_chroma_clip_idx[altIdx][j] specifies the clipping index of the clipping value to use before multiplying by the j-th coefficient of the alternative chroma filter with index altIdx. It is a requirement of bitstream conformance that the values of alf_chroma_clip_idx[altIdx][j] with altIdx=0 . . . alf_chroma_num_alt_filters_minus1, j=0 . . . 5 shall be in the range of 0 to 3, inclusive.

The chroma filter clipping values AlfClip$_C$[adaptation_parameter_set_id][altIdx] with elements AlfClip$_C$[adaptation_parameter_set_id][altIdx][j], with altIdx=0 . . . alf_chroma_num_alt_filters_minus1, j=0 . . . 5 are derived as specified in Table 18 depending on bitDepth set equal to BitDepth$_e$ and clipIdx set equal to alf_chroma_clip_idx[altIdx][j].

TABLE 18

| | clipIdx | | | |
|---|---|---|---|---|
| bitDepth | 0 | 1 | 2 | 3 |
| 8 | 255 | 64 | 16 | 4 |
| 9 | 511 | 108 | 23 | 5 |

TABLE 18-continued

| | clipIdx | | | |
|---|---|---|---|---|
| bitDepth | 0 | 1 | 2 | 3 |
| 10 | 1023 | 181 | 32 | 6 |
| 11 | 2047 | 304 | 45 | 7 |
| 12 | 4095 | 512 | 64 | 8 |
| 13 | 8191 | 861 | 91 | 10 |
| 14 | 16383 | 1448 | 128 | 11 |
| 15 | 32767 | 2435 | 181 | 13 |
| 16 | 65535 | 4096 | 256 | 16 |

Further, with respect to Table 15, it should be noted that JVET-O2001 provides the following syntax and semantics for the adaptation parameter set syntax structure:

TABLE 19

| | Descriptor |
|---|---|
| adaptation_parameter_set_rbsp( ) { | |
|   adaptation_parameter_set_id | u(5) |
|   aps_params_type | u(3) |
|   if( aps_params_type = = ALF_APS ) | |
|     alf_data( ) | |
|   else if( aps_params_type = = LMCS_APS ) | |
|     lmcs_data( ) | |
|   else if( aps_params_type = = SCALING_APS ) | |
|     scaling_list_data( ) | |
|   aps_extension_flag | u(1) |
|   if( aps_extension_flag ) | |
|     while( more_rbsp_data( ) ) | |
|       aps_extension_data_flag | u(1) |
|   rbsp_trailing_bits( ) | |
| } | |

Each APS RBSP shall be available to the decoding process prior to it being referred, included in at least one access unit with TemporalId less than or equal to the TemporalId of the coded slice NAL unit that refers it or provided through external means.

Let aspLayerId be the nuh_layer_id of an APS NAL unit. If the layer with nuh_layer_id equal to aspLayerId is an independent layer (i.e., vps_independent_layer_flag[GeneralLayerIdx[aspLayerId]] is equal to 1), the APS NAL unit containing the APS RBSP shall have nuh_layer_id equal to the nuh_layer_id of a coded slice NAL unit that refers it. Otherwise, the APS NAL unit containing the APS RBSP shall have nuh_layer_id either equal to the nuh_layer_id of a coded slice NAL unit that refers it, or equal to the nuh_layer_id of a direct dependent layer of the layer containing a coded slice NAL unit that refers it.

All APS NAL units with a particular value of adaptation_parameter_set_id and a particular value of aps_params_type within an access unit shall have the same content.

adaptation_parameter_set_id provides an identifier for the APS for reference by other syntax elements.

When aps_params_type is equal to ALF_APS or SCALING_APS, the value of adaptation_parameter_set_id shall be in the range of 0 to 7, inclusive.

When aps_params_type is equal to LMCS_APS, the value of adaptation_parameter_set_id shall be in the range of 0 to 3, inclusive.

aps_arams_type specifies the type of APS parameters carried in the APS as specified in Table 20. When aps_params_type is equal to 1 (LMCS_APS), the value of adaptation_parameter_set_id shall be in the range of 0 to 3, inclusive.

TABLE 20

| aps_params_type | Name of aps_params_type | Type of APS parameters |
|---|---|---|
| 0 | ALF_APS | ALF parameters |
| 1 | LMCS_APS | LMCS parameters |
| 2 | SCALING_APS | Scaling list parameters |
| 3 ... 7 | Reserved | Reserved |

NOTE—Each type of APSs uses a separate value space for adaptation_parameter_set_id.

NOTE—An APS NAL unit (with a particular value of adaptation_parameter_set_id and a particular value of aps_params_type) can be shared across pictures, and different slices within a picture can refer to different ALF APSs.

aps_extension_flag equal to 0 specifies that no aps_extension_data_flag syntax elements are present in the APS RBSP syntax structure. aps_extension_flag equal to 1 specifies that there are aps_extension_data_flag syntax elements present in the APS RBSP syntax structure.

aps_extension_data_flag may have any value. Its presence and value do not affect decoder conformance to profiles specified in this version of this Specification. Decoders conforming to this version of this Specification shall ignore all aps_extension_data_flag syntax elements.

With respect to Table 15, in one example, syntax elements alf_chroma_filter_signal_flag, alf_cross_component_cb_filter_signal_flag, and/or alf_cross_component_cr_filter_signal_flag may be conditionally signaled only when ChormaArrayType is not equal to 0 and when not present their value is inferred. The conditional signaling saves bits. That is, in one example, Table 15 may be modified as follows:

|  | Descriptor |
|---|---|
| alf_data( ) { |  |
|   alf_luma_filter_signal_flag | u(1) |
|   if( ChromaArrayType != 0) { |  |
|     alf_chroma_filter_signal_flag | u(1) |
|     alf_cross_component_cb_filter_signal_flag | u(1) |
|     alf_cross_component_cr_filter_signal_flag | u(1) |
|   } |  |
| ... |  |
| } |  |

With the following semantics:

alf_chroma_filter_signal_flag equal to 1 specifies that a chroma filter is signaled. alf_chroma_filter_signal_flag equal to 0 specifies that a chroma filter is not signaled. When not present alf_chroma_filter_signal_flag is inferred to be equal to 0.

The variable NumAlfFilters specifying the number of different adaptive loop filters is set equal to 25.

alf_cross_component_cb_filter_signal_flag equal to 1 specifies that a cross component Cb filter is signaled. alf_cross_component_cb_filter_signal_flag equal to 0 specifies that a cross component Cb filter is not signaled. When not present alf_cross_component_cb_filter_signal_flag is inferred to be equal to 0.

alf_cross_component_cr_filter_signal_flag equal to 1 specifies that a cross component Cr filter is signaled. alf_cross_component_cr_filter_signal_flag equal to 0 specifies that a cross component Cr filter is not signaled. When not present alf_cross_component_cr_filter_signal_flag is inferred to be equal to 0.

With respect to Table 16, in one example, the semantics may be based on the following:

slice_pic_parameter_set_id specifies the value of pps_pic_parameter_set_id for the PPS in use. The value of slice_pic_parameter_set_id shall be in the range of 0 to 63, inclusive.

It is a requirement of bitstream conformance that the value of TemporalId of the current picture shall be greater than or equal to the value of TemporalId of the PPS that has pps_pic_parameter_set_id equal to slice_pic_parameter_set_id.

cabac_init_flag specifies the method for determining the initialization table used in the initialization process for context variables. When cabac_init_flag is not present, it is inferred to be equal to 0.

slice_qp_delta specifies the initial value of $Qp_Y$ to be used for the coding blocks in the slice until modified by the value of CuQpDeltaVal in the coding unit layer. The initial value of the $Qp_Y$ quantization parameter for the slice, $SliceQp_Y$, is derived as follows:

$$SliceQp_Y = 26 + init\_qp\_minus26 + slice\_qp\_delta$$

The value of $SliceQp_Y$ shall be in the range of $-QpBdOffset_Y$ to +63, inclusive.

Where, init_qp_minus26 plus 26 specifies the initial value of $SliceQp_Y$ for each slice referring to the PPS. The initial value of $SliceQp_Y$ is modified at the slice layer when a non-zero value of slice_qp_delta is decoded. The value of init_qp_minus26 shall be in the range of $-(26+QpBdOffset_Y)$ to +37, inclusive.

slice_sao_luma_flag equal to 1 specifies that SAO is enabled for the luma component in the current slice; slice_sao_luma_flag equal to 0 specifies that SAO is disabled for the luma component in the current slice. When slice_sao_luma_flag is not present, it is inferred to be equal to 0.

slice_sao_chroma_flag equal to 1 specifies that SAO is enabled for the chroma component in the current slice; slice_sao_chroma_flag equal to 0 specifies that SAO is disabled for the chroma component in the current slice. When slice_sao_chroma_flag is not present, it is inferred to be equal to 0.

slice_alf_enabled_flag equal to 1 specifies that adaptive loop filter is enabled and may be applied to Y, Cb, or Cr colour component in a slice. slice_alf_enabled_flag equal to 0 specifies that adaptive loop filter is disabled for all colour components in a slice.

slice_num_alf_aps_ids_luma specifies the number of ALF APSs that the slice refers to. The value of slice_num_alf_aps_ids_luma shall be in the range of 0 to 7, inclusive.

slice_alf_aps_id_luma[i] specifies the adaptation_parameter_set_id of the i-th ALF APS that the luma component of the slice refers to. The TemporalId of the APS NAL unit having aps_params_type equal to ALF_APS and adaptation_parameter_set_id equal to slice_alf_aps_id_luma[i] shall be less than or equal to the TemporalId of the coded slice NAL unit.

For intra slices and slices in an IRAP picture, slice_alf_aps_id_luma[i] shall not refer to an ALF APS associated with other pictures rather than the picture containing the intra slices or the IRAP picture.

slice_alf_chroma_idc equal to 0 specifies that the adaptive loop filter is not applied to Cb and Cr colour components. slice_alf_chroma_idc equal to 1 indicates that the adaptive loop filter is applied to the Cb colour component. slice_alf_chroma_idc equal to 2 indicates that the adaptive loop filter is applied to the Cr colour component. slice_alf_chroma_idc equal to 3 indicates that the adaptive loop filter is applied to Cb and Cr colour components. When slice_alf_chroma_idc is not present, it is inferred to be equal to 0.

slice_alf_aps_id_chroma specifies the adaptation_parameter_set_id of the ALF APS that the chroma component of the slice refers to. The TemporalId of the APS NAL unit having aps_params_type equal to ALF_APS and adaptation_parameter_set_id equal to slice_alf_aps_id_chroma shall be less than or equal to the TemporalId of the coded slice NAL unit.

For intra slices and slices in an IRAP picture, slice_alf_aps_id_chroma shall not refer to an ALF APS associated with other pictures rather than the picture containing the intra slices or the IRAP picture.

slice_cross_component_alf_cb_enabled_flag equal to 0 specifies that the cross component Cb filter is not applied to Cb colour component. slice_cross_component_alf_cb_enabled_flag equal to 1 indicates that the cross component Cb filter is applied to the Cb colour component. When slice_cross_component_alf_cb_enabled_flag is not present, it is inferred to be equal to 0.

slice_cross_component_alf_cb_reuse_temporal_layer_filter_flag equal to 1 specifies that the cross component Cb filter coefficients, with j=0 . . . 13, inclusive is set equal to CcAlfTemporalCoeff$_{Cb}$[TemporalId][j].

slice_cross_component_alf_cb_reuse_temporal_layer_filter_flag equal to 0 and slice_cross_component_alf_cb_enabled_flag is equal to 1 specifies that the syntax element slice_cross_component_alf_cb_aps_id is present in current slice header.

When slice_cross_component_alf_cb_enabled_flag is equal to 1, and slice_cross_component_alf_cb_reuse_temporal_layer_filter_flag is equal to 0, the elements of CcAlfTemporalCoeff$_{Cb}$[TemporalId][j] and CcAlfCoeff$_{Cb}$[j], with j=0 . . . 13 are derived as follows:

CcAlfTemporalCoeff$_{Cb}$[TemporalId][$j$]=CcAlfApsCoeff$_{Cb}$[slice_cross_component_alf_cb_aps_id][$j$]

CcAlfCoeff$_{Cb}$[$j$]=CcAlfApsCoeff$_{Cb}$[slice_cross_component_alf_cb_aps_id][$j$]

When slice_cross_component_alf_cb_enabled_flag is equal to 1, and slice_cross_component_alf_cb_reuse_temporal_layer_filter_flag is equal to 1, the elements of CcAlfCoeff$_{Cb}$[j], with j=0 . . . 13 are derived as follows:

CcAlfCoeff$_{Cb}$[$j$]=CcAlfTemporalCoeff$_{Cb}$[TemporalId][$i$]

It should be noted that in some examples, slice_cross_component_alf_cb_reuse_temporal_layer_filter_flag could be conditionally signaled either with if(slice type !=I) and/or NAL unit type being Non-IRAP and non-GDR and when not present inferred to equal 0.

A NAL unit type being Non-IRAP and non-GDR can be expressed by the following condition statement:
if(nal_unit_type !=IDR_W_RADL && nal_unit_type !=IDR_N_LP && nal_unit_type !=CRA_NUT && nal_unit_type !=GDR_NUT)

A NAL unit type being Non-IRAP and non-GDR and if (slice type !=I) can be expressed by the following condition statement:
if(nal_unit_type !=IDR_W_RADL && nal_unit_type !=IDR_N_LP && nal_unit_type !=CRA_NUT && nal_unit_type !=GDR_NUT && slice_type !=I)

slice_cross_component_alf_cb_aps_id specifies the adaptation_parameter_set_id that the Cb colour component of the slice refers to. The TemporalId of the APS NAL unit having aps_params_type equal to ALF_APS and adaptation_parameter_set_id equal to slice_cross_component_alf_cb_aps_id shall be less than or equal to the TemporalId of the coded slice NAL unit.

For intra slices and slices in an IRAP picture, slice_cross_component_alf_cb_aps_id shall not refer to an ALF APS associated with other pictures rather than the picture containing the intra slices or the IRAP picture.

When slice_cross_component_alf_cb_enabled_flag equal to 1, it is a requirement of bitstream conformance that, for all slices of the current picture, the ALF APS referred to by slice_cross_component_alf_cb_aps_id shall be the same.

slice_cross_component_alf_cb_log2_control_size_minus4 specifies the control block size in number of chroma samples for the Cb colour component. slice_cross_component_alf_cb_log2_control_size_minus4 shall be in the range 0 to Min(Log2(CtbWidthC), Log2(CtbHeightC))−4, inclusive.

The variables CcAlfWidthCbL and CcAlfHeightCbL are derived as follows:

CcAlfWidthCbL=(1<<
 (slice_cross_component_alf_cb_log2_control_size_minus4+
 4))*SubWidthC CcAlfHeightCbL=(1<<
 (slice_cross_component_alf_cb_log2_control_size_minus4+
 4))*SubHeightC slice_cross_component_alf_cr_enabled_flag equal to 0 specifies that the cross component Cr filter is not applied to Cr colour component. slice_cross_component_alf_cb_enabled_flag equal to 1 indicates that the cross component adaptive loop filter is applied to the Cr colour component. When slice_cross_component_alf_cr_enabled_flag is not present, it is inferred to be equal to 0.

With respect to Table 16, in one example syntax elements slice_cross_component_alf_cb_enabled_flag and slice_cross_component_alf_cr_enabled_flag may be grouped into a single if(ChromaArrayType !=0){ } statement.

slice_cross_component_alf_cr_reuse_temporal_layer_filter_flag equal to 1 specifies that the cross component Cr filter coefficients, with j=0 . . . 13, inclusive is set equal to CcAlfTemporalCoeff$_{Cr}$[TemporalId][j].

slice_cross_component_alf_cr_reuse_temporal_layer_filter_flag equal to 0 and slice_cross_component_alf_cr_enabled_flag is equal to 1 specifies that the syntax element slice_cross_component_alf_cr_aps_id is present in current slice header.

When slice_cross_component_alf_cr_enabled_flag is equal to 1, and slice_cross_component_alf_cr_reuse_temporal_layer_filter_flag is equal to 0, the elements of CcAlfTemporalCoeff$_{Cr}$[TemporalId][j] and CcAlfCoeff$_{Cr}$[j], with j=0 . . . 13 are derived as follows:

CcAltTemporalCoeff$_{Cr}$[TemporalId][$j$]=CcAlfApsCoeff$_{Cr}$[slice_cross_component_alf_cr_aps_id][$j$]

CcAlfCoeff$_{Cr}$[$j$]=CcAlfApsCoeff$_{Cr}$[slice_cross_component_alf_cr_aps_id][$j$]

When slice_cross_component_alf_cb_enabled_flag is equal to 1, and slice_cross_component_alf_cb_reuse_temporal_layer_filter_flag is equal to 1, the elements of CcAlfCoeff$_{Cr}$[j], with j=0 . . . 13 are derived as follows:

CcAlfCoeff$_{Cr}$[$j$]=CcAlfTemporalCoeff$_{Cr}$[TemporalId][$j$]

It should be noted that in some examples, slice_cross_component_alf_cr_reuse_temporal_layer_filter_flag could be conditionally signaled either with if(slice type !=1) and/or NAL unit type being Non-IRAP and non-GDR and when not present inferred to equal 0.

slice_cross_component_alf_cr_aps_id specifies the adaptation_parameter_set_id that the Cr colour component of the slice refers to. The TemporalId of the APS NAL unit having aps_params_type equal to ALF_APS and adaptation_parameter_set_id equal to slice_cross_component_alf_cr_aps_id shall be less than or equal to the TemporalId of the coded slice NAL unit.

For intra slices and slices in an IRAP picture, slice_cross_component_alf_cr_aps_id shall not refer to an ALF APS associated with other pictures rather than the picture containing the intra slices or the IRAP picture.

When slice_cross_component_alf_cr_enabled_flag equal to 1, it is a requirement of bitstream conformance that, for all slices of the current picture, the ALF APS referred to by slice_cross_component_alfcr_aps_id shall be the same.

slice_cross_component_alf_cr_log2_control_size_minus4 specifies the control block size in number of chroma samples for the Cr colour component. slice_cross_component_alf_cr_log2_control_size_minus4 shall be in the range 0 to Min(Log2(CtbWidthC), Log2(CtbHeightC))–4, inclusive.

The variables CcAlfWidthCrL and CcAlfHeightCrL are derived as follows:

CcAlfWidthCrL=(1<<
(slice_cross_component_alf_cr_log2_control_size_minus4+4))*SubWidth CCcAlfHeightCrL=(1<<
(slice_cross_component_alf_cr_log2_control_size_minus4+4))*SubHeightC deblocking_filter_override_flag equal to 1 specifies that deblocking parameters are present in the slice header. deblocking_filter_override_flag equal to 0 specifies that deblocking parameters are not present in the slice header. When not present, the value of deblocking_filter_override_flag is inferred to be equal to 0.

slice_deblocking_filter_disabled_flag equal to 1 specifies that the operation of the deblocking filter is not applied for the current slice. slice_deblocking_filter_disabled_flag equal to 0 specifies that the operation of the deblocking filter is applied for the current slice. When slice_deblocking_filter_disabled_flag is not present, it is inferred to be equal to pps_deblocking_filter_disabled_flag.

slice_beta_offset_div2 and slice_tc_offset_div2 specify the deblocking parameter offsets for β and tC (divided by 2) for the current slice. The values of slice_beta_offset_div2 and slice_tc_offset_div2 shall both be in the range of –6 to 6, inclusive. When not present, the values of slice_beta_offset_div2 and slice_tc_offset_div2 are inferred to be equal to pps_beta_offset_div2 and pps_tc_offset_div2, respectively.

slice_lmcs_enabled_flag equal to 1 specifies that luma mapping with chroma scaling is enabled for the current slice, slice_lmcs_enabled_flag equal to 0 specifies that luma mapping with chroma scaling is not enabled for the current slice. When slice_lmcs_enabled_flag is not present, it is inferred to be equal to 0.

slice_lmcs_aps_id specifies the adaptation, parameter_set_id of the LMCS_APS that the slice refers to. The TemporalId of the APS NAL unit having aps_params_type equal to LMCS_APS and adaptation_parameter_set_id equal to slice_lmcs_aps_id shall be less than or equal to the TemporalId of the coded slice NAL unit.

When present, the value of slice_lmcs_aps_id shall be the same for all slices of a picture.

slice_chroma_residual_scale_flag equal to 1 specifies that chroma residual scaling is enabled for the current slice. slice_chroma_residual_scale_flag equal to 0 specifies that chroma residual scaling is not enabled for the current slice. When slice_chroma_residual_scale_flag is not present, it is inferred to be equal to 0.

As provided above, slice_cross_component_alf_cb_log2_control_size_minus4 and slice_cross_component_aif_cr_log2_control_size_minus4 limit the maximum block size of local control filter indications (i.e., to Min(Log2(CtbWidthC), Log2(CtbHeightC))). In one example, the maximum block size of local control filter indications may be limited to Min(Floor(Log2(CtbWidthC)), Floor(Log2(CtbHeightC))). Further, in one example, the maximum block size of local control indications may be limited so that the control blocks cannot span more than one CTU. This may make processing across Tile/Slice boundary simpler because Tiles/Slices are described in units of CTUs. In one example, the maximum block size limitation is derived based on maximum CTU size (block and/or width), and/or chroma format.

It should be noted that JVET-02001 provides following syntax and semantics for syntax element non_reference_picture_flag:

| | Descriptor |
|---|---|
| slice_header( ) { | |
|   slice_pic_parameter_set_id | ue(v) |
|   if( rect_slice_flag \| \| NumBricksInPic > 1 ) | |
|     slice_address | u(v) |
|   if( !rect_slice_flag && !single_brick_per_slice_flag ) | |
|     num_bricks_in_slice_minus1 | ue(v) |
|   non_reference_picture_flag | u(1) |
|   slice_type | ue(v) |
|   ... | |
| } | | non_reference_picture_flag equal to 1 specifies the picture containing the slice is never used as a reference picture. non_reference_picture_flag equal to 0 specifies the picture containing the slice may or may not be used as a reference picture.

In one example, according to the techniques herein, the semantics of syntax elements slice_alf_aps_id_luma[i], slice_alf_chroma_idc and slice_alf_aps_id_chroma may be based on the following:

slice_alf_aps_id_luma[i] specifies the adaptation_parameter_set_id of the i-th ALF APS that the luma component of the slice refers to. The TemporalId of the APS NAL unit having aps_params_type equal to ALF_APS and adaptation_parameter_set_id equal to slice_alf_aps_id_luma[i] shall be less than or equal to the TemporalId of the coded slice NAL unit.

For intra slices and slices in an IRAP picture, slice_alf_aps_id_luma[i] shall not refer to an ALF APS associated with other pictures rather than the picture containing the intra slices or the IRAP picture.

For i in the range of 0 to slice_num_alf_aps_ids_luma, inclusive, it is a requirement of bitstream conformance that, alf_luma_filter_signal_flag is equal to 1 for the ALF APS with adaptation_parameter_set_id equal to slice_alf_aps_id_luma[i].

slice_alf_chroma_idc equal to 0 specifies that the adaptive loop filter is not applied to Cb and Cr colour components.

slice_alf_chroma_idc equal to 1 indicates that the adaptive loop filter is applied to the Cb colour component. slice_alf_chroma_idc equal to 2 indicates that the adaptive loop filter is applied to the Cr colour component. slice_alf_chroma_idc equal to 3 indicates that the adaptive loop filter is applied to Cb and Cr colour components. When slice_alf_chroma_idc is not present, it is inferred to be equal to 0.

slice_alf_aps_id_chroma specifies the adaptation_parameter_set_id of the ALF APS that the chroma component of the slice refers to. The TemporalId of the APS NAL unit having aps_params_type equal to ALF_APS and adaptation_parameter_set_id equal to slice_alf_aps_id_chroma shall be less than or equal to the TemporalId of the coded slice NAL unit.

For intra slices and slices in an IRAP picture, slice_alf_aps_id_chroma shall not refer to an ALF APS associated with other pictures rather than the picture containing the intra slices or the IRAP picture.

It is a requirement of bitstream conformance that, alf_chroma_filter_signal_flag is equal to 1 for the ALF APS with adaptation_parameter_set_id equal to slice_alf_aps_id_chroma.

Further, JVET-02001 includes the following syntax elements in the sequence parameter set syntax structure: sps_sao_enabled_flag equal to 1 specifies that the sample adaptive offset process is applied to the reconstructed picture after the deblocking filter process. sps_sao_enabled_flag equal to 0 specifies that the sample adaptive offset process is not applied to the reconstructed picture after the deblocking filter process.

sps_alf_enabled_flag equal to 0 specifies that the adaptive loop filter is disabled. sps_alf_enabled_flag equal to 1 specifies that the adaptive loop filter is enabled.

sps_lmcs_enabled_flag equal to 1 specifies that luma mapping with chroma scaling is used in the CVS. sps_lmcs_enabled_flag equal to 0 specifies that luma mapping with chroma scaling is not used in the CVS.

loop_filter_across_subpic_enabled_flag[i] equal to 1 specifies that in-loop filtering operations may be performed across the boundaries of the i-th subpicture in each coded picture in the CVS. loop_filter_across_subpic_enabled_flag[i] equal to 0 specifies that in-loop filtering operations are not performed across the boundaries of the i-th subpicture in each coded picture in the CVS. When not present, the value of loop_filter_across_subpic_enabled_pic_flag[i] is inferred to be equal to 1.

And the following syntax elements in the picture parameter set syntax structure:

cabac_init_present_flag equal to 1 specifies that cabac_init_flag is present in slice headers referring to the PPS. cabac_init_present_flag equal to 0 specifies that cabac_init_flag is not present in slice headers referring to the PPS.

deblocking_filter_override_enabled_flag equal to 1 specifies the presence of deblocking_filter_override_flag in the slice headers for pictures referring to the PPS. deblocking_filter_override_enabled_flag equal to 0 specifies the absence of deblocking_filter_override_flag in the slice headers for pictures referring to the PPS. When not present, the value of deblocking_filter_override_enabled_flag is inferred to be equal to 0.

loop_filter_across_bricks_enabled_flag equal to 1 specifies that in-loop filtering operations may be performed across brick boundaries in pictures referring to the PPS. loop_filter_across_bricks_enabled_flag equal to 0 specifies that in-loop filtering operations are not performed across brick boundaries in pictures referring to the PPS. The in-loop filtering operations include the deblocking filter, sample adaptive offset filter, and adaptive loop filter operations. When not present, the value of loop_filter_across_bricks_enabled_flag is inferred to be equal to 1.

loop_filter_across_slices_enabled_flag equal to 1 specifies that in-loop filtering operations may be performed across slice boundaries in pictures referring to the PPS. loop_filter_across_slice_enabled_flag equal to 0 specifies that in-loop filtering operations are not performed across slice boundaries in pictures referring to the PPS. The in-loop filtering operations include the deblocking filter, sample adaptive offset filter, and adaptive loop filter operations. When not present, the value of loop_filter_across_slices_enabled_flag is inferred to be equal to 0.

Further with respect to Table 16, the variables ChromaArrayType, SubWidthC, and SubHeightC may be derived as provided in Table 21:

TABLE 21

| chroma_format_idc | separate_colour_plane_flag | Chroma format | ChromaArrayType | SubWidthC | SubHeightC |
|---|---|---|---|---|---|
| 0 | 0 | Monochrome | 0 | 1 | 1 |
| 1 | 0 | 4:2:0 | 1 | 2 | 2 |
| 2 | 0 | 4:2:2 | 2 | 2 | 1 |
| 3 | 0 | 4:4:4 | 3 | 1 | 1 |
| 3 | 1 | 4:4:4 | 0 | 1 | 1 |

Further with respect to Table 16, JVET-02001 includes the following syntax elements in the sequence parameter set syntax structure:

log2_ctu_size_minus5 plus 5 specifies the luma coding tree block size of each CTU. It is a requirement of bitstream conformance that the value of log2_ctu_size_minus5 be less than or equal to 2.

log2_min_luma_coding_block_size_minus2 plus 2 specifies the minimum luma coding block size.

The variables CtbLog2SizeY, CtbSizeY, MinCbLog2SizeY, MinCbSizeY, IbcBufWidthY, IbcBufWidthC and Vsize are derived as follows:

CtbLog2SizeY=log2_ctu_size_minus5+5

CtbSizeY=1<<CtbLog2SizeY

MinCbLog2SizeY=log2_min_luma_coding_block_size_minus2+2

MinCbSizeY=1<<MinCbLog2SizeY

IbcBufWidthY=128*128/CtbSizeY

IbcBufWidthC=IbcBufWidthY/SubWidthC

VSize=Min(64,CtbSizeY)

The variables CtbWidthC and CtbHeightC, which specify the width and height, respectively, of the array for each chroma CTB, may be derived as follows:

If chroma_format_idc is equal to 0 (monochrome) or separate_colour_plane_flag is equal to 1, CtbWidthC and CtbHeightC are both equal to 0.

Otherwise, CtbWidthC and CtbHeightC are derived as follows:

CtbWidthC=CtbSizeY/SubWidthC

CtbHeightC=CtbSizeY/SubHeightC

With respect to Table 17, in one example, the semantics may be based on the following: The CTU is the root node of the coding tree structure.

The array IsAvailable[cIdx][x][y] specifying whether the sample at (x, y) is available for use in the derivation process for neighbouring block availability as specified is initialized as follows for cIdx=0 . . . 2, x=0 . . . CtbSizeY−1, and y=0 . . . CtbSizeY−1:

IsAvailable[cIdx][x][y]=FALSE

The array IsInSmr[x][y] specifying whether the sample at (x, y) is located inside a shared merging candidate list region, is initialized as follows for x=0 . . . CtbSizeY−1 and y=0 . . . CtbSizeY−1:

IsInSmr[x][y]=FALSE alf_ctb_flag[cIdx][xCtb>>CtbLog2SizeY] [yCtb>>CtbLog2SizeY] equal to 1 specifies that the adaptive loop filter is applied to the coding tree block of the colour component indicated by cIdx of the coding tree unit at luma location (xCtb, yCtb). alf_ctb_flag[cIdx] [xCtb>>CtbLog2SizeY][yCtb>>CtbLog2SizeY] equal to 0 specifies that the adaptive loop filter is not applied to the coding tree block of the colour component indicated by cIdx of the coding tree unit at luma location (xCtb, yCtb).

When alf_ctb_flag[cIdx][xCtb>>CtbLog2SizeY] [yCtb>>CtbLog2SizeY] is not present, it is inferred to be equal to 0.

alf_ctb_use_first_aps_flag equal to 1 specifies that the filter information in APS with adaptive_parameter_set_id equal to slice_alf_aps_id_luma[0] is used. alf_ctb_use_first_aps_flag equal to 0 specifies that the luma CTB does not use the filter information in APS with adaptive_parameter_set_id equal to slice_alf_aps_id_luma[0]. When alf_ctb_use_first_aps_flag is not present, it is inferred to be equal to 0.

alf_use_aps_flag equal to 0 specifies that one of the fixed filter sets is applied to the luma CTB. alf_use_aps_flag equal to 1 specifies that a filter set from an APS is applied to the luma CTB. When alf_use_aps_flag is not present, it is inferred to be equal to 0.

alf_luma_prev_filter_idx_minus1 plus 1 specifies the previous filter that is applied to the luma CTB. The value of alf_luma_prev_filter_idx_minus1 shall be in a range of 0 to slice_num_alf_aps_ids_luma−2, inclusive. When alf_luma_prev_filter_idx_minus1 is not present, it is inferred to be equal to 0.

The variable AlfCtbFiltSetIdxY[xCtb>>CtbLog2SizeY] [yCtb>>CtbLog2SizeY] specifying the filter set index for the luma CTB at location (xCtb, yCtb) is derived as follows:

If alf_ctb_use_first_aps_flag is equal to 1, AlfCtbFiltSetIdxY[xCtb>>CtbLog2SizeY]
[yCtb>>CtbLog2SizeY] is set equal to 16.
Otherwise, if alf_use_aps_flag is equal to 0, AlfCtbFiltSetIdxY[xCtb>>CtbLog2SizeY]
[yCtb>>CtbLog2SizeY] is set equal to alf_luma_fixed_filter_idx.
Otherwise, AlfCtbFiltSetIdxY[xCtb>>CtbLog2SizeY] [yCtb>>CtbLog2SizeY] is set equal to 17+alf_luma_prev_filter_idx_minus1.

alf_luma_fixed_filter_idx specifies the fixed filter that is applied to the luma CTB. The value of alf_luma_fixed_filter_idx shall be in a range of 0 to 15, inclusive.

alf_ctb_filter_alt_idx[chromaIdx] [xCtb>>CtbLog2SizeY][yCtb>>CtbLog2SizeY] specifies the index of the alternative chroma filter applied to the coding tree block of the chroma component, with chromaIdx equal to 0 for Cb and chromaIdx equal 1 for Cr, of the coding tree unit at luma location (xCtb, yCtb). When alf_ctb_filter_alt_idx[chromaIdx][xCtb>>CtbLog2SizeY]
[yCtb>>CtbLog2SizeY] is not present, it is inferred to be equal to zero.

alf_cross_component_cb_flag[xL/CcAlfWidthCbL][yL/CcAlfHeightCbL] equal to 0 indicates that the cross component Cb filter is not applied to block of Cb colour component samples at luma location (xL, yL). alf_cross_component_cb_flag[xL/CcAlfWidthCbL][yL/CcAlfHeightCbL] equal to 1 indicates that the cross component Cb filter is applied to the block of Cb colour component samples at luma location (xL, yL)

alf_cross_component_cr_flag[xL/CcAlfWidthCbL][yL/CcAlfHeightCbL] equal to 0 indicates that the cross component Cr filter is not applied to block of Cr colour component samples at luma location (xL, yL). alf_cross_component_cr_flag[xL/CcAlfWidthCbL][yL/CcAlfHeightCbL] equal to 1 indicates that the cross component Cr filter is applied to the block of Cr colour component samples at luma location (xL, yL)

It should be noted that in one example, [xL/CcAlfWidthCbL][yL/CcAlfHeightCbL] may be expressed using shift operations instead of /.

Further, with respect to Table 17, JVET-O2001 includes the following syntax elements in the picture parameter set syntax structure:

pic_width_in_luma_samples specifies the width of each decoded picture referring to the PPS in units of luma samples. pic_width_in_luma_samples shall not be equal to 0, shall be an integer multiple of Max(8, MinCbSizeY), and shall be less than or equal to pic_width_max_in_luma_samples.

When subpics_present_flag is equal to 1, the value of pic_width_in_luma_samples shall be equal to pic_width_max_in_luma_samples.

pic_height_in_luma_samples specifies the height of each decoded picture referring to the PPS in units of luma samples. pic_height_in_luma_samples shall not be equal to 0 and shall be an integer multiple of Max(8, MinCbSizeY), and shall be less than or equal to pic_height_max_in_luma_samples.

When subpics_present_flag is equal to 1, the value of pic_height_in_luma_samples shall be equal to pic_height_max_in_luma_samples.

Let refPicWidthInLumaSamples and refPicHeightInLumaSamples be the pic_width_in_luma_samples and pic_height_in_luma_samples, respectively, of a reference picture of a current picture referring to this PPS. Is a requirement of bitstream conformance that all of the following conditions are satisfied:

pic_width_in_luma_samples*2 shall be greater than or equal to refPicWidthInLumaSamples.
pic_height_in_luma_samples*2 shall be greater than or equal to refPicHeightInLumaSamples.
pic_width_in_luma_samples shall be less than or equal to refPicWidthInLumaSamples*8.
pic_height_in_luma_samples shall be less than or equal to refPicHeightInLumaSamples*8.

The variables PicWidthInCtbsY, PicHeightInCtbsY, PicSizeInCtbsY, PicWidthInMinCbsY, PicHeightInMinCbsY, PicSizeInMinCbsY, PicSizeInSamplesY, PicWidthInSamplesC and PicHeightInSamplesC are derived as follows:

PicWidthInCtbsY=Ceil(pic_width_in_luma_samples+CtbSizeY)

PicHeightInCtbsY=Ceil(pic_height_in_luma_samples CtbSizeY)

PicSizeInCtbsY=PicWidthInCtbsY*PicHeightInCtbsY

PicWidthInMinCbsY=pic_width_in_luma_samples/MinCbSizeY

PicHeightInMinCbsY=pic_height_in_luma_samples/MinCbSizeY

PicSizeInMinCbsY=PicWidthInMinCbsY*PicHeightInMinCbsY

PicSizeInSamplesY=pic_width_in_luma_samples*pic_height_in_luma_samples

PicWidthInSamplesC=pic_width_in_luma_samples/SubWidthC

PicHeightInSamplesC=pic_height_in_luma_samples/SubHeightC

Further, JVET-O2001 includes the following syntax elements in the picture parameter set syntax structure:

pps_loop_filter_across_virtual_boundaries_disabled_flag equal to 1 specifies that the in-loop filtering operations are disabled across the virtual boundaries in pictures referring to the PPS. pps_loop_filter_across_virtual_boundaries_disabled_flag equal to 0 specifies that no such disabling of in-loop filtering operations is applied in pictures referring to the PPS. The in-loop filtering operations include the deblocking filter, sample adaptive offset filter, and adaptive loop filter operations. When not present, the value of pps_loop_filter_across_virtual_boundaries_disabled_flag is inferred to be equal to 0.

pps_num_ver_virtual_boundaries specifies the number of pps_virtual_boundaries_pos_x[i] syntax elements that are present in the PPS. When pps_num_ver_virtual_boundaries is not present, it is inferred to be equal to 0.

pps_virtual_boundaries_pos_x[i] is used to compute the value of PpsVirtualBoundariesPosX[i], which specifies the location of the i-th vertical virtual boundary in units of luma samples. pps_virtual_boundaries_pos_x[i] shall be in the range of 1 to Ceil(pic_width_in_luma_samples+8)−1, inclusive.

The location of the vertical virtual boundary PpsVirtualBoundariesPosX[i] is derived as follows:

PpsVirtualBoundariesPosX[i]=pps_virtual_boundaries_pos_x[i]*8

The distance between any two vertical virtual boundaries shall be greater than or equal to CtbSizeY luma samples.

pps_num_hor_virtual_boundaries specifies the number of pps_virtual_boundaries_pos_y[i] syntax elements that are present in the PPS. When pps_num_hor_virtual_boundaries is not present, it is inferred to be equal to 0.

pps_virtual_boundaries_pos_y[i] is used to compute the value of PpsVirtualBoundariesPosY[i], which specifies the location of the i-th horizontal virtual boundary in units of luma samples. pps_virtual_boundaries_pos_y[i] shall be in the range of 1 to Ceil(pic_height_in_luma_samples+8)−1, inclusive.

The location of the horizontal virtual boundary PpsVirtualBoundariesPosY[i] is derived as follows:

PpsVirtualBoundariesPosY[i]=pps_virtual_boundaries_pos_y[i]*8

The distance between any two horizontal virtual boundaries shall be greater than or equal to CtbSizeY luma samples.

As provided above, for example, with respect to Table 5C and Table 15, one or more filters syntax elements cross-component Cb and Cr filter sets may be signaled, (e.g., in alf_data( )). In one example, according to the techniques herein, one or more cross-component filter sets may be defined for a decoder (e.g., stored in a decoder memory). That is, default cross-component filter sets may be defined. Further, in one example, the cross-component filter sets may be indexed and an index value may be signaled to indicate a cross-component filter set to be applied. Further, default cross-component filter sets may be used in combination with signaled cross-component filter sets. That is, for example, in one example, a flag may be signaled indicating if an index is used to indicate a cross-component filter set to be applied or if a cross-component filter set is signaled. In one example, distinct default filter sets may be respectively defined for Cb and Cr. Further, it should be noted that in some examples, the fixed filter sets and the signaled coefficient filters may have different sizes and/or shapes. In such examples, a filtering process may describe filtering for each filter having a particular shape/size.

In one example, according to the techniques herein, for example, with respect to the syntax and semantics provided above with respect to Tables 15-21, an adaptive loop filter process may be performed based on the following:

Inputs of this process are the reconstructed picture sample array prior to adaptive loop filter recPicture$_L$ and, when ChromaArrayType is not equal to 0, the arrays recPicture$_{Cb}$ and recPicture$_{Cr}$.

Outputs of this process are the modified reconstructed picture sample array after adaptive loop filter alfPicture$_L$ and, when ChromaArrayType is not equal to 0, the arrays ccAlfPicture$_{Cb}$ and ccAlfPicture$_{Cr}$.

The sample values in the modified reconstructed picture sample array after adaptive loop filter alfPicture$_L$ and, when ChromaArrayType is not equal to 0, the arrays alfPicture$_{Cb}$ and alfPicture$_{Cr}$ are initially set equal to the sample values in the reconstructed picture sample array prior to adaptive loop filter recPicture$_L$ and, when ChromaArrayType is not equal to 0, the arrays recPicture$_{Cb}$ and recPicture$_{Cr}$, respectively.

The following ordered steps apply:

For every coding tree unit with luma coding tree block location (rx, ry), where rx=0 . . . PicWidthInCtbsY−1 and ry=0 . . . PicHeightInCtbsY−1, the following applies:

When alf_ctb_flag[0][rx][ry] is equal to 1, the coding tree block filtering process for luma samples as specified is invoked with recPicture$_L$, alfPicture$_L$, and the luma coding tree block location (xCtb, yCtb) set equal to (rx<<CtbLog2SizeY, ry<<CtbLog2SizeY) as inputs, and the output is the modified filtered picture alfPicture$_L$.

When ChromaArrayType is not equal to 0 and alf_ctb_flag[1][rx][ry] is equal to 1, the coding tree block filtering process for chroma samples as specified is invoked with recPicture set equal to recPicture$_{Cb}$, alfPicture set equal to alfPicture$_{Cb}$, the chroma coding tree block location (xCtbC, yCtbC) set equal to ((rx<<CtbLog2SizeY)/SubWidthC, (ry<<CtbLog2SizeY)/SubHeightC), and the alternative chroma filter index altIdx set equal to alf_ctb_filter_alt_idx[0][rx][ry] as inputs, and the output is the modified filtered picture alfPicture$_{Cb}$.

When ChromaArrayType is not equal to 0 and alf_ctb_flag[2][rx][ry] is equal to 1, the coding tree block filtering process for chroma samples as specified is invoked with recPicture set equal to recPicture$_{Cr}$, alfPicture set equal to alfPicture$_{Cr}$, the chroma coding tree block location (xCtbC, yCtbC) set equal to ((rx<<CtbLog2SizeY)/SubWidthC, (ry<<CtbLog2SizeY)/SubHeightC), and the alternative chroma filter index altIdx set equal to alf_ctb_filter_alt_idx[0][rx][ry] as inputs, and the output is the modified filtered picture alfPicture$_{Cr}$.

For every luma location (rx, ry), where rx=0 . . . pic_width_in_luma_samples/CcAlfWidthCbL−1 and ry=0 . . . pic_height_in_luma_samples/CcAlfHeightCbL−1, the following applies:

When ChromaArrayType is not equal to 0 and alf_cross_component_cb_flag[rx][ry] is equal to 1, the cross component filtering process for block of chroma samples as specified below invoked with recPicture$_L$ set equal to recPicture$_L$, alfPicture$_C$ set equal to alfPicture$_{Cb}$, chroma block of samples location (xC, yC) set equal to (rx*CcAlfWidthCbL/SubWidthC, ry*CcAlfHeightCbL/SubHeightC), ccAlfWidth set equal to CcAlfWidthCbL/SubWidthC, ccAlfHeight set equal to CcAlfHeightCbL/SubHeightC, and the cross component filter coefficients CcAlfCoeff[j] set equal to CcAlfCoeff$_C$[j], with j=0.13, as inputs, and the output is the modified filtered picture ccAlfPicture$_{Cb}$.

For every luma location (rx, ry), where rx=0 . . . pic_width_in_luma_samples/CcAlfWidthCrL−1 and ry=0 . . . pic_height_in_luma_samples/CcAlfHeightCrL−1, the following applies:

When ChromaArrayType is not equal to 0 and alf_cross_component_cr_flag[rx][ry] is equal to 1, the cross component filtering process for block of chroma samples as specified below is invoked with recPicture$_L$ set equal to recPicture$_L$, alfPicture$_C$ set equal to alfPicture$_{Cr}$, chroma block of samples location (xC, yC) set equal to (rx*CcAlfWidthCrL/SubWidthC, ry*CcAlfHeightCrL/SubHeightC), ccAlfWidth set equal to CcAlfWidthCrL/SubWidthC, ccAlfHeight set equal to CcAlfHeightCrL/SubHeightC, and the cross component filter coefficients CcAlfCoeff[j] set equal to CcAlfCoeff$_{Cr}$[j], with j=0 . . . 13, as inputs, and the output is the modified filtered picture ccAlfPicture$_{Cr}$.

Cross Component Filtering Process for Block of Chroma Samples

Inputs of this process are:
a reconstructed luma picture sample array recPicture$_L$ prior to the luma adaptive loop filtering process,
a filtered reconstructed chroma picture sample array alfPicture$_{Cr}$,
a chroma location (xC, yC) specifying the top left sample of the current block of chroma samples relative to the top left sample of the current picture,
a width ccAlfWidth of block of chroma samples
a height ccAlfHeight of block of chroma samples
cross component filter coefficients CcAlfCoeff[j], with j=0 . . . 13

Output of this process is the modified filtered reconstructed chroma picture sample array ccAlfPicture.

The coding tree block luma location (xCtb, yCtb) is derived as follows:

xCtb=(((xC*SubWidthC)>>CtbLog2SizeY)<<CtbLog2SizeY yCtb=(((yC*SubHeightC)>>CtbLog2SizeY)<<CtbLog2SizeY For the derivation of the filtered reconstructed chroma samples ccAlfPicture[xC+x][yC+y], each reconstructed chroma sample inside the current chroma block of samples alfPicture$_C$[xC+x][yC+y] with x=0 . . . ccAlfWidth−1, y=0 . . . ccAlfHeight−1, is filtered as follows:

The luma location (x$_L$, y$_L$) corresponding to the current chroma sample at chroma location (xC+x, yC+y) is set equal to ((xC+x)*SubWidthC, (yC+y)*SubHeightC)

The luma locations (h$_{xL+i}$, v$_{yL+j}$) with i=−2 . . . 2, j=−2 . . . 3 inside the array recPicture$_L$ are derived as follows:

If pps_loop_filter_across_virtual_boundaries_disabled_flag is equal to 1, and PpsVirtualBoundariesPosX[n] % CtbSizeY is not equal to 0, and xL−PpsVirtualBoundariesPosX[n] is greater than or equal to 0 and less than 3 for any n=0 . . . pps_num_ver_virtual_boundaries−1, the following applies:

h$_{xL+i}$=Clip3(PpsVirtualBoundariesPosX[n], pic_width_in_luma_samples−1,xL+i)

Otherwise, if pps_loop_filter_across_virtual_boundaries_disabled_flag is equal to 1, and PpsVirtualBoundariesPosX[n] % CtbSizeY is not equal to 0, and PpsVirtualBoundariesPosX[n]−xL is greater than 0 and less than 4 for any n=0 . . . pps_num_ver_virtual_boundaries−1, the following applies:

h$_{x+i}$=Clip3(0,PpsVirtualBoundariesPosX[n]−1,xL+i)

Otherwise, the following applies:

h$_{x+i}$=Clip3(0,pic_width_in_luma_samples−1,xL+i)

If pps_loop_filter_across_virtual_boundaries_disabled_flag is equal to 1, and PpsVirtualBoundariesPosY[n] % CtbSizeY is not equal to 0, and yL−PpsVirtualBoundariesPosY[n] is greater than or equal to 0 and less than 3 for any n=0 . . . pps_num_hor_virtual_boundaries−1, the following applies:

v$_{y+j}$=Clip3(PpsVirtualBoundariesPosY[n],pic_height_in_luma_samples−1,yL+j)

Otherwise, if pps_loop_filter_across_virtual_boundaries_disabled_flag is equal to 1, and PpsVirtualBoundariesPosY[n] % CtbSizeY is not equal to 0, and PpsVirtualBoundariesPosY[n]−yL is greater than 0 and less than 4 for any n=0 . . . pps_num_hor_virtual_boundaries−1, the following applies:

v$_{y+j}$=Clip3(0,PpsVirtualBoundariesPosY[n]−1,yL+j)

Otherwise, the following applies:

v$_{y+j}$=Clip3(0,pic_height_in_luma_samples−1,yL+j)

The variables clipLeftPos, clipRightPos, clipTopPos and clipBottomPos are derived by invoking the ALF boundary position derivation process as specified below with (xCtb, yCtb) and (xL−xCtb, yL−yCtb) as inputs.

The vertical sample position offsets yM2, yM1, yP1, yP2 and yP3 are specified in Table 22 according to the vertical luma sample position yL, clipLeftPos and clipRightPos.

The horizontal sample position offsets xM1, xM2, xP1 and xP2 are specified in Table 23 according to the horizontal luma sample position xL, clipLeftPos and clipRightPos.

The variable curr is derived as follows:

$$curr = alfPicture_C[xC+x, yC+y]$$

The array of cross component filter coefficients f[j] is derived as follows with j=0 . . . 13:

$$f[j] = CcAlfCoeff[1]$$

The variable sum is derived as follows:

$$\begin{aligned}sum = &f[0]*recPicture_L[h_x, v_{y+yM2}] + f[1]*recPicture_L\\&[h_{x+xM1}, v_{y+yM1}] + f[2]*recPicture_L[h_x, v_{y+yM1}] + f[3]\\&*recPicture_L[h_{x+xP1}, v_{y+yM1}] + f[4]*recPicture_L\\&[x_{x+xM2}, v_y] + f[5]*recPicture_L[h_{x+xM1}, v_y] + f[6]\\&*recPicture_L[h_x, v_y] + f[7]*recPicture_L[h_{x+xP1}, v_y] + f\\&[4]*recPicture_L[h_{x+xP2}, v_y] + f[4]*recPicture_L\\&[h_{x+xM2}, v_{y+yP1}] + f[8]*recPicture_L[h_{x+xM1}, v_{y+yP1}] +\\&f[9]*recPicture_L[h_x, v_{y+yP1}] + f[10]*recPicture_L\\&[h_{x+xP1}, v_{y+yP1}] + f[4]*recPicture_L[h_{x+xP2}, v_{y+yP1}] + f\\&[11]*recPicture_L[h_{x+xM1}, v_{y+yP2}] + f[12]*recPicture_L[h_x, v_{y+yP2}] + f[13]*recPicture_L[h_{x+xP1}, v_{y+yP2}] + f[0]*recPicture_L[h_x, v_{y+yP3}] + sum = curr +\\&(sum+64) >> 7)\end{aligned}$$

The modified filtered reconstructed chroma picture sample array ccAlfPicture[xC+x][yC+y] is derived as follows:

$$ccAlfPicture[xC+x][yC+y] = Clip3(0, (1<<BitDepth_C)-1, sum)$$

TABLE 22

| Condition | yM2 | yM1 | yP1 | yP2 | yP3 |
|---|---|---|---|---|---|
| yL = = clipTopPos + 1 | −1 | −1 | 1 | 2 | 3 |
| yL = = clipTopPos | 0 | 0 | 1 | 2 | 3 |
| yL = = clipBottomPos − 1 | −2 | −1 | 0 | 0 | 0 |
| yL = = clipBottomPos − 2 | −2 | −1 | 1 | 1 | 1 |
| yL = = clipBottomPos − 3 | −2 | −1 | 1 | 2 | 2 |
| Otherwise | −2 | −1 | 1 | 2 | 3 |

TABLE 23

| Condition | xM2 | xM1 | xP1 | xP2 |
|---|---|---|---|---|
| xL = = clipLeftPos + 1 | −1 | −1 | 1 | 2 |
| xL = = clipLeftPos | 0 | 0 | 1 | 2 |
| xL = = clipRightPos − 1 | −2 | −1 | 0 | 0 |
| xL = = clipRightPos − 2 | −2 | −1 | 1 | 1 |
| Otherwise | −2 | −1 | 1 | 2 |

ALF Boundary Position Derivation
 Inputs of this process are:
 a luma location (xCtb, yCtb) specifying the top-left sample of the current luma coding tree block relative to the top left sample of the current picture,
 a luma location (x, y) specifying the current sample relative to the top-left sample of the current luma coding tree block.
 Output of this process are:
 the left vertical boundary position clipLeftPos,
 the right vertical boundary position clipRightPos,
 the above horizontal boundary position clipTopPos,
 the below horizontal boundary position clipBottomPos.
 The variables clipLeftPos, clipRightPos, clipTopPos and clipBottomPos are set equal to −128.
 The variable clipTopPos is modified as follows:
 If the bottom boundary of the current coding tree block is not the bottom boundary of the picture and y−(Ctb-SizeY−4) is greater than or equal to 0, the variable clipTopPos is set equal to yCtb+CtbSizeY−4.
 Otherwise, if pps_loop_filter_across_virtual_boundaries_disabled_flag is equal to 1, and PpsVirtualBoundariesPosY[n] % CtbSizeY is equal to 0, and yCtb+y−PpsVirtualBoundariesPosY[n] is greater than or equal to 0 and less than 3 for any n=0 . . . pps_num_hor_virtual_boundaries−1, the following applies:

clipTopPos=PpsVirtualBoundariesPosY[n]

Otherwise, if y is less than 3, and the top boundary of the current coding tree block is not the top boundary of the picture, and one or more of the following conditions are true, the variable clipTopPos is set equal to yCtb:
  If the top boundary of the current coding tree block is the top boundary of the brick, and loop_filter_across_bricks_enabled_flag is equal to 0.
  If the top boundary of the current coding tree block is the top boundary of the slice, and loop_filter_across_slices_enabled_flag is equal to 0.
  If the top boundary of the current coding tree block is the top boundary of the subpicture, and loop_filter_across_subpic_enabled_flag[SubPicIdx] is equal to 0.
 The variable clipBottomPos is modified as follows:
 If the bottom boundary of the current coding tree block is not the bottom boundary of the picture and CtbSizeY−4−y is greater than 0 and is less than 4, the variable clipBottomPos is set equal to yCtb+CtbSizeY−4.
 Otherwise, if pps_loop_filter_across_virtual_boundaries_disabled_flag is equal to 1, PpsVirtualBoundariesPosY[n] % CtbSizeY is equal to 0, PpsVirtualBoundariesPosY[n] is not equal to pic_height_in_luma_samples−1 or 0, and PpsVirtualBoundariesPosY[n]−yCtb−y is greater than 0 and less than 4 for any n=0 . . . pps_num_hor_virtual_boundaries−1, the following applies:

clipBottomPos=PpsVirtualBoundariesPosY[n]

Otherwise, if CtbSizeY−y is less than 4, and the bottom boundary of the current coding tree block is not the bottom boundary of the picture, and one or more of the following conditions are true, the variable clipBottomPos is set equal to yCtb+CtbSizeY:
  If the bottom boundary of the current coding tree block is the bottom boundary of the brick, and loop_filter_across_bricks_enabled_flag is equal to 0.
  If the bottom boundary of the current coding tree block is the bottom boundary of the slice, and loop_filter_across_slices_enabled_flag is equal to 0.
  If the bottom boundary of the current coding tree block is the bottom boundary of the subpicture, and loop_filter_across_subpic_enabled_flag[SubPicIdx] is equal to 0.
 The variable clipLeftPos is modified as follows:
 If pps_loop_filter_across_virtual_boundaries_disabled_flag is equal to 1, and PpsVirtualBoundariesPosX[n] % CtbSizeY is equal to 0, and xCtb+x−PpsVirtualBoundariesPosX[n] is greater than or equal to 0 and less than 3 for any n=0 . . . pps_num_ver_virtual_boundaries−1, the following applies:

clipLeftPos=PpsVirtualBoundariesPosX[n]

Otherwise, if x is less than 3, the left boundary of the current coding tree block is not the left boundary of the picture and one or more of the following conditions are true, the variable clipLeftPos is set equal to xCtb:

If the left boundary of the current coding tree block is the left boundary of the brick, and loop_filter_across_bricks_enabled_flag is equal to 0.

If the left boundary of the current coding tree block is the left boundary of the slice, and loop_filter_across_slices_enabled_flag is equal to 0.

If the left boundary of the current coding tree block is the left boundary of the subpicture, and loop_filter_across_subpic_enabled_flag[SubPicIdx] is equal to 0.

The variable clipRightPos is modified as follows:

If pps_loop_filter_across_virtual_boundaries_disabled_flag is equal to 1, and PpsVirtualBoundariesPosX[n] % CtbSizeY is equal to 0, and PpsVirtualBoundariesPosX[n]−xCtb−x is greater than 0 and less than 4 for any n=0 . . . pps_num_ver_virtual_boundaries−1, the following applies:

clipRightPos=PpsVirtualBoundariesPosX[$n$]

Otherwise, if CtbSizeY−x is less than 4, and the right boundary of the current coding tree block is not the right boundary of the picture, and one or more of the following conditions are true, the variable clipRightPos is set equal to xCtb+CtbSizeY:

If the right boundary of the current coding tree block is the right boundary of the brick, and loop_filter_across_bricks_enabled_flag is equal to 0.

If the right boundary of the current coding tree block is the right boundary of the slice, and loop_filter_across_slices_enabled_flag is equal to 0.

if the right boundary of the current coding tree block is the right boundary of the subpicture, and loop_filter_across_subpic_enabled_flag[SubPicIdx] is equal to 0.

As described above, syntax elements may be entropy coded according to CABAC or the like. In one example, according to the techniques herein the binarization of alf_cross_component_cb_flag and/or alf_cross_component_cr_flag may be a fixed length, FL, binarization with a maximum value, cMax=1. Further, in one example, according to the techniques herein, for alf_cross_component_cb_flag and/or alf_cross_component_cr_flag two variables pStateIdx0 and pStateIdx1 corresponding to probability state indices for CABAC coding may be initialized as follows:

Table 24 and Table 25 contain the values of the 6 bit variable initValue used in the initialization of context variables that are assigned to syntax elements alf_cross_component_cb_flag and alf_cross_component_cr_flag. In Table 24 and Table 25 values of a variable ctxIdx are mapped to initValue and shiftIdx. It should be noted the in Table 24 and Table 25, the shiftIdx value is used to derive shifr values for a state transition process. Further, the value EP indicates equiprobable and corresponds to a value of 35 in JVET-02001.

TABLE 24

| Initialization | ctxIdx of alf_cross_component_cb_flag | | |
|---|---|---|---|
| variable | 0 | 1 | 2 |
| initValue | EP | EP | EP |
| shiftIdx | 0 | 0 | 0 |

TABLE 25

| Initialization | ctxIdx of alf_cross_component_cr_flag | | |
|---|---|---|---|
| variable | 0 | 1 | 2 |
| initValue | EP | EP | EP |
| shiftIdx | 0 | 0 | 0 |

From the 6 bit table entry initValue, the two 3 bit variables slopeIdx and offsetIdx are derived as follows:

slopeIdx=initValue>>3 offsetIdx=initValue & 7

The variables m and n, used in the initialization of context variables, are derived from slopeIdx and offsetIdx as follows:

$m$=slopeIdx−4

$n$=(offsetIdx*18)+1

The two values assigned to pStateIdx0 and pStateIdx1 for the initialization are derived from SliceQp$_Y$, which is derived as provided above:

Given the variables m and n, the initialization is specified as follows:

preCtxState=Clip3(1,127,(($m$*(Clip3(0,51,SliceQp$_Y$)−16))>>1)+$n$)

The two values assigned to pStateIdx0 and pStateIdx1 for the initialization are derived as follows:

pStateIdx0=preCtxState<<3 pStateIdx1=preCtxState<<7

The ctxIdx for which initialization is needed for each of the three initialization types, specified by the variable initType, are listed in Table 26. For P and B slice types, the derivation of initType depends on the value of the cabac_init_flag syntax element. The variable initType is derived as follows:

```
if( slice_type = = I )
    initType = 0
else if(slice_type = = P )
    initType = cabac_init_flag ? 2 : 1
else
    initType = cabac_init_flag ? 1 : 2
```

TABLE 26

| Syntax element | initType | | |
|---|---|---|---|
| | 0 | 1 | 2 |
| alf_cross_component_cb_flag[ ][ ] | 0 | 1 | 2 |
| alf_cross_component_cr_flag[ ][ ] | 0 | 1 | 2 |

From Table 26, a variable ctxIdxOffset is set equal to initType. The variable ctxIdx is set equal to the sum of ctxInc and ctxIdxOffset.

In one example, the assignment of ctxInc is specified as follows with condL and condA specified in Table 27:

For the syntax elements alf_cross_component_cb_flag[x0/CcAlfWidthCbL][y0/CcAlfHeightCbL] and alf_cross_component_cr_flag[x0/CcAlfWidthCrL][y0/CcAlfHeightCrL]:

ctxInc=(condL && availableL)+(condA && availableA)+ctxSetIdx*3

TABLE 27

| Syntax element | condL | condA | ctxSetIdx |
|---|---|---|---|
| alf_cross_component_cb_flag [ x0/CcAlfWidthCbL ] [ y0/CcAlfHeightCbL ] | alf_cross_component_cb_flag [ xNbL/CcAlfWidthCbL ] [ yNbL/CcAlfHeightCbL ] | alf_cross_component_cb_flag [ xNbA/CcAlfWidthCbL ] [ yNbA/CcAlfHeightCbL ] | 0 |
| alf_cross_component_cr_flag [ x0/CcAlfWidthCr ] [ y0/CcAlfHeightCrL ] | alf_cross_component_cr_flag [ xNbL/CcAlfWidthCrL ] [ yNbL/CcAlfHeightCrL ] | alf_cross_component_cr_flag [ xNbA/CcAlfWidthCrL ] [ yNbA/CcAlfHeightCrL ] | 0 |

With respect to Table 27, in one example, each of syntax elements in condL and/or condA may be compared with 0, e.g., a "==0" test may added.

In one example, according to the techniques herein, cross component filtering may include using filters having zero gain. In one example, the sum of coefficients for a zero gain filter is zero. It should be noted that a zero gain filter with the sum of coefficients being zero may provide better coding efficiency for a number of coefficients being signaled, because an unsignaled filter coefficient may be determined and used. That is, when the sum of coefficients for a zero gain filter is zero, the value for a coefficient of the filter may be derived if the value of remaining filter coefficients is known and as such, there is no need to explicitly signal one of the coefficient, leading to bit rate savings. Further, it should be noted that in other examples, a filter may be separated into two or more subsets of coefficients and the values of coefficients in each subset may be required to sum to a particular value (e.g., a value which is not necessarily 0). For example, in one example, a filter could be split (e.g., horizontally, vertically, or about a diagonal) into two halves of equal size. The coefficients in a first half could be constrained to sum to a predetermined value (for example, a fixed-point representation of 0.5) and the coefficients in the second half could be constrained to sum to minus the predetermined value. The predetermined value may also be zero.

Figure 20A:
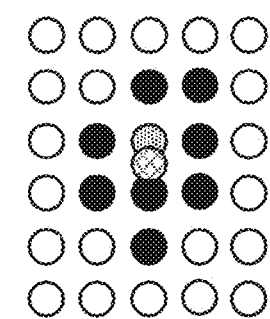
FIG. 20A is a conceptual diagram illustrating example of support samples which may be used for cross component filtering in accordance with one or more techniques of this disclosure.
Figure 20B:
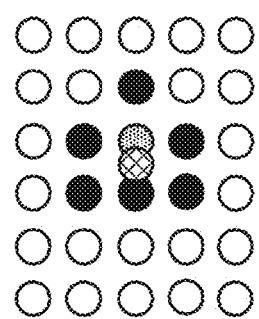
FIG. 20B is a conceptual diagram illustrating example of support samples which may be used for cross component filtering in accordance with one or more techniques of this disclosure.

FIGS. 20A-20B illustrate examples of zero gain filter with the sum of coefficients being zero. That is, as illustrated in FIGS. 20A-20B, for the number of filter support samples, N, N−1 coefficients are signaled and one coefficient is derived. It should be noted that the use of zero gain filters with the sum of coefficients being zero may be applied to any of the filter sizes and shapes described herein.

With respect to FIG. 20A, in one example, a corresponding filtering process may be based on the following:
Cross Component Filtering Process for Block of Chroma Samples
  Inputs of this process are:
    a reconstructed luma picture sample array recPicture$_L$ prior to the luma adaptive loop filtering process,
    a filtered reconstructed chroma picture sample array alfPicture$_{Cr}$,
    a chroma location (xC, yC) specifying the top left sample of the current block of chroma samples relative to the top left sample of the current picture,
    a width ccAlfWidth of block of chroma samples
    a height ccAlfHeight of block of chroma samples
    cross component filter coefficients CcAlfCoeff[j], with j=0.7
  Output of this process is the modified filtered reconstructed chroma picture sample array ccAlfPicture.
The coding tree block luma location (xCtb, yCtb) is derived as follows:

xCtb=(((xC*SubWidthC)>>CtbLog2SizeY)
    <<CtbLog2SizeY yCtb=(((yC*SubHeightC)>>CtbLog2SizeY)
    <<CtbLog2SizeY For the derivation of the filtered reconstructed chroma samples ccAlfPicture[xC+x][yC+y], each reconstructed chroma sample inside the current chroma block of samples alfPicture$_C$[xC+x][yC+y] with x=0 . . . ccAlfWidth−1, y=0 . . . ccAlfHeight−1, is filtered as follows:
  The luma location ($x_L$, $y_L$) corresponding to the current chroma sample at chroma location (xC+x, yC+y) is set equal to ((xC+x)*SubWidthC, (yC+y)*SubHeightC)
  The luma locations ($h_{xL+i}$, $v_{yL+j}$) with i=−1 . . . 1, j=−1 . . . 2 inside the array recPicture$_L$ are derived as follows:
    If pps_loop_filter_across_virtual_boundaries_disabled_flag is equal to 1, and PpsVirtualBoundariesPosX[n] % CtbSizeY is not equal to 0, and $x_L$−PpsVirtualBoundariesPosX[n] is greater than or equal to 0 and less than 3 for any n=0 . . . pps_num_ver_virtual_boundaries−1, the following applies:

$h_{x+i}$=Clip3(PpsVirtualBoundariesPosX[n],
    pic_width_in_luma_samples−1,xL+i)

Otherwise, if pps_loop_filter_across_virtual_boundaries_disabled_flag is equal to 1, and PpsVirtualBoundariesPosX[n] % CtbSizeY is not equal to 0, and PpsVirtualBoundariesPosX[n]−xL is greater than 0 and less than 4 for any n=0 . . . pps_num_ver_virtual_boundaries−1, the following applies:

$h_{x+i}$=Clip3(0,PpsVirtualBoundariesPosX[n]−1,xL+i)

Otherwise, the following applies:

$h_{x+i}$=Clip3(0,pic_width_in_luma_samples−1,xL+i)

If pps_loop_filter_across_virtual_boundaries_disabled_flag is equal to 1, and PpsVirtualBoundariesPosY[n] % CtbSizeY is not equal to 0, and yL−PpsVirtualBoundariesPosY[n] is greater than or equal to 0 and less than 3 for any n=0 . . . pps_num_hor_virtual_boundaries−1, the following applies:

$v_{y+j}$=Clip3(PpsVirtualBoundariesPosY[n],pic_height_in_luma_samples−1,yL+j)

Otherwise, if pps_loop_filter_across_virtual_boundaries_disabled_flag is equal to 1, and PpsVirtualBoundariesPosY[n] % CtbSizeY is not equal to 0, and PpsVirtualBoundariesPosY[n]−yL is greater than 0 and less than 4 for any n=0 . . . pps_num_hor_virtual_boundaries−1, the following applies:

$v_{y+j}$=Clip3(0,PpsVirtualBoundariesPosY[n]−1,yL+i)

Otherwise, the following applies:

$v_{y+j}$=Clip3(0,pic_height_in_luma_samples−1,yL+j)

The variables clipLeftPos, clipRightPos, clipTopPos and clipBottomPos are derived by invoking the ALF boundary position derivation process as specified below with (xCtb, yCtb) and (xL−xCtb, yL−yCtb) as inputs.

The vertical sample position offsets yM2, yM1, yP1, yP2 and yP3 are specified in Table 22 according to the vertical luma sample position $y_L$, clipLeftPos and clipRightPos.

The horizontal sample position offsets xM1, xM2, xP1 and xP2 are specified in Table 23 according to the horizontal luma sample position $x_L$, clipLeftPos and clipRightPos.

The variable curr is derived as follows:

curr=alfPicture$_C$[xC+x,yC+y]

The array of cross component filter coefficients f[j] is derived as follows with j=0 . . . 7:

f[j]=CcAlfCoeff[j]

The variable centerValue and sum are derived as follows:

centerValue=recPicture$_L$[$h_x,v_y$]

sum=f[0]*(recPicture$_L$[$h_x,v_{y+yM1}$]−centerValue)+f[1]*
(recPicture$_L$[$h_{x+xM1},v_y$]−centerValue)+f[2]*
(recPicture$_L$[$h_{x+xP1},v_y$]−centerValue)+f[3]*
(recPicture$_L$[$h_{x+xP1},v_y$]−centerValue)+f[4]*
(recPicture$_L$[$h_{x+xM1},v_{y+yP1}$]−centerValue)+f[5]*
(recPicture$_L$[$h_x,v_{y+yP1}$]−centerValue)+f[6]*
(recPicture$_L$[$h_{x+xP1},v_{y+yP1}$]−centerValue)+f[7]*
(recPicture$_L$[$h_x,v_{y+yP2}$]−centerValue)

sum=curr+(sum+64)>>7)

The modified filtered reconstructed chroma picture sample array ccAlfPicture[xC+x][yC+y] is derived as follows:

ccAlfPicture[xC+x][yC+y]=Clip3(0,(1<<BitDepth$_C$)−1,sum)

With respect to FIG. 20B, in one example, a corresponding filter process may be based on the following:
Cross Component Filtering Process for Block of Chroma Samples
  Inputs of this process are:
  a reconstructed luma picture sample array recPicture$_L$ prior to the luma adaptive loop filtering process,
  a filtered reconstructed chroma picture sample array alfPicture$_{Cr}$,
  a chroma location (xC, yC) specifying the top left sample of the current block of chroma samples relative to the top left sample of the current picture,
  a width ccAlfWidth of block of chroma samples
  a height ccAlfHeight of block of chroma samples
  cross component filter coefficients CcAlfCoeff[j], with j=0 . . . 5
  Output of this process is the modified filtered reconstructed chroma picture sample array ccAlfPicture.
  The coding tree block luma location (xCtb, yCtb) is derived as follows:

xCtb=(((xC*SubWidthC)>>CtbLog2SizeY)
  <<CtbLog2SizeY yCtb=(((yC*SubHeightC)>>CtbLog2SizeY)
  <<CtbLog2SizeY For the derivation of the filtered reconstructed chroma samples ccAlfPicture[xC+x][yC+y], each reconstructed chroma sample inside the current chroma block of samples alfPicture$_C$[xC+x][yC+y] with x=0 . . . ccAlfWidth−1, y=0 . . . ccAlfHeight−1, is filtered as follows:

The luma location ($x_L$, $y_L$) corresponding to the current chroma sample at chroma location (xC+x, yC+y) is set equal to ((xC+x)*SubWidthC, (yC+y)*SubHeightC)

The luma locations ($h_{xL+i}$, $v_{yL+j}$) with i=−1 . . . 1, j=−1 . . . 1 inside the array recPicture$_L$ are derived as follows:
  If pps_loop_filter_across_virtual_boundaries_disabled_flag is equal to 1, and PpsVirtualBoundariesPosX[n] % CtbSizeY is not equal to 0, and xL−PpsVirtualBoundariesPosX[n] is greater than or equal to 0 and less than 3 for any n=0 . . . pps_num_ver_virtual_boundaries−1, the following applies:

$h_{xL+i}$=Clip3(PpsVirtualBoundariesPosX[n],
  pic_width_in_luma_samples−1,xL+i)

Otherwise, if pps_loop_filter_across_virtual_boundaries_disabled_flag is equal to 1, and PpsVirtualBoundariesPosX[n] % CtbSizeY is not equal to 0, and PpsVirtualBoundariesPosX[n]−xL is greater than 0 and less than 4 for any n=0 . . . pps_num_ver_virtual_boundaries−1, the following applies:

$h_{x+i}$=Clip3(0,PpsVirtualBoundariesPosX[n]−1,xL+i)

Otherwise, the following applies:

$h_{x+i}$=Clip3(0,pic_width_in_luma_samples−1,xL+i)

If pps_loop_filter_across_virtual_boundaries_disabled_flag is equal to 1, and PpsVirtualBoundariesPosY[n] % CtbSizeY is not equal to 0, and yL−PpsVirtualBoundariesPosY[n] is greater than or equal to 0 and less than 3 for any n=0 . . . pps_num_hor_virtual_boundaries−1, the following applies:

$v_{y+j}$=Clip3(PpsVirtualBoundariesPosY[n],pic_height_in_luma_samples−1,yL+j)

Otherwise, if pps_loop_filter_across_virtual_boundaries_disabled_flag is equal to 1, and PpsVirtualBoundariesPosY[n] % CtbSizeY is not equal to 0, and PpsVirtualBoundariesPosY[n]−yL is greater than 0 and less than 4 for any n=0 . . . pps_num_hor_virtual_boundaries−1, the following applies:

$v_{y+j}$=Clip3(0,PpsVirtualBoundariesPosY[n]−1,yL+j)

Otherwise, the following applies:

$v_{y+j}$=Clip3(0,pic_height_in_luma_samples−1,yL+j)

The variables clipLeftPos, clipRightPos, clipTopPos and clipBottomPos are derived by invoking the ALF boundary position derivation process as specified below with (xCtb, yCtb) and (xL−xCtb, yL−yCtb) as inputs.

The vertical sample position offsets yM2, yM1, yP1, yP2 and yP3 are specified in Table 22 according to the vertical luma sample position $y_L$, clipLeftPos and clipRightPos.

The horizontal sample position offsets xM1, xM2, xP1 and xP2 are specified in Table 23 according to the horizontal luma sample position xL, clipLeftPos and clipRightPos.

The variable curr is derived as follows:

curr=alfPicture$_C$[xC+x,yC+y]

The array of cross component filter coefficients f[j] is derived as follows with j=0 . . . 5:

f[j]=CcAlfCoeff[j]

The variable centerValue and sum are derived as follows:

$$centerValue = recPicture_L[h_x, v_y]$$

$$sum = f[0]*(recPicture_L[h_x, v_{y+yM1}] - centerValue) + f[1]*$$
$$(recPicture_L[h_{x+xM1}, v_y] - centerValue) + f[2]*$$
$$(recPicture_L[h_{x+xP1}, v_y] - centerValue) + f[3]*$$
$$(recPicture_L[h_{x+xM1}, v_{y+yP1}] - centerValue) + f[4]*$$
$$(recPicture_L[h_x, v_{y+yP1}] - centerValue) + f[5]*$$
$$(recPicture_L[h_{x+xP1}, v_{y+yP1}] - centerValue) +$$
$$sum = curr + (sum+64) >> 7)$$

The modified filtered reconstructed chroma picture sample array ccAlfPicture[xC+x][yC+y] is derived as follows:

$$ccAlfPicture[xC+x][yC+y] = Clip3(0, (1 << BitDepth_C) - 1, sum)$$

"Versatile Video Coding (Draft 7)," 16th Meeting of ISO/IEC JTC1/SC29/WG11 1-11 Oct. 2019, Geneva, CH, document JVET-P2001-vE, which is incorporated by reference herein, and referred to as JVET-P2001, is an update to JVET-O2001 and represents the current iteration of the draft text of a video coding specification corresponding to the VVC project. JVET-P2001 includes a picture header syntax structure which includes information that is common for all slices of the coded picture associated with the picture (PH). Table 28 illustrates the portion of the syntax structure of the picture header provided in JVET-P2001 which is relevant to filtering operations.

TABLE 28

| | Descriptor |
|---|---|
| picture_header_rbsp( ) { | |
| ... | |
|   if( sps_sao_enabled_flag ) { | |
|     pic_sao_enabled_present_flag | u(1) |
|     if( pic_sao_enabled_present_flag ) { | |
|       pic_sao_luma_enabled_flag | u(1) |
|       if(ChromaArrayType != 0 ) | |
|         pic_sao_chroma_enabled_flag | u(1) |
|     } | |
|   } | |
|   if( sps_alf_enabled_flag ) { | |
|     pic_alf_enabled_present_flag | u(1) |
|     if( pic_alf_enabled_present_flag ) { | |
|       pic_alf_enabled_flag | u(1) |
|       if( pic_alf_enabled_flag ) { | |
|         pic_num_alf_aps_ids_luma | u(3) |
|         for( i = 0; i < pic_num_alf_aps_ids_luma; i++ ) | |
|           pic_alf_aps_id_luma[ i ] | u(3) |
|         if( ChromaArrayType != 0 ) | |
|           pic_alf_chroma_idc | u(2) |
|         if( pic_alf_chroma_idc ) | |
|           pic_alf_aps_id_chroma | u(3) |
|       } | |
|     } | |
|   } | |
|   if ( !pps_dep_quant_enabled_flag ) | |
|     pic_dep_quant_enabled_flag | u(1) |
|   if( !pic_dep_quant_enabled_flag ) | |
|     sign_data_hiding_enabled_flag | u(1) |
|   if( deblocking_filter_override_enabled_flag ) { | |
|     pic_deblocking_filter_override_present_flag | u(1) |
|     if( pic_deblocking_filter_override_present_flag ) { | |
|       pic_deblocking_filter_override_flag | u(1) |
|       if( pic_deblocking_filter_override_flag ) { | |
|         pic_deblocking_filter_disabled_flag | u(1) |
|         if( !pic_deblocking_filter_disabled_flag ) { | |
|           pic_beta_offset_div2 | se(v) |
|           pic_tc_offset_div2 | se(v) |
|         } | |
|       } | |
|     } | |
|   } | |

TABLE 28-continued

| | Descriptor |
|---|---|
| ... | |
|   rbsp_trailing_bits( ) | |
| } | |

With respect to Table 28, JVET-P2001 provides the following semantics:

The PH contains information that is common for all slices of the coded picture associated with the PH.

. . .

pic_sao_enabled_present_flag equal to 1 specifies that pic_sao_luma_flag and pic_sao_chroma_flag are present in the PH. pic_sao_enabled_present_flag equal to 0 specifies that pic_sao_luma_flag and pic_sao_chroma_flag are not present in the PH. When pic_sao_enabled_present_flag is not present, it is inferred to be equal to 0.

pic_sao_luma_flag equal to 1 specifies that SAO is enabled for the luma component in all slices associated with the PH; pic_sao_luma_flag equal to 0 specifies that SAO for the luma component may be disabled for one, or more, or all slices associated with the PH. When pic_sao_luma_flag is not present, it is inferred to be equal to 0.

pic_sao_chroma_flag equal to 1 specifies that SAO is enabled for the chroma component in all slices associated with the PH; pic_sao_chroma_flag equal to 0 specifies that SAO for chroma component may be disabled for one, or more, or all slices associated with the PH. When pic_sao_chroma_flag is not present, it is inferred to be equal to 0.

pic_alf_enabled_present_flag equal to 1 specifies that pic_alf_enabled_flag, pic_num_alf_aps_ids_luma, pic_alf_aps_id_luma[i], pic_alf_chroma_ide, and pic_alf_aps_id_chroma are present in the PH. pic_alf_enabled_present_flag equal to 0 specifies that pic_alf_enabled_flag, pic_num_alf_aps_ids_luma, pic_alf_aps_id_luma[i], pic_alf_chroma_ide, and pic_alf_aps_id_chroma are not present in the PH. When pic_alf_enabled_present_flag is not present, it is inferred to be equal to 0.

pic_alf_enabled_flag equal to 1 specifies that adaptive loop filter is enabled for all slices associated with the PH and may be applied to Y, Cb, or Cr colour component in the slices. pic_alf_enabled_flag equal to 0 specifies that adaptive loop filter may be disabled for one, or more, or all slices associated with the PH. When not present, pic_alf_enabled_flag is inferred to be equal to 0.

pic_num_alf_aps_ids_luma specifies the number of ALF APSs that the slices associated with the PH refers to.

pic_alf_aps_id_luma[i] specifies the adaptation_parameter_set_id of the i-th ALF APS that the luma component of the slices associated with the PH refers to.

The value of alf_luma_filter_signal_flag of the APS NAL unit having aps_params_type equal to ALF_APS and adaptation_parameter_set_id equal to pic_alf_aps_id_luma[i] shall be equal to 1.

pic_alf_chroma_idc equal to 0 specifies that the adaptive loop filter is not applied to Cb and Cr colour components. pic_alf_chroma_idc equal to 1 indicates that the adaptive loop filter is applied to the Cb colour component. pic_alf_chroma_idc equal to 2 indicates that the adaptive loop filter is applied to the Cr colour component. pic_alf_chroma_idc equal to 3 indicates that the adaptive loop filter is applied to Cb and Cr colour components. When pic_alf_chroma_idc is not present, it is inferred to be equal to 0.

pic_alf_aps_id_chroma specifies the adaptation_parameter_set_id of the ALF APS that the chroma component of the slices associated with the PH refers to.

The value of alf_chroma_filter_signal_flag of the APS NAL unit having aps_params_type equal to ALF_APS and adaptation_parameter_set_id equal to pic_alf_aps_id_chroma shall be equal to 1.

pic_dep_quant_enabled_flag equal to 0 specifies that dependent quantization is disabled for slices associated with the PH. pic_dep_quant_enabled_flag equal to 1 specifies that dependent quantization is enabled for slices associated with the PH. When not present, the value of pic_dep_quant_enabled_flag is inferred to be equal to pps_dep_quant_enable_idc−1.

sign_data_hiding_enabled_flag equal to 0 specifies that sign bit hiding is disabled. sign_data_hiding_enabled_flag equal to 1 specifies that sign bit hiding is enabled. When sign_data_hiding_enabled_flag is not present, it is inferred to be equal to 0.

pic_deblocking_filter_override_present_flag equal to 1 specifies that pic_deblocking_filter_override_flag is present in the PH. pic_deblocking_filter_override_present_flag equal to 0 specifies that pic_deblocking_filter_override_flag is not present in the PH. When pic_deblocking_filter_override_present_flag is not present, it is inferred to be equal to 0.

pic_deblocking_filter_override_flag equal to 1 specifies that deblocking parameters are present in the PH. pic_deblocking_filter_override_flag equal to 0 specifies that deblocking parameters are not present in the PH. When not present, the value of pic_pic_deblocking_filter_override_flag is inferred to be equal to 0.

pic_deblocking_filter_disabled_flag equal to 1 specifies that the operation of the deblocking filter is not applied for the slices associated with the PH. pic_deblocking_filter_disabled_flag equal to 0 specifies that the operation of the deblocking filter is applied for the slices associated with the PH. When pic_deblocking_filter_disabled_flag is not present, it is inferred to be equal to pps_deblocking_filter_disabled_flag.

pic_beta_offset_div2 and pic_tc_offset_div2 specify the deblocking parameter offsets for β and tC (divided by 2) for the slices associated with the PH. The values of pic_beta_offset_div2 and pic_tc_offset_div2 shall both be in the range of −6 to 6, inclusive. When not present, the values of pic_beta_offset_div2 and pic_tc_offset_div2 are inferred to be equal to pps_beta_offset_div2 and pps_tc_offset_div2, respectively.

In one example, according to the techniques herein, an implementation of cross component filtering utilizing a picture header syntax structure may be based on the following syntax and semantics:

TABLE 29

|  | Descriptor |
|---|---|
| picture_header_rbsp( ) { |  |
| ... |  |
|   if( sps_sao_enabled_flag ) { |  |
|     pic_sao_enabled_present_flag | u(1) |
|     if( pic_sao_enabled_present_flag ) { |  |
|       pic_sao_luma_enabled_flag | u(1) |
|       if(ChromaArrayType != 0 ) |  |
|         pic_sao_chroma_enabled_flag | u(1) |
|     } |  |
|   } |  |
|   if( sps_alf_enabled_flag ) { |  |
|     pic_alf_enabled_present_flag | u(1) |
|     if( pic_alf_enabled_present_flag ) { |  |
|       pic_alf_enabled_flag | u(1) |
|       if( pic_alf_enabled_flag ) { |  |
|         pic_num_alf_aps_ids_luma | u(3) |
|         for( i = 0; i < pic_num_alf_aps_ids_luma; i++ ) |  |
|           pic_alf_aps_id_luma[ i ] | u(3) |
|         if( ChromaArrayType != 0 ) |  |
|           pic_alf_chroma_idc | u(2) |
|         if( pic_alf_chroma_idc ) |  |
|           pic_alf_aps_id_chroma | u(3) |
|       } |  |
|       pic_cross_component_alf_cb_enabled_flag | u(1) |
|       if( pic_cross_component_alf_cb_enabled_flag ) { |  |
|         pic_cross_component_alf_cb_aps_id | u(3) |
|         pic_cross_component_cb_filters_signalled_minus1 | ue(v) |
|       } |  |
|       pic_cross_component_alf_cr_enabled_flag | u(1) |
|       if( pic_cross_component_alf_cr_enabled_flag ) { |  |
|         pic_cross_component_alf_cr_aps_id | u(3) |
|         pic_cross_component_cr_filters_signalled_minus1 | ue(v) |
|       } |  |
|     } |  |
|   } |  |
|   if ( !pps_dep_quant_enabled_flag ) |  |
|     pic_dep_quant_enabled_flag | u(1) |
|   if( !pic_dep_quant_enabled_flag ) |  |
|     sign_data_hiding_enabled_flag | u(1) |
|   if( deblocking_filter_override_enabled_flag ) { |  |
|     pic_deblocking_filter_override_present_flag | u(1) |
|     if( pic_deblocking_filter_override_present_flag ) { |  |
|       pic_deblocking_filter_override_flag | u(1) |
|       if( pic_deblocking_filter_override_flag ) { |  |
|         pic_deblocking_filter_disabled_flag | u(1) |
|         if( !pic_deblocking_filter_disabled_flag ) { |  |
|           pic_beta_offset_div2 | se(v) |
|           pic_tc_offset_div2 | se(v) |
|         } |  |
|       } |  |
|     } |  |
|   } |  |
| ... |  |
|   rbsp_trailing_bits( ) |  |
| } |  |

TABLE 30

|  | Descriptor |
|---|---|
| alf_data( ) { |  |
|   alf_luma_filter_signal_flag | u(1) |
|   alf_chroma_filter_signal_flag | u(1) |
|   alf_cross_component_cb_filter_signal_flag | u(1) |
|   alf_cross_component_cr_filter_signal_flag | u(1) |
|   if( alf_luma_filter_signal_flag ) { |  |
|     alf_luma_clip_flag | u(1) |
|     alf_luma_num_filters_signalled_minus1 | ue(v) |
|     if( alf_luma_num_filters_signalled_minus1 > 0 ) { |  |
|       for( filtIdx = 0; filtIdx < NumAlfFilters; filtIdx++ ) |  |
|         alf_luma_coeff_delta_idx[ filtIdx ] | u(v) |
|     } |  |

TABLE 30-continued

|  | Descriptor |
|---|---|
| ```
      for( sfIdx = 0; sfIdx <= alf_luma_num_filters_signalled_minus1; sfIdx++ ) {
        for( j = 0; j < 12; j++ ) {
          alf_luma_coeff_abs[ sfIdx ][ j ]
``` | uek(v) |
| ```
          if( alf_luma_coeff_abs[ sfIdx ][ j ] )
            alf_luma_coeff_sign[ sfIdx ][ j ]
``` | u(1) |
| ```
        }
      }
      if( alf_luma_clip_flag ) {
        for( sfIdx = 0; sfIdx <= alf_luma_num_filters_signalled_minus1; sfIdx++ ) {
          for( j = 0; j < 12; j++ )
            alf_luma_clip_idx[ sfidx ][ j ]
``` | u(2) |
| ```
        }
      }
    }
    if( alf_chroma_filter_signal_flag ) {
      alf_chroma_num_alt_filters_minus1
``` | ue(v) |
| ```
      for( altIdx = 0; altIdx <= alf_chroma_num_alt_filters_minus1; altIdx++ ) {
        alf_chroma_clip_flag[ altIdx ]
``` | u(1) |
| ```
        for( j = 0; j < 6; j++ ) {
          alf_chroma_coeff_abs[ altIdx ][ j ]
``` | uek(v) |
| ```
          if( alf_chroma_coeff_abs[ altIdx ][ j ] > 0 )
            alf_chroma_coeff_sign[ altIdx ][ j ]
``` | u(1) |
| ```
        }
        if( alf_chroma_clip_flag[ altIdx ] ) {
          for( j = 0; j < 6; j++ )
            alf_chroma_clip_idx[ altIdx ][ j ]
``` | u(2) |
| ```
        }
      }
    }
    if ( alf_cross_component_cb_filter_signal_flag ) {
      alf_cross_component_cb_filters_signalled_minus1
``` | ue(v) |
| ```
      for( k = 0; k < (alf_cross_component_cb_filters_signalled_minus1+1); k++ ) {
        for( j = 0; j < 8; j++ )
          alf_cross_component_cb_coeff_plus32[ k ][ j ]
``` | u(6) |
| ```
      }
    }
    if ( alf_cross_component_cr_filter_signal_flag ) {
      alf_cross_component_cr_filters_signalled_minus1
``` | ue(v) |
| ```
      for( k = 0; k < (alf_cross_component_cr_filters_signalled_minus1+1); k++ ) {
        for ( j = 0; j < 8; j++ )
          alf_cross_component_cr_coeff_plus32[ k ][ j ]
``` | u(6) |
| ```
      }
    }
  }
}
``` | |

TABLE 31

|  | Descriptor |
|---|---|
| ```
slice_header( ) {
...
  if ( slice_type != I ) {
  ...
    if( cabac_init_present_flag )
      cabac_init_flag
``` | u(1) |
| ```
  ...
  }
  ...
  slice_qp_delta
``` | se(v) |
| ```
  ...
  if( sps_sao_enabled_flag && !pic_sao_enabled_present_flag ) {
    slice_sao_luma_flag
``` | u(1) |
| ```
    if( ChromaArrayType != 0 )
      slice_sao_chroma_flag
``` | u(1) |
| ```
  }
  if( sps_alf_enabled_flag && !pic_alf_enabled_present_flag) {
    slice_alf_enabled_flag
``` | u(1) |
| ```
    if( slice_alf_enabled_flag ) {
      slice_num_alf_aps_ids_luma
``` | u(3) |
| ```
      for( i = 0; i < slice_num_alf_aps_ids_luma; i++ )
        slice_alf_aps_id_luma[ i ]
``` | u(3) |
| ```
      if( ChromaArrayType != 0 )
        slice_alf_chroma_idc
``` | u(2) |
| ```
      if( slice_alf_chroma_idc )
        slice_alf_aps_id_chroma
``` | u(3) |

TABLE 31-continued

| | Descriptor |
|---|---|
| `  }`<br>`  if( ChromaArrayType != 0 )`<br>`    slice_cross_component_alf_cb_enabled_flag` | u(1) |
| `  if( slice_cross_component_alf_cb_enabled_flag ) {`<br>`    slice_cross_component_alf_cb_aps_id` | u(3) |
| `    slice_cross_component_cb_filters_signalled_minus1` | ue(v) |
| `  }`<br>`  if( ChromaArrayType != 0 )`<br>`    slice_cross_component_alf_cr_enabled_flag` | u(1) |
| `  if( slice_cross_component_alf_cr_enabled_flag ) {`<br>`    slice_cross_component_alf_cr_aps_id` | u(3) |
| `    slice_cross_component_cr_filters_signalled_minus1` | ue(v) |
| `  }`<br>`}`<br>`...`<br>`  byte_alignment( )`<br>`}` | |

TABLE 32

| | Descriptor |
|---|---|
| `coding_tree_unit( ) {`<br>`  xCtb = CtbAddrX << CtbLog2SizeY`<br>`  yCtb = CtbAddrY << CtbLog2SizeY`<br>`  if( slice_sao_luma_flag || slice_sao_chroma_flag )`<br>`    sao( CtbAddrX, CtbAddrY )`<br>`  if( slice_alf_enabled_flag ){`<br>`    alf_ctb_flag[ 0 ][ CtbAddrX ][ CtbAddrY ]` | ae(v) |
| `    if( alf_ctb_flag[ 0 ][ CtbAddrX ][ CtbAddrY ] ) {`<br>`      if( slice_num_alf_aps_ids_luma > 0 )`<br>`        alf_use_aps_flag` | ae(v) |
| `      if( alf_use_aps_flag ) {`<br>`        if( slice_num_alf_aps_ids_luma > 1 )`<br>`          alf_luma_prev_filter_idx` | ae(v) |
| `      } else`<br>`        alf_luma_fixed_filter_idx` | ae(v) |
| `    }`<br>`    if( slice_alf_chroma_idc == 1 || slice_alf_chroma_idc == 3 ) {`<br>`      alf_ctb_flag[ 1 ][ CtbAddrX ][ CtbAddrY ]` | ae(v) |
| `      if( alf_ctb_flag[ 1 ][ CtbAddrX ][ CtbAddrY ]`<br>`         && aps_alf_chroma_num_alt_filters_minus1 > 0 )`<br>`        alf_ctb_filter_alt_idx[ 0 ][ CtbAddrX ][ CtbAddrY ]` | ae(v) |
| `    }`<br>`    if( slice_alf_chroma_idc == 2 || slice_alf_chroma_idc == 3 ) {`<br>`      alf_ctb_flag[ 2 ][ CtbAddrX ][ CtbAddrY ]` | ae(v) |
| `      if( alf_ctb_flag[ 2 ][ CtbAddrX ][ CtbAddrX ]`<br>`         && aps_alf_chroma_num_alt_filters_minus1 > 0 )`<br>`        alf_ctb_filter_alt_idx[ 1 ][ CtbAddrX ][ CtbAddrX ]` | ae(v) |
| `    }`<br>`  }`<br>`  if ( slice_cross_component_alf_cb_enabled_flag )`<br>`    alf_ctb_cross_component_cb_idc[ CtbAddrX ][ CtbAddrY ]` | ae(v) |
| `  if ( slice_cross_component_alf_cr_enabled_flag )`<br>`    alf_ctb_cross_component_cr_idc[ CtbAddrX ][ CtbAddrY ]` | ae(v) |
| `  if( slice_type == I && qtbtt_dual_tree_intra_flag )`<br>`    dual_tree_implicit_qt_split ( xCtb, yCtb, CtbSizeY, 0 )`<br>`  else`<br>`    coding_tree( xCtb, yCtb, CtbSizeY, CtbSizeY, 1, 1, 0, 0, 0, 0, 0,`<br>`          SINGLE_TREE, MODE_TYPE_ALL )`<br>`}` | |

With respect to Tables 29-32, in one example, the semantics may be based on the semantics provided above and the following:

pic_alf_enabled_present_flag equal to 1 specifies that pic_alf_enabled_flag, pic_num_alf_aps_ids_luma, pic_alf_aps_id_luma[i], pic_alf_chroma_idc, pic_alf_aps_id_chroma, pic_cross_component_alf_cb_enabled_flag, pic_cross_component_alf_cb_aps_id, pic_cross_component_cb_filters_signaled_minus1, pic_cross_component_alf_cr_enabled_flag, pic_cross_component_alf_cr_aps_id, and pic_cross_component_cr_filters_signaled_minus1 are present in the PH. pic_alf_enabled_present_flag equal to 0 specifies that pic_alf_enabled_flag, pic_num_alf_aps_ids_luma, pic_alf_aps_id_luma[i], pic_alf_chroma_idc, pic_alf_aps_id_chroma, pic_cross_component_alf_cb_enabled_flag, pic_cross_component_alf_cb_aps_id, pic_cross_component_cb_filters_signaled_minus1, pic_cross_component_alf_cr_enabled_flag, pic_cross_component_alf_cr_aps_id, and pic_cross_component_cr_filters_signaled_minus1 are not present in the PH. When pic_alf_enabled_present_flag is not present, it is inferred to be equal to 0.

pic_cross_component_alf_cb_enabled_flag equal to 1 specifies that cross component Cb filter is enabled for all slices associated with the PH and may be applied to Cb colour component in the slices. pic_cross_component_alf_cb_enabled_flag equal to 0 specifies that cross component Cb filter may be disabled for one, or more, or all slices associated with the PH. When not present, pic_cross_component_alf_cb_enabled_flag is inferred to be equal to 0.

pic_cross_component_alf_cb_aps_id specifies the adaptation_parameter_set_id of the ALF APS that the Cb colour component of the slices associated with the PH refers to.

The value of alf_cross_component_cb_filter_signal_flag of the APS NAL unit having aps_params_type equal to ALF_APS and adaptation_parameter_set_id equal to pic_cross_component_alf_cb_aps_id shall be equal to 1.

pic_cross_component_cb_filters_signaled_minus1 plus 1 specifies the number of cross component Cb filters. The value of pic_cross_component_cb_filters_signaled_minus1 shall be in the range 0 to 3

When pic_cross_component_alf_cb_enabled_flag equal to 1, it is a requirement of bitstream conformance that pic_cross_component_cb_filters_signaled_minus1 shall be less than or equal to the value of alf_cross_component_cb_filters_signaled_minus1 in the referenced ALF APS referred to by pic_cross_component_alf_cb_aps_id.

pic_cross_component_alf_cr_enabled_flag equal to 1 specifies that cross component Cr filter is enabled for all slices associated with the PH and may be applied to Cr colour component in the slices. pic_cross_component_alf_cr_enabled_flag equal to 0 specifies that cross component Cr filter may be disabled for one, or more, or all slices associated with the PH. When not present, pic_cross_component_alf_cr_enabled_flag is inferred to be equal to 0.

pic_cross_component_alf_cr_aps_id specifies the adaptation_parameter_set_id of the ALF APS that the Cr colour component of the slices associated with the PH refers to.

The value of alf_cross_component_cr_filter_signal_flag of the APS NAL unit having aps_params_type equal to ALF_APS and adaptation_parameter_set_id equal to pic_cross_component_alf_cr_aps_id shall be equal to 1.

pic_cross_component_cr_filters_signaled_minus1 plus 1 specifies the number of cross component Cr filters. The value of pic_cross_component_cr_filters_signaled_minus1 shall be in the range 0 to 3

When pic_cross_component_alf_cr_enabled_flag equal to 1, it is a requirement of bitstream conformance that pic_cross_component_cr_filters_signaled_minus1 shall be less than or equal to the value of alf_cross_component_cr_filters_signaled_minus1 in the referenced ALF APS referred to by pic_cross_component_alf_cr_aps_id.

alf_luma_filter_signal_flag equal to 1 specifies that a luma filter set is signaled. alf_luma_filter_signal_flag equal to 0 specifies that a luma filter set is not signaled.

alf_chroma_filter_signal_flag equal to 1 specifies that a chroma filter is signaled. alf_chroma_filter_signal_flag equal to 0 specifies that a chroma filter is not signaled. When ChromaArrayType is equal to 0, alf_chroma_filter_signal_flag shall be equal to 0.

The values of alf_luma_filter_signal_flag, alf_chroma_filter_signal_flag, alf_cross_component_cb_filter_signal_flag and alf_cross_component_cr_filter_signal_flag shall not all be equal to 0.

The variable NumAlfFilters specifying the number of different adaptive loop filters is set equal to 25.

alf_cross_component_eb_filter_signal_flag equal to 1 specifies that a cross component Cb filter is signaled. alf_cross_component_cb_filter_signal_flag equal to 0 specifies that a cross component Cb filter is not signaled. When ChromaArrayType is equal to 0, alf_cross_component_cb_filter_signal_flag shall be equal to 0.

alf_cross_component_eb_filters_signaled_minus1 plus 1 specifies the number of cross component Cb filters signaled in the current ALF APS. The value of alf_cross_component_eb_filters_signaled_minus1 shall be in the range 0 to 3.

alf_cross_component_cb_coeff_plus32[k][j] minus 32 specifies the value of the j-th coefficient of the signaled k-th cross-component Cb filter set. When alf_cross_component_cb_coeff_plus32[k][j] is not present, it is inferred to be equal to 32.

The signaled k-th cross component Cb filter coefficients CcAlfApsCoeff$_{Cb}$[adaptation_parameter_set_id][k] with elements CcAlfApsCoeff$_{Cb}$[adaptation_parameter_set_id][k][ ], with i=0 . . . 7 are derived as follows:

CcAlfApsCoeff$_{Cb}$[adaptation_parameter_set_id][$k$][$j$]=alf_cross_component_cb_coeff_plus32[$k$][$j$]−32 alf_cross_component_cr_filter_signal_flag equal to 1 specifies that a cross component Cr filter is signaled. alf_cross_component_cr_filter_signal_flag equal to 0 specifies that a cross component Cr filter is not signaled. When ChromaArrayType is equal to 0, alf_cross_component_cr_filter_signal_flag shall be equal to 0.

alf_cross_component_cr_filters_signaled_minus1 plus 1 specifies the number of cross component Cr filters signaled in the current ALF APS. The value of alf_cross_component_cr_filters_signaled_minus1 shall be in the range 0 to 3.

alf_cross_component_cr_coeff_plus32[k][j] minus 32 specifies the value of the j-th coefficient of the signaled k-th cross-component Cr filter set. When alf_cross_component_cr_coeff_abs[k][j] is not present, it is inferred to be equal to 32.

The signaled k-th cross component Cr filter coefficients CcAlfApsCoeff$_{Cr}$[adaptation_parameter_set_id][k] with elements CcAlfApsCoeff$_{Cr}$[adaptation_parameter_set_id][k][j], with j=0 . . . 7 are derived as follows:

CcAlfApsCoeff$_{Cr}$[adaptation_parameter_set_id][$k$][$j$]=alf_cross_component_cr_coeff_plus32[$k$][$j$]−32 slice_cross_component_alf_cb_enabled_flag equal to 0 specifies that the cross component Cb filter is not applied to Cb colour component. slice_cross_component_alf_cb_enabled_flag equal to 1 indicates that the cross component Cb filter is applied to the Cb colour component. When slice_cross_component_alf_cb_enabled_flag is not present, it is inferred to be equal to pic_cross_component_alf_cb_enabled_flag.

slice_cross_component_alf_cb_aps_id specifies the adaptation_parameter_set_id that the Cb colour component of the slice refers to. The TemporalId of the APS NAL unit having aps_params_type equal to ALF_APS and adaptation_parameter_set_id equal to slice_cross_component_alf_cb_aps_id shall be less than or equal to the TemporalId of the coded slice NAL unit. When slice_cross_component_alf_cb_enabled_flag is equal to 1 and slice_cross_component_alf_cb_aps_id is not present, the value of slice_cross_component_alf_cb_aps_id is inferred to be equal to the value of pic_cross_component_alf_cb_aps_id.

The value of alf_cross_component_cb_filter_signal_flag of the APS NAL unit having aps_params_type equal to ALF_APS and adaptation_parameter_set_id equal to slice_cross_component_alf_cb_aps_id shall be equal to 1.

slice_cross_component_cb_filters_signaled_minus1 plus 1 specifies the number of cross component Cb filters. The value of slice_cross_component_cb_filters_signaled_minus1 shall be in the range 0 to 3. When slice_cross_component_alf_cb_enabled_flag is equal to 1 and slice_cross_component_cb_filters_signaled_minus1 is not present, the value of slice_cross_component_cb_filters_signaled_minus1 is inferred to be equal to the value of pic_cross_component_cb_filters_signaled_minus1.

When slice_cross_component_alf_cb_enabled_flag equal to 1, it is a requirement of bitstream conformance that slice_cross_component_cb_filters_signaled_minus1 shall be less than or equal to the value of alf_cross_component_cb_filters_signaled_minus1 in the ALF APS referred to by slice_cross_component_alf_cb_aps_id of current slice.

slice_cross_component_alf_cr_enabled_flag equal to 0 specifies that the cross component Cr filter is not applied to Cr colour component. slice_cross_component_alf_cb_enabled_flag equal to 1 indicates that the cross component adaptive loop filter is applied to the Cr colour component. When slice_cross_component_alf_cr_enabled_flag is not present, it is inferred to be equal to pic_cross_component_alf_cr_enabled_flag.

slice_cross_component_alf_cr_aps_id specifies the adaptation_parameter_set_id that the Cr colour component of the slice refers to. The TemporalId of the APS NAL unit having aps_params_type equal to ALF_APS and adaptation_parameter_set_id equal to slice_cross_component_alf_cr_aps_id shall be less than or equal to the TemporalId of the coded slice NAL unit. When slice_cross_component_alf_cr_enabled_flag is equal to 1 and slice_cross_component_alf_cr_aps_id is not present, the value of slice_cross_component_alf_cr_aps_id is inferred to be equal to the value of pic_cross_component_alf_cr_aps_id.

The value of alf_cross_component_cr_filter_signal_flag of the APS NAL unit having aps_params_type equal to ALF_APS and adaptation_parameter_set_id equal to slice_cross_component_alf_cr_aps_id shall be equal to 1.

slice_cross_component_cr_filters_signaled_minus1 plus 1 specifies the number of cross component Cr filters. The value of slice_cross_component_cr_filters_signaled_minus1 shall be in the range 0 to 3. When slice_cross_component_alf_cr_enabled_flag is equal to 1 and slice_cross_component_cr_filters_signaled_minus1 is not present, the value of slice_cross_component_cr_filters_signaled_minus1 is inferred to be equal to the value of pic_cross_component_cr_filters_signaled_minus1.

When slice_cross_component_alf_cr_enabled_flag equal to 1, it is a requirement of bitstream conformance that slice_cross_component_cr_filters_signaled_minus1 shall be less than or equal to the value of alf_cross_component_cr_filters_signaled_minus1 in the referenced ALF APS referred to by slice_cross_component_alf_cr_aps_id of current slice.

alf_ctb_cross_component_cb_idc [xCtb>>CtbLog2SizeY][yCtb>>CtbLog2SizeY] equal to 0 indicates that the cross component Cb filter is not applied to block of Cb colour component samples at luma location (xCtb, yCtb). alf_cross_component_cb_idc [xCtb>>CtbLog2SizeY][yCtb>>CtbLog2SizeY] not equal to 0 indicates that the alf_cross_component_cb_idc [xCtb>>CtbLog2SizeY][yCtb>>CtbLog2SizeY]-th cross component Cb filter is applied to the block of Cb colour component samples at luma location (xCtb, yCtb). When alf_ctb_cross_component_cb_idc[xCtb>>CtbLog2SizeY][yCtb>>CtbLog2SizeY] is not present, it is inferred to be equal to 0.

alf_ctb_cross_component_cr_idc [xCtb>>CtbLog2SizeY][yCtb>>CtbLog2SizeY] equal to 0 indicates that the cross component Cr filter is not applied to block of Cr colour component samples at luma location (xCtb, yCtb). alf_cross_component_cr_idc [xCtb>>CtbLog2SizeY][yCtb>>CtbLog2SizeY] not equal to 0 indicates that the alf_cross_component_cr_idc [xCtb>>CtbLog2SizeY][yCtb>>CtbLog2SizeY]-th cross component Cr filter is applied to the block of Cr colour component samples at luma location (xCtb, yCtb). When alf_ctb_cross_component_cr_idc[xCtb>>CtbLog2SizeY][yCtb>>CtbLog2SizeY] is not present, it is inferred to be equal to 0.

In one example, according to the techniques herein, for example, with respect to the syntax and semantics provided above with respect to Tables 29-32, an adaptive loop filter process may be performed based on the following:

Inputs of this process are the reconstructed picture sample array prior to adaptive loop filter recPicture$_L$ and, when ChromaArrayType is not equal to 0, the arrays recPicture$_{Cb}$ and recPicture$_{Cr}$.

Outputs of this process are the modified reconstructed picture sample array after adaptive loop filter alfPicture$_L$ and, when ChromaArrayType is not equal to 0, the arrays ccAlfPicture$_{Cb}$ and ccAlfPicture$_{Cr}$.

The sample values in the modified reconstructed picture sample array after adaptive loop filter alfPicture$_L$ and, when ChromaArrayType is not equal to 0, the arrays alfPicture$_{Cb}$ and alfPicture$_{Cr}$, are initially set equal to the sample values in the reconstructed picture sample array prior to adaptive loop filter recPicture$_L$ and, when ChromaArrayType is not equal to 0, the arrays recPicture$_{Cb}$ and recPicture$_{Cr}$, respectively.

The following ordered steps apply:

For every coding tree unit with luma coding tree block location (rx, ry), where rx=0 . . . PicWidthInCtbsY−1 and ry=0 . . . PicHeightInCtbsY−1, the following applies:

When alf_ctb_flag[0][rx][ry] is equal to 1, the coding tree block filtering process for luma samples as specified is invoked with recPicture$_L$, alfPicture$_L$, and the luma coding tree block location (xCtb, yCtb) set equal to (rx<<CtbLog2SizeY, ry<<CtbLog2SizeY) as inputs, and the output is the modified filtered picture alfPicture$_L$.

When ChromaArrayType is not equal to 0 and alf_ctb_flag[1][rx][ry] is equal to 1, the coding tree block filtering process for chroma samples as specified is invoked with recPicture set equal to recPicture$_{Cb}$, alfPicture set equal to alfPicture$_{Cb}$, the chroma coding tree block location (xCtbC, yCtbC) set equal to ((rx<<CtbLog2SizeY)/SubWidthC, (ry<<CtbLog2SizeY)/SubHeightC), and the alternative chroma filter index altIdx set equal to alf_ctb_filter_alt_idx[0][rx][ry] as inputs, and the output is the modified filtered picture alfPicture$_{Cb}$.

When ChromaArrayType is not equal to 0 and alf_ctb_flag[2][rx][ry] is equal to 1, the coding tree block filtering process for chroma samples as specified is invoked with recPicture set equal to recPicture$_{Cr}$, alfPicture set equal to alfPicture$_{Cr}$, the chroma coding tree block location (xCtbC, yCtbC) set equal to ((rx<<CtbLog2SizeY)/SubWidthC, (ry<<CtbLog2SizeY)/SubHeightC), and the alternative chroma filter index altIdx set equal to alf_ctb_filter_alt_idx[0][rx][ry] as inputs, and the output is the modified filtered picture alfPicture$_{Cr}$.

When ChromaArrayType is not equal to 0, the sample values in the arrays ccAlfPicture$_{Cb}$ and ccAlfPicture$_{Cr}$ are set equal to the sample values in the arrays alfPicture$_{Cb}$ and alfPicture$_{Cr}$, respectively.

For every coding tree unit with luma coding tree block location (rx, ry), where rx=0 . . . PicWidthInCtbsY−1 and ry=0 . . . PicHeightInCtbsY−1, the following applies:

When ChromaArrayType is not equal to 0 and alf_etb_cross_component_cb_idc[rx][ry] is not equal to 0, the cross component filtering process for block of chroma samples as specified below is invoked with recPicture$_L$ set equal to recPicture$_L$, alfPicture$_C$ set equal to alfPicture$_{Cb}$, the chroma coding tree block location (xCtbC, yCtbC) set equal to ((rx<<CtbLog2SizeY)/SubWidthC, (ry<<CtbLog2SizeY)/SubHeightC)), the luma coding tree block location (xCtb, yCtb) set equal to (rx<<CtbLog2SizeY, ry<<CtbLog2SizeY), ccAlfWidth set equal to (1<<<<CtbLog2SizeY)/SubWidthC, ccAlfHeight set equal to (1<<<<CtbLog2SizeY)/SubHeightC, and the cross component filter coefficients CcAlfCoeff[j] set equal to CcAlfCoeff$_{Cb}$[slice_cross_component_alf_cb_aps_id][alf_ctb_cross_component_cb_idc [rx][ry]−1][j], with j=0 . . . 7, as inputs, and the output is the modified filtered picture ccAlfPicture$_{Cb}$.

When ChromaArrayType is not equal to 0 and alf_ctb_cross_component_cr_idc[rx][ry] is not equal to 0, the cross component filtering process for block of chroma samples as specified below is invoked with recPicture$_L$ set equal to recPicture$_L$, alfPicture$_C$ set equal to alfPicture$_{Cr}$, the chroma coding tree block location (xCtbC, yCtbC) set equal to ((rx<<CtbLog2SizeY)/SubWidthC, (ry<<CtbLog2SizeY)/SubHeightC)), the luma coding tree block location (xCtb, yCtb) set equal to (rx<<CtbLog2SizeY, ry<<CtbLog2SizeY), ccAlfWidth set equal to (1<<CtbLog2SizeY)/SubWidthC, ccAlfHeight set equal to (1<<<<CtbLog2SizeY)/SubHeightC, and the cross component filter coefficients CcAlfCoeff[j] set equal to CcAlfCoeff$_{Cr}$[slice_cross_component_alf_cr_aps_id][alf_ctb_cross_component_cr_idc [rx][ry]−1][j], with j=0 . . . 7, as inputs, and the output is the modified filtered picture ccAlfPicture$_{Cr}$.

Cross Component Filtering Process for Block of Chroma Samples

Inputs of this process are:
a reconstructed luma picture sample array recPicture$_L$ prior to the luma adaptive loop filtering process,
a filtered reconstructed chroma picture sample array alfPicture$_{Cr}$,
a chroma location (xCtbC, yCtbC) specifying the top-left sample of the current chroma coding tree block relative to the top left sample of the current picture,
a luma location (xCtb, yCtb) specifying the top-left sample of the current luma coding tree block relative to the top left sample of the current picture
a width ccAlfWidth of block of chroma samples
a height ccAlfHeight of block of chroma samples
cross component filter coefficients CcAlfCoeff[i], with j=0 . . . 7

Output of this process is the modified filtered reconstructed chroma picture sample array ccAlfPicture. For the derivation of the filtered reconstructed chroma samples ccAlfPicture[xCtbC+x][yCtbC+y], each reconstructed chroma sample inside the current chroma block of samples alfPicture$_C$[xCtbC+x][yCtbC+y] with x=0 . . . ccAlfWidth−1, y=0 . . . ccAlfHeight−1, is filtered as follows:

The luma location (xL, yL) corresponding to the current chroma sample at chroma location (xCtbC+x, yCtbC+y) is set equal to ((xCtbC+x)*SubWidthC, (yCtbC+y)*SubHeightC)

The luma locations ($h_{xL+i}$, $v_{yL+j}$) with i=−1 . . . 1, j=−1 . . . 2 inside the array recPicture$_L$ are derived as follows:

If pps_loop_filter_across_virtual_boundaries_disabled_flag is equal to 1, and PpsVirtualBoundariesPosX[n] % CtbSizeY is not equal to 0, and xL−PpsVirtualBoundariesPosX[n] is greater than or equal to 0 and less than 3 for any n=0 . . . pps_num_ver_virtual_boundaries−1, the following applies:

$h_{xL+i}$=Clip3(PpsVirtualBoundariesPosX[$n$], pic_width_in_luma_samples−1,$xL+i$)

Otherwise, if pps_loop_filter_across_virtual_boundaries_disabled_flag is equal to 1, and PpsVirtualBoundariesPosX[n] % CtbSizeY is not equal to 0, and PpsVirtualBoundariesPosX[n]−x$_L$ is greater than 0 and less than 4 for any n=0 . . . pps_num_ver_virtual_boundaries−1, the following applies:

$h_{x+i}$=Clip3(0,PpsVirtualBoundariesPosX[$n$]−1,$xL+i$)

Otherwise, the following applies:

$h_{x+i}$=Clip3(0,pic_width_in_luma_samples−1,$xL+i$)

If pps_loop_filter_across_virtual_boundaries_disabled_flag is equal to 1, and PpsVirtualBoundariesPosY[n] % CtbSizeY is not equal to 0, and yL−PpsVirtualBoundariesPosY[n] is greater than or equal to 0 and less than 3 for any n=0 . . . pps_num_hor_virtual_boundaries−1, the following applies:

$v_{y+j}$=Clip3(PpsVirtualBoundariesPosY[$n$],pic_height_in_luma_samples−1,$yL+j$)

Otherwise, if pps_loop_filter_across_virtual_boundaries_disabled_flag is equal to 1, and PpsVirtualBoundariesPosY[n] % CtbSizeY is not equal to 0, and PpsVirtualBoundariesPosY[n]−yL is greater than 0 and less than 4 for any n=0 . . . pps_num_hor_virtual_boundaries−1, the following applies:

$v_{y+j}$=Clip3(0,PpsVirtualBoundariesPosY[$n$]−1,$yL+j$)

Otherwise, the following applies:

$v_{y+j}$=Clip3(0,pic_height_in_luma_samples−1,$yL+j$)

The variables clipLeftPos, clipRightPos, clipTopPos and clipBottomPos are derived by invoking the ALF boundary position derivation process as specified below with (xCtb, yCtb) and (xL−xCtb, yL−yCtb) as inputs.

The vertical sample position offsets yM1, yP1 and yP2 are specified in Table 33 according to the vertical luma sample position y$_L$, clipLeftPos and clipRightPos.

The horizontal sample position offsets xM1 and xP1 are specified in Table 34 according to the horizontal luma sample position x$_L$, clipLeftPos and clipRightPos.

The variable curr is derived as follows:

curr=alfPicture$_C$[xCtbC+$x$,yCtbC+$y$]

The array of cross component filter coefficients f[j] is derived as follows with j=0 . . . 7:

$f[j]$=CcAlfCoeff[$j$]

The variable sum is derived as follows:

$$sum = f[0]*recPicture_L[h_{x},v_{y+yM1}] + f[1]*recPicture_L[h_{x+xM1},v_y] + f[2]*recPicture_L[h_x,v_y] + f[3]*recPicture_L[h_{x+xP1},v_y] + f[4]*recPicture_L[h_{x+xM1},v_{y+yP1}] + f[5]*recPicture_L[h_x,v_{y+yP1}] + f[6]*recPicture_L[h_{x+xP1},v_{y+yP1}] + f[7]*recPicture_L[h_x,v_{y+yP2}]$$

$$deltaBitDepth = BitDepth_Y - BitDepth_C$$

$$scaledSum = (sum + (1 << (6 + deltaBitDepth))) >> (7 + deltaBitDepth)$$

$$scaledSum = Clip3(-(1<<(BitDepth_C-1)),(1<<(BitDepth_C-1))-1,scaledSum)$$

$$sum = curr + scaledSum$$

The modified filtered reconstructed chroma picture sample array ccAlfPicture[xCtbC+x][yCtbC+y] is derived as follows:

$$ccAlfPicture[xCtbC+x][yCtbC+y] = Clip3(0,(1<<BitDepth_C)-1,sum)$$

TABLE 33

| Condition | yM1 | yP1 | yP2 |
|---|---|---|---|
| yL = = clipTopPos + 1 | −1 | 1 | 1 |
| yL = = clipTopPos | 0 | 0 | 1 |
| yL = = clipBottomPos − 1 | 0 | 0 | 1 |
| yL = = clipBottomPos − 2 | −1 | 1 | 1 |
| Otherwise | −1 | 1 | 2 |

TABLE 34

| Condition | xM1 | xP1 |
|---|---|---|
| xL = = clipLeftPos | 0 | 0 |
| xL = = clipRightPos − 1 | 0 | 0 |
| xL = = clipRightPos − 2 | −1 | 1 |
| Otherwise | −1 | 1 |

It should be noted that the implementation of cross component filtering based on the syntax and semantics provided for Tables 29-32 provides an 8 tap filter. U.S. Provisional Application No. 62/913,065, filed on Oct. 9, 2019, each of which are incorporated by reference, provides an example implementation of a corresponding 6 tap filter.

In one example, according to the techniques herein, an ALF boundary position derivation process may be based on the following, where an input includes a virtual boundary offset vbOffset specifying the distance in luma samples between the bottom boundary of the current coding tree block and a virtual boundary.

ALF Boundary Position Derivation
  Inputs of this process are:
    a luma location (xCtb, yCtb) specifying the top-left sample of the current luma coding tree block relative to the top left sample of the current picture,
    a luma location (x, y) specifying the current sample relative to the top-left sample of the current luma coding tree block.
  Output of this process are:
    the left vertical boundary position clipLeftPos,
    the right vertical boundary position clipRightPos,
    the above horizontal boundary position clipTopPos,
    the below horizontal boundary position clipBottomPos,
    the top left boundary flag clipTopLeftFlag,
    the bottom right boundary flag clipBotRightFlag.

The variables clipLeftPos, clipRightPos, clipTopPos and clipBottomPos are set equal to −128.
The variables clipTopLeftFlag and clipBotRightFlag are both set equal to 0.
The variable clipTopPos is modified as follows:
  If y−(CtbSizeY−4) is greater than or equal to 0, the variable clipTopPos is set equal to yCtb+CtbSizeY−4.
  Otherwise, if VirtualBoundariesDisabledFlag is equal to 1, and yCtb+y−VirtualBoundariesPosY[n] is greater than or equal to 0 and less than 3 for any n=0 . . . VirtualBoundariesNumHor−1, the following applies:

clipTopPos=VirtualBoundariesPosY[n]

Otherwise, if y is less than 3 and one or more of the following conditions are true, the variable clipTopPos is set equal to yCtb:
    The top boundary of the current coding tree block is the top boundary of the tile, and loop_filter_across_tiles_enabled_flag is equal to 0.
    The top boundary of the current coding tree block is the top boundary of the slice, and loop_filter_across_slices_enabled_flag is equal to 0.
    The top boundary of the current coding tree block is the top boundary of the subpicture, and loop_filter_across_subpic_enabled_flag[SubPicIdx] is equal to 0.
The variable clipBottomPos is modified as follows:
  If VirtualBoundariesDisabledFlag is equal to 1, VirtualBoundariesPosY[n] is not equal to pic_height_in_luma_samples−1 or 0, and VirtualBoundariesPosY[n]−yCtb−y is greater than 0 and less than 5 for any n=0 . . . VirtualBoundariesNumHor−1, the following applies:

clipBottomPos=VirtualBoundariesPosY[n]

Otherwise, if CtbSizeY−4−y is greater than 0 and is less than 5, the variable clipBottomPos is set equal to yCtb+CtbSizeY−4.
  Otherwise, if CtbSizeY−y is less than 5, and one or more of the following conditions are true, the variable clipBottomPos is set equal to yCtb+CtbSizeY:
    The bottom boundary of the current coding tree block is the bottom boundary of the tile, and loop_filter_across_tiles_enabled_flag is equal to 0.
    The bottom boundary of the current coding tree block is the bottom boundary of the slice, and loop_filter_across_slices_enabled_flag is equal to 0.
    The bottom boundary of the current coding tree block is the bottom boundary of the subpicture, and loop_filter_across_subpic_enabled_flag[SubPicIdx] is equal to 0.
The variable clipLeftPos is modified as follows:
  If VirtualBoundariesDisabledFlag is equal to 1, and xCtb+x−VirtualBoundariesPosX[n] is greater than or equal to 0 and less than 3 for any n=0 . . . VirtualBoundariesNumVer−1, the following applies:

clipLeftPos=VirtualBoundariesPosX[n]

Otherwise, if x is less than 3, and one or more of the following conditions are true, the variable. clipLeftPos is set equal to xCtb:
    The left boundary of the current coding tree block is the left boundary of the tile, and loop_filter_across_tiles_enabled_flag is equal to 0.
    The left boundary of the current coding tree block is the left boundary of the slice, and loop_filter_across_slices_enabled_flag is equal to 0.

The left boundary of the current coding tree block is the left boundary of the subpicture, and loop_filter_across_subpic_enabled_flag[SubPicIdx] is equal to 0.

The variable clipRightPos is modified as follows:
If VirtualBoundariesDisabledFlag is equal to 1, and VirtualBoundariesPosX[n]−xCtb−x is greater than 0 and less than 5 for any n=0 . . . VirtualBoundariesNumVer−1, the following applies:
clipRightPos=VirtualBoundariesPosX[n]
Otherwise, if CtbSizeY−x is less than 5, and one or more of the following conditions are true, the variable clipRightPos is set equal to xCtb+CtbSizeY:
  The right boundary of the current coding tree block is the right boundary of the tile, and loop_filter_across_tiles_enabled_flag is equal to 0.
  The right boundary of the current coding tree block is the right boundary of the slice, and loop_filter_across_slices_enabled_flag is equal to 0.
  The right boundary of the current coding tree block is the right boundary of the subpicture, and loop_filter_across_subpic_enabled_flag[SubPicIdx] is equal to 0.

The variable clipTopLeftFlag and clipBotRightFlag are modified as following:
  If the coding tree block covering the luma position (xCtb, yCtb) and the coding tree block covering the luma position (xCtb−CtbSizeY, yCtb−CtbSizeY) belong to different slices, and loop_filter_across_slices_enabled_flag is equal to 0, clipTopLeftFlag is set equal to 1.
  If the coding tree block covering the luma position (xCtb, yCtb) and the coding tree block covering the luma position (xCtb+CtbSizeY, yCtb+CtbSizeY) belong to different slices, and loop_filter_across_slices_enabled_flag is equal to 0, clipBotRightFlag is set equal to 1.

As described above, syntax elements may be entropy coded according to CABAC or the like. In one example, according to the techniques herein the binarization of alf_cross_component_cb_idc[ ][ ] and/or alf_cross_component_cr_idc[ ][ ] may as provided in Table 35.

TABLE 35

| Syntax element | Binarization | |
|---|---|---|
| | Process | Input parameters |
| alf_ctb_cross_component_cb_idc[ ][ ] | TR | cMax = ( slice_cross_component_cb_filters_signalled_minus1 + 1 ), cRiceParam = 0 |
| alf_ctb_cross_component_cr_idc[ ][ ] | TR | cMax = ( slice_cross_component_cr_filters_signalled_minus1 + 1 ), cRiceParam = 0 |

Further, in one example, according to the techniques herein, for alf_cross_component_cb_idc[ ][ ] and/or alf_cross_component_cr_idc[ ][ ] two variables pStateIdx0 and pStateIdx1 corresponding to probability state indices for CABAC coding may be initialized as follows:

Table 36 and Table 37 contain the values of the 6 bit variable initValue used in the initialization of context variables that are assigned to syntax elements alf_cross_component_cb_flag and alf_cross_component_cr_flag. In Table 36 and Table 37 values of a variable ctxIdx are mapped to initValue and shiftIdx. It should be noted the in Table 36 and Table 37, the shiftIdx value is used to derive shifr values for a state transition process. Further, the value EP indicates equiprobable and corresponds to a value of 35 in JVET-P2001.

TABLE 36

| Initialization | ctxIdx of alf_ctb_cross_component_cb_idc | | | | | | | | |
|---|---|---|---|---|---|---|---|---|---|
| variable | 0 | 1 | 2 | 3 | 4 | 5 | 6 | 7 | 8 |
| initValue | EP | EP | EP | EP | EP | EP | EP | EP | EP |
| shiftIdx | 0 | 0 | 0 | 0 | 0 | 0 | 0 | 0 | 0 |

TABLE 37

| Initialization | ctxIdx of alf_ctb_cross_component_cr_idc | | | | | | | | |
|---|---|---|---|---|---|---|---|---|---|
| variable | 0 | 1 | 2 | 3 | 4 | 5 | 6 | 7 | 8 |
| initValue | EP | EP | EP | EP | EP | EP | EP | EP | EP |
| shiftIdx | 0 | 0 | 0 | 0 | 0 | 0 | 0 | 0 | 0 |

From the 6 bit table entry initValue, the two 3 bit variables slopeIdx and offsetIdx are derived as provided above.

The variables m and n, used in the initialization of context variables, are derived from slopeIdx and offsetIdx as provide above.

The two values assigned to pStateIdx0 and pStateIdx1 for the initialization are derived from SliceQp$_Y$, as provided above.

The two values assigned to pStateIdx0 and pStateIdx1 for the initialization are derived as provided above.

The etxIdx for which initialization is needed for each of the three initialization types, specified by the variable initType, are listed in Table 38. For P and B slice types, the derivation of initType depends on the value of the cabac_init_flag syntax element. The variable initType is derived as follows:

```
if( slice_type = = I )
    initType = 0
else if( slice_type = = P )
    initType = cabac_init_flag ? 2 : 1
```

-continued

```
else
    initType = cabac_init_flag ? 1 : 2
```

TABLE 38

| | initType | | |
|---|---|---|---|
| Syntax element | 0 | 1 | 2 |
| alf_cross_component_cb_flag[ ][ ] | 0 . . . 2 | 3 . . . 5 | 6 . . . 8 |
| alf_cross_component_cr_flag[ ][ ] | 0 . . . 2 | 3 . . . 5 | 6 . . . 8 |

From Table 38, a variable ctxIdxOffset is set equal to initType. The variable ctxIdx is set equal to the sum of ctxInc and ctxIdxOffset.

In one example, the assignment of ctxInc is specified as follows:

TABLE 39

| Syntax element | binIdx | | | | | |
|---|---|---|---|---|---|---|
| | 0 | 1 | 2 | 3 | 4 | >=5 |
| alf_ctb_cross_component_cb_idc[ ][ ] | 0...2 (Table 38) | bypass | bypass | bypass | bypass | bypass |
| alf_ctb_cross_component_cr_idc[ ][ ] | 0...2 (Table 38) | bypass | bypass | bypass | bypass | bypass |

For the syntax elements alf_ctb_cross_component_cb_idc[x0>>CtbLog2SizeY][y0>>CtbLog2SizeY], and alf_ctb_cross_component_cr_idc [x0>>CtbLog2SizeY][y0>>CtbLog2SizeY]: ctxInc= (condL && availableL)+(condA && availableA)+ctxSetIdx*3

TABLE 40

| Syntax element | condL | condA | ctxSetIdx |
|---|---|---|---|
| alf_ctb_cross_component_cb_idc [ x0 >> CtbLog2SizeY ] [ y0 >> CtbLog2SizeY ] | alf_ctb_cross_component_cb_idc [ xNbL >> CtbLog2SizeY ] [ yNbL >> CtbLog2SizeY ] | alf_ctb_cross_component_cb_idc [ xNbA >> CtbLog2SizeY ] [ yNbA >> CtbLog2SizeY ] | 0 |
| alf_ctb_cross_component_cr_idc [ x0 >> CtbLog2Size Y ] [ y0 >> CtbLog2SizeY ] | alf_ctb_cross_component_cr_idc [ xNbL >> CtbLog2SizeY ] [ yNbL >> CtbLog2SizeY ] | alf_ctb_cross_component_cr_idc [ xNbA >> CtbLog2SizeY ] [ yNbA >> CtbLog2SizeY ] | 0 |

In this manner, video encoder represents an example of a device configured to receive reconstructed sample data for a current component of video data, receiving reconstructed sample data for one or more additional components of video data, derive a cross component filter based on data associated with one or more additional components of video data, and apply a filter to the reconstructed sample data for a current component of video data based on the derived cross component filter and the reconstructed sample data for one or more additional components of video data.

Figure 17:
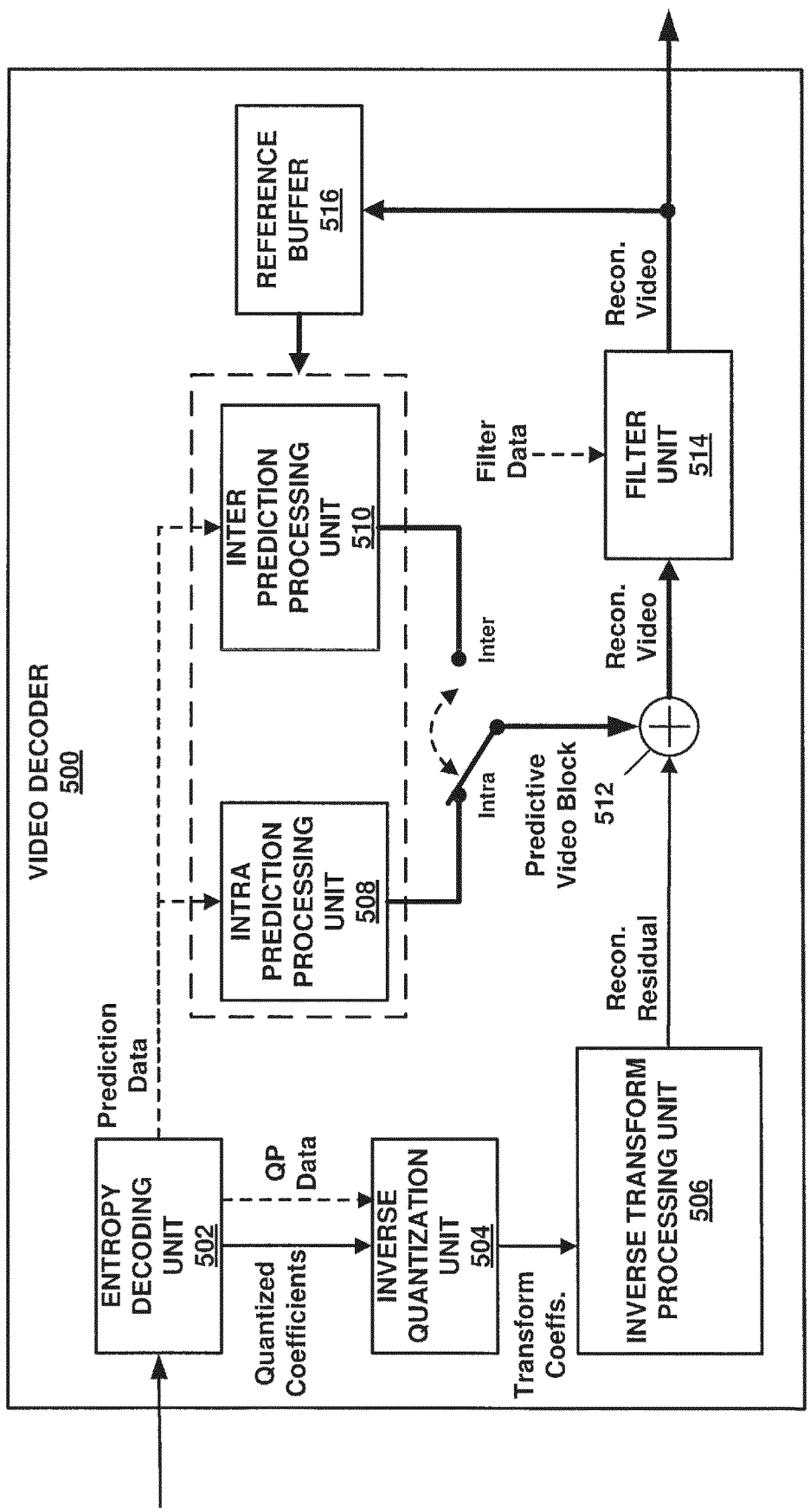
FIG. 17 is a block diagram illustrating an example of a video decoder that may be configured to decode video data according to one or more techniques of this disclosure.

FIG. 17 is a block diagram illustrating an example of a video decoder that may be configured to decode video data according to one or more techniques of this disclosure. In one example, video decoder 500 may be configured to reconstruct video data based on one or more of the techniques described above. That is, video decoder 500 may operate in a reciprocal manner to video encoder 200 described above. Video decoder 500 may be configured to perform intra prediction decoding and inter prediction decoding and, as such, may be referred to as a hybrid decoder. In the example illustrated in FIG. 18 video decoder 500 includes an entropy decoding unit 502, inverse quantization unit 504, inverse transformation processing unit 506, intra prediction processing unit 508, inter prediction processing unit 510, summer 512, filter unit 514, and reference buffer 516. Video decoder 500 may be configured to decode video data in a manner consistent with a video encoding system, which may implement one or more aspects of a video coding standard. It should be noted that although example video decoder 500 is illustrated as having distinct functional blocks, such an illustration is for descriptive purposes and does not limit video decoder 500 and/or subcomponents thereof to a particular hardware or software architecture. Functions of video decoder 500 may be realized using any combination of hardware, firmware, and/or software implementations.

As illustrated in FIG. 17, entropy decoding unit 502 receives an entropy encoded bitstream. Entropy decoding unit 502 may be configured to decode quantized syntax elements and quantized coefficients from the bitstream according to a process reciprocal to an entropy encoding process. Entropy decoding unit 502 may be configured to perform entropy decoding according any of the entropy coding techniques described above. Entropy decoding unit 502 may parse an encoded bitstream in a manner consistent with a video coding standard. Video decoder 500 may be configured to parse an encoded bitstream where the encoded bitstream is generated based on the techniques described above.

Referring again to FIG. 17, inverse quantization unit 504 receives quantized transform coefficients (i.e., level values) and quantization parameter data from entropy decoding unit 502. Quantization parameter data may include any and all combinations of delta QP values and/or quantization group size values and the like described above. Video decoder 500 and/or inverse quantization unit 504 may be configured to determine QP values used for inverse quantization based on values signaled by a video encoder and/or through video properties and/or coding parameters. That is, inverse quantization unit 504 may operate in a reciprocal manner to coefficient quantization unit 206 described above. For example, inverse quantization unit 504 may be configured to infer predetermined values), allowed quantization group sizes, and the like, according to the techniques described above. Inverse quantization unit 504 may be configured to apply an inverse quantization. Inverse transform processing unit 506 may be configured to perform an inverse transformation to generate reconstructed residual data. The techniques respectively performed by inverse quantization unit 504 and inverse transform processing unit 506 may be similar to techniques performed by inverse quantization/transform processing unit 208 described above. Inverse transform processing unit 506 may be configured to apply an inverse DCT, an inverse DST, an inverse integer transform, Non-Separable Secondary Transform (NSST), or a conceptually similar inverse transform processes to the transform coefficients in order to produce residual blocks in the pixel domain. Further, as described above, whether a particular transform (or type of particular transform) is performed may be dependent on an intra prediction mode. As illustrated in FIG. 17, reconstructed residual data may be provided to summer 512. Summer 512 may add reconstructed residual data to a predictive video block and generate reconstructed video data. A predictive video block may be determined according to a predictive video technique (i.e., intra prediction and inter frame prediction).

Intra prediction processing unit 508 may be configured to receive intra prediction syntax elements and retrieve a predictive video block from reference buffer 516. Reference buffer 516 may include a memory device configured to store one or more frames of video data. Intra prediction syntax elements may identify an intra prediction mode, such as the intra prediction modes described above. In one example, intra prediction processing unit 508 may reconstruct a video block using according to one or more of the intra prediction coding techniques described herein. Inter prediction processing unit 510 may receive inter prediction syntax elements and generate motion vectors to identify a prediction block in one or more reference frames stored in reference buffer 516. Inter prediction processing unit 510 may produce motion compensated blocks, possibly performing interpolation based on interpolation filters. Identifiers for interpolation filters to be used for motion estimation with sub-pixel precision may be included in the syntax elements. Inter prediction processing unit 510 may use interpolation filters to calculate interpolated values for sub-integer pixels of a reference block.

Filter unit 514 may be configured to perform filtering on reconstructed video data. For example, filter unit 514 may be configured to perform deblocking and/or SAO filtering, as described above with respect to filter unit 216. In example filter unit 514 may include cross component filter unit 600 described below. Further, it should be noted that in some examples, filter unit 514 may be configured to perform proprietary discretionary filter (e.g., visual enhancements). As illustrated in FIG. 17, a reconstructed video block may be output by video decoder 500.

Figure 18:
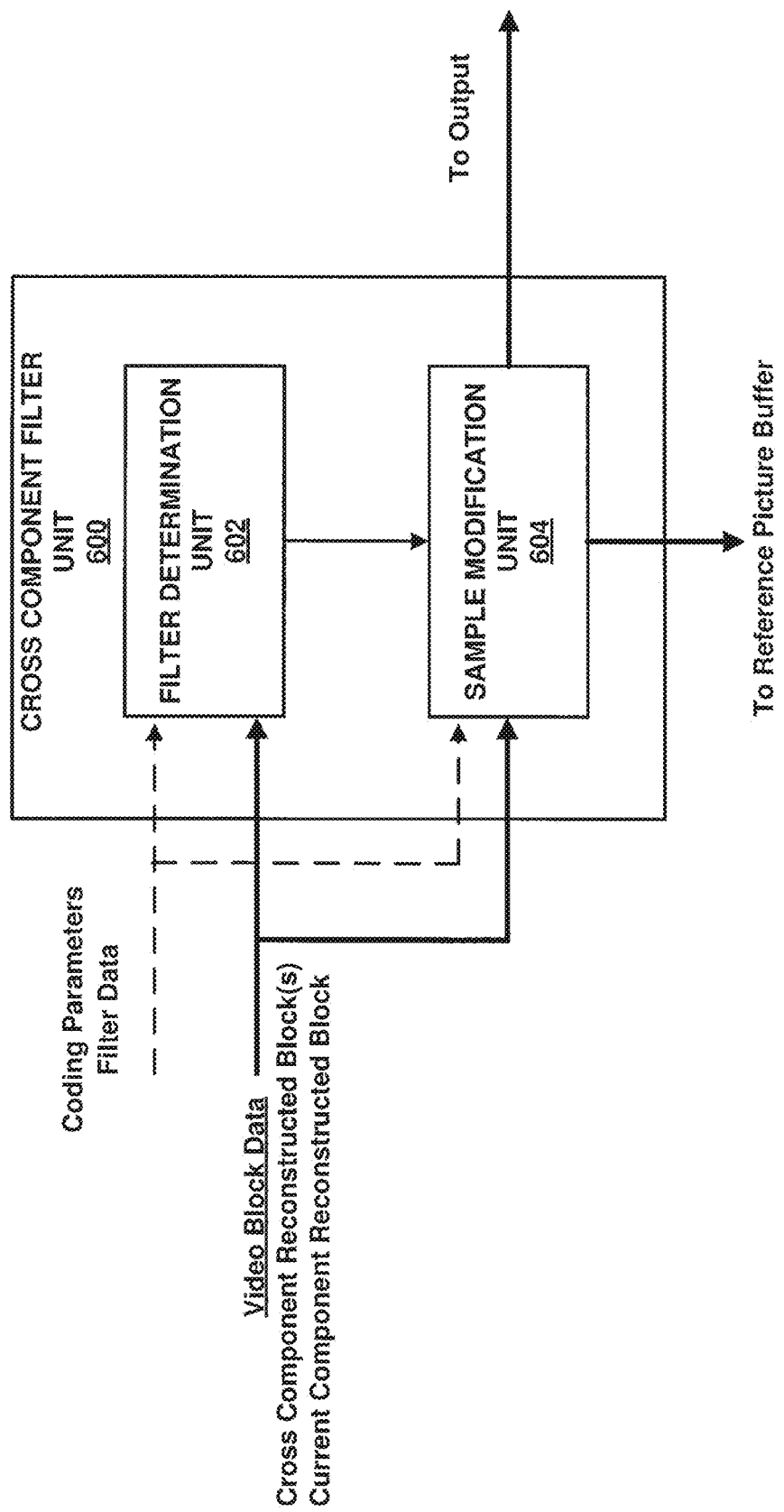
FIG. 18 is a block diagram illustrating an example of cross component filter unit that may be configured to encode video data according to one or more techniques of this disclosure.

As described above, FIG. 7 illustrates an example of a cross component filter unit that may be configured to encode video data according to one or more techniques of this disclosure. FIG. 18 illustrates an example of a cross component filter unit that may be configured to decode video data according to one or more techniques of this disclosure. That it, cross component filter unit 600 may operation in a reciprocal manner to cross component filter unit 300. As illustrated in FIG. 18, component filter unit 600 includes filter determination unit 602 and sample modification unit 604. Sample modification unit 604 may operate in a manner similar to sample modification unit 304. That is, sample modification unit 604 may perform filtering according to derived filter, include one or more of the filters describe herein. As illustrated in FIG. 18, sample modification unit 604 may output the modified reconstructed block to the reference picture buffer (i.e., as an in-loop filter) and output the modified reconstructed block to an output (e.g., a display). Filter determination unit 602 may receive coding parameter information (e.g., an intra prediction) available at the time a current block is decoded and available video block data which, as illustrated in FIG. 18, at a video decoder, may include: Cross Component Reconstructed Block(s) and Current Component Reconstructed Block. However, as illustrated in FIG. 18 filter determination unit 602 may receive filter data. That is, filter data specifying a derived filter may be signaled to the filter determination unit 602. Examples of such signaling are described above. As such, filter determination unit 302 may derive a filter to be used on the chroma reconstructed block based on the video data, coding parameters and/or filter data.

Figure 19A:
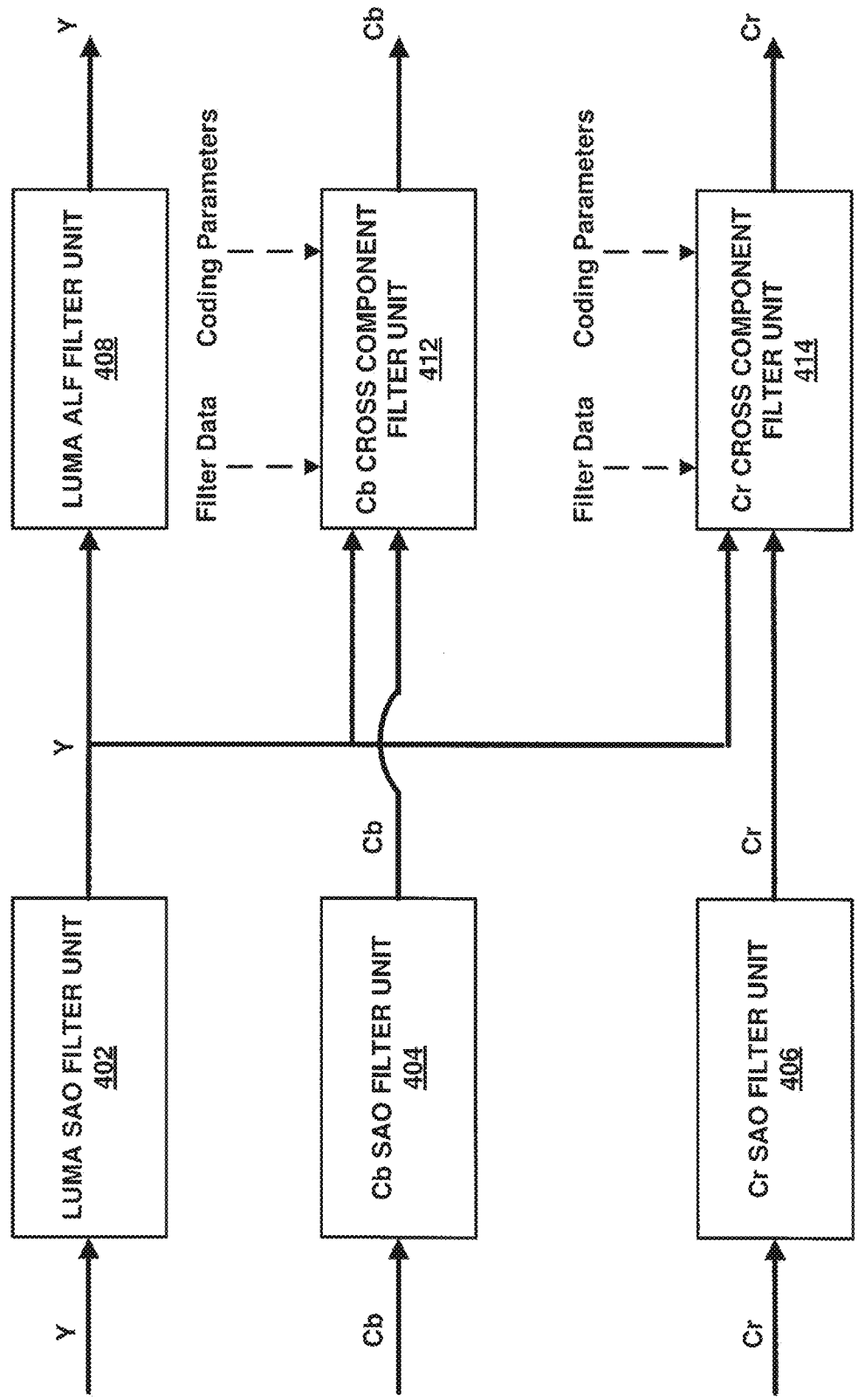
FIG. 19A is a block diagram illustrating example of cross component filter units that may be configured to reduce a reconstruction error according to one or more techniques of this disclosure.
Figure 19B:
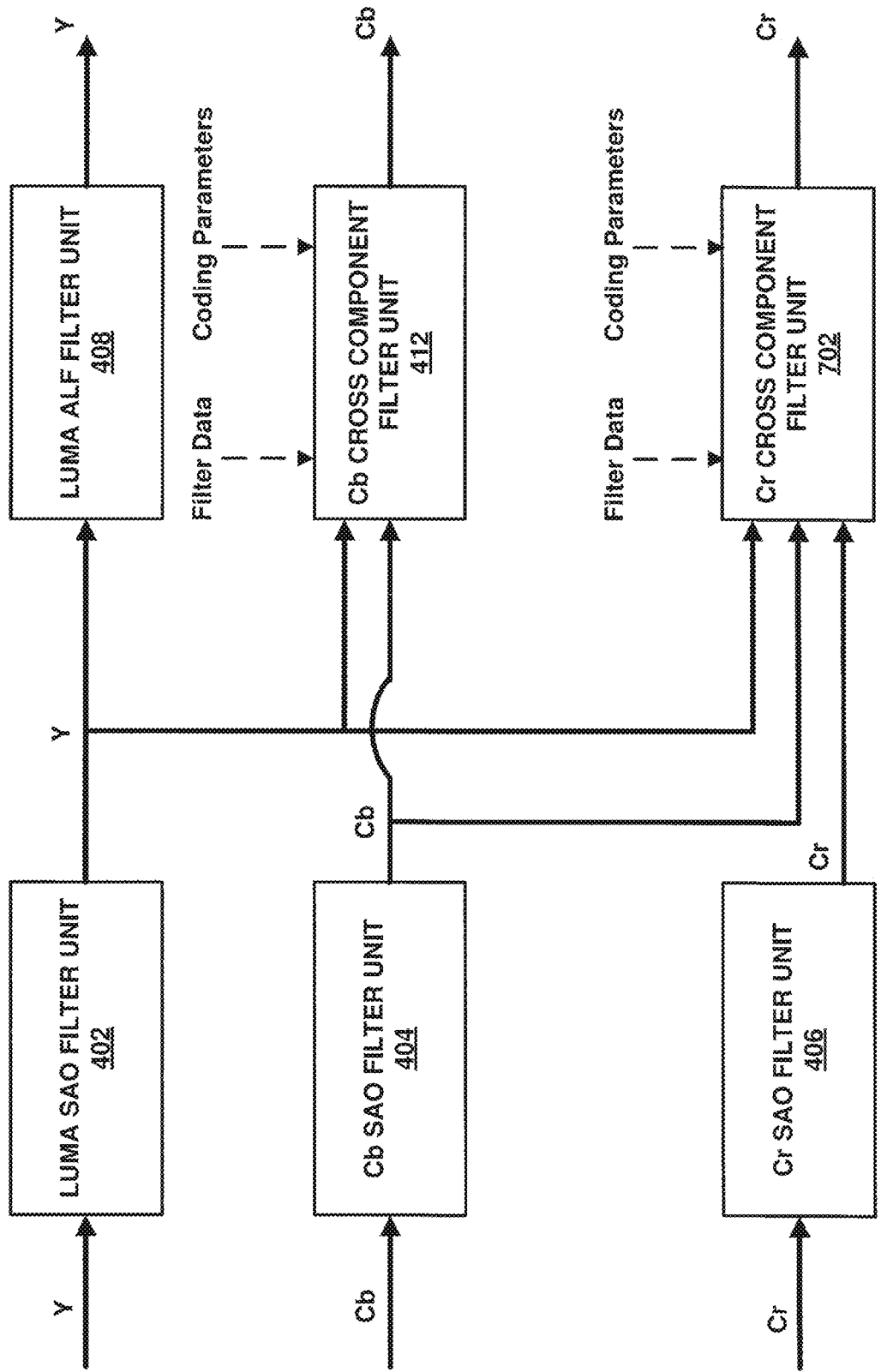
FIG. 19B is a block diagram illustrating example of cross component filter units that may be configured to reduce a reconstruction error according to one or more techniques of this disclosure.
Figure 19C:
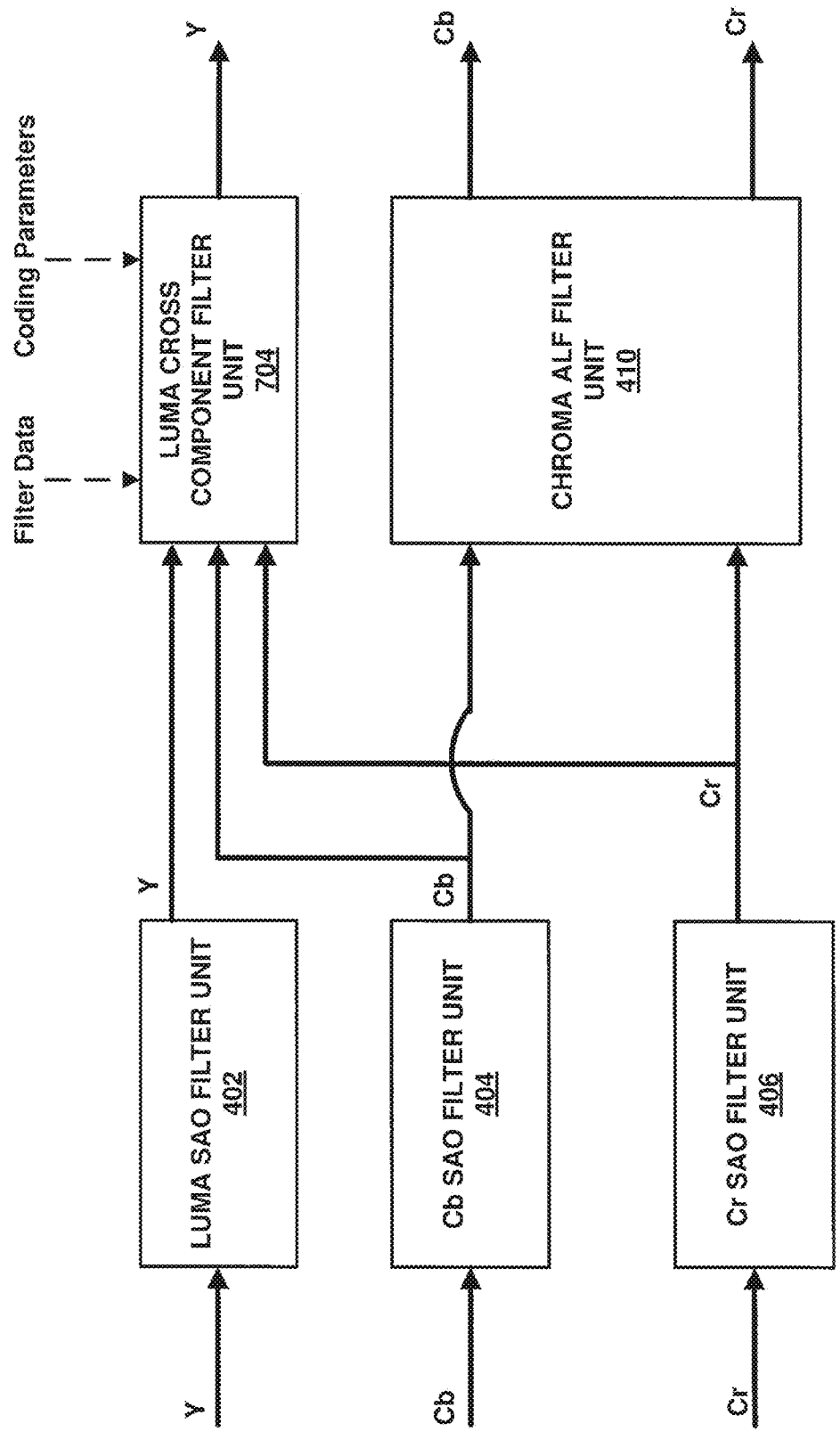
FIG. 19C is a block diagram illustrating example of cross component filter units that may be configured to reduce a reconstruction error according to one or more techniques of this disclosure.

As described above, the cross component filtering techniques describe herein may be generally applied to each component of video data. As such, one or more combinations of components of video data may be used to reduce a reconstruction error for one or more other components of video data. FIGS. 19A-19C are block diagrams illustrating examples of cross component filter units that may be configured to reduce a reconstruction error according to one or more techniques of this disclosure. That is, FIGS. 19A-19C illustrate examples of loop filters that may be included in filtering unit 514. In FIGS. 19A-19C, commonly number elements are described above. Cr Cross Component filter unit 702 is an example of a filter unit configured to filter a Cr component based on a luma component, a Cb component, filter data, and coding parameters. Luma Cross Component filter unit 704 is an example of a filter unit configured to filter a luma component based on a luma component, a Cb component, a Cr component, filter data, and coding parameters. Thus, video decoder 500 represents an example of a device configure to receive reconstructed sample data for a current component of video data, receiving reconstructed sample data for one or more additional components of video data, derive a cross component filter based on data associated with one or more additional components of video data, and apply a filter to the reconstructed sample data for a current component of video data based on the derived cross component filter and the reconstructed sample data for one or more additional components of video data.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

SUMMARY

In one example, a method of reducing a reconstruction error in video data, the method comprising: receiving reconstructed sample data for a current component of video data; receiving reconstructed sample data for one or more additional components of video data; deriving a cross component filter based on data associated with one or more additional components of video data; and applying a filter to the reconstructed sample data for a current component of video data based on the derived cross component filter and the reconstructed sample data for one or more additional components of video data.

In one example, the method, further comprising signaling information associated with the derived cross component filter.

In one example, the method, wherein deriving a cross component filter includes parsing signaling to determine cross component filter parameters.

In one example, the method, wherein deriving a cross component filter based on data associated with one or more additional components of video data includes deriving a cross component filter based on a known reconstruction error.

In one example, the method, a cross component filter is specified according to filter coefficients.

In one example, a device for coding video data, the device comprising one or more processors configured to perform any and all combinations of the steps.

In one example, the device, wherein the device includes a video encoder.

In one example, the device, wherein the device includes a video decoder.

In one example, a system comprising: the device includes a video encoder; and the device includes a video decoder.

In one example, an apparatus for coding video data, the apparatus comprising means for performing any and all combinations of the steps.

In one example, a non-transitory computer-readable storage medium comprising instructions stored thereon that, when executed, cause one or more processors of a device for coding video data to perform any and all combinations of the steps.

In one example, a method of filtering reconstructed video data, the method comprising: parsing a first syntax element used for setting cross-component filter coefficients; inputting a reconstructed luma picture sample array; deriving luma locations by using location corresponding to a current chroma sample; deriving an filter coefficient array by using the cross-component filter coefficients; deriving a variable by using the filter coefficient array and the reconstructed luma picture sample array defined by the luma locations; and deriving a scaled variable by using the variable, wherein the variable is modified by a sum of a sample of a current chroma block, which is defined by a predetermined location, and the scaled variable.

In one example, the method, wherein the syntax element is a syntax element for specifying an adaption parameter set identifier and the syntax element is included in a slice header.

In one example, the method, further comprising: decoding a second syntax element used for setting the cross-component filter coefficients, wherein the second syntax element is included in a coding tree unit syntax structure.

In one example, the method, wherein the first syntax element is decoded according to a value of a cross component adaptive loop filter enabled flag.

In one example, the method, wherein the second syntax element specifies whether a cross-component filter is applied to a block.

In one example, the method, wherein the second syntax element specifies whether a cross-component filter is applied to a block.

In one example, the method, wherein the second syntax element is entropy coded by using a truncated Rice binarization process.

In one example, a device for coding video data, the device comprising one or more processors configured to: code a first syntax element used for setting cross-component filter coefficients; input a reconstructed luma picture sample array; derive luma locations by using a location corresponding to a current chroma sample; derive an filter coefficient array by using the cross-component filter coefficients; derive a variable by using the filter coefficient array and the reconstructed luma picture sample array defined by the luma locations; and derive a scaled variable by using the variable, wherein the variable is modified by a sum of a sample of a current chroma block, which is defined by a predetermined location, and the scaled variable.

In one example, a device for decoding video data, the device comprising one or more processors configured to: decode a first syntax element used for setting cross-component filter coefficients; input a reconstructed luma picture sample array; derive luma locations by using a location corresponding to a current chroma sample; derive an filter coefficient array by using the cross-component filter coefficients; derive a variable by using the filter coefficient array and the reconstructed luma picture sample array defined by the luma locations; and derive a scaled variable by using the variable, wherein the variable is modified by a sum of a sample of a current chroma block, which is defined by a predetermined location, and the scaled variable.

The invention claimed is:

1. A method of decoding coded data, the method comprising:
   parsing a first syntax element, wherein the first syntax element plus one specifies a number of cross-component adaptive loop filters, wherein a value of the first syntax element is in a range of zero to three;
   parsing a second syntax element specifying whether a cross-component adaptive loop filter is enabled;
   parsing a third syntax element, wherein the third syntax element specifies a fourth syntax element that a chroma colour component of a slice refers to;
   parsing a fifth syntax element in a coding tree unit, wherein the fifth syntax element specifies whether the cross-component adaptive loop filter is applied to a coding tree block and when a value of the fifth syntax element is not equal to 0, a filter set index of the cross-component adaptive loop filter is applied to the coding tree block; and
   applying the cross-component adaptive loop filter based on the value of the fifth syntax element,
   wherein in a case that a value of the second syntax element is equal to 1 and the third syntax element is not present, a value of the third syntax element is inferred to be equal to a value of a sixth syntax element.

2. A decoder for decoding coded data, the decoder comprising:
   a processor; and
   a memory associated with the processor, wherein the processor is configured to:
   parse a first syntax element, wherein the first syntax element plus one specifies a number of cross-component adaptive loop filters, wherein a value of the first syntax element is in a range of zero to three;
   parse a second syntax element specifying whether a cross-component adaptive loop filter is enabled;
   parse a third syntax element, wherein the third syntax element specifies a fourth syntax element that a chroma colour component of a slice refers to;
   parse a fifth syntax element in a coding tree unit, wherein the fifth syntax element specifies whether the cross-component adaptive loop filter is applied to a coding tree block and when a value of the fifth syntax element is not equal to 0, a filter set index of the cross-component adaptive loop filter is applied to the coding tree block; and
   apply the cross-component adaptive loop filter based on the value of the fifth syntax element,
   wherein in a case that a value of the second syntax element is equal to 1 and the third syntax element is not present, a value of the third syntax element is inferred to be equal to a value of a sixth syntax element.

3. An encoder for encoding image data, the encoder comprising:
   a processor; and
   a memory associated with the processor, wherein the processor is configured to:
   encode a first syntax element, wherein the first syntax element plus one specifies a number of cross-component adaptive loop filters, wherein a value of the first syntax element is in a range of zero to three;
   encode a second syntax element specifying whether a cross-component adaptive loop filter is enabled;
   encode a third syntax element, wherein the third syntax element specifies a fourth syntax element that a chroma colour component of a slice refers to;
   encode a fifth syntax element in a coding tree unit, wherein the fifth syntax element specifies whether the cross-component adaptive loop filter is applied to a coding tree block and when a value of the fifth syntax element is not equal to 0, a filter set index of the cross-component adaptive loop filter is applied to the coding tree block; and
   apply the cross-component adaptive loop filter based on the value of the fifth syntax element,
   wherein in a case that a value of the second syntax element is equal to 1 and the third syntax element is not present, a value of the third syntax element is inferred to be equal to a value of a sixth syntax element.

* * * * *